(12) United States Patent
Fujino et al.

(10) Patent No.: US 12,516,114 B2
(45) Date of Patent: Jan. 6, 2026

(54) HUMAN ANTI-IL-33 NEUTRALIZING MONOCLONAL ANTIBODY

(71) Applicant: Mitsubishi Tanabe Pharma Corporation, Osaka (JP)

(72) Inventors: Yasuhiro Fujino, Osaka (JP); Tsutomu Yoshikawa, Osaka (JP); Hiroshi Ochi, Osaka (JP)

(73) Assignee: Mitsubishi Tanabe Pharma Corporation, Osaka (JP)

( * ) Notice: Subject to any disclaimer, the term of this patent is extended or adjusted under 35 U.S.C. 154(b) by 36 days.

(21) Appl. No.: 18/340,790

(22) Filed: Jun. 23, 2023

(65) Prior Publication Data

US 2024/0002495 A1    Jan. 4, 2024

Related U.S. Application Data

(60) Continuation of application No. 16/414,602, filed on May 16, 2019, now Pat. No. 11,725,049, which is a continuation of application No. 15/621,950, filed on Jun. 13, 2017, now abandoned, which is a division of application No. 15/037,998, filed as application No. PCT/JP2014/084695 on Dec. 26, 2014, now Pat. No. 9,758,578.

(30) Foreign Application Priority Data

Dec. 26, 2013 (JP) ................................. 2013-270551
Apr. 4, 2014 (JP) ................................. 2014-078223

(51) Int. Cl.
*C07K 16/24* (2006.01)
*A61K 39/395* (2006.01)
*A61K 39/00* (2006.01)

(52) U.S. Cl.
CPC ...... *C07K 16/244* (2013.01); *A61K 39/39591* (2013.01); *A61K 2039/505* (2013.01); *C07K 2317/33* (2013.01); *C07K 2317/34* (2013.01); *C07K 2317/55* (2013.01); *C07K 2317/565* (2013.01); *C07K 2317/76* (2013.01); *C07K 2317/92* (2013.01); *C07K 2317/94* (2013.01)

(58) Field of Classification Search
None
See application file for complete search history.

(56) References Cited

U.S. PATENT DOCUMENTS

| | | | |
|---|---|---|---|
| 9,758,578 B2 | 9/2017 | Fujino et al. | |
| 2008/0063634 A1 | 3/2008 | Salfeld et al. | |
| 2010/0260705 A1 | 10/2010 | Martin | |
| 2014/0099280 A1 | 4/2014 | Girard et al. | |
| 2016/0289322 A1 | 10/2016 | Fujino et al. | |
| 2020/0190182 A1 | 6/2020 | Tomohiro et al. | |
| 2022/0041709 A1 | 2/2022 | Ikemoto et al. | |

FOREIGN PATENT DOCUMENTS

| | | |
|---|---|---|
| CA | 2685124 A1 | 11/2008 |
| CN | 101189265 A | 5/2008 |
| CN | 103459426 A | 12/2013 |
| EA | 201591331 A1 | 1/2016 |
| EP | 3 277 717 A1 | 2/2018 |
| JP | 2004-331569 A | 11/2004 |
| JP | 2007-523089 A | 8/2007 |
| JP | 2007-537702 A | 12/2007 |
| JP | 2008-520684 A | 6/2008 |
| JP | 2008-543340 A | 12/2008 |
| JP | 2010-513306 A | 4/2010 |
| JP | 2011-526591 A | 10/2011 |
| JP | 2012-010702 A | 1/2012 |
| JP | 2012-502967 A | 2/2012 |
| JP | 2017-008003 A | 1/2017 |
| WO | WO 2005/007699 A2 | 1/2005 |
| WO | WO 2005/079844 A2 | 9/2005 |
| WO | WO 2006/055638 A2 | 5/2006 |
| WO | WO 2006/128690 A1 | 12/2006 |
| WO | WO 2007/002261 A2 | 1/2007 |
| WO | WO 2008/074004 A2 | 6/2008 |
| WO | WO 2008/132709 A1 | 11/2008 |
| WO | WO 2008/144610 A1 | 11/2008 |
| WO | WO 2010/000721 A1 | 1/2010 |
| WO | WO 2010/032061 A1 | 3/2010 |
| WO | WO 2011/031600 A1 | 3/2011 |
| WO | WO 2012/113927 A1 | 8/2012 |

(Continued)

OTHER PUBLICATIONS

Akcay et al., "IL-33 exacerbates acute kidney injury," J. Am. Soc. Nephrol., vol. 22, pp. 2057-2067, 2011.
Choi et al., "Interleukin-33 induces angiogenesis and vascular permeability through ST2/TRAF6-mediated endothelial nitric oxide production", Blood, vol. 114, No. 14, pp. 3117-3126, 2009.
Czajkowsky et al., "Fc-fusion proteins: new developments and future perspectives", EMBO Molecular Medicine, vol. 4, No. 10, pp. 1015-1028, 2012.
Daugherty et al., "Formulation and delivery issues for monoclonal antibody therapeutics", Advanced Drug Delivery, Elsevier, Amsterdam, NL, vol. 58, No. 5-6, Aug. 7, 2006, pp. 686-706.

(Continued)

*Primary Examiner* — Daniel C Gamett
(74) *Attorney, Agent, or Firm* — Knobbe, Martens, Olson & Bear, LLP

(57) ABSTRACT

An antibody has an antagonistic effect against IL-33. An isolated human anti-IL-33 neutralizing monoclonal antibody has framework regions with amino acid sequences from a germline, including combinations and fragments of such sequences. The epitopes for a plurality of anti-IL-33 monoclonal antibodies were identified, human anti-IL-33 neutralizing monoclonal antibodies were obtained, and the complementarity-determining regions that achieve high binding ability to IL-33 was specified by introducing mutations in the complementarity-determining regions. The identified complementarity-determining regions were used to produce the foregoing human anti-IL-33 neutralizing monoclonal antibodies having framework regions.

3 Claims, 11 Drawing Sheets

Specification includes a Sequence Listing.

(56) References Cited

FOREIGN PATENT DOCUMENTS

| WO | WO 2014/152195 A1 | 9/2014 |
|---|---|---|
| WO | WO 2014/164959 A2 | 10/2014 |
| WO | WO 2015/099175 A1 | 7/2015 |
| WO | WO 2015/106080 A2 | 7/2015 |
| WO | WO 2016/031932 A1 | 3/2016 |
| WO | WO 2016/077366 A1 | 5/2016 |
| WO | WO 2016/140921 A1 | 9/2016 |
| WO | WO 2016/140922 A1 | 9/2016 |
| WO | WO 2016/156440 A1 | 10/2016 |
| WO | WO 2017/062456 A2 | 4/2017 |
| WO | WO 2018/158332 A1 | 9/2018 |

OTHER PUBLICATIONS

Guabiraba, R., et al., IL-33 Targeting Attenuates Intestinal Mucositis and Enhances Effective Tumour Chemotherapy in Mice, Mucosal Immunology, vol. 7, No. 5, pp. 1079-1093, 2014.

Hayakawa et al., "Soluble ST2 Blocks Interleukin-33 Signaling in Allergic Airway Inflammation", The Journal of Biological Chemistry, vol. 282, No. 36, pp. 26369-26380, 2007.

Honda et al., Analytical Tips for Biopharmaceutics Foundation on the Application for Quality Assessment Part 9: Analyzing and engineering protein stabilities, Pharm Tech Japan, vol. 34, No. 5, pp. 885-894, 2018.

Hu et al., "Serum IL-33 as a diagnostic and prognostic marker in non-small cell lung cancer," Asian Pacific Journal of Cancer Prevention, vol. 14, No. 4, pp. 2563-2566, 2013.

Izutsu K., Lyophilization of Protein Pharmaceuticals, Journal of Pharmaceuticals Science and Technology Japan, vol. 72, No. 6, pp. 353-358, 2012.

Kang et al., "Rapid Formulation Development for Monoclonal Antibodies", Bioprocess International, Informa Life Sciences Group, US, vol. 14, No. 4, Apr. 12, 2016, p. 40, 42, 44, 46,.

Lee, H.Y., et al., Blockade of IL-33/ST2 Ameliorates Airway Inflammation in a Murine Model of Allergic Asthma, Experimental Lung Research, vol. 40, No. 2, pp. 66-76, 2014.

Li, P., et al., IL-33 Neutralization Suppresses Lupus Disease in Lupus-Prone Mice, Inflammation, vol. 37, No. 3, pp. 824-832, 2014.

Liu, X., et al., Structural Insights into the Interaction of IL-33 with its Receptors, PNAS, vol. 110, No. 37, pp. 14918-14923, 2013.

Lloyd et al., Modelling the human immune response: performance of a 1011 human antibody repertoire against a broad panel of therapeutically relevant antigens. Protein Engineering, Design & Selection. Mar. 1, 2009;22(3):159-168.

Lucchese et al., How a Single Amino Acid Change May Alter the Immunological Information of a Peptide, Frontiers in Bioscience, E4, pp. 1843-1852, Jan. 1, 2012.

Matsuyama et al., "Increased levels of interleukin 33 in sera and synovial fluid from patients with active rheumatoid arthritis," The Journal of Rheumatology, vol. 37, No. 1, pp. 18-25, 2010.

Mbarik et al., "Soluble ST2 and IL-33: Potential Markers of Endometriosis in the Tunisian Population", Immunology Letters, vol. 166, pp. 1-5, 2015.

Mchedlidze et al., "Interleukin-33-dependent innate lymphoid cells mediate hepatic fibrosis," Immunity, vol. 39, pp. 357-371, Aug. 22, 2013.

Mei et al., Indoleamine 2,3- dioxygenase-1 (ID01) in human endometrial stromal cells induces macrophage tolerance through interleukin-33 in the progression of endometriosis, International Journal of Clinical and Experimental Pathology, vol. 7, No. 6, pp. 2743-2757, 2014.

Miller et al., "Inter Leukin-33 Modulates Inflammation in Endometriosis", Reproductive Sciences, vol. 25, Supplement 1, pp. 287A-288A, 2018.

Miller et al., "Inter Leukin-33 Modulates Inflammation in Endometriosis", Scientific Reports, vol. 7, No. 17903, pp. 1-11, 2017.

Miller et al., "Pro-inflammatory effects of IL-33 in endometriosis", Reproductive Sciences, vol. 24, Supplement 1, p. 270A, S-113, 2017.

Mitzutani et al., Interleukin-33 and alveolar macrophages contribute to the mechanisms underlying the exacerbation of IgE-mediated airway inflammation and remodeling in mice, Immunology, vol. 139, pp. 205-218, 2013.

Nabe, T., Interleukin (IL)-33: New Therapeutic Target for Atopic Diseases Journal of Pharmacological Sciences, vol. 126, No. 2, pp. 85-91, 2014.

Ohno et al., "Interleukin-33 in allergy," Allergy, vol. 67, pp. 1203-1214, 2012.

Pastorelli et al., "Epithelial-derived IL-33 and its receptor ST2 are dysregulated in ulcerative colitis and in experimental Th1/Th2 driven enteritis," PNAS, vol. 107, No. 17, pp. 8017-8022, Apr. 27, 2010.

Prefontaine et al., "Increased IL-33 expression by epithelial cells in bronchial asthma," J. Allergy Clin. Immunol., Letter to the Editor, vol. 125, No. 3, pp. 752-754, 2010.

Qiu et al., Anti-Interleukin-33 Inhibits Cigarette Smoke-Induced Lung Inflammation in Mice, Immunology, vol. 138, No. 1, pp. 76-82, 2012.

Rankin et al., "IL-33 induces IL-13-dependent cutaneous fibrosis," The Journal of Immunology, pp. 1526-1535, 2010.

Rudikoff et al., Single Amino Acid Substitution Altering Antigen-Binding Specificity, Proc. Natl. Acad. Sci. USA, vol. 79, pp. 1979-1983, Mar. 1982.

Santulli et al., "Serum and Peritoneal Inter Leukin-33 Levels and Elevated in Deeply Infiltrating Endometriosis", Human Reproduction, vol. 27, No. 7, pp. 2001-2009, 2012.

Shadie et al., Ambient Particulate Matter Includes an Exacerbation of Airway Inflammation in Experimental Asthma: Role of Interleukin-33, Clinical & Experimental Immunology, vol. 177, No. 2, pp. 491-499, 2014.

Shire, Formulation of proteins and monoclonal antibodies mAbs, Jan. 1, 2015, Monoclonal Antibodies: Meeting The Challenges in Manufacturing, Formulation, Delivery and Stability of Final Drug Product, pp. 93-120.

Suria, Anaptysbio Announces Development of Novel Anti-IL33 Therapeutic Antibody, AnaptysBio, 1 page, Jan. 10, 2014.

Uchiyama, U., Analytical Tips for Biopharmaceutics Foundation on the Application for Quality Assessment Part 6: Properties of protein solution, Pharm Tech Japan, vol. 34, No. 1, pp. 109-120, 2018.

Wang et al., Antibody Structure, Instability, and Formulation, J Pharma Sciences, vol. 96, No. 1, Jan. 1, 2007, pp. 1-26.

Xu et al., IL-33 exacerbates autoantibody-induced arthritis, J Immunol. Mar. 1, 2010; vol. 184, No. 5, pp. 2620-2626.

Xu et al., Influenza H1N1 A/Solomon Island/3/06 Virus Receptor Binding Specificity Correlates with Virus Pathogenicity, Antigenicity, and Immunogenicity in Ferrets, J Virol. vol. 84, No. 10, pp. 4936-4945, May 2010.

Yanaba et al., "Serum IL-33 levels are raised in patients with systemic sclerosis: association with extent of skin sclerosis and severity of pulmonary fibrosis," Clin. Rheumatol., vol. 30, pp. 825-830, 2011.

International Search Report mailed Mar. 31, 2015 for International Patent Application No. PCT/JP2014/084695 filed Dec. 26, 2014; 4 pages.

International Search Report & Written Opinion, mailed Oct. 9, 2018, in International Application No. PCT/JP2018/032494.

International Preliminary Report on Patentability, dated Jul. 31, 2019, in International Application No. PCT/JP2018/032494.

Notice of Reasons for Rejection mailed Jan. 25, 2022 in Patent Application No. P 2020-219204.

European Search Report and Search Opinion for EP Application No. 19860824.2 dated May 6, 2022.

European Search Report issued in EP Application No. 23166641, dated Aug. 25, 2023.

Ohno et al., "Paracrine IL-33 Stimulation Enhances Lipopolysaccharide-Mediated Macrophage Activation", PLoS ONE, 2011, 6(4): 1-10.

Notice of Allowance issued in Chinese Application No. 202010976343.7, dated Oct. 1, 2025.

Almost entire region (S117-T270) of mature human IL-33 (S112-T270)

Part of PEP12(S117-N130)

PEP14(D131-L150)

PEP24(E231-I250)

PEP26(K251-T270)

| Peptide ID | Human IL-33 Amino Acid Number N terminous / C terminous | | Amino Acid Length | Peptide Sequence | Position in V101-T270 region of human IL-33 |
|---|---|---|---|---|---|
| PEP11 (SEQ ID No.410) | 101 | 120 | 20 | VQKYTRALHDSSITGISPIT | |
| PEP12 (SEQ ID No.411) | 111 | 130 | 20 | SSITGISPITEYLASLSTYN | |
| PEP13 (SEQ ID No.412) | 121 | 140 | 20 | EYLASLSTYNDQSITFALED | |
| PEP14 (SEQ ID No.413) | 131 | 150 | 20 | DQSITFALEDESYEIYVEDL | |
| PEP15 (SEQ ID No.414) | 141 | 160 | 20 | ESYEIYVEDLKKDEKKDKVL | |
| PEP16 (SEQ ID No.415) | 151 | 170 | 20 | KKDEKKDKVLSYTESDHPS | |
| PEP17 (SEQ ID No.416) | 161 | 180 | 20 | LSYTESDPSNE SGDGVDCK | |
| PEP18 (SEQ ID No.417) | 171 | 190 | 20 | NESGDGVDGKMLMVTLSPTK | |
| PEP19 (SEQ ID No.418) | 181 | 200 | 20 | MLMVTLSPTKDFWLHANNKE | |
| PEP20 (SEQ ID No.419) | 191 | 210 | 20 | DFWLHANNKEHSVELHKCEK | |
| PEP21 (SEQ ID No.420) | 201 | 220 | 20 | HSVELHKCEKPLPDQAFFVL | |
| PEP22 (SEQ ID No.421) | 211 | 230 | 20 | PLPDQAFFVLHNMHSNCVSF | |
| PEP23 (SEQ ID No.422) | 221 | 240 | 20 | HNMHSNCVSFECKTDPGVF1 | |
| PEP24 (SEQ ID No.423) | 231 | 250 | 20 | ECKTDPGVF1GVKDNHLAL1 | |
| PEP25 (SEQ ID No.424) | 241 | 260 | 20 | GVKDNHLAL1KVDSSENLCT | |
| PEP26 (SEQ ID No.425) | 251 | 270 | 20 | KVDSSENLCTENILFKLSET | |

FIG. 12

HUMAN ANTI-IL-33 NEUTRALIZING MONOCLONAL ANTIBODY

CROSS REFERENCE TO RELATED APPLICATIONS

Any and all applications for which a foreign or domestic priority claim is identified in the Application Data Sheet as filed with the present application are hereby incorporated by reference under 37 CFR 1.57.

REFERENCE TO ELECTRONIC SEQUENCE LISTING

The present application is being filed along with an Electronic Sequence Listing in ST.26 format. The Electronic Sequence Listing is provided as a file entitled SWA018_001C2_SL.xml created and last saved on Jun. 23, 2023, which is approximately 527.6 KB in size. The information in the Electronic Sequence Listing is incorporated herein by reference in its entirety in accordance with 35 U.S.C. § 1.52(e)

TECHNICAL FIELD

The present invention relates to a human anti-IL-33 neutralizing monoclonal antibody and an antibody which competes therewith; and a cytokine expression inhibitor containing any of such antibodies; and a pharmaceutical composition containing any of such antibodies for treatment, prevention, or alleviation of diseases associated with IL-33.

BACKGROUND ART

Interleukin-33 (hereinafter, referred to as IL-33) is a cytokine of the interleukin-1 family, which is believed to be involved in inflammatory conditions. IL-33 is constitutively expressed in the nuclei of epithelial cells and vascular endothelial cells, is released during cell destruction following tissue injury caused by infections or physical or chemical stress, and then acts as alarmin. It is also believed that IL-33 expression and secretion are increased by stimulation with lipopolysaccharide or the like in some mechanisms. The extracellularly released IL-33 binds to IL-33 receptors expressed on cells, thereby being capable of activating intracellular signal transduction. IL-33 receptors are expressed on various immune cells and epithelial cells, where IL-33-induced intracellular signal transduction occurs.

IL-33 is believed to induce allergic inflammation (for example, asthma, atopic dermatitis, pollinosis, and anaphylactic shock) by inducing production of Th2 cytokines (for example, IL-4, IL-5, IL-6, and IL-13) from Th2 cells, mast cells, eosinophils, basophils, natural killer T (NKT) cells, and Group 2 innate lymphocytes, among immune cells expressing IL-33 receptors (NPL 1: Tatsukuni Ohno et al., Allergy, 2012, Vol. 67, p. 1203). In mast cells and macrophages among the immune cells expressing IL-33 receptors, stimulation with IL-33 induces production of IL-1β, IL-6, and tumor necrosis factor α (TNF-α), which is suggested to be involved in the development of autoantibody-induced arthritis (model of rheumatoid arthritis) (NPL 2: Damo Xu et al., Journal of Immunology, 2010, Vol. 184, p. 2620). IL-33 antagonists are suggested to be effective against acute kidney injury (NPL 3: Ali Akcay et al., Journal of American Society Nephrology, 2011, Vol. 22, p. 2057). Increased IL-33 expression is observed in various human inflammatory diseases (for example, rheumatoid arthritis, asthma, systemic sclerosis, fibrosis such as hepatic fibrosis and pulmonary fibrosis, psoriasis, ulcerative colitis, Crohn's disease, multiple sclerosis, and ankylosing spondylitis), and IL-33 is believed to be involved in the development and maintenance of various diseases (NPL 4: Yasushi Matsuyama et al., Journal of Rheumatology, 2010, Vol. 37, p. 18; NPL 5: David Prefontaine et al., Journal of Allergy and Clinical Immunology, 2010, Vol. 125, p. 752; NPL 6: Koichi Yanaba et al., Clinical Rheumatology, 2011, Vol. 30, p. 825; NPL 7: A. L. Rankin et al., Journal of Immunology, 2010, Vol. 184, p. 1526; NPL 8: Tamar Mchedlidze et al., Immunity, 2013, Vol. 39, p. 357; NPL 9: Liang-An Hu et al., Asian Pacific Journal of Cancer Prevention, 2013, Vol. 14, p. 2563; NPL 10: Luca Pastorelli et al., Proceedings of the National Academy of Sciences of the United States of America, 2010, vol. 107, p. 8017).

Based on the knowledge on the association of IL-33 with various diseases, in particular inflammatory diseases, IL-33 agonists and antagonists have been developed (PTLs 1 to 4). Among the IL-33 agonists and antagonists, antibodies to IL-33 have been attracting attention, in view of their specificity and potency. Several antibodies which have been developed are directed to a murine antibody which fails to specify the epitope for the antibody (PTL 1); an antibody which recognizes a region including the caspase cleavage site of IL-33 residues 155 to 198 of SEQ ID NO:226 in the Sequence Listing) as epitope, based on the findings of the specific caspase cleavage site of IL-33 and the findings that the uncleaved form of IL-33 is the active form(PTL2); and several goat polyclonal antibodies which are commercially available. An article dated January 10th, 2014 on the website of AnaptysBio, Inc. reports their successful preparation of ANB020, the candidate for development of anti-IL-33 therapeutic antibody, using their proprietary somatic hypermutation technology (SHM-XEL) platform (NPL 11: Hamza Suria, 'AnaptysBio announces development of novel anti-IL-33 therapeutic antibody', [on line], 2014, [retrieved on 11 Jan. 2014], Retrieved from Internet:<URL: http://www.anaptysbio.com/anti-il-33/>). Murphy et al. disclose that they prepared 20 types of human anti-IL-33 monoclonal antibodies using VelocImmune mouse, that is, mouse transgenic for variable regions of a human antibody gene (PTL 5), but fail to disclose the epitope for the antibodies. In addition, the amino acid sequences of the framework regions of the 20 types of human anti-IL-33 monoclonal antibodies are different from human germline sequences in two or more amino acid residues. Due to such a difference, administration of these antibodies to human causes immune reaction to them to induce human anti-human immunoglobulin antibody (HAHA), which undesirably reduces the effects of the antibodies and induces inflammation or other side effects.

CITATION LIST

Patent Literature

PTL 1: WO 2005/079844
PTL 2: WO 2008/132709
PTL 3: WO 2011/031600
PTL 4: WO 2008/144610
PTL 5: WO 2014/164959

Non Patent Literature

NPL 1: Tatsukuni Ohno et al., Allergy, 2012, Vol. 67, p. 120
NPL 2: Damo Xu et al., Journal of Immunology, 2010, Vol. 184, p. 2620
NPL 3: Ali Akcay et al., Journal of American Society Nephrology, 2011, Vol. 22, p. 2057
NPL 4: Yasushi Matsuyama et al., Journal of Rheumatology, 2010, Vol. 37, p. 18
NPL 5: David Prefontaine et al., Journal of Allergy and Clinical Immunology, 2010, Vol. 125, p. 752
NPL 6: Koichi Yanaba et al., Clinical Rheumatology, 2011, Vol. 30, p. 825
NPL 7: A. L. Rankin et al., Journal of Immunology, 2010, Vol. 184, p. 1526
NPL 8: Tamar Mchedlidze et al., Immunity, 2013, Vol. 39, p. 357
NPL 9: Liang-An Hu et al., Asian Pacific Journal of Cancer Prevention, 2013, Vol. 14, p. 2563
NPL 10: Luca Pastorelli et al., Proceedings of the National Academy of Sciences of the United States of America, 2010, vol. 107, p. 8017
NPL 11: Hamza Suria, 'AnaptysBio announces development of novel anti-IL-33 therapeutic antibody', [on line], 2014, [retrieved on 11 Jan. 2014], Retrieved from Internet: <URL: http://www.anaptysbio.com/anti-il-33/>

SUMMARY OF INVENTION

Technical Problem

The association of IL-33 with some diseases has been clarified and development of an anti-IL-33 neutralizing monoclonal antibody having antagonistic effect against IL-33 has been required in recent years. The action of the anti-IL-33 neutralizing monoclonal antibody is closely related to the region of an epitope to which the antibody is to bind. Since IL-33 is extracellularly released during cell destruction, IL-33 is likely to be cleaved by lysosomal proteolytic enzymes, which may produce so-called mature IL-33 and many fragments derived from the mature IL-33 and having the activity of IL-33. If the fragments include an epitope consisting of a continuous amino acid sequence, a monoclonal antibody that is capable of binding to the epitope consisting of a continuous amino acid sequence of IL-33 is more advantageous than a monoclonal antibody that is capable of binding to an epitope consisting of a discontinuous amino acid sequence, because the former is capable of binding firmly to the continuous amino acid sequence of one of the fragments and inhibits the binding between the fragment and IL-33 receptors. However, it has remained difficult to identify such an epitope consisting of a continuous amino acid sequence for production of an anti-IL-33 monoclonal antibody having a desired antagonistic effect.

The anti-IL-33 neutralizing monoclonal antibody that is capable of binding to an epitope consisting of a continuous amino acid sequence of IL-33 preferably exhibits low antigenicity when it is administered to a human or the like. A human antibody preferably exhibits low antigenicity when it is administered to a human and has framework regions comprising amino acid sequences framework regions from a human germline or amino acid sequences consisting of a combination thereof. However, when the SHM-XEL platform or the like is applied to a human antibody contained in a human antibody gene library, amino acid sequence mutation occurs not only in the complementarity-determining regions but also in the framework regions. Furthermore, if a transgenic mouse induced with a gene of a human antibody is immunized with a human IL-33 protein to prepare a human anti-IL-33 neutralizing monoclonal antibody, mutation cannot be avoided in the amino acid sequences of the framework regions of the anti-IL-33 neutralizing monoclonal antibody. Accordingly, it has remained difficult to prepare an isolated anti-IL-33 human monoclonal antibody that includes framework regions comprising amino acid sequences of framework regions from a human germline or amino acid sequences consisting of the combination thereof.

Solution to Problem

The inventors, who have made extensive studies to solve the problems, found that an antibody that is capable of firmly binding to the epitope traditionally believed as preferred epitope, i.e. epitope present in a sequence spanning positions 155 to 198 of IL-33, has little antagonistic effect and that an epitope consisting of a continuous amino acid sequence present in a sequence spanning positions 101 to 154 or 199 to 270 of IL-33, in particular positions 111 to 130, 131 to 150, 231 to 250, or 251 to 270, is significant in view of the antagonistic effect of an antibody that is capable of binding to the epitope, and arrived at the present invention.

The inventors have also isolated a human anti-IL-33 neutralizing monoclonal antibody from a human antibody library, and have introduced mutations only in its complementarity-determining regions to identify the complementarity-determining regions that achieve excellent binding ability and physical properties. As a result, the inventors have successfully obtained a human antibody that has framework regions consisting of amino acid sequences without any mutation as compared to the amino acid sequences of the framework regions of the germline and is capable of binding to human IL-33 to neutralize its functions. The present invention involves the following aspects:

[1]. A monoclonal antibody that is capable of binding to an epitope consisting of a continuous amino acid sequence included in positions 101 to 154 or 199 to 270 of SEQ ID NO:226 in the Sequence Listing.

[2]. The antibody according to Aspect 1, wherein the epitope consisting of a continuous amino acid sequence included in positions 101 to 154 or 199 to 270 of SEQ ID NO:226 in the Sequence Listing consists of a continuous amino acid sequence included in positions 111 to 130, 131 to 150, 231 to 250, or 251 to 270 of SEQ ID NO:226 in the Sequence Listing.

[3]. The antibody according to Aspect 1 or 2, wherein the epitope consisting of a continuous amino acid sequence included in positions 101 to 154 or 199 to 270 of SEQ ID NO:226 in the Sequence Listing consists of an amino acid sequence including an amino acid selected from P118, I119, T120, Y122, L123, R124, S125, L126, S127, Y129, N130, D131, Q132, S133, T135, A137, L138, E139, S142, Y143, E144, I145, Y146, E148, D149, L150, D244, N245, H246, K266, L267, S268, and E269.

[4]. The antibody according to any one of Aspects 1 to 3, wherein the epitope consisting of a continuous amino acid sequence included in positions 101 to 154 or 199 to 270 of SEQ ID NO:226 in the Sequence Listing consists of a continuous amino acid of positions 111 to 130, 131 to 150, 231 to 250, or 251 to 270 of SEQ ID NO:226 in the Sequence Listing.

[5]. The antibody according to any one of Aspects 1 to 4, wherein the epitope consisting of a continuous amino acid sequence included in the sequence spanning positions 101 to 154 or 199 to 270 of SEQ ID NO:226 in the Sequence Listing consists of a continuous amino acid sequence of positions 138 to 147 or 139 to 147 of SEQ ID NO:226 in the Sequence Listing.

[6]. The antibody according to any one of Aspects 1 to 5, wherein the monoclonal antibody that is capable of binding to the epitope consisting of a continuous amino acid sequence included in positions 101 to 154 or 199 to 270 of SEQ ID NO:226 in the Sequence Listing is an IL-33 antagonist.

[7]. The antibody according to any one of Aspects 1 to 6, wherein the monoclonal antibody that is capable of binding to the epitope consisting of a continuous amino acid sequence included in positions 101 to 154 or 199 to 270 of SEQ ID NO:226 in the Sequence Listing inhibits binding between IL-33 receptors and IL-33.

[8]. A pharmaceutical composition for treatment, prevention, or alleviation of a disease associated with IL-33, comprising the antibody according to any one of Aspects 1 to 7.

[9]. A cytokine expression inhibitor comprising the antibody according to any one of Aspects 1 to 7.

[10]. The inhibitor according to Aspect 9, wherein the inhibitor inhibits expression of TNF-α, IFN-γ, IL-1β, IL-4, IL-5, IL-6, or IL-13.

[11]. The inhibitor according to Aspect 9 or 10, wherein the inhibitor inhibits expression of IFN-γ, IL-5, IL-6, or IL-13.

[12]. An epitope selected from the group consisting of:
1) the epitope according to any one of Aspects 1 to 5;
2) an epitope consisting of an amino acid sequence, wherein one or several amino acid are substituted, deleted, or added to the continuous amino acid sequence of the epitope of item 1; and
3) an epitope consisting of an amino acid sequence with at least 90% sequence identity to the continuous amino acid sequence of the epitope.

[13]. An antibody generated or screened using the epitope according to Aspect 12.

[14]. The antibody according to any one of Aspects 1 to 7, wherein the monoclonal antibody that is capable of binding to the epitope consisting of a continuous amino acid sequence included in positions 101 to 154 or 199 to 270 of SEQ ID NO:226 in the Sequence Listing is a chimeric, a humanized, or a human antibody.

[15]. The antibody according to Aspect 14, wherein the amino acid sequence of the framework regions is the amino acid sequences of framework regions from a human germline or a combination of the amino acid sequences thereof.

[16]. The antibody according to Aspect 15, wherein the amino acid sequence of the light-chain framework region 1 is residues 1 to 22 of SEQ ID NO:317 in the Sequence Listing; the amino acid sequence of the light-chain framework region 2 is residues 36 to 50 of SEQ ID NO:317 in the Sequence Listing; the amino acid sequence of the light-chain framework region 3 is residues 58 to 89 of SEQ ID NO:317 in the Sequence Listing; the amino acid sequence of the light-chain framework region 4 is residues 3 to 12 of SEQ ID NO:401 in the Sequence Listing; the amino acid sequence of the heavy-chain framework region 1 is residues 1 to 30 of SEQ ID NO:367 or residues 1 to 30 of SEQ ID NO:368 in the Sequence Listing; the amino acid sequence of the heavy-chain framework region 2 is residues 36 to 49 of SEQ ID NO:367 or residues 36 to 49 of SEQ ID NO:368 in the Sequence Listing; the amino acid sequence of the heavy-chain framework region 3 is residues 67 to 98 of SEQ ID NO:367 or residues 67 to 98 of SEQ ID NO:368 in the Sequence Listing; and the amino acid sequence of the heavy-chain framework region 4 is residues 5 to 15 of SEQ ID NO:407 in the Sequence Listing.

[17]. The antibody according to Aspect 15 or 16, wherein the amino acid sequence of the light-chain framework region 1 is residues 1 to 22 of SEQ ID NO:317 in the Sequence Listing; the amino acid sequence of the light-chain framework region 2 is residues 36 to 50 of SEQ ID NO:317 in the Sequence Listing; the amino acid sequence of the light-chain framework region 3 is residues 58 to 89 of SEQ ID NO:317 in the Sequence Listing; the amino acid sequence of the light-chain framework region 4 is residues 3 to 12 of SEQ ID NO:401 in the Sequence Listing; the amino acid sequence of the heavy-chain framework region 1 is residues 1 to 30 of SEQ ID NO:367 in the Sequence Listing; the amino acid sequence of the heavy-chain framework region 2 is residues 36 to 49 of SEQ ID NO:367 in the Sequence Listing; the amino acid sequence of the heavy-chain framework region 3 is residues 67 to 98 of SEQ ID NO:368 in the Sequence Listing; and the amino acid sequence of the heavy-chain framework region 4 is residues 5 to 15 of SEQ ID NO:407 in the Sequence Listing.

[18]. An isolated human anti-IL-33 neutralizing, wherein a combination of the amino acid sequences of the light-chain complementarity-determining region 1 (LCDR), the light-chain complementarity-determining region 2 (LCDR2), the light-chain complementarity-determining region 3 (LCDR3), the heavy-chain complementarity-determining region 1 (HCDR1), the heavy-chain complementarity-determining region 2 (HCDR2), and the heavy-chain complementarity-determining region 3 (HCDR3) is selected from the combinations represented by C1 to C30 in Table 1:

TABLE 1

The following SEQ ID Nos. show the SEQ ID Nos. in the Sequence Listing

| | LCDR1 | LCDR2 | LCDR3 | HCDR1 | HCDR2 | HCDR3 |
|---|---|---|---|---|---|---|
| C1 | SEQ ID No. 1 | SEQ ID No. 11 | SEQ ID No. 22 | SEQ ID No. 43 | SEQ ID No. 51 | SEQ ID No. 65 |
| C2 | SEQ ID No. 1 | SEQ ID No. 11 | SEQ ID No. 23 | SEQ ID No. 43 | SEQ ID No. 52 | SEQ ID No. 65 |
| C3 | SEQ ID No. 2 | SEQ ID No. 11 | SEQ ID No. 23 | SEQ ID No. 44 | SEQ ID No. 52 | SEQ ID No. 65 |
| C4 | SEQ ID No. 2 | SEQ ID No. 11 | SEQ ID No. 23 | SEQ ID No. 44 | SEQ ID No. 53 | SEQ ID No. 65 |
| C5 | SEQ ID No. 2 | SEQ ID No. 11 | SEQ ID No. 23 | SEQ ID No. 43 | SEQ ID No. 54 | SEQ ID No. 65 |
| C6 | SEQ ID No. 2 | SEQ ID No. 11 | SEQ ID No. 24 | SEQ ID No. 45 | SEQ ID No. 52 | SEQ ID No. 65 |
| C7 | SEQ ID No. 2 | SEQ ID No. 11 | SEQ ID No. 23 | SEQ ID No. 46 | SEQ ID No. 52 | SEQ ID No. 65 |
| C8 | SEQ ID No. 3 | SEQ ID No. 12 | SEQ ID No. 25 | SEQ ID No. 47 | SEQ ID No. 55 | SEQ ID No. 66 |

TABLE 1-continued

The following SEQ ID Nos. show the SEQ ID Nos. in the Sequence Listing

|     | LCDR1         | LCDR2          | LCDR3          | HCDR1         | HCDR2         | HCDR3         |
| --- | ------------- | -------------- | -------------- | ------------- | ------------- | ------------- |
| C9  | SEQ ID No. 4  | SEQ ID No. 12  | SEQ ID No. 26  | SEQ ID No. 47 | SEQ ID No. 56 | SEQ ID No. 67 |
| C10 | SEQ ID No. 4  | SEQ ID No. 13  | SEQ ID No. 27  | SEQ ID No. 47 | SEQ ID No. 56 | SEQ ID No. 67 |
| C11 | SEQ ID No. 5  | SEQ ID No. 12  | SEQ ID No. 28  | SEQ ID No. 47 | SEQ ID No. 56 | SEQ ID No. 67 |
| C12 | SEQ ID No. 4  | SEQ ID No. 12  | SEQ ID No. 29  | SEQ ID No. 47 | SEQ ID No. 56 | SEQ ID No. 67 |
| C13 | SEQ ID No. 6  | SEQ ID No. 14  | SEQ ID No. 30  | SEQ ID No. 47 | SEQ ID No. 56 | SEQ ID No. 67 |
| C14 | SEQ ID No. 7  | SEQ ID No. 14  | SEQ ID No. 31  | SEQ ID No. 47 | SEQ ID No. 56 | SEQ ID No. 67 |
| C15 | SEQ ID No. 4  | SEQ ID No. 15  | SEQ ID No. 32  | SEQ ID No. 47 | SEQ ID No. 56 | SEQ ID No. 67 |
| C16 | SEQ ID No. 6  | SEQ ID No. 16  | SEQ ID No. 33  | SEQ ID No. 48 | SEQ ID No. 57 | SEQ ID No. 68 |
| C17 | SEQ ID No. 4  | SEQ ID No. 17  | SEQ ID No. 34  | SEQ ID No. 49 | SEQ ID No. 58 | SEQ ID No. 69 |
| C18 | SEQ ID No. 6  | SEQ ID No. 18  | SEQ ID No. 35  | SEQ ID No. 47 | SEQ ID No. 59 | SEQ ID No. 70 |
| C19 | SEQ ID No. 6  | SEQ ID No. 19  | SEQ ID No. 36  | SEQ ID No. 47 | SEQ ID No. 56 | SEQ ID No. 71 |
| C20 | SEQ ID No. 6  | SEQ ID No. 20  | SEQ ID No. 26  | SEQ ID No. 47 | SEQ ID No. 56 | SEQ ID No. 66 |
| C21 | SEQ ID No. 6  | SEQ ID No. 18  | SEQ ID No. 37  | SEQ ID No. 47 | SEQ ID No. 60 | SEQ ID No. 72 |
| C22 | SEQ ID No. 6  | SEQ ID No. 20  | SEQ ID No. 38  | SEQ ID No. 47 | SEQ ID No. 56 | SEQ ID No. 73 |
| C23 | SEQ ID No. 8  | SEQ ID No. 20  | SEQ ID No. 27  | SEQ ID No. 49 | SEQ ID No. 56 | SEQ ID No. 68 |
| C24 | SEQ ID No. 9  | SEQ ID No. 20  | SEQ ID No. 39  | SEQ ID No. 47 | SEQ ID No. 60 | SEQ ID No. 73 |
| C25 | SEQ ID No. 4  | SEQ ID No. 21  | SEQ ID No. 34  | SEQ ID No. 47 | SEQ ID No. 61 | SEQ ID No. 74 |
| C26 | SEQ ID No. 10 | SEQ ID No. 19  | SEQ ID No. 40  | SEQ ID No. 47 | SEQ ID No. 62 | SEQ ID No. 75 |
| C27 | SEQ ID No. 4  | SEQ ID No. 18  | SEQ ID No. 41  | SEQ ID No. 50 | SEQ ID No. 56 | SEQ ID No. 76 |
| C28 | SEQ ID No. 6  | SEQ ID No. 20  | SEQ ID No. 42  | SEQ ID No. 47 | SEQ ID No. 63 | SEQ ID No. 77 |
| C29 | SEQ ID No. 2  | SEQ ID No. 11  | SEQ ID No. 23  | SEQ ID No. 43 | SEQ ID No. 64 | SEQ ID No. 65 |
| C30 | SEQ ID No. 6  | SEQ ID No. 20  | SEQ ID No. 40  | SEQ ID No. 47 | SEQ ID No. 64 | SEQ ID No. 78 |

The human anti-IL-33 neutralizing monoclonal antibody according to Aspect 18, wherein the combination of the amino acid sequences of the light-chain complementarity-determining region 1 (LCDR1), the light-chain complementarity-determining region 2 (LCDR2), the light-chain complementarity-determining region 3 (LCDR3), the heavy-chain complementarity-determining region 1 (HCDR1), the heavy-chain complementarity-determining region 2 (HCDR2), and the heavy-chain complementarity-determining region 3 (HCDR3) is selected from the combinations represented by C1 to C28 in Table 1.

[20]. The human anti-IL-33 neutralizing monoclonal antibody according to Aspect 18 or 19, wherein the combination of the amino acid sequences of the light-chain complementarity-determining region 1 (LCDR1), the light-chain complementarity-determining region 2 (LCDR2), the light-chain complementarity-determining region 3 (LCDR3), the heavy-chain complementarity-determining region 1 (HCDR1), the heavy-chain complementarity-determining region 2 (HCDR2), and the heavy-chain complementarity-determining region 3 (HCDR3) is selected from the combinations represented by C1, C8, C15, C17, and C18 in Table 1.

[21]. The human anti-IL-33 neutralizing monoclonal antibody according to any one of Aspects 18 to 20, wherein the amino acid sequence of the framework region of the antibody is the amino acid sequences of framework regions from a human germline or a combination of the amino acid sequences thereof.

[22]. The human anti-IL-33 neutralizing monoclonal antibody according to any one of Aspects 18 to 21, wherein the amino acid sequence of the light-chain framework region 1 is residues 1 to 22 of SEQ ID NO:317 in the Sequence Listing; the amino acid sequence of the light-chain framework region 2 is residues 36 to 50 of SEQ ID NO:317 in the Sequence Listing; the amino acid sequence of the light-chain framework region 3 is residues 58 to 89 of SEQ ID NO:317 in the Sequence Listing; the amino acid sequence of the light-chain framework region 4 is residues 3 to 12 of SEQ ID NO:401 in the Sequence Listing; the amino acid sequence of the heavy-chain framework region 1 is residues 1 to 30 of SEQ ID NO:367 or residues 1 to 30 of SEQ ID NO:368 in the Sequence Listing; the amino acid sequence of the heavy-chain framework region 2 is residues 36 to 49 of SEQ ID NO:367 or residues 36 to 49 of SEQ ID NO:368 in the Sequence Listing; the amino acid sequence of the heavy-chain framework region 3 is residues 67 to 98 of SEQ ID NO:367 or residues 67 to 98 of SEQ ID NO:368 in the Sequence Listing; and the amino acid sequence of the heavy-chain framework region 4 is residues 5 to 15 of SEQ ID NO:407 in the Sequence Listing.

[23]. The human anti-IL-33 neutralizing monoclonal antibody according to any one of Aspects 18 to 22, wherein the combination of respective amino acid sequences of light-chain and heavy-chain variable regions is selected from the combinations represented by V1 to V30 in Table 2:

TABLE 2

The following SEQ ID Nos. show the SEQ ID Nos. in the Sequence Listing

| Combination | Light Chain Variable Region | Heavy Chain Variable Region |
| --- | --- | --- |
| V1  | SEQ ID No. 79 | SEQ ID No. 105 |
| V2  | SEQ ID No. 80 | SEQ ID No. 106 |
| V3  | SEQ ID No. 81 | SEQ ID No. 107 |
| V4  | SEQ ID No. 81 | SEQ ID No. 108 |
| V5  | SEQ ID No. 81 | SEQ ID No. 109 |
| V6  | SEQ ID No. 82 | SEQ ID No. 110 |
| V7  | SEQ ID No. 81 | SEQ ID No. 111 |
| V8  | SEQ ID No. 83 | SEQ ID No. 112 |
| V9  | SEQ ID No. 84 | SEQ ID No. 113 |
| V10 | SEQ ID No. 85 | SEQ ID No. 113 |
| V11 | SEQ ID No. 86 | SEQ ID No. 113 |
| V12 | SEQ ID No. 87 | SEQ ID No. 113 |
| V13 | SEQ ID No. 88 | SEQ ID No. 113 |
| V14 | SEQ ID No. 89 | SEQ ID No. 113 |
| V15 | SEQ ID No. 90 | SEQ ID No. 113 |
| V16 | SEQ ID No. 91 | SEQ ID No. 114 |
| V17 | SEQ ID No. 92 | SEQ ID No. 115 |
| V18 | SEQ ID No. 93 | SEQ ID No. 116 |
| V19 | SEQ ID No. 94 | SEQ ID No. 117 |
| V20 | SEQ ID No. 95 | SEQ ID No. 118 |

TABLE 2-continued

The following SEQ ID Nos. show the SEQ ID Nos. in the Sequence Listing

| Combination | Light Chain Variable Region | Heavy Chain Variable Region |
|---|---|---|
| V21 | SEQ ID No. 96 | SEQ ID No. 119 |
| V22 | SEQ ID No. 97 | SEQ ID No. 120 |
| V23 | SEQ ID No. 98 | SEQ ID No. 121 |
| V24 | SEQ ID No. 99 | SEQ ID No. 122 |
| V25 | SEQ ID No. 100 | SEQ ID No. 123 |
| V26 | SEQ ID No. 101 | SEQ ID No. 124 |
| V27 | SEQ ID No. 102 | SEQ ID No. 125 |
| V28 | SEQ ID No. 103 | SEQ ID No. 126 |
| V29 | SEQ ID No. 81 | SEQ ID No. 127 |
| V30 | SEQ ID No. 104 | SEQ ID No. 128 |

[24]. The human anti-IL-33 neutralizing monoclonal antibody according to Aspect 23, wherein the combination of respective amino acid sequences of the light-chain and heavy-chain variable regions is selected from the combinations represented by V1 to V28 in Table 2.

[25]. The human anti-IL-33 neutralizing monoclonal antibody according to Aspect 23 or 24, wherein the combination of the respective amino acid sequences of the light-chain and heavy-chain variable regions is selected from the combinations represented by V1, V8, V15, V17, and V18 in Table 2.

[26]. The human anti-IL-33 neutralizing monoclonal antibody according to any one of Aspects 18 to 25, wherein the light chain is a λ chain.

[27]. The human anti-IL-33 neutralizing monoclonal antibody according to any one of Aspects 18 to 26, wherein the human anti-IL-33 neutralizing monoclonal antibody is IgG.

[28]. The human anti-IL-33 neutralizing monoclonal antibody according to any one of Aspects 18 to 27, wherein the antigen is human IL-33 and monkey IL-33.

[29]. A nucleic acid molecule encoding a protein portion of the human anti-IL-33 neutralizing monoclonal antibody according to any one of Aspects 18 to 28.

[30]. The nucleic acid molecule according to Aspect 29, wherein a combination of nucleic acid sequences respectively encoding the amino acid sequences of the light-chain complementarity-determining region 1 (LCDR1), light-chain complementarity-determining region 2 (LCDR2), light-chain complementarity-determining region 3 (LCDR3), heavy-chain complementarity-determining region 1 (HCDR1), heavy-chain complementarity-determining region 2 (HCDR2) and heavy-chain complementarity-determining region 3 (HCDR3) is selected from the combinations represented by CN1 to CN30 in Table 3:

TABLE 3

The following SEQ ID Nos. show the SEQ ID Nos. in the Sequence Listing

| Combination | LCDR1 | LCDR2 | LCDR3 | HCDR1 | HCDR2 | HCDR3 |
|---|---|---|---|---|---|---|
| CN1 | SEQ ID No. 129 | SEQ ID No. 140 | SEQ ID No. 156 | SEQ ID No. 181 | SEQ ID No. 191 | SEQ ID No. 209 |
| CN2 | SEQ ID No. 129 | SEQ ID No. 140 | SEQ ID No. 157 | SEQ ID No. 181 | SEQ ID No. 192 | SEQ ID No. 209 |
| CN3 | SEQ ID No. 130 | SEQ ID No. 140 | SEQ ID No. 157 | SEQ ID No. 182 | SEQ ID No. 192 | SEQ ID No. 209 |
| CN4 | SEQ ID No. 130 | SEQ ID No. 140 | SEQ ID No. 157 | SEQ ID No. 182 | SEQ ID No. 193 | SEQ ID No. 209 |
| CN5 | SEQ ID No. 130 | SEQ ID No. 140 | SEQ ID No. 157 | SEQ ID No. 181 | SEQ ID No. 194 | SEQ ID No. 209 |
| CN6 | SEQ ID No. 130 | SEQ ID No. 140 | SEQ ID No. 158 | SEQ ID No. 183 | SEQ ID No. 192 | SEQ ID No. 209 |
| CN7 | SEQ ID No. 130 | SEQ ID No. 140 | SEQ ID No. 157 | SEQ ID No. 184 | SEQ ID No. 192 | SEQ ID No. 209 |
| CN8 | SEQ ID No. 131 | SEQ ID No. 141 | SEQ ID No. 159 | SEQ ID No. 185 | SEQ ID No. 195 | SEQ ID No. 210 |
| CN9 | SEQ ID No. 132 | SEQ ID No. 141 | SEQ ID No. 160 | SEQ ID No. 185 | SEQ ID No. 196 | SEQ ID No. 211 |
| CN10 | SEQ ID No. 132 | SEQ ID No. 142 | SEQ ID No. 161 | SEQ ID No. 185 | SEQ ID No. 196 | SEQ ID No. 211 |
| CN11 | SEQ ID No. 133 | SEQ ID No. 143 | SEQ ID No. 162 | SEQ ID No. 185 | SEQ ID No. 196 | SEQ ID No. 211 |
| CN12 | SEQ ID No. 132 | SEQ ID No. 141 | SEQ ID No. 163 | SEQ ID No. 185 | SEQ ID No. 196 | SEQ ID No. 211 |
| CN13 | SEQ ID No. 134 | SEQ ID No. 144 | SEQ ID No. 164 | SEQ ID No. 185 | SEQ ID No. 196 | SEQ ID No. 211 |
| CN14 | SEQ ID No. 135 | SEQ ID No. 144 | SEQ ID No. 165 | SEQ ID No. 185 | SEQ ID No. 196 | SEQ ID No. 211 |
| CN15 | SEQ ID No. 132 | SEQ ID No. 145 | SEQ ID No. 166 | SEQ ID No. 185 | SEQ ID No. 196 | SEQ ID No. 211 |
| CN16 | SEQ ID No. 134 | SEQ ID No. 146 | SEQ ID No. 167 | SEQ ID No. 186 | SEQ ID No. 197 | SEQ ID No. 212 |
| CN17 | SEQ ID No. 132 | SEQ ID No. 147 | SEQ ID No. 168 | SEQ ID No. 187 | SEQ ID No. 198 | SEQ ID No. 213 |
| CN18 | SEQ ID No. 134 | SEQ ID No. 148 | SEQ ID No. 169 | SEQ ID No. 185 | SEQ ID No. 199 | SEQ ID No. 214 |
| CN19 | SEQ ID No. 134 | SEQ ID No. 149 | SEQ ID No. 170 | SEQ ID No. 185 | SEQ ID No. 200 | SEQ ID No. 215 |
| CN20 | SEQ ID No. 134 | SEQ ID No. 150 | SEQ ID No. 171 | SEQ ID No. 185 | SEQ ID No. 200 | SEQ ID No. 216 |
| CN21 | SEQ ID No. 134 | SEQ ID No. 148 | SEQ ID No. 172 | SEQ ID No. 185 | SEQ ID No. 201 | SEQ ID No. 217 |
| CN22 | SEQ ID No. 134 | SEQ ID No. 150 | SEQ ID No. 173 | SEQ ID No. 185 | SEQ ID No. 200 | SEQ ID No. 218 |
| CN23 | SEQ ID No. 136 | SEQ ID No. 151 | SEQ ID No. 174 | SEQ ID No. 188 | SEQ ID No. 202 | SEQ ID No. 219 |
| CN24 | SEQ ID No. 137 | SEQ ID No. 151 | SEQ ID No. 175 | SEQ ID No. 189 | SEQ ID No. 203 | SEQ ID No. 220 |
| CN25 | SEQ ID No. 138 | SEQ ID No. 152 | SEQ ID No. 176 | SEQ ID No. 189 | SEQ ID No. 204 | SEQ ID No. 221 |
| CN26 | SEQ ID No. 139 | SEQ ID No. 153 | SEQ ID No. 177 | SEQ ID No. 189 | SEQ ID No. 205 | SEQ ID No. 222 |
| CN27 | SEQ ID No. 138 | SEQ ID No. 154 | SEQ ID No. 178 | SEQ ID No. 190 | SEQ ID No. 206 | SEQ ID No. 223 |
| CN28 | SEQ ID No. 134 | SEQ ID No. 155 | SEQ ID No. 179 | SEQ ID No. 185 | SEQ ID No. 207 | SEQ ID No. 224 |
| CN29 | SEQ ID No. 130 | SEQ ID No. 140 | SEQ ID No. 157 | SEQ ID No. 181 | SEQ ID No. 208 | SEQ ID No. 209 |
| CN30 | SEQ ID No. 134 | SEQ ID No. 155 | SEQ ID No. 180 | SEQ ID No. 185 | SEQ ID No. 208 | SEQ ID No. 225 |

[31]. A vector comprising the nucleic acid molecule according to Aspect 29 or 30.

[32]. A host cell comprising the vector according to Aspect 31.

[33]. A method of producing the human anti-IL-33 neutralizing monoclonal antibody according to any one of Aspects 18 to 28, comprising culturing the host cell according to Aspect 32.

[34]. A cytokine expression inhibitor comprising the human anti-IL-33 neutralizing monoclonal antibody according to any one of Aspects 18 to 28.

[35]. The inhibitor according to Aspect 34, wherein the inhibitor inhibits expression of TNF-α, IFN-γ, IL-1β, IL-4, IL-5, IL-6, or IL-13.

[36]. The inhibitor according to Aspect 34 or 35, wherein the inhibitor inhibits expression of IFN-γ, IL-5, IL-6, or IL-13.

[37]. A pharmaceutical composition comprising the human anti-IL-33 neutralizing monoclonal antibody according to any one of Aspects 18 to 28.

[38]. The pharmaceutical composition according to Aspect 37 for treatment, prevention, or alleviation of a disease associated with IL-33.

[39]. The pharmaceutical composition according to Aspect 38, wherein the disease associated with IL-33 is selected from the group consisting of asthma, atopic dermatitis, pollinosis, anaphylactic shock, sinusitis (including eosinophilic sinusitis), Crohn's disease, ulcerative colitis, arthritis, systemic lupus erythematosus, pemphigus, pemphigoid, scleroderma, ankylosing spondylitis, hepatic fibrosis (including primary biliary cirrhosis), pulmonary fibrosis, chronic obstructive pulmonary disease (COPD), acute kidney injury, vasculitis, and cancer.

[40]. An anti-IL-33 neutralizing monoclonal antibody which competes with the antibody according to Aspect 20 or 25 in binding to IL-33.

[41]. A method for treatment, prevention, or alleviation of symptom in a patient with a disease associated with IL-33, the method comprising administering the antibody according to any one of Aspects 1 to 7 and 18 to 28 to the patient.

[42]. The method according to Aspect 41, wherein the disease associated with IL-33 is selected from the group consisting of asthma, atopic dermatitis, pollinosis, anaphylactic shock, sinusitis (including eosinophilic sinusitis), Crohn's disease, ulcerative colitis, arthritis, systemic lupus erythematosus, pemphigus, pemphigoid, scleroderma, ankylosing spondylitis, hepatic fibrosis (including primary biliary cirrhosis), pulmonary fibrosis, chronic obstructive pulmonary disease (COPD), acute kidney injury, vasculitis, and cancer.

[43]. Use of the antibody according to any one of Aspects 1 to 7 and 18 to 28 for the manufacture of amedicament to treat, prevent, or alleviate a disease associated with IL-33.

[44]. The use according to Aspect 43, wherein the disease associated with IL-33 is selected from the group consisting of asthma, atopic dermatitis, pollinosis, anaphylactic shock, sinusitis (including eosinophilic sinusitis), Crohn's disease, ulcerative colitis, arthritis, systemic lupus erythematosus, pemphigus, pemphigoid, scleroderma, ankylosing spondylitis, hepatic fibrosis (including primary biliary cirrhosis), pulmonary fibrosis, chronic obstructive pulmonary disease (COPD), acute kidney injury, vasculitis, and cancer.

[45]. Use of the antibody according to any one of Aspects 1 to 7 and 18 to 28 for the treatment, prevention, or alleviation of a disease associated with IL-33.

[46]. The use according to Aspect 45, wherein the disease associated with IL-33 is selected from the group consisting of asthma, atopic dermatitis, pollinosis, anaphylactic shock, sinusitis (including eosinophilic sinusitis), Crohn's disease, ulcerative colitis, arthritis, systemic lupus erythematosus, pemphigus, pemphigoid, scleroderma, ankylosing spondylitis, hepatic fibrosis (including primary biliary cirrhosis), pulmonary fibrosis, chronic obstructive pulmonary disease (COPD), acute kidney injury, vasculitis, and cancer.

[47]. A method for treating, preventing, or alleviating a symptom in a patient in need of inhibition of cytokine expression, the method comprising administering the antibody according to any one of Aspects 1 to 7 and 18 to 28 to the patient.

[48]. The method according to Aspect 47, wherein the cytokine is TNF-06, IFN-γ, IL-1β, IL-4, IL-5, IL-6, or IL-13.

[49]. Use of the antibody according to any one of Aspects 1 to 7 and 18 to 28 for the manufacture of a cytokine expression inhibitor.

[50]. The use according to Aspect 49, wherein the cytokine is TNF-06, IFN-γ, IL-1β, IL-4, IL-5, IL-6, or IL-13.

Advantageous Effects of Invention

Since the monoclonal antibody of the present invention is capable of binding to an epitope consisting of a continuous amino acid sequence, the monoclonal antibody readily exhibits its neutralizing effect by binding to a continuous amino acid sequence, even in the case where IL-33 is cleaved into fragments The monoclonal antibody of the present invention is less likely to induce human anti-human immunoglobulin antibody (HAHA) to its framework regions and/or complementarity-determining regions when it is administered to a human subject. Antibodies can exert a prolonged IL-33 neutralizing effect in vivo, unless they are inhibited by HAHA. In addition, antibodies are safely used, unless inflammation is caused by binding with HAHA. The monoclonal antibody of the present invention is capable of binding to human IL-33 to neutralize its functions, and thus is applicable to novel pharmaceuticals for diagnosis, prevention, treatment, or alleviation of diseases associated with IL-33.

BRIEF DESCRIPTION OF THE DRAWINGS

FIG. 12 shows the sequence and position of peptides PEP11 to PEP26.

DETAILED DESCRIPTION OF THE PREFERRED EMBODIMENTS

Definitions

Figure 1:
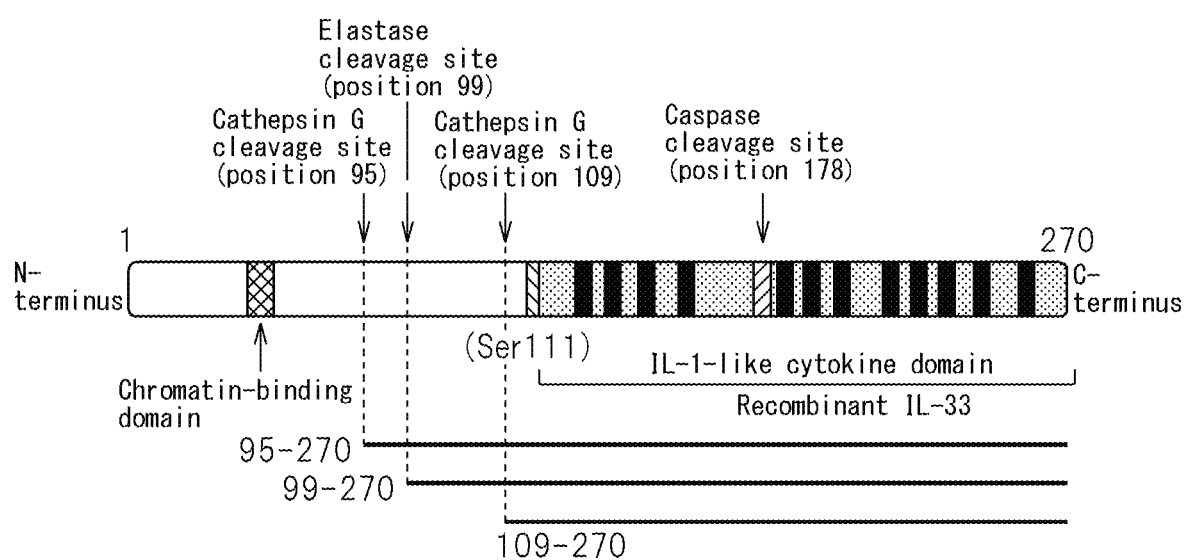
FIG. 1 shows each domain and cleavage site of the IL-33 protein.

The definitions of terms used herein are provided below for better understanding of the invention.

[Epitope]

As used herein, the term "epitope" refers to the part of an antigen recognized by an antibody. As used herein, the term "epitope" relates to a continuous amino acid sequence necessary for the recognition of the antibody.

[Binding]

As used herein, "binding" of a monoclonal antibody to an epitope refers to formation of a complex via binding between the antibody and the peptide which is an epitope. Examples of the binding between a monoclonal antibody and the epitope includes, but are not limited to, ionic, hydrogen, hydrophobic, and van der Waals bonds. Binding ability of a monoclonal antibody to an epitope can be analyzed, for example, by using peptide array scanning or KinExA technology described in the specification.

[Antibody]

The term "antibody" herein is used in the broadest sense, and includes monoclonal antibodies and polyclonal antibodies which exhibit desired binding specificity. The antibody of the present invention may be an antibody from any animal, and may be for example, a mouse antibody, a human antibody, a rat antibody, a rabbit antibody, a goat antibody, or a camel antibody.

[Monoclonal Antibody]

Among the antibodies of the present invention, "monoclonal antibody" refers to a population of antibodies produced from a single clone (i.e. the population includes substantially single molecular species) with respect to a designed amino acid sequence. Monoclonal antibodies include chimeric antibodies, humanized antibodies, human antibodies, multispecific antibodies, and artificial antibody, and functionally modified forms thereof, and conjugated antibodies containing any of such antibodies, and fragments of such antibodies. The monoclonal antibody of the present invention can be produced by any known method including, for example, hybridoma, phage display, and genetic engineering techniques.

[Chimeric Antibody]

The term "chimeric antibody" refers to an antibody containing light chains and/or heavy chains that are composed of variable regions of a non-human animal and constant regions of human.

[Humanized Antibody]

The term "humanized antibody" refers to an antibody which is composed of variable regions consisting of complementarity-determining regions of a non-human antibody and framework regions of a human antibody; and constant regions of a human antibody.

[Human Antibody]

The term "human antibody" refers to an antibody, wherein both light and heavy chains are derived from human. Human antibody includes the following isotypes with different heavy-chain constant regions: IgG (including IgG1, IgG2, IgG3, and IgG4) having γ heavy chains; IgM having μ heavy chains; IgA having α heavy chains (including IgA1 and IgA2); IgD having δ heavy chains; and IgE having ε heavy chains. In principle, each human antibody molecule has either κ or λ light chains.

[Multispecific Antibody]

The term "multispecific antibody" refers to an asymmetric antibody that has two or more independent antigen recognition sites and has specificity for two or more different antigens. Examples of the multispecific antibody include bispecific antibodies with specificity for two antigens, and trispecific antibodies with specificity for three antigens. One or more of the antigens recognized by the multispecific antibody of the present invention are an IL-33 molecule.

[Artificial Antibody]

"Artificial antibody" refers to, for example, protein scaffolds, which do not have a structure of an antibody, but have a function like an antibody. Examples of the applicable protein scaffolds include Kunitz domains of human serine protease inhibitors; extracellular domains of human fibronectin; ankyrin; and lipocalin. A protein scaffold that is capable of binding to the epitope of the present invention can be produced by modifying the sequence of the target-biding site on the scaffold (Clifford Mintz et. al., BioProcess International, 2013, Vol. 11(2), pp. 40-48).

[Functionally Modified Antibody]

As used herein, the term "functionally modified antibody" refers to an antibody which is regulated for its functions or properties, except for the antigen-binding function, such as cytotoxic function, complement activation function, and half-life in blood by mainly modifying amino acids or sugar chains in Fc regions of an antibody.

[Conjugated Antibody]

As used herein, the term "conjugated antibody" refers to an antibody which is conjugated with a non-antibody functional molecule, such as non-peptidic polymers, e.g., poly(ethylene glycol) (PEG); radioactive materials; toxins; low-molecular-weight compounds; cytokines; albumin; and enzymes through any chemical or genetic engineering process.

[Fragment]

As used herein, the term "antibody fragment" refers to a protein which comprises a part of an antibody and can bind to an antigen. Examples of the antibody fragment include Fab fragments, Fv fragments, F(ab')$_2$ fragments, Fab' fragments, and scFv fragments.

These antibody fragments may be conjugated with non-antibody functional molecules, such as non-peptidic polymers, e.g., poly(ethylene glycol) (PEG); radioactive materials; toxins; low-molecular-weight compounds; cytokines; albumin; and enzymes through any chemical or genetic engineering process.

[IL-33]

IL-33 is a cytokine of the IL-1 family. Human IL-33 consists of 270 amino acids as shown in SEQ ID NO:226 in the Sequence Listing. IL-33 comprises an N-terminal chromatin-binding domain, a C-terminal IL-1-like cytokine domain having 12 β-strands and having a molecular weight of 18 kDa, cathepsin G cleavage sites located at positions 95 and 109, an elastase cleavage site located at position 99, and a caspase cleavage site located at position 178 (FIG. 1). It is believed that, during cell necrosis, IL-33 is cleaved by enzymes, such as elastase, cathepsin G and proteinase 3, which are derived from loysosome etc., into various fragments including mature IL-33, such as IL-33 (residues 95 to 270) ("IL-33 (residues 95 to 270)" represents the IL-33 fragment represented by the amino acid sequence at positions 95 to 270 from N-terminus of SEQ ID NO:226 in the Sequence Listing; other fragments are represented in the same way), IL-33 (residues 99 to 270), IL-33 (resides 109 to 270), and IL-33 (residues 112 to 270)), and functions as a cytokine. In the case of apoptotic cell death, IL-33 is cleaved at position 178, by caspase activated during the apoptosis, into inactivated forms of IL-33, such as IL-33 (residues 179 to 270).

Once IL-33 is extracellularly released as a cytokine, it binds to IL-33 receptors and functions as an inducer of intracellular signal transduction in the cells expressing the IL-33 receptor. The IL-33-induced signal transduction occurs through pathways including, but not limited to, NF-κB and MAPKKs pathways, and eventually induces production of various cytokines, chemokines, and inflammatory mediators. Examples of the IL-33-induced cytokines include TNF-α, IL-1β, IFN-γ, IL-3, IL-4, IL-5, IL-6, and IL-13. In particular, production of IFN-γ, IL-5, IL-6, and IL-13 is induced. Examples of the IL-33-induced chemokines include CXCL2, CCL2, CCL3, CCL6, CCL17, and CCL24. Examples of the IL-33-induced inflammatory mediators include PGD2 and LTB4. The IL-33-induced cytokines, chemokines, and inflammatory mediators are involved in migration, cytokine production, and degranulation of immune cells, and cause inflammation. In the present invention, IL-33 may be either full-length IL-33 or any active fragment of IL-33, and may also be any derivative or variant thereof, as long as they are capable of binding to an IL-33 receptor described below and attain its effect. IL-33 may be either human IL-33 or IL-33 derived from any other organism. Among IL-33, human IL-33 represented by the amino acid sequence of SEQ ID NO:226 in the Sequence Listing is preferred.

The IL-33 receptor to which IL-33 binds is a heterodimeric complex composed of ST2 and IL-1RAcP (IL-1 receptor accessory protein). The IL-33 receptor contains the binding site that specifically recognizes IL-33 in the extracellular domain of ST2. The IL-33 receptor is expressed in cells including, but not limited to, various immune cells (such as Th2 cells, mast cells, eosinophils, basophils, macrophages, dendritic cells, NK cells, NKT cells, Group 2 innate lymphocytes (natural helper cells), nuocytes, and Ih2 (innate helper type 2) cells) and epithelial cells.

[Diseases Associated with IL-33]

As used herein, the term "disease associated with IL-33" refers to diseases caused by excessive extracellular release of IL-33. The diseases associated with IL-33 can be prevented, treated, or alleviated with an agent capable of inhibiting the functions of IL-33. The diseases associated with IL-33 include, for example, asthma, atopic dermatitis, pollinosis, anaphylactic shock, sinusitis (including eosinophilic sinusitis), Crohn's disease, ulcerative colitis, arthritis, systemic lupus erythematosus, pemphigus, pemphigoid, scleroderma, ankylosing spondylitis, hepatic fibrosis (including primary biliary cirrhosis), pulmonary fibrosis, chronic obstructive pulmonary disease (COPD), acute kidney injury, vasculitis, and cancer.

[Framework Region]

The term "framework region" refers to the part in variable regions of an immunoglobulin molecule other than complementarity-determining regions. Each light and heavy chain has four framework regions (framework regions 1, 2, 3, and 4). Herein, framework regions of immunoglobulin molecules are numbered in accordance with the Kabat numbering system (Kabat et al., 1987, Sequences of Proteins of Immunological Interest, US Department of Health and Human Services, NIH, USA).

[Germline]

The term "germline" refers to a group of germ cells such as spermatozoa and ovum, and refers to human germline, unless otherwise indicated. Immunoglobulin genes of germ cells contain no mutation, unlike those of B cells expressing antibodies. Accordingly, the term "amino acid sequence(s) of framework region(s) from germline" refers to amino acid sequence(s) without any mutation as compared to the amino acid sequence(s) of the framework region(s) of immunoglobulin. The term "a combination of amino acid sequences of framework regions from germlines" indicates that one or more of the four framework regions have an amino acid sequence of framework region from different germline. Gene that encode light-chain variable regions of human immune globulin is divided into Vκ segment and Jκ segment in κ chain; and Vλ segment and Jλ segment in λ chain. Framework regions 1 to 3 are present on the Vκ and Vλ segments, and framework region 4 is present on the Jκ and Jλ segments. The gene of the heavy-chain variable regions of human immunoglobulin is divided into VH segment, DH segment, and JH segment. Framework regions 1 to 3 are present on the VH segment, and framework region 4 is present on the JH segment. The germline amino acid sequences of each Vκ, Vλ, VH, Jκ, Jλ, and JH segment of human immunoglobulin are shown in Table 4.

TABLE 4-1

The following SEQ ID Nos. show the SEQ ID Nos. in the Sequence Listing

| Segment | germline name | SEQ ID No. |
| --- | --- | --- |
| Vκ | Vκ1-5 | SEQ ID No. 278 |
| Vκ | Vκ1-6 | SEQ ID No. 279 |
| Vκ | Vκ1-8 | SEQ ID No. 280 |
| Vκ | Vκ1-9 | SEQ ID No. 281 |
| Vκ | Vκ1-12, Vκ1D-12 | SEQ ID No. 282 |
| Vκ | Vκ1-16 | SEQ ID No. 283 |
| Vκ | Vκ1-17 | SEQ ID No. 284 |
| Vκ | Vκ1-27 | SEQ ID No. 285 |
| Vκ | Vκ1-33, Vκ1D-33 | SEQ ID No. 286 |
| Vκ | Vκ1-39, Vκ1D-39 | SEQ ID No. 287 |
| Vκ | Vκ1D-8 | SEQ ID No. 288 |
| Vκ | Vκ1D-13 | SEQ ID No. 289 |
| Vκ | Vκ1D-16 | SEQ ID No. 290 |
| Vκ | Vκ1D-17 | SEQ ID No. 291 |
| Vκ | Vκ1D-43 | SEQ ID No. 292 |
| Vκ | Vκ1-NL1 | SEQ ID No. 293 |
| Vκ | Vκ2-24 | SEQ ID No. 294 |
| Vκ | Vκ2-28, Vκ2D-28 | SEQ ID No. 295 |
| Vκ | Vκ2-30 | SEQ ID No. 296 |
| Vκ | Vκ2-40, Vκ2D-40 | SEQ ID No. 297 |
| Vκ | Vκ2D-26 | SEQ ID No. 298 |
| Vκ | Vκ2D-29 | SEQ ID No. 299 |
| Vκ | Vκ2D-30 | SEQ ID No. 300 |
| Vκ | Vκ3-11 | SEQ ID No. 301 |

TABLE 4-1-continued

The following SEQ ID Nos. show the SEQ ID Nos. in the Sequence Listing

| Segment | germline name | SEQ ID No. |
|---|---|---|
| Vκ | Vκ3-15, Vκ3D-15 | SEQ ID No. 302 |
| Vκ | Vκ3-20 | SEQ ID No. 303 |
| Vκ | Vκ3D-7 | SEQ ID No. 304 |
| Vκ | Vκ3D-11 | SEQ ID No. 305 |
| Vκ | Vκ3D-20 | SEQ ID No. 306 |
| Vκ | Vκ3-NL1 | SEQ ID No. 307 |
| Vκ | Vκ3-NL2 | SEQ ID No. 308 |
| Vκ | Vκ3-NL3 | SEQ ID No. 309 |

[Table 4-2]

| Segment | germline name | SEQ ID No. |
|---|---|---|
| Vκ | Vκ3-NL4 | SEQ ID No. 310 |
| Vκ | Vκ3-NL5 | SEQ ID No. 311 |
| Vκ | Vκ4-1 | SEQ ID No. 312 |
| Vκ | Vκ5-2 | SEQ ID No. 313 |
| Vλ | Vλ1-36 | SEQ ID No. 314 |
| Vλ | Vλ1-40 | SEQ ID No. 315 |
| Vλ | Vλ1-44 | SEQ ID No. 316 |
| Vλ | Vλ1-47 | SEQ ID No. 317 |
| Vλ | Vλ1-51 | SEQ ID No. 318 |
| Vλ | Vλ2-8 | SEQ ID No. 319 |
| Vλ | Vλ2-11 | SEQ ID No. 320 |
| Vλ | Vλ2-14 | SEQ ID No. 321 |
| Vλ | Vλ2-18 | SEQ ID No. 322 |
| Vλ | Vλ2-23 | SEQ ID No. 323 |
| Vλ | Vλ3-1 | SEQ ID No. 324 |
| Vλ | Vλ3-9 | SEQ ID No. 325 |
| Vλ | Vλ3-10 | SEQ ID No. 326 |
| Vλ | Vλ3-12 | SEQ ID No. 327 |
| Vλ | Vλ3-16 | SEQ ID No. 328 |
| Vλ | Vλ3-19 | SEQ ID No. 329 |
| Vλ | Vλ3-21 | SEQ ID No. 330 |
| Vλ | Vλ3-22 | SEQ ID No. 331 |
| Vλ | Vλ3-25 | SEQ ID No. 332 |
| Vλ | Vλ3-27 | SEQ ID No. 333 |
| Vλ | Vλ4-3 | SEQ ID No. 334 |
| Vλ | Vλ4-60 | SEQ ID No. 335 |
| Vλ | Vλ4-69 | SEQ ID No. 336 |
| Vλ | Vλ5-37 | SEQ ID No. 337 |
| Vλ | Vλ5-39 | SEQ ID No. 338 |
| Vλ | Vλ5-45 | SEQ ID No. 339 |
| Vλ | Vλ5-52 | SEQ ID No. 340 |
| Vλ | Vλ6-57 | SEQ ID No. 341 |
| Vλ | Vλ7-43 | SEQ ID No. 342 |
| Vλ | Vλ7-46 | SEQ ID No. 343 |
| Vλ | Vλ8-61 | SEQ ID No. 344 |

[Table 4-3]

| Segment | germline name | SEQ ID No. |
|---|---|---|
| Vλ | Vλ9-49 | SEQ ID No. 345 |
| Vλ | Vλ10-54 | SEQ ID No. 346 |
| VH | VH1-2 | SEQ ID No. 347 |
| VH | VH1-3 | SEQ ID No. 348 |
| VH | VH1-8 | SEQ ID No. 349 |
| VH | VH1-18 | SEQ ID No. 350 |
| VH | VH1-24 | SEQ ID No. 351 |
| VH | VH1-45 | SEQ ID No. 352 |
| VH | VH1-46 | SEQ ID No. 353 |
| VH | VH1-58 | SEQ ID No. 354 |
| VH | VH1-f | SEQ ID No. 355 |
| VH | VH1-69 | SEQ ID No. 356 |
| VH | VH2-5 | SEQ ID No. 357 |
| VH | VH2-26 | SEQ ID No. 358 |
| VH | VH2-70 | SEQ ID No. 359 |
| VH | VH3-7 | SEQ ID No. 360 |
| VH | VH3-9 | SEQ ID No. 361 |
| VH | VH3-11 | SEQ ID No. 362 |
| VH | VH3-13 | SEQ ID No. 363 |
| VH | VH3-15 | SEQ ID No. 364 |
| VH | VH3-20 | SEQ ID No. 365 |
| VH | VH3-21 | SEQ ID No. 366 |
| VH | VH3-23 | SEQ ID No. 367 |
| VH | VH3-30, VH3-30-3 | SEQ ID No. 368 |
| VH | VH3-33 | SEQ ID No. 369 |
| VH | VH3-43 | SEQ ID No. 370 |
| VH | VH3-48 | SEQ ID No. 371 |
| VH | VH3-49 | SEQ ID No. 372 |

TABLE 4-1-continued

The following SEQ ID Nos. show the SEQ ID Nos. in the Sequence Listing

| Segment | germline name | SEQ ID No. |
|---|---|---|
| VH | VH3-53 | SEQ ID No. 373 |
| VH | VH3-64 | SEQ ID No. 374 |
| VH | VH3-66 | SEQ ID No. 375 |
| VH | VH3-72 | SEQ ID No. 376 |
| VH | VH3-73 | SEQ ID No. 377 |
| VH | VH3-74 | SEQ ID No. 378 |
| VH | VH3-d | SEQ ID No. 379 |

[Table 4-4]

| Segment | germline name | SEQ ID No. |
|---|---|---|
| VH | VH3-NL1 | SEQ ID No. 380 |
| VH | VH4-4 | SEQ ID No. 381 |
| VH | VH4-28 | SEQ ID No. 382 |
| VH | VH4-30-2 | SEQ ID No. 383 |
| VH | VH4-30-4 | SEQ ID No. 384 |
| VH | VH4-31 | SEQ ID No. 385 |
| VH | VH4-34 | SEQ ID No. 386 |
| VH | VH4-39 | SEQ ID No. 387 |
| VH | VH4-59 | SEQ ID No. 388 |
| VH | VH4-b | SEQ ID No. 389 |
| VH | VH4-61 | SEQ ID No. 390 |
| VH | VH5-a | SEQ ID No. 391 |
| VH | VH5-51 | SEQ ID No. 392 |
| VH | VH6-1 | SEQ ID No. 393 |
| VH | VH7-4-1 | SEQ ID No. 394 |
| Jκ | Jκ1 | SEQ ID No. 395 |
| Jκ | Jκ2 | SEQ ID No. 396 |
| Jκ | Jκ3 | SEQ ID No. 397 |
| Jκ | Jκ4 | SEQ ID No. 398 |
| Jκ | Jκ5 | SEQ ID No. 399 |
| Jλ | Jλ1 | SEQ ID No. 400 |
| Jλ | Jλ2, Jλ3 | SEQ ID No. 401 |
| Jλ | Jλ6 | SEQ ID No. 402 |
| Jλ | Jλ7 | SEQ ID No. 403 |
| JH | JH1 | SEQ ID No. 404 |
| JH | JH2 | SEQ ID No. 405 |
| JH | JH3 | SEQ ID No. 406 |
| JH | JH4 | SEQ ID No. 407 |
| JH | JH5 | SEQ ID No. 408 |
| JH | JH6 | SEQ ID No. 409 |

[Human Monoclonal Antibody]

The term "human monoclonal antibody" refers to a monoclonal antibody containing variable and constant regions of human germline immunoglobulin sequence. In the present invention, the human monoclonal antibody may be a recombinant generated by replacing its variable regions partially or entirely with variable regions of any other human monoclonal antibody. The recombinant may be generated by recombination at boundaries between the framework regions and the complementarity-determining regions, in order to avoid undesired influences on the binding ability of the antibody. The recombinant may also be generated by recombination of framework regions 1 to 4 respectively with framework regions 1 to 4 of any other human monoclonal antibody, in order to avoid undesired increase in immunogenicity. The human monoclonal antibody of the present invention may be a variant of a human monoclonal antibody. In order to reduce immunogenicity while maintaining or improving its binding ability with the antigen, the human monoclonal antibody preferably includes amino acid sequences of complementarity-determining region with mutation and amino acid sequences of germline framework region without mutation.

[Isolated]

The term "isolated" antibody refers to an antibody identified and separated and/or recovered from a component in its natural environment. Contaminant components in its natural environments are materials that would interfere with diagnostic or therapeutic uses of the antibody, and include enzymes, hormones, and other proteinaceous or non-proteinaceous solutes. In general, an isolated antibody may be obtained by at least one purification step, and an antibody purified by such at least one purification step is referred to as "isolated antibody."

[Neutralization]

As used herein, the term "neutralization" refers to an action of binding to a target of interest and inhibiting one of its functions. Specifically, the term "anti-IL-33 neutralizing monoclonal antibody" refers to a monoclonal antibody which inhibits biological activity induced by the IL-33 polypeptide via binding with IL-33. The biological activity to be inhibited of IL-33 includes, but is not limited to, production of IL-33-induced cytokines such as IL-6. Indicators of the biological activity of IL-33 can be evaluated by one or more of the in vitro or in vivo analyses known in the art. The term "human anti-IL-33 neutralizing monoclonal antibody" refers to a human monoclonal antibody that is capable of binding to IL-33 to inhibit one of its functions.

[Antagonist]

As used herein, the term "antagonist" is a generic term for materials having a neutralizing effect on a target of interest. Specifically, "IL-33 antagonist" refers to a material capable of binding to IL-33 to inhibit one of its functions, for example anti-IL-33 neutralizing monoclonal antibodies.

[Complementarity-Determining Region]

The term "complementarity-determining regions" refers to the regions which form the antigen-binding site in variable regions of an immunoglobulin molecule. It is also referred to as "hypervariable regions" indicating the parts with particularly great variability in the amino acid sequences among different immunoglobulin molecules. Light and heavy chains respectively contain three complementarity-determining regions (complementarity-determining regions 1, 2, and 3). In the present invention, the complementarity-determining regions of immunoglobulin molecules are numbered in accordance with the Kabat numbering system (Kabat et al., 1987, Sequences of Proteins of Immunological Interest, US Department of Health and Human Services, NIH, USA).

[Competition]

As used herein, an antibody which "competes" with a monoclonal antibody indicates that the presence of the monoclonal antibody significantly decreases the binding of an antibody with IL-33, as measured by surface plasmon resonance (SPR) as described in the specification.

As used herein, the term "anti-IL-33 neutralizing monoclonal antibody which competes" encompasses chimeric antibodies, humanized antibodies, human antibodies, multispecific antibodies, and artificial antibody, and functionally modified forms thereof, conjugated antibodies containing any of such antibodies, and fragments of such antibodies.

The embodiments of the present invention are explained below. The following embodiments is illustrative, and should not be construed to limit the present invention.

The present invention relates to a monoclonal antibody that is capable of binding to an epitope of IL-33. Since the monoclonal antibody that is capable of binding to the epitope can neutralize the activity of human IL-33, the epitope preferably has an amino acid sequence of positions 101 to 154 or 199 to 270, more preferably 111 to 130 (PEP12), 131 to 150 (PEP14), 231 to 250 (PEP24), or 251 to 270 (PEP26), of SEQ ID NO:226 in the Sequence Listing. IL-33 is often cleaved during extracellular release. If an epitope is formed from amino acid residues being separate on on the primary sequence of IL-33 based on protein folding, cleavage of IL-33 affects the protein folding and deletes the separated amino acid residues of the epitope, which may result in significant decrease of the affinity of the antibody with the resulting fragments. For this reason, the epitope to which the anti-IL-33 monoclonal antibody binds is preferably a continuous amino acid sequence.

In order to attain the neutralizing effect of the monoclonal antibody that is capable of binding to an epitope, it is required, for example, to inhibit binding of IL-33 with IL-33 receptors. Thus, the epitope in the present invention is preferably present not only on the surface of the IL-33 protein but also in close proximity to the IL-33 receptors. The inventors have performed conformational modeling based on the crystallographic structure data in NPL 11, to identify the amino acids containing the atom of IL-33 located at the atomic distance of 5 Å or less from a component atom of the IL-33 receptor, when the two atoms are in the closest proximity (i.e. interfacial atom), as described below in the Examples. Examples of the amino acid containing the interfacial atom include P118 ("P118" represents the proline residue at position 118 of SEQ ID NO:226 in the Sequence Listing; hereinafter, amino acid residues are represented in the same way), I119, T120, Y122, L123, R124, S125, L126, S127, Y129, and N130 of PEP12; D131, Q132, S133, T135, A137, L138, E139, S142, Y143, E144, I145, Y146, E148, D149, and L150 of PEP14; D244, N245, and H246 of PEP24; and K266, L267, S268, and E269 of PEP26. A functional epitope to specifically bind to a monoclonal antibody that can neutralize IL-33 preferably includes the amino acid containing the interfacial atom. The neutralizing effect of a monoclonal antibody that is capable of specifically binding to a functional epitope is believed to depend on the number and the conformational position of the interfacial atoms contained in the functional epitope, but it is not intended to be bound by the theory.

A preferred embodiment of the present invention is directed to a monoclonal antibody wherein the epitope consisting of a continuous amino acid sequence included in positions 101 to 154 or 199 to 270 of SEQ ID NO:226 in the Sequence Listing consists of a continuous amino acid sequence of positions 111 to 130 (PEP12), 131 to 150 (PEP14), 231 to 250 (PEP24), or 251 to 270 (PEP26) of SEQ ID NO:226 in the Sequence Listing. A more preferred embodiment of the present invention is the monoclonal antibody wherein the epitope consists of a continuous amino acid sequence of positions 138 to 147 or 139 to 147 of SEQ ID NO:226 in the Sequence Listing.

The inventors have studied the minimal amino acid sequence required for the epitope, using two different monoclonal antibodies that bind to PEP14, and have determined the continuous amino acid sequences of positions 138 to 147 and 139 to 147 of SEQ ID NO:226 in the Sequence Listing as the minimal sequence for the epitope of IL-33. Accordingly, the present invention relates to an epitope consisting of a continuous amino acid sequence of positions 138 to 147 or 139 to 147 of SEQ ID NO:226 in the Sequence Listing.

The binding of a monoclonal antibody to the epitope of the present invention can be confirmed by a method generally practiced in the art, such as ELISA, immunoprecipitation, surface plasmon resonance (SPR), and KinExA technology. For example, if a monoclonal antibody is tested using the epitope peptides of the present invention in peptide array scanning based on the SPR process, as described in the Examples in the specification, the binding of the monoclonal antibody to the epitope can be determined based on significant increases in RU values. The analysis by KinExA technology described in the specification in the Examples can determine a dissociation constant (Kd). The dissociation constant against an epitope peptide is preferably low, and is preferably 10 μM or lower, 1 μM or lower, 100 nM or lower, 10 nM or lower, 1 nM or lower, 100 pM or lower, or 10 pM or lower.

Another embodiment of the present invention relates to a pharmaceutical composition comprising the monoclonal antibody of the present invention that is capable of binding to an epitope consisting of a continuous amino acid sequence included in positions 101 to 154 or 199 to 270 of SEQ ID NO:226 in the Sequence Listing. The invention also relates to a method for diagnosis, treatment, prevention, or alleviation of a disease associated with IL-33, the method comprising administering the monoclonal antibody of the invention, and to use of the monoclonal antibody of the invention for the manufacture of a amedicament to diagnosing, treating, preventing, or alleviating a disease associated with IL-33.

Non-limiting examples of the disease associated with IL-33 include asthma, atopic dermatitis, urticaria, pollinosis, anaphylactic shock, sinusitis (including eosinophilic sinusitis), allergic encephalomyelitis, hypereosinophilic syndrome, polymyalgia rheumatica, rheumatic heart diseases, multiple sclerosis, arthritis (for example, rheumatoid arthritis, juvenile arthritis, psoriatic arthritis, arthrosis deformans, and Reiter's syndrome), systemic lupus erythematosus (including discoid lupus), pemphigus, pemphigoid, psoriasis, ankylosing spondylitis, hepatitis (for example, autoimmune hepatitis and chronic active hepatitis), inflammatory bowel diseases (for example, ulcerative colitis, Crohn's disease, and gluten-sensitive enteropathy), Sjogren's syndrome, autoimmune hemolytic anemia, autoimmune inflammatory eye diseases, autoimmune neonatal thrombocytopenia, autoimmune neutropenia, autoimmune oophoritis and orchitis, autoimmune thrombocytopenia, autoimmune thyroiditis, multiple myositis, dermatomyositis, myasthenia gravis, adrenergic agonist resistance, alopecia areata (alopecia greata), antiphospholipid syndrome, adrenal autoimmune diseases (for example, autoimmune Addison's disease), celiac sprue-dermatitis, chronic fatigue and immune dysfunction syndrome (CFIDS), cold agglutinin disease, essential mixed cryoglobulinemia, fibromyalgia-fibromyositis, glomerulonephritis (for example, IgA nephropathy), Graves' disease, hyperthyroidism (that is, Hashimoto's thyroiditis), idiopathic thrombocytopenic purpura (ITP), mixed connective tissue disease, Type 1 or immune-mediated diabetes mellitus, pernicious anemia, polychondritis, polyglandular syndrome, stiff-man syndrome, vitiligo, sarcoidosis, polyendocrinopathy, other endocrinopathy, arteriosclerosis, hepatic fibrosis (for example, primary biliary cirrhosis), pulmonary fibrosis (for example, idiopathic pulmonary fibrosis), chronic obstructive pulmonary disease (COPD), scleroderma (including CREST syndrome and Raynaud's phenomenon), tubulointerstitial nephritis, dense deposit disease, acute kidney injury, myocarditis, cardiomyopathy, neuritis (for example, Guillain-Barre syndrome), polyarteritis nodosa, cardiotomy syndrome, chronic inflammatory demyelinating polyneuropathy, IgA neuropathy, lichen planus, Meniere's disease, post-myocardial infarction (post-MI) syndrome, uveitis, uveitis ophthalmia, vasculitis, primary agammaglobulinemia, cancer (for example, brain tumor, laryngeal cancer, lip and oral cancer, hypopharyngeal cancer, thyroid cancer, esophageal cancer, breast cancer, lung cancer, gastric cancer, adrenocortical carcinoma, cancer of the bile duct, gallbladder cancer, liver cancer, pancreatic cancer, bladder cancer, colon cancer, uterine cancer, ovarian cancer, prostate cancer, testicular cancer, chronic lymphocytic leukemia, chronic myelogenous leukemia, Ewing's tumor, Hodgkin's disease, non-Hodgkin lymphoma, melanoma, mesothelioma, and multiple myeloma), infections resistant to clearance by the immune system (for example, severe acute respiratory syndrome (SARS)), lethal cytokine storm associated with virulent influenza infection, and sepsis. The disease associated with IL-33 is preferably asthma, atopic dermatitis, pollinosis, anaphylactic shock, sinusitis (including eosinophilic sinusitis), Crohn's disease, ulcerative colitis, arthritis, systemic lupus erythematosus, pemphigus, pemphigoid, scleroderma, ankylosing spondylitis, hepatic fibrosis (including primary biliary cirrhosis), pulmonary fibrosis, chronic obstructive pulmonary disease (COPD), acute kidney injury, vasculitis, and cancer.

A further embodiment of the present invention relates to an expression inhibitor against a cytokine, chemokine, or an inflammatory mediator, comprising the monoclonal antibody that is capable of binding to an epitope consisting of a continuous amino acid sequence included in positions 101 to 154 or 199 to 270 of SEQ ID NO:226 in the Sequence Listing.

The cytokine to be inhibited by the expression inhibitor for cytokines, chemokines, or inflammatory mediators according to the present invention is one of the IL-33 induced cytokines, including TNF-06, IFN-γ, IL-1β, IL-3, IL-4, IL-5, IL-6, and IL-13. The chemokine to be inhibited with the inhibitor is one of IL-33-induced chemokines, including CXCL2, CCL2, CCL3, CCL6, CCL17, and CCL24. The inflammatory mediator to be inhibited with the inhibitor is one of IL-33-induced inflammatory mediators, including PGD2 and LTB4. A particularly preferred embodiment of the present invention is an expression inhibitor containing an anti-IL-33 monoclonal antibody to inhibit expression of IFN-γ, IL-5, IL-6, or IL-13. More preferably, the inhibitor is an IL-6 expression inhibitor.

In a further embodiment of the present invention, the invention relates to an epitope to which an anti-IL-33 monoclonal antibody binds. In the present invention, the epitope is directed to a sequence consisting of six to twenty amino acids necessary for recognition by the antibody. In another embodiment, the epitope may further contain amino acids in close proximity, either in the sequence or in the three-dimensional structure, to amino acids in the determined sequence, thereby a further epitope may be formed. However, the epitope preferably does not contain discontinuous amino acids.

The continuous amino acid sequence of the epitope of the present invention consists of at least five, preferably at least six, more preferably at least seven, more preferably at least eight, yet more preferably at least nine amino acids. The continuous amino acid sequence consists of at least 10, more preferably 15, yet more preferably at least 20 amino acids, so as to achieve more sufficient antigenicity. On the other hand, if the epitope contains an excessively long sequence, however, it may contain two or more sites recognized by an antibody, which may interfere with production or screening of antibodies having a desired neutralizing effect. For this reason, the sequence of the epitope is preferably 30 amino acids or less, more preferably 20 amino acids or less, yet more preferably 15 amino acids or less, in length, for ensuring exhibition of the desired neutralizing effect by the antibody that is capable of binding to the epitope of the present invention. The number of amino acid residues in the continuous amino acid sequence included in the epitope is selected from, for example, 5, 6, 7, 8, 9, 10, 11, 12, 13, 14, 15, 16, 17, 18, 19, and 20.

The epitope may have one or several amino acid mutations, i.e. amino acid substitutions, deletions, or insertions, unless the mutations change the antigenicity. The number of introduced mutations is preferably five or less, more preferably three or less, most preferably one. The epitope may also be modified, for example, with sugar chains of the original protein, and terminal modification. In another embodiment, the epitope may consist of an amino acid sequence with sequence identity of at least 90%, more preferably at least 95%, more preferably at least 97%, yet more preferably at least 98%, most preferably 99%, to the continuous amino acid sequence specified in the present invention, unless the antigenicity is affected. The epitope peptide may be tagged with histidine or biotin, etc., when it is used as bait, and may be linked to a carrier protein such as KLH, when it is used as vaccine.

"Percent (%) sequence identity" related to a reference polypeptide sequence identified herein is defined as the percentage of amino acid residues that are included in a candidate sequence and are identical with the amino acid residues in a specific reference polypeptide sequence, after aligning the sequences and introducing gaps, if necessary, to achieve the maximum percent sequence identity, and not considering any conservative substitutions as part of the sequence identity. Alignment for the purpose of determining percent amino acid sequence identity can be achieved by using various methods within the skill in the art, for example, a publicly available computer software, such as BLAST, BLAST-2, ALIGN, or Megalign (DNASTAR, Inc.) software. Those skilled in the art can determine appropriate parameters for measuring alignment, including any algorithm necessary for achieving maximal alignment on the full-length sequences to be compared. For the purposes described herein, however, percent amino acid sequence identity values are determined by pairwise comparison using the sequence comparison computer program BLAST. In a circumstance where the program BLAST is used for comparison of amino acid sequences, the percent amino acid sequence identity of a given amino acid sequence A to a given amino acid sequence B is calculated as follows:

Fraction X/Y×100 where X is the number of amino acid residues scored as identical matches by the sequence alignment program BLAST in its alignment of the sequences A and B, and Y is the total number of amino acid residues in the sequence B. It will be appreciated that difference in length between the amino acid sequences A and B results in difference in the percent amino acid sequence identity of the sequence A to the sequence B and that of the sequence B to the sequence A. All the percent amino acid sequence identity values described herein are determined based on the BLAST computer program as just described above, unless otherwise indicated.

The epitope found in the present invention is directed to a functional epitope to which an anti-IL-33 neutralizing antibody binds specifically. Thus, a novel antibody having an antagonistic effect against IL-33 can be obtained efficiently by means of the functional epitope of the present invention. Specifically, a monoclonal antibody having the antagonistic effect can be obtained by screening monoclonal antibodies to full-length IL-33 or mature IL-33 to identify those which are capable of binding to the functional epitope of the invention. Accordingly, in a further embodiment, the present invention relates to a method of screening for an antibody having an antagonistic effect using the functional epitope of IL-33. More specifically, if a clone of antibody having an antagonistic effect against IL-33 is concentrated from a naive antibody library by phage display technique, library selection is first performed using a full-length or mature IL-33 protein as bait, the clones of antibodies that bind to one or more of various epitopes on the surface of IL-33 are enriched and then are subjected to the library selection using the functional epitope peptides found in the invention as bait. Such a method provides efficient screening of an antibody capable of specifically binding to the functional epitope and having an antagonistic effect against IL-33.

In the Examples, the inventors tested monoclonal antibodies that had been confirmed to bind to epitopes of 20 amino acid residues in length to analyze their antagonistic activity against IL-33 at different antibody concentrations, to determine epitopes suitable for production or screening of an antibody having the antagonistic effect. The results show that antibodies binding to an epitope selected from the group consisting of positions 111 to 130 (PEP12), 131 to 150 (PEP14), 231 to 250 (PEP24), and 251 to 271 (PEP26) of SEQ ID NO:226 in the Sequence Listing clearly exhibited concentration-dependent increase in their antagonistic effect. The results demonstrate that such epitopes are functional epitopes suitable for production or screening of an antibody having antagonistic effect. Accordingly, in one embodiment, the present invention relates to an epitope comprising a sequence consisting of at least six, preferably at least 10, more preferably at least 15, consecutive amino acids included in a region selected from the group consisting of positions 111 to 130, 131 to 150, 231 to 250, and 251 to 271 of SEQ ID NO:226 in the Sequence Listing. In another embodiment, the present invention relates to an epitope selected from the group consisting of positions 111 to 130, 131 to 150, 231 to 250, and 251 to 270 of SEQ ID NO:226 in the Sequence Listing.

The epitope can be produced by any peptide synthesizing technique ordinarily practiced in the art. A prepared and purified epitope can be used for immunization of animals or for production of antibodies to the epitope. Alternatively, a purified epitope can be applied to phage displaying technique for production or screening of a monoclonal antibody that is capable of binding to the epitope. The epitope can also be used as vaccine when it is used in combination with an adjuvant.

The present invention relates to a monoclonal antibody that is capable of binding to an epitope consisting of a continuous amino acid sequence included in a sequence spanning positions 101 to 154 or 199 to 270 of SEQ ID NO:226 in the Sequence Listing. Examples of the monoclonal antibody include chimeric antibodies, humanized antibodies, human antibodies, multispecific antibodies, and artificial antibody; and functionally modified forms thereof, conjugated antibody thereof, and fragments thereof. The monoclonal antibody of the present invention may be an antibody from any animal, for example, mouse antibody, human antibody, rat antibody, rabbit antibody, goat antibody, or camel antibody. The monoclonal antibody of the present invention can be produced by a variety of known processes including, for example, hybridoma, phage display, and genetic engineering techniques.

In the hybridoma technique, an animal, in particular rat or mouse, is immunized with an immunogen, and B cells are collected from its spleen or lymph node and are then fused with immortalized cells, e.g., myeloma cells, to form hybridoma cells. The hybridoma cells are screened to identify the hybridoma that produces an antibody having the desired binding ability, and the desired antibody can be produced with the screened hybridoma. A human antibody can be obtained from a transgenic mouse induced with a gene for the human antibody. The monoclonal antibody of interest is obtained from the hybridoma cells by, for example, culturing the hybridoma cells in accordance with an ordinary method and then collecting the culture supernatant; or administering the hybridoma cells to a mammal which is compatible with the hybridoma cells for proliferation, and then collecting the ascitic fluid. The former method is suitable for production of antibodies at high purity, and the latter method is suitable for large-scale production of antibodies. Monoclonal antibodies can be prepared by any known technique, for example, in accordance with the description in Current Protocols in Immunology, Wiley and Sons Inc., Chapter 2.

In the phage display technique, phages selected from any phage antibody library are screened using an immunogen of interest to select the phages that have desired binding ability to the immunogen. The sequence contained in the selected phages and corresponding to the antibody is then isolated or determined, and an expression vector including a nucleic acid molecule that encodes a monoclonal antibody is constructed based on the isolated sequence or determined sequence information. The expression vector is then transfected into a cell line and the cell line is cultured to produce the monoclonal antibody. A human antibody with desired binding ability can be produced with a human antibody library as the phage antibody library.

In genetic engineering techniques, a recombinant antibody can be prepared by introducing a mutation in a sequence corresponding to complementarity-determining regions (CDR) or any other sequence within the gene sequence which encodes the antibody, incorporating the resulting sequence into an expression vector, and then transforming the expression vector into a host cell (see, for example, Borrebaeck C. A. K. and Larrick J. W. THERAPEUTIC MONOCLONAL ANTIBODIES, Published in the United Kingdom by MACMILLAN PUBLISHERS LTD, 1990).

In the present invention, chimeric antibodies, humanized antibodies, multispecific antibodies, and artificial antibody mimetics can also be used, for example, for the purpose of reducing xenoantigenicity to human or adding other function. Such antibodies can be produced by any known method.

A chimeric antibody can be produced by ligating a DNA which encodes variable regions of a non-human antibody to a DNA which encodes constant regions of a human antibody, incorporating the resulting DNA into an expression vector, which is then transformed into a host cell for expression of the antibody of interest (see EP 125023 and WO 92/19759). Chimeric antibodies useful for the present invention can be produced by such a known technique.

A humanized antibody can be produced by ligating a DNA which encodes complementarity-determining regions (CDR) of a non-human antibody to a DNA which encodes the remaining regions of a human antibody, and incorporating the resulting DNA into an expression vector, which is then transformed into a host cell for expression of the antibody of interest.

A multispecific antibody refers to an asymmetric antibody that has two or more independent antigen recognition sites and have specificity for two or more different antigens. A multispecific antibody such as bispecific antibody can be produced by any genetic engineering technique based on antigen-binding regions of two or more monoclonal antibodies. Such genetic engineering techniques have already been established in the art. For example, a desired bispecific antibody can be obtained by linking antigen-binding regions of two different monoclonal antibodies in tandem in accordance with the DVD-Ig method (Wu et al., Nature Biotechnology 25(11), 1290(2007)), or by modifying Fc region of an antibody to combine heavy chains of two different antibodies that are capable of binding to different antigens in accordance with the ART-Ig method (Kitazawa et al., Nature Medicine 18(10), 1570(2012)).

"Artificial antibody" refers to, for example, protein scaffolds, which do not have a structure of an antibody, but have a function like an antibody. Examples of the applicable protein scaffolds include Kunitz domains of human serine protease inhibitors; extracellular domains of human fibronectin; ankyrin; and lipocalin. A protein scaffold that is capable of binding to the epitope of the present invention can be produced by modifying the sequence of the target-biding site on the scaffold (PTL 4; Clifford Mintz et. al BioProcess International, 2013, Vol. 11(2), pp. 40-48).

The monoclonal antibody of the present invention may be modified in its amino acid sequence or sugar chain structure in Fc regions to regulate its functions or properties, except for the antigen-binding function, such as cytotoxic function, complement activation function, and half-life in blood (Strohl, Current Opinion in Biotechnology, 2009, vol. 20, p. 685). Such a functionally modified antibody can be prepared, for example, by a method described below. A monoclonal antibody produced in CHO host cells knocked out for the α1,6-fucosyltransferase (FUT8) gene has a decreased fucose content on the sugar chains, resulting in increased cytotoxic function, while an antibody produced in CHO host cells transfected with the FUT 8 gene has low cytotoxic function (WO 2005/035586, WO 2002/31140, and WO 00/61739). The complement activation function of the antibody can be regulated by modification of its Fc region via change in amino acid residues (U.S. Pat. Nos. 6,737,056, 7,297,775, and 7,317,091). The half-life in blood of the antibody can be prolonged with an Fc region variant having increased binding ability to FcRn, one of Fc receptors (Shuhei Hashiguchi et al., SEIKAGAKU (The Journal of Biochemistry), 2010, Vol. 82(8), p. 710). Such functionally-modified antibodies can be produced by genetic engineering techniques.

The monoclonal antibody used in the present invention may be a conjugated antibody produced by binding an antibody to any of various molecules, such as non-peptidic polymers, e.g., poly(ethylene glycol) (PEG); radioactive materials; and toxins. Such a conjugated antibody can be produced through chemical modification of the obtained antibody. Methods for chemical modification have already been established in the art. Such conjugated antibodies are also encompassed in the monoclonal antibody of the present invention (D. J. King., Applications and Engineering of Monoclonal antibodies., 1998 T. J. International Ltd, Monoclonal Antibody-Based Therapy of Cancer., 1998 Marcel Dekker Inc; Chari et al., Cancer Res., 1992 Vol. 152:127; Liu et al., Proc Natl Acad Sci USA., 1996 Vol 93:8681).

According to the present invention, in addition to the full-length antibodies described above, the antibody also encompasses fragments of monoclonal antibodies and any modified forms thereof, as long as they have binding ability to an epitope of interest and exerts antagonistic activity. Examples of the antibody fragment include Fab fragments, Fv fragments, F(ab')$_2$ fragments, Fab' fragments, and single-chain Fv (scFv) fragments, which contain the Fv regions of the H and L chains connected via a suitable linker. These antibody fragments may be bound to non-antibody functional molecules, such as non-peptidic polymers, e.g., poly (ethylene glycol) (PEG); radioactive materials; toxins; low-molecular-weight compounds; cytokines; albumin; and enzymes.

The production system for preparing monoclonal antibodies may be any of in vitro and in vivo production systems. The in vitro production system includes the production system using eukaryotic cells, e.g., animal cells, plant cells, or fungal cells; and the production system using prokaryotic cells, e.g., bacterial cells such as *Escherichia coli* and *Bacillus subtilis*. Applicable cells include animal cells, in particular mammalian cells, e.g., generally used cells, such as CHO, COS, myeloma, BHK, HeLa, and Vero cells; insect cells; and plant cells. In vivo production system includes production systems in animals or plants. Examples of the production system in animals include those in mammals and insects. Examples of applicable mammals include goats, porcines, ovines, mice, and bovines (Vicki Glaser, SPECTRUM Biotechnology Applications, 1993). Examples of applicable insects include silkworms. Examples of applicable plants include tobacco.

If the monoclonal antibody is produced in an in vitro or in vivo production system as described above, the DNA encoding the heavy chain (H chain) and the DNA encoding the light chain (L chain) may be incorporated into separate expression vectors to co-transform the host, or may be incorporated together into a single expression vector to transform the host (see WO 94/11523).

The monoclonal antibody thus produced can be purified to homogeneity. The monoclonal antibodies can be separated and purified by any method ordinarily used for separation and purification of proteins. For example, the monoclonal antibodies can be separated and purified by appropriately selecting or combining methods and instruments including, but not limited to, chromatographic columns for affinity chromatography, filtration, ultrafiltration, salt precipitation, dialysis, SDS-polyacrylamide gel electrophoresis, and isoelectric focusing (Antibodies: A Laboratory Manual. Ed Harlow and David Lane, Cold Spring Harbor Laboratory, 1988). Columns used in affinity chromatography include protein A columns and protein G columns. Examples of the protein A column include the Hyper D, POROS, and Sepharose F. F. columns (Amersham Biosciences).

The monoclonal antibody that is capable of binding to an epitope consisting of a continuous amino acid sequence included in positions 101 to 154 or 199 to 270 of SEQ ID NO:226 in the Sequence Listing is preferably a chimeric antibody, humanized antibody, or human antibody, most preferably a human antibody, in view of the low antigenicity it may exhibit when it is administered to a human. Among human antibodies, those wherein the amino acid sequences of the framework regions correspond to amino acid sequences of framework regions from a human germline or a combination of amino acid sequences thereof are preferred. Thus, the present invention relates to a human anti-IL-33 neutralizing monoclonal antibody wherein the amino acid sequences of the framework regions correspond to amino acid sequences of framework regions from a human germline or a combination of amino acid sequences thereof.

Since the framework regions of variable region of such a human anti-IL-33 neutralizing monoclonal antibody comprise amino acid sequences of the human germline framework regions or a combination of amino acid sequences thereof, such a human anti-IL-33 neutralizing monoclonal antibody is characterized by no or significantly low immunogenicity caused by these regions, and also by being capable of binding to IL-33 to inhibit its functions. Thus, when the antibody is used as a pharmaceutical, it is unlikely to induce human anti-human immunoglobulin antibody (HAHA), so that it can avoid clearance in vivo. As a result, the antibody of the invention can attain a prolonged IL-33 neutralizing effect, and is safe because it does not cause inflammation induced by binding with HAHA.

The amino acid sequences of the human germline light-chain and heavy-chain framework regions maybe any amino acid sequence of human germline framework region. Examples of applicable sequence include amino acid sequences encoded by the DNA sequences of heavy-chain and light-chain framework regions of human antibody as registered in the database such as NCBI database (http://www.ncbi.nlm.nih.gov/igblast/showGermline.cgi), and the amino acid sequences of germline framework regions as shown in Table 4. The light-chain variable region may be either a λ chain variable region or κ chain variable region. The light-chain and heavy-chain framework regions of human germline are preferably those which frequently emerge in vivo and are often used. Examples of such a human heavy-chain framework region include the framework regions 1, 2, and 3 of the VH3-23, VH3-30, VH4-39, and VH4-34 germlines and the framework region 4 of the JH4 germline. Examples of human light-chain framework regions which frequently emerge in vivo include the framework regions 1, 2, and 3 of Vλ1-47, Vλ2-14, Vκ3-20, and Vκ1-39 germlines, and the framework region 4 of Jλ2 germline. The heavy-chain framework regions may be composed of any combination of any human heavy-chain framework regions. For example, the framework regions 1 and 2 of VH3-23 germline and the framework region 3 of VH3-30 germline can be selected and used in combination as heavy-chain framework regions. The light-chain framework regions may also be composed of any combination of any human light-chain framework regions.

Preferred amino acid sequences of framework regions of germline in the present invention are those of the framework regions of the VH3-23, VH3-30, JH4, Vλ1-47, and Jλ2 germlines. Specifically, the framework regions preferably have the following amino acid sequences: the amino acid sequence of the light-chain framework region 1 is residues 1 to 22 of SEQ ID NO:317 in the Sequence Listing; the amino acid sequence of the light-chain framework region 2 is residues 36 to 50 of SEQ ID NO:317 in the Sequence Listing; the amino acid sequence of the light-chain framework region 3 is residues 58 to 89 of SEQ ID NO:317 in the Sequence Listing; the amino acid sequence of the light-chain framework region 4 is residues 3 to 12 of SEQ ID NO:401 in the Sequence Listing; the amino acid sequence of the heavy-chain framework region 1 is residues 1 to 30 of SEQ ID NO:367 or residues 1 to 30 of SEQ ID NO:368 in the Sequence Listing; the amino acid sequence of the heavy-chain framework region 2 is residues 36 to 49 of SEQ ID NO:367 or residues 36 to 49 of SEQ ID NO:368 in the Sequence Listing; the amino acid sequence of the heavy-chain framework region 3 is residues 67 to 98 of SEQ ID NO:367 or residues 67 to 98 of SEQ ID NO:368 in the Sequence Listing; and the amino acid sequence of the heavy-chain framework region 4 is residues 5 to 15 of SEQ ID NO:407 in the Sequence Listing. More preferably, the framework regions have the following amino acid sequences: the amino acid sequence of the light-chain framework region 1 is residues 1 to 22 of SEQ ID NO:317 in the Sequence Listing; the amino acid sequence of the light-chain framework region 2 is residues 36 to 50 of SEQ ID NO:317 in the Sequence Listing; the amino acid sequence of the light-chain framework region 3 is residues 58 to 89 of SEQ ID NO:317 in the Sequence Listing; the amino acid sequence of the light-chain framework region 4 is residues 3 to 12 of SEQ ID NO:401 in the Sequence Listing; the amino acid sequence of the heavy-chain framework region 1 is residues 1 to 30 of SEQ ID NO:367 in the Sequence Listing; the amino acid sequence of the heavy-chain framework region 2 is residues 36 to 49 of SEQ ID NO:367 in the Sequence Listing; the amino acid sequence of the heavy-chain framework region 3 is residues 67 to 98 of SEQ ID NO:368 in the Sequence Listing; and the amino acid sequence of the heavy-chain framework region 4 is residues 5 to 15 of SEQ ID NO:407 in the Sequence Listing.

In another embodiment, the present invention relates to an isolated human anti-IL-33 neutralizing monoclonal antibody, wherein the amino acid sequences of a light-chain complementarity-determining region 1 (LCDR1), a light-chain complementarity-determining region 2 (LCDR2), a light-chain complementarity-determining region 3 (LCDR3), α heavy-chain complementarity-determining region 1 (HCDR1), α heavy-chain complementarity-determining region 2 (HCDR2), and α heavy-chain complementarity-determining region 3 (HCDR3) correspond to the combination of amino acid sequences of complementarity-determining regions represented by C1 to C30 in Table 1.

In a preferred embodiment, the human anti-IL-33 neutralizing monoclonal antibody having the combination of complementarity-determining regions represented by C1 to C30 shown in Table 1 has binding ability and neutralizing activity, in particular to mature IL-33 that is capable of binding to an IL-33 receptor to exert activity, e.g., IL-33 (residues 95 to 270), IL-33 (residues 99 to 270), IL-33 (residues 109 to 270), and IL-33 (residues 112 to 270), among IL-33. More preferably, the human anti-IL-33 neutralizing monoclonal antibody having the combination of the complementarity-determining regions represented by C1 to C30 shown in Table 1 has a binding ability to IL-33 (residues 131 to 150).

In a preferred embodiment of the present invention, the combination of amino acid sequences of the complementarity-determining regions provides improved binding ability and/or physical properties of the antibody. In a particularly preferred embodiment, the upper limit of the dissociation rate constant (koff) against human IL-33 is about $3.5\times10^{-5}$/sec or lower, more preferably about $2.0\times10^{-5}$/sec or lower, more preferably $1.5\times10^{-5}$/sec or lower, yet more preferably about $1.0\times10^{-5}$/sec or lower, and the lower limit of the dissociation rate constant is, but not limited to, $10^{-7}$/sec or higher, more preferably $10^{-6}$/sec or higher, more preferably about $5\times10^{-6}$/sec or higher.

Among human anti-IL-33 neutralizing monoclonal antibodies, more preferred are those which have a low dissociation constant (Kd) against human IL-33. The upper limit of the dissociation constant (Kd) is $10^{-9}$M or lower, more preferably $10^{-10}$M or lower, yet more preferably $10^{-12}$M or lower, for example. The lower limit of the dissociation rate constant is, but not limited to, preferably $10^{-4}$M or higher, more preferably $10^{-13}$ or higher.

The human anti-IL-33 neutralizing monoclonal antibody of the present invention inhibits IL-6 production from HUVEC stimulated with IL-33. In particular, antibodies with higher inhibitory effect are more preferred. Specifically, in a preferred embodiment of the present invention, the human anti-IL-33 neutralizing monoclonal antibody, which attains about 50% or higher, more preferably about 70% or higher, yet more preferably about 90% or higher rate (inhibiting rate) of inhibiting IL-6 production from HUVEC which is stimulated with 100 ng/mL of IL-33 as described below in Example 10, is preferred.

The human anti-IL-33 neutralizing monoclonal antibody of the present invention inhibits production of IL-5, IL-6, and/or IL-13 by KU-812 cells stimulated with IL-33. In particular, antibodies with higher inhibitory effect are more preferred. Specifically, in a preferred embodiment of the present invention, the human anti-IL-33 neutralizing monoclonal antibody which attains the about 30% or higher, more preferably about 50% or higher, yet more preferably about 70% or higher rate (inhibiting rate) of inhibiting production of IL-5, IL-6, and/or IL-13 by KU-812 cells stimulated with 100 ng/mL of IL-33, as described below in Example 11, is preferred.

The human anti-IL-33 neutralizing monoclonal antibody of the present invention inhibits IFN-γ production by human peripheral blood mononuclear cells stimulated with IL-33. In particular, antibodies with higher inhibitory effect are more preferred. Specifically, in a preferred embodiment of the present invention, the human anti-IL-33 neutralizing monoclonal antibody which attains about 80% or higher, more preferably about 90% or higher, yet more preferably about 95% or higher rate of inhibiting IFN-γ production by human peripheral blood mononuclear cells stimulated with 10 ng/mL of IL-33, as described below in Example 12, is preferred.

The human anti-IL-33 neutralizing monoclonal antibody of the present invention inhibits inflammation induced by administration of human IL-33 to a mouse. In particular, antibodies with higher anti-inflammatory effect are more preferred. Specifically, in a preferred embodiment of the present invention, daily intraperitoneal administration of 10 mg/kg of the human anti-IL-33 neutralizing monoclonal antibody for seven days, which attains the rate of inhibiting increases in spleen weight, serum IgA concentration, serum IgE concentration, blood neutrophil count, blood basophil count, blood eosinophil count, and/or serum IL-5 concentration, induced by continuous administration of human IL-33 for seven days at an amount of 0.4 µg/individual, of about 30% or higher, more preferably about 50% or higher, yet more preferably about 80% or higher, as described below in Example 13, is preferred.

The human anti-IL-33 neutralizing monoclonal antibody of the present invention preferably has excellent physical properties. In particular, the human anti-IL-33 neutralizing monoclonal antibody preferably does not show bimodal particle size distribution and exhibits significantly low aggregation property in evaluation by dynamic light scattering. The human anti-IL-33 neutralizing monoclonal antibody of the invention preferably has high interaction parameter (kD), which is an indicator of colloidal stability. For example, the interaction parameter is preferably −12.4 mL/g or higher, more preferably −10 mL/g or higher, yet more preferably −8.5 mL/g or higher.

The human anti-IL-33 neutralizing monoclonal antibody of the present invention preferably has an excellent thermodynamic stability. For example, a preferred antibody exhibits thermodynamic stability such that the folded state of the immunoglobulin domain disappears at a temperature (Tm) of 65° C. or higher, preferably 68° C. or higher, more preferably 70° C. or higher, yet more preferably 73° C. or higher.

The human anti-IL-33 neutralizing monoclonal antibody of the present invention preferably has high antibody stability. The antibody stability can be measured by any common method, e.g., preservation stability test or forced oxidation test. In a preferred embodiment of the present invention, the antibody molecules have a monomer ratio of 90% or higher, more preferably 95% or higher, and have binding activity to the human IL-33 protein of 95% or higher, more preferably 99% or higher, after the preservation stability test at a temperature of 40° C. for four weeks, as described below in Example 21.

As described in Example 22, the human anti-IL-33 neutralizing monoclonal antibody of the present invention preferably has a binding activity of 80% or higher, more preferably 85% or higher, yet more preferably 90% or higher to the human IL-33 protein, after forced oxidation with 1% hydrogen peroxide solution at a temperature of 37° C. for 24 hours.

In view of the foregoing points, the human anti-IL-33 neutralizing monoclonal antibody selected from the combination of complementarity-determining regions represented by C1 to C28 in Table 1 is a preferred antibody. A more preferred embodiment of the present invention is a human anti-IL-33 neutralizing monoclonal antibody having complementarity-determining regions that respectively have amino acid sequences in accordance with a specific combination (C1, C8, C15, C17, or C18 in Table 1).

The human anti-IL-33 neutralizing monoclonal antibody identified by the combination of the amino acid sequences of the respective complementarity-determining regions may have any amino acid sequences of any framework regions in the variable regions, as long as the antigen-binding ability is assured. The respective amino acid sequences of framework regions preferably are amino acid sequences of framework regions from a human germline or a combination of amino acid sequences thereof. The amino acid sequences of framework regions of any germline that is used frequently in vivo in human are more preferred.

In the present invention, the amino acid sequences of the framework regions preferably have the following amino acid sequences: the amino acid sequence of the light-chain framework region 1 is residues 1 to 22 of SEQ ID NO:317 in the Sequence Listing; the amino acid sequence of the light-chain framework region 2 is residues 36 to 50 of SEQ ID NO:317 in the Sequence Listing; the amino acid sequence of the light-chain framework region 3 is residues 58 to 89 of SEQ ID NO:317 in the Sequence Listing; the amino acid sequence of the light-chain framework region 4 is residues 3 to 12 of SEQ ID NO:401 in the Sequence Listing; the amino acid sequence of the heavy-chain framework region 1 is residues 1 to 30 of SEQ ID NO:367 or residues 1 to 30 of SEQ ID NO:368 in the Sequence Listing; the amino acid sequence of the heavy-chain framework region 2 is residues 36 to 49 of SEQ ID NO:367 or residues 36 to 49 of SEQ ID NO:368 in the Sequence Listing; the amino acid sequence of the heavy-chain framework region 3 is residues 67 to 98 of SEQ ID NO:367 or residues 67 to 98 of SEQ ID NO:368 in the Sequence Listing; and the amino acid sequence of the heavy-chain framework region 4 is residues 5 to 15 of SEQ ID NO:407 in the Sequence Listing. More preferably, the framework regions have the following amino acid sequences: the amino acid sequence of the light-chain framework region 1 is residues 1 to 22 of SEQ ID NO:317 in the Sequence Listing; the amino acid sequence of the light-chain framework region 2 is residues 36 to 50 of SEQ ID NO:317 in the Sequence Listing; the amino acid sequence of the light-chain framework region 3 is residues 58 to 89 of SEQ ID NO:317 in the Sequence Listing; the amino acid sequence of the light-chain framework region 4 is residues 3 to 12 of SEQ ID NO:401 in the Sequence Listing; the amino acid sequence of the heavy-chain framework region 1 is residues 1 to 30 of SEQ ID NO:367 in the Sequence Listing; the amino acid sequence of the heavy-chain framework region 2 is residues 36 to 49 of SEQ ID NO:367 in the Sequence Listing; the amino acid sequence of the heavy-chain framework region 3 is residues 67 to 98 of SEQ ID NO:368 in the Sequence Listing; and the amino acid sequence of the heavy-chain framework region 4 is residues 5 to 15 of SEQ ID NO:407 in the Sequence Listing.

Examples of the preferred combinations of the amino acid sequences of the heavy-chain variable regions and the light-chain variable regions in the present invention are shown in Table 2.

A preferred embodiment of the present invention is a human anti-IL-33 neutralizing monoclonal antibody comprising variable regions that respectively have amino acid sequences in accordance with any one of combinations V1 to V28 shown in Table 2.

A more preferred embodiment of the present invention is a human anti-IL-33 neutralizing monoclonal antibody comprising complementarity-determining regions that respectively have amino acid sequences in accordance with a specific combination (V1, V8, V15, V17, or V18 in Table 2).

Depending on the difference in the heavy chain constant regions, human immunoglobulin molecules are categorized into IgG (including IgG1, IgG2, IgG3, and IgG4) having γ heavy chains; IgM having μ heavy chains; IgA (including IgA1 and IgA2) having α heavy chains; IgD having δ heavy chains; and IgE having ε heavy chains. All these types are encompassed in the constant regions of the human anti-IL-33 neutralizing monoclonal antibody of the present invention. Light chains are categorized into κ and λ light chains that differ in the position on chromosome. The light chain in the present invention encompasses both of the two light chains. In production of an antibody pharmaceutical, an antibody having κ light chains is preferred from the perspective of aggregation, but an antibody having λ light chains is also useful, because the λ light chains have a different amino acid sequence from that of the κ chains and have similar diversity to the κ chains. The human anti-IL-33 neutralizing monoclonal antibody of the present invention is preferably IgG having λ light chains and γ heavy chains, more preferably IgG1 having λ light chains and γ1 light chains, from the perspective of the stability in blood.

Since the amino acid sequence of IL-33 is different among animal species, the amino acid sequence of human IL-33 shown in SEQ ID NO:226 in the Sequence Listing is different from that of monkey IL-33 shown in SEQ ID NO:227 in the Sequence Listing. In general, since monkeys are used as experimental animals in pharmacological tests or safety tests of antibody pharmaceuticals, the human anti-IL-33 neutralizing monoclonal antibody of the present invention is preferably further capable of binding to monkey IL-33, and more preferably capable of binding to monkey IL-33 with a binding affinity similar to that with a human IL-33. In a particularly preferred embodiment, the ratio of the koff against human IL-33 versus the koff against monkey IL-33 is within about 20-fold, more preferably within about 10-fold, yet more preferably within about five-fold.

Illustrative examples of the antibody fragment of the present invention include Fab fragments, Fv fragments, F(ab')$_2$ fragments, Fab' fragments, and scFv fragments. These antibody fragments may be bound to non-antibody functional molecules such as non-peptidic polymers, e.g., poly(ethylene glycol) (PEG); radioactive materials; toxins; low-molecular-weight compounds; cytokines; albumin; and enzymes.

The human anti-IL-33 neutralizing monoclonal antibody of the present invention may be bound to an antibody having binding specificity for an antigen other than IL-33, to produce a multispecific antibody such as bispecific antibody. Non-limiting examples of the antigen other than IL-33 include TNF-α, IL-6 receptors, CD3, CD20, a4 integrin, BLys, Thymic Stromal Lymphopoietin, IgE, IL-1, IL-2, IL-4, IL-5, IL-6, IL-13, IL-17, IL-23, and IL-25.

The human anti-IL-33 neutralizing monoclonal antibody and fragments thereof of the present invention may be modified in its amino acid sequence or sugar chain structure in Fc regions, to produce a functionally modified antibody having regulated functions or properties, such as cytotoxic function, complement activation function, and half-life in blood (Kenya Shitara, Journal of the Pharmaceutical Society of Japan, 2009, Vol. 129(1), p. 3; Akiko Ishii et al., Folia Pharmacologica Japonica, 2010, Vol. 136(5), p. 280; Shuhei Hashiguchi et al., SEIKAGAKU (The Journal of Biochemistry), 2010, Vol. 82(8), p. 710; Strohl, Current Opinion in Biotechnology, 2009, vol. 20, p. 685).

The human anti-IL-33 neutralizing monoclonal antibody and antibody fragments thereof in the present invention may be bound to other functional molecule to form a conjugated antibody. For example, novel function can be added by binding a functional molecule, such as non-peptidic polymer, e.g., poly(ethylene glycol) (PEG); radioactive materials; toxins; low-molecular-weight compounds; albumin; cytokines; and enzymes to the antibody.

Other embodiments of the present invention relate to a nucleic acid molecule encoding a protein portion of a human anti-IL-33 neutralizing monoclonal antibody comprising framework regions that have amino acid sequences from germline(s); a vector including the nucleic acid molecule; a host cell including the vector; and a method for production of a human anti-IL-33 neutralizing monoclonal antibody including culturing the host cell.

In a yet another embodiment, the present invention relates to a composition comprising the human anti-IL-33 neutralizing monoclonal antibody described above. Since IL-33 induces inflammation and the like, the human anti-IL-33 neutralizing monoclonal antibody is expected to be applicable to diagnosis, treatment, prevention, or alleviation of a disease associated with IL-33. Accordingly, in one embodiment, the invention relates to a pharmaceutical composition comprising the human anti-IL-33 neutralizing monoclonal antibody for diagnosis, treatment, prevention, or alleviation of a disease associated with IL-33. In a yet another embodiment, since IL-33 induces cytokines, chemokines, and inflammatory mediators, the present invention relates to an expression inhibitor of the expression for cytokines, chemokines, or inflammatory mediators, comprising the human anti-IL-33 neutralizing monoclonal antibody.

The cytokine to be inhibited by the expression inhibitor for cytokines, chemokines, or inflammatory mediators according to the present invention is one of the IL-33-induced cytokines, including TNF-α, IFN-γ, IL-1β, IL-3, IL-4, IL-5, IL-6, and IL-13 etc. The chemokine to be inhibited with the inhibitor is one of IL-33-induced chemokines, including CXCL2, CCL2, CCL3, CCL6, CCL17, and CCL24, etc. The inflammatory mediator to be inhibited with the inhibitor is one of IL-33-induced inflammatory mediators, including PGD2 and LTB4 etc. A particularly preferred embodiment of the present invention is an expression inhibitor containing a human anti-IL-33 neutralizing monoclonal antibody to inhibit expression of IFN-γ, IL-5, IL-6, or IL-13. More preferably, the inhibitor is an IL-6 production inhibitor.

In another embodiment, the present invention relates to a pharmaceutical composition containing the monoclonal antibody of the present invention. The present invention also relates to a method for diagnosis, treatment, prevention, or alleviation of a disease associated with IL-33, the method comprising administering the monoclonal antibody of the invention; and to use of the monoclonal antibody of the invention for manufacture of a medicament for diagnosis, treatment, prevention, or alleviation of a disease associated with IL-33.

The disease associated with IL-33 include, but not limited to, asthma, atopic dermatitis, urticaria, pollinosis, anaphylactic shock, sinusitis (including eosinophilic sinusitis), allergic encephalomyelitis, hypereosinophilic syndrome, polymyalgia rheumatica, rheumatic heart diseases, multiple sclerosis, arthritis (for example, rheumatoid arthritis, juvenile arthritis, psoriatic arthritis, arthrosis deformans, and Reiter's syndrome), systemic lupus erythematosus (including discoid lupus), pemphigus, pemphigoid, psoriasis, ankylosing spondylitis, hepatitis (for example, autoimmune hepatitis and chronic active hepatitis), inflammatory bowel diseases (for example, ulcerative colitis, Crohn's disease, and gluten-sensitive enteropathy), Sjogren's syndrome, autoimmune hemolytic anemia, autoimmune inflammatory eye diseases, autoimmune neonatal thrombocytopenia, autoimmune neutropenia, autoimmune oophoritis and orchitis, autoimmune thrombocytopenia, autoimmune thyroiditis, multiple myositis, dermatomyositis, myasthenia gravis, adrenergic agonist resistance, alopecia areata (alopecia greata), antiphospholipid syndrome, adrenal autoimmune diseases (for example, autoimmune Addison's disease), celiac sprue-dermatitis, chronic fatigue and immune dysfunction syndrome (CFIDS), cold agglutinin disease, essential mixed cryoglobulinemia, fibromyalgia-fibromyositis, glomerulonephritis (for example, IgA nephropathy), Graves' disease, hyperthyroidism (that is, Hashimoto's thyroiditis), idiopathic thrombocytopenic purpura (ITP), mixed connective tissue disease, Type 1 or immune-mediated diabetes mellitus, pernicious anemia, polychondritis, polyglandular syndrome, stiff-man syndrome, vitiligo, sarcoidosis, polyendocrinopathy, other endocrinopathy, arteriosclerosis, hepatic fibrosis (for example, primary biliary cirrhosis), pulmonary fibrosis (for example, idiopathic pulmonary fibrosis), chronic obstructive pulmonary disease (COPD), scleroderma (including CREST syndrome and Raynaud's phenomenon), tubulointerstitial nephritis, dense deposit disease, acute kidney injury, myocarditis, cardiomyopathy, neuritis (for example, Guillain-Barre syndrome), polyarteritis nodosa, cardiotomy syndrome, chronic inflammatory demyelinating polyneuropathy, IgA neuropathy, lichen planus, Meniere's disease, post-myocardial infarction (post-MI) syndrome, uveitis, uveitis ophthalmia, vasculitis, primary agammaglobulinemia, cancer (for example, brain tumor, laryngeal cancer, lip and oral cancer, hypopharyngeal cancer, thyroid cancer, esophageal cancer, breast cancer, lung cancer, gastric cancer, adrenocortical carcinoma, cancer of the bile duct, gallbladder cancer, liver cancer, pancreatic cancer, bladder cancer, colon cancer, uterine cancer, ovarian cancer, prostate cancer, testicular cancer, chronic lymphocytic leukemia, chronic myelogenous leukemia, Ewing's tumor, Hodgkin's disease, non-Hodgkin lymphoma, melanoma, mesothelioma, and multiple myeloma), infections resistant to clearance by the immune system (for example, severe acute respiratory syndrome (SARS)), lethal cytokine storm associated with virulent influenza infection, and sepsis. The disease associated with IL-33 is preferably asthma, atopic dermatitis, pollinosis, anaphylactic shock, sinusitis (including eosinophilic sinusitis), Crohn's disease, ulcerative colitis, arthritis, systemic lupus erythematosus, pemphigus, pemphigoid, scleroderma, ankylosing spondylitis, hepatic fibrosis (including primary biliary cirrhosis), pulmonary fibrosis, chronic obstructive pulmonary disease (COPD), acute kidney injury, vasculitis, and cancer.

A pharmaceutical composition comprising the human anti-IL-33 neutralizing monoclonal antibody of the present invention may further contain a pharmacologically acceptable carrier, diluent, or excipient, in addition to the human anti-IL-33 neutralizing monoclonal antibody or a salt thereof as the active ingredient. The pharmaceutical composition may further contain an additional active ingredient other than the human anti-IL-33 neutralizing monoclonal antibody of the present invention, for example, an anti-inflammatory agent or immunosuppressive agent. Such a composition is provided in a dosage form suitable for parenteral or oral administration. From the perspective of the use as an antibody pharmaceutical, parenteral administration is preferred. Examples of the parenteral administration include, but are not limited to, intravenous, intraarterial, subcutaneous, topical, intraperitoneal, intramuscular, nasal, ophthalmic, transdermal, transmucosal, intrathecal, rectal, intramuscular, and intracerebral administration.

The pharmaceutical composition may be provided in any dosage form depending on the administration route. Examples of the dosage form include injection, powder, infusion, granule, tablet, and suppository. From the perspective of parenteral administration, the dosage form is preferably injection, infusion, or powder to be dissolved before use. These preparations may further contain any of various adjuvants used in pharmaceuticals. Specific examples of the adjuvant include carriers and other additives, such as stabilizer, preservative, analgesic, and emulsifier.

The human anti-IL-33 neutralizing monoclonal antibody of the present invention may be provided by continuous infusion at intervals of, for example, once per day, week, or month, or one to seven times per year, or by dosing. The dosing may be provided by intravenous, subcutaneous, topical, oral, nasal, rectal, intramuscular, or intraventricular administration, or by inhalation. A preferred dose protocol involves the maximum dose or administration frequency to avoid serious adverse side effects. The total weekly dose is generally at least about 0.05 µg/kg (body weight), more generally at least about 0.2 µg/kg, most generally at least about 0.5 µg/kg, typically at least about 1 µg/kg, more typically at least about 10 µg/kg, most typically at least about 100 µg/kg, preferably at least about 0.2 mg/kg, more preferably at least about 1.0 mg/kg, most preferably at least about 2.0 mg/kg, optimally at least about 10 mg/kg, more optimally at least about 25 mg/kg, most optimally at least about 50 mg/kg.

The human anti-IL-33 neutralizing monoclonal antibody of the present invention is useful in, for example, a diagnostic assay for detection of IL-33 expression in specific cells or tissues, or in blood serum, of a patient with a disease associated with IL-33. For diagnostic application, typically, the human anti-IL-33 neutralizing monoclonal antibody is preferably a conjugated antibody labeled with a detectable moiety.

In another embodiment, the present invention relates to an anti-IL-33 neutralizing monoclonal antibody which competes in binding to IL-33 with an anti-IL-33 neutralizing monoclonal antibody comprising amino acid sequences in accordance with a combination of specific complementarity-determining regions amino acid sequences (C1, C8, C15, C17, or C18 in Table 1) or in accordance with a combination of specific variable region amino acid sequences (V1, V8, V15, V17, or V18 in Table 2).

The anti-IL-33 neutralizing monoclonal antibody which competes in binding to IL-33 with an anti-IL-33 neutralizing monoclonal antibody comprising amino acid sequences in accordance with a combination of specific complementarity-determining regions amino acid sequences or in accordance with a combination of specific variable regions amino acid sequences can be obtained as follows: anti-IL-33 antibodies are produced by a genetic engineering technique, e.g., phage display, or the hybridoma technique; and the produced anti-IL-33 antibodies are screened by the surface plasmon resonance (SPR) technique as described below, for example.

Biotinylated human IL-33 protein (4 µg/mL) as ligand is loaded on an avidin-immobilized sensor chip to be immobilized thereon at an amount equivalent to 1300 to 1600 RU. Any anti-IL-33 antibody (15 µg/mL) is then loaded as an analyte thereon, so as to bind to the human IL-33 protein immobilized on the sensor chip. The process is repeated for several times until all the human IL-33 protein molecules immobilized on the sensor chip is bound by the anti-IL-33 antibody (saturation). Then the binding level at saturation (saturation binding level 1) is determined.

The same experiment is carried out with a human anti-IL-33 neutralizing monoclonal antibody comprising complementarity-determining regions that respectively have amino acid sequences in accordance with a specific combination or a human anti-IL-33 neutralizing monoclonal antibody comprising variable regions that respectively have amino acid sequences in accordance with a specific combination according to the invention, and the binding level at saturation (saturation binding level 2) is determined.

After the saturation of the human IL-33 protein on the sensor chip with the human anti-IL-33 neutralizing monoclonal antibody comprising complementarity-determining regions that respectively have amino acid sequences in accordance with a specific combination or the human anti-IL-33 neutralizing monoclonal antibody comprising variable regions that respectively have amino acid sequences in accordance with a specific combination according to the invention, any anti-IL-33 antibody (15 µg/mL) is loaded as an analyte. It is confirmed whether the analyte exhibits additional binding with the human IL-33 protein that has been saturated with the human anti-IL-33 neutralizing monoclonal antibody comprising complementarity-determining regions that respectively have amino acid sequences in accordance with a specific combination or the human anti-IL-33 neutralizing monoclonal antibody comprising variable regions that respectively have amino acid sequences in accordance with a specific combination according to the invention.

If any anti-IL-33 antibody can exhibit additional binding with the human IL-33 protein that has been saturated with the human anti-IL-33 neutralizing monoclonal antibody comprising complementarity-determining regions that respectively have amino acid sequences in accordance with a specific combination or the human anti-IL-33 neutralizing monoclonal antibody comprising variable regions that respectively have amino acid sequences in accordance with a specific combination according to the invention, while maintaining its saturation binding level 1 calculated above, then the anti-IL-33 antibody is determined to be "not competitive." If the anti-IL-33 antibody cannot exhibit additional binding with the human IL-33 protein that has been saturated with the human anti-IL-33 neutralizing monoclonal antibody comprising complementarity-determining regions that respectively have amino acid sequences in accordance with a specific combination or the anti-IL-33 neutralizing monoclonal antibody comprising variable regions that respectively have amino acid sequences in accordance with a specific combination according to the invention, then the anti-IL-33 antibody is determined to be "competitive." If the anti-IL-33 antibody can exhibit additional binding with the human IL-33 protein that has been saturated with the human anti-IL-33 neutralizing monoclonal antibody comprising complementarity-determining regions that respectively have amino acid sequences in accordance with a specific combination or the anti-IL-33 neutralizing monoclonal antibody comprising variable regions that respectively have amino acid sequences in accordance with a specific combination according to the invention but the additional binding level is lower than the saturation binding level 1 with a significant difference, then the antibody is determined to be "competitive." The significant difference can be determined by a common statistical method (for example, Student's t-test). The level of significance is set to equal to or less than 5% or 1%.

The anti-IL-33 neutralizing monoclonal antibody which competes in binding to IL-33 with a human anti-IL-33 neutralizing monoclonal antibody comprising amino acid sequences in accordance with a combination of specific complementarity-determining regions amino acid sequences or in accordance with a combination of specific variable regions amino acid sequences may be an antibody from any animal, for example, mouse, human, rat, rabbit, goat, or camel, and may also be a chimeric antibody or humanized antibody produced by combining such antibodies. The anti-IL-33 neutralizing monoclonal antibody which competes in binding to IL-33 with the human anti-IL-33 neutralizing monoclonal antibody comprising amino acid sequences in accordance with a combination of specific complementarity-determining regions amino acid sequences or in accordance with a combination of specific variable regions is preferably a chimeric antibody, humanized antibody, or human antibody, most preferably human antibody.

The anti-IL-33 neutralizing monoclonal antibody which competes in binding to IL-33 with the human anti-IL-33 neutralizing monoclonal antibody comprising amino acid sequences according to a combination of specific complementarity-determining regions amino acid sequences or a combination of specific variable regions amino acid sequence includes antibody fragments. Examples of the antibody fragment include Fab fragments, Fv fragments, F(ab')$_2$ fragments, Fab' fragments, and scFv fragments. Antibody fragments bound with PEG or the like are preferred.

The method for production of the anti-IL-33 neutralizing monoclonal antibody and the like of the present invention will be now described. The human anti-IL-33 neutralizing monoclonal antibody can be prepared through a genetic engineering technique, through incorporation of a DNA sequence which contains sequences encoding a desired combination of complementarity-determining regions and a combination of framework regions and encodes light-chain and heavy-chain variable regions into an expression vector; transformation of the expression vector into a host cell; and then culture of the host cell (see, for example, Borrebaeck C. A. K. and Larrick J. W. THERAPEUTIC MONOCLONAL ANTIBODIES, Published in the United Kingdom by MACMILLAN PUBLISHERS LTD, 1990). Alternatively, DNA sequences which respectively encode full-length heavy chain and full-length light chain can be produced through linkage of a DNA sequence encoding light-chain constant region to a DNA sequence encoding light-chain variable region and linkage of a DNA sequence encoding heavy-chain constant region to a DNA sequence encoding heavy-chain variable region. The combination of DNA sequences respectively encoding the full-length heavy chain and full-length light chain of a preferred human anti-IL-33 neutralizing antibody of the present invention include, for example, that of IgG1 having λ light chain as shown in Table 5. If the antibody is produced with an animal cell through a genetic engineering technique, the C-terminal lysine residue may be deleted. For this reason, the three nucleotides "aag" in the 3' terminus of the nucleic acid sequence of the heavy chain shown in Table 5 (SEQ ID NOS:254 to 277 in the Sequence Listing) may be deleted from each heavy-chain nucleic acid sequence.

| The following SEQ ID Nos. show the SEQ ID Nos. in the Sequence Listing | | |
|---|---|---|
| Combination | Light Chain | Heavy Chain |
| IGN1 | SEQ ID No.228 | SEQ ID No. 254 |
| IGN2 | SEQ ID No. 229 | SEQ ID No. 255 |
| IGN3 | SEQ ID No. 230 | SEQ ID No. 256 |
| IGN4 | SEQ ID No. 230 | SEQ ID No. 257 |
| IGN5 | SEQ ID No. 230 | SEQ ID No. 258 |
| IGN6 | SEQ ID No. 231 | SEQ ID No. 259 |
| IGN7 | SEQ ID No. 230 | SEQ ID No. 260 |
| IGN8 | SEQ ID No. 232 | SEQ ID No. 261 |
| IGN9 | SEQ ID No. 233 | SEQ ID No. 262 |
| IGN10 | SEQ ID No. 234 | SEQ ID No. 262 |
| IGN11 | SEQ ID No. 235 | SEQ ID No. 262 |
| IGN12 | SEQ ID No. 236 | SEQ ID No. 262 |
| IGN13 | SEQ ID No. 237 | SEQ ID No. 262 |
| IGN14 | SEQ ID No. 238 | SEQ ID No. 262 |
| IGN15 | SEQ ID No. 239 | SEQ ID No. 262 |
| IGN16 | SEQ ID No. 240 | SEQ ID No. 263 |
| IGN17 | SEQ ID No. 241 | SEQ ID No. 264 |
| IGN18 | SEQ ID No. 242 | SEQ ID No. 265 |
| IGN19 | SEQ ID No. 243 | SEQ ID No. 266 |
| IGN20 | SEQ ID No. 244 | SEQ ID No. 267 |
| IGN21 | SEQ ID No. 245 | SEQ ID No. 268 |
| IGN22 | SEQ ID No. 246 | SEQ ID No. 269 |
| IGN23 | SEQ ID No. 247 | SEQ ID No. 270 |
| IGN24 | SEQ ID No. 248 | SEQ ID No. 271 |
| IGN25 | SEQ ID No. 249 | SEQ ID No. 272 |
| IGN26 | SEQ ID No. 250 | SEQ ID No. 273 |
| IGN27 | SEQ ID No. 251 | SEQ ID No. 274 |
| IGN28 | SEQ ID No. 252 | SEQ ID No. 275 |
| IGN29 | SEQ ID No. 230 | SEQ ID No. 276 |
| IGN30 | SEQ ID No. 253 | SEQ ID No. 277 |

The production system for preparing antibodies may be any of in vitro production systems. Examples of the in vitro production system include eukaryotic cells, e.g., animal cells, plant cells, or fungal cells; and prokaryotic cells, e.g., bacterial cells such as *Escherichia coli* and *Bacillus subtilis*. Examples of the applicable animal cells include mammalian cells, e.g., generally used cells, such as CHO, COS, myeloma, BHK, HeLa, Vero, 293, NS0, Namalwa, and YB2/0 cells; and insect cells and plant cells can also be used. The 293 and CHO cells are preferred.

If the monoclonal antibody is produced in an in vitro production system as described above, the DNA encoding the heavy chain and the DNA encoding the light chain may be incorporated into separate expression vectors to co-transform the host, or may be incorporated together into a single expression vector to transform the host (see WO 94/11523). Examples of the preferred vector applicable to animal cells include, but are not limited to, pConPlus, pcDM8, pcDNA I/Amp, pcDNA3.1, and pREP4.

The antibody thus produced can be purified to homogeneity. The antibodies can be separated and purified by any ordinary method used for separation and purification of proteins. For example, the antibodies can be separated and purified by appropriately selecting or combining methods and instruments including, but not limited to, chromatographic columns for affinity chromatography, filtration, ultrafiltration, salt precipitation, dialysis, SDS-polyacrylamide gel electrophoresis, and isoelectric focusing (Antibodies: A Laboratory Manual. Ed Harlow and David Lane, Cold Spring Harbor Laboratory, 1988). Columns used in affinity chromatography include protein A columns and protein G columns. Examples of the protein A column include the Hyper D, POROS, and Sepharose F. F. columns (Amersham Biosciences).

The human anti-IL-33 neutralizing monoclonal antibody of the present invention can be bound to any antibody that have binding specificity for other antigen than IL-33 to produce a multispecific antibody, such as bispecific antibody. Several chemical methods of producing the bispecific antibody have been already known well (Nisonoff, A. et al., Archives of biochemistry and biophysics., 1961, Vol. 90, p. 460-462, Brennan, M. et al., Science, 1985, Vol. 299, pp. 81-83). In such methods, two different antibodies are each hydrolyzed with an enzyme, and then disulfide bonds in the heavy chains of the antibody are cleaved with a reducing agent, followed by mixing of the two heterologous antibodies and re-oxidization of the mixture. A bivalent antibody is thereby produced. Preparation of antibodies using a crosslinker, such as glutaraldehyde or carbodiimide, has also been recently disclosed (Japanese Patent Application Laid-Open Publication No. 2-1556). Several genetic engineering techniques for producing multispecific antibodies such as bispecific antibodies have already been established in the art. A desired bispecific antibody can be prepared by linking antigen-binding regions of two different monoclonal antibodies in tandem in accordance with a DVD-Ig method (Wu et al., Nature Biotechnology 25(11), 1290(2007)), or by modifying Fc region of an antibody to combine heavy chains of two different antibodies that are capable of binding to different antigens in accordance with the ART-Ig method (Kitazawa et al., Nature Medicine 18(10), 1570(2012)), for example.

A functionally modified form of the human anti-IL-33 neutralizing monoclonal antibody of the present invention or a conjugated antibody containing the antibody of the invention can be prepared by a method described below, for example. If the human anti-IL-33 neutralizing monoclonal antibody of the invention is produced in CHO host cells knocked out for the α1,6-fucosyltransferase (FUT8) gene, the antibody has a decreased fucose content on the sugar chains, resulting in an increased cytotoxic function, while an antibody produced in CHO host cells transfected with the FUT 8 gene has a low cytotoxic function (WO 2005/035586, WO 2002/31140, and WO 00/61739). The complement activation function of the antibody can be regulated by modification of its Fc region via a modification in amino acid residues (U.S. Pat. Nos. 6,737,056, 7,297,775, and 7,317,091). The half-life of the antibody in blood can be prolonged with an Fc region variant having increased binding ability to FcRn, one of Fc receptors (Shuhei Hashiguchi et al., SEIKAGAKU (The Journal of Biochemistry), 2010, Vol. 82(8), p. 710). Such functionally-modified antibodies can be produced by genetic engineering techniques.

The human anti-IL-33 neutralizing monoclonal antibody of the present invention can be bound to other functional molecules to produce a conjugated antibody. For example, if PEG is bound as a functional molecule to an antibody, non-limiting examples of the PEG include PEG with a molecular weight of 2000 to 100000 Da, more preferably 10000 to 50000 Da. The PEG may be either linear or branched. PEG can be bound to an N-terminal amino group of an amino acid in the antibody by using NHS active group. Examples of radioactive materials used as a functional molecule include $^{131}I$, $^{125}I$, $^{90}Y$, $^{64}Cu$, $^{99}Tc$, $^{77}Lu$, $^{211}At$ and the like. Radioactive materials can be directly bound to the antibody by any method such as chloramine T method. Examples of toxins used as a functional molecule include bacterial toxins (for example, diphtheria toxin), phytotoxins (for example, ricin), low-molecular-weight toxins (for example, geldanamycin), maytansinoid, and calicheamicin. Examples of the low-molecular-weight compound used as a functional molecule include daunomycin, doxorubicin, methotrexate, mitomycin, neocarzonostatin, vindesine, and fluorescent dyes such as FITC. Examples of enzymes used as a functional molecule include luciferase (for example, firefly luciferase and bacterial luciferase; U.S. Pat. No. 4,737,456), malate dehydrogenase, urease, peroxidase (for example, horseradish peroxidase (HRPO)), alkaline phosphatase, β-galactosidase, glucoamylase, lysozyme, saccharide oxidase (for example, glucose oxidase, galactose oxidase, and glucose-6-phosphate dehydrogenase), heterocyclic oxidase (for example, uricase and xanthine oxidase), lactoperoxidase, and microperoxidase. Examples of the linker used in chemical binding of toxin, low-molecular weight compound or enzyme include divalent radicals (for example, alkylene, arylene, and heteroarylene), linkers represented by —$(CR_2)_nO(CR_2)_n$— (where R is any substituent group), repeating units of alkoxy (for example, polyethyleneoxy, PEG, and polymethyleneoxy), alkylamino (for example, polyethyleneamino and Jeffamine™), and diacid esters and amides (including succinates, succinamides, diglycollates, malonates, and capramides). Several methods for chemical modification to bind the functional molecule have been already established in the art (D. J. King., Applications and Engineering of Monoclonal antibodies., 1998 T. J. International Ltd, Monoclonal Antibody-Based Therapy of Cancer., 1998 Marcel Dekker Inc; Chari et al., Cancer Res., 1992 Vol. 152:127; Liu et al., Proc Natl Acad Sci USA., 1996 Vol. 93:8681).

The anti-IL-33 neutralizing monoclonal antibody which competes in binding to IL-33 with a human anti-IL-33 neutralizing monoclonal antibody comprising a combination of specific complementarity-determining regions amino acid sequences (C1, C8, C15, C17, or C18 in Table 1) or a combination of specific variable regions amino acid sequences (V1, V8, V15, V17, or V18 in Table 2) may be an antibody from any animal, for example, mouse antibody, human antibody, rat antibody, rabbit antibody, goat antibody, or camel antibody, and may also be a chimeric antibody or humanized antibody produced by combining such antibodies. Such anti-IL-33 neutralizing monoclonal antibodies can be produced by any known method including, for example, hybridoma technique, phage display technique, and genetic engineering techniques. In particular, the antibody is preferably produced by a genetic engineering method.

A chimeric antibody can be produced by ligating a DNA which encodes variable regions of a non-human antibody to a DNA which encodes constant regions of a human antibody, incorporating the resulting DNA into an expression vector, which is then transformed into a host cell for expression of the antibody of interest (see EP 125023 and WO 92/19759).

A humanized antibody can be produced by ligating a DNA which encodes complementarity-determining regions (CDR) of a non-human antibody to a DNA which encodes the remaining regions of a human antibody, and incorporating the resulting DNA into an expression vector, which is then transformed into a host cell A human antibody can be prepared through the process described in the Examples below. The human antibody can also be prepared by any technique such as trioma technique, human B CELLS hybridoma technique (Kozbor et al., 1983 Immunol Today 4: p. 72) and EBV hybridoma technique for producing a human monoclonal antibody (Cole et al., 1985, MONOCLONAL ANTIBODIES AND CANCER THERAPY, Alan R. Liss, Inc., p. 77). The human antibody may also be produced by immunizing a transgenic mouse introduced a human antibody gene with an antigen protein to produce a hybridoma. Examples of the transgenic mouse include HuMab (registered trademark) mouse (Medarex), KM™ mouse (Kirin Pharma), KM (FCγRIIb-KO) mouse, and VelocImmune mouse (Regeneron Pharmaceuticals, Inc.).

In another embodiment, the present invention relates to an artificial antibody which competes in binding to IL-33 with the anti-IL-33 neutralizing monoclonal antibody comprising amino acid sequences in accordance with a combination of a specific complementarity-determining regions amino acid sequences (C1, C8, C15, C17, or C18 in Table 1) or a specific variable regions amino acid sequences (V1, V8, V15, V17, or V18 in Table 2). As the artificial antibody, for example, the tenth unit in the human fibronectin type III domain (FNfn10) can be used. An artificial antibody capable of binding to a desired target can be produced by introducing mutation in the BC, DE, and/or FG loops of the unit. Besides the extracellular domain of fibronectin, Kunitz domain of serine protease inhibitor and peptides such as ankyrin and lipocalin can be used as the artificial antibody. These artificial antibodies can be produced by a genetic engineering technique involving introduction of a vector containing a nucleic acid molecule which encodes the peptide into *Escherichia coli*, yeast, or animal cells, culture of the host cells, and then recovery and purification of the culture supernatant.

The artificial antibody can be selected by searching a random sequence library including random combinations of amino acids for a low-molecular-weight peptide molecules which are capable of binding specifically to the epitope of the present invention, such as an antibody, instead of use of the amino acid sequence of a specific protein or a part thereof as described above (for example, Hipolito et al., Current Opinion in Chemical Biology, 2012 Vol. 16: 196; Yamagishi et al., Chemistry & Biology, 2011 Vol. 18: 1562). Such a peptide can also be produced by any chemical synthetic method such as a fluorenylmethyloxycarbonyl technique or t-butyloxycarbonyl technique, instead of a genetic engineering technique.

[Combination of Sequences of Antibody]

The combinations C1 to C30 shown in Table 1, i.e. combinations of amino acid sequences for complementarity-determining regions; the combinations V1 to V30 shown in Table 2, i.e. combinations of amino acid sequences for variable regions; the combinations CN1 to CN30 shown in Table 5, i.e. the combinations of nucleic acid sequences for complementarity-determining regions; and the combinations IGN1 to IGN30 shown in Table 5, i.e. combinations of nucleic acid sequences, of the human anti-IL-33 neutralizing monoclonal antibody described in the specification respectively correspond to identical clone sequences. The correspondence between the sequences is shown in Table 6. For example, the complementarity-determining regions of the clone A10-1C04 respectively correspond to the six amino acid sequences of complementarity-determining regions represented by the combination C1, and the combination of amino acid sequences of the complementarity-determining regions may be respectively encoded by the six nucleic acid sequences of the combination CN1. The clone comprises heavy-chain and light-chain variable regions respectively corresponding to the two amino acid sequences of the combination V1. The amino acid sequences of λ light chain and γ heavy chain, including the variable regions, of the combination V1 are respectively encoded by the two nucleic acid sequences of the combination IGN1.

TABLE 6

| Clone name | CDR (Amino Acids Sequence) | Variable Region (Amino Acids Sequence) | CDR (Nucleic Acids Sequence) | Heavy Chain/Light Chain (Nucleic Acid Sequence) |
|---|---|---|---|---|
| A10-1C04 | C1 | V1 | CN1 | IGN1 |
| A12-1E04 | C2 | V2 | CN2 | IGN2 |
| A12-1H04 | C3 | V3 | CN3 | IGN3 |
| A12-1H08 | C4 | V4 | CN4 | IGN4 |
| A13-1F05 | C5 | V5 | CN5 | IGN5 |
| A13-1F07 | C6 | V6 | CN6 | IGN6 |
| A13-1G05 | C7 | V7 | CN7 | IGN7 |
| A23-1A05 | C8 | V8 | CN8 | IGN8 |
| A25-2D01 | C9 | V9 | CN9 | IGN9 |
| A25-2B02 | C10 | V10 | CN10 | IGN10 |
| A25-2E04 | C11 | V11 | CN11 | IGN11 |
| A25-2C06 | C12 | V12 | CN12 | IGN12 |
| A25-2C07 | C13 | V13 | CN13 | IGN13 |
| A25-2H11 | C14 | V14 | CN14 | IGN14 |
| A25-2C02 | C15 | V15 | CN15 | IGN15 |
| A25-3G05 | C16 | V16 | CN16 | IGN16 |
| A25-3H04 | C17 | V17 | CN17 | IGN17 |
| A26-1F02 | C18 | V18 | CN18 | IGN18 |
| A26-2A05 | C19 | V19 | CN19 | IGN19 |
| A26-2B01 | C20 | V20 | CN20 | IGN20 |
| A27-1A06 | C21 | V21 | CN21 | IGN21 |
| A27-1C06 | C22 | V22 | CN22 | IGN22 |
| A28-1C08 | C23 | V23 | CN23 | IGN23 |
| A28-1G07 | C24 | V24 | CN24 | IGN24 |
| A28-2C06 | C25 | V25 | CN25 | IGN25 |
| A28-2F01 | C26 | V26 | CN26 | IGN26 |
| A28-2G07 | C27 | V27 | CN27 | IGN27 |
| A28-2H06 | C28 | V28 | CN28 | IGN28 |
| A00-0070 | C29 | V29 | CN29 | IGN29 |
| A00-0036 | C30 | V30 | CN30 | IGN30 |

EXAMPLES

The present invention will now be described in more details by way of Examples, which should not be construed to limit the invention, unless otherwise indicated.

Example 1: Preparation of Anti-IL-33 Antibodies and Identification of Epitope Peptides

[Preparation of Antibodies]

A human IL-33 protein was immunized to an animal to produce a hybridoma from the splenic cells of the immunized animal, and the monoclonal antibody was thereby prepared. The RNA was extracted from the splenic cells of the immunized animal to produce a library of antibodies of the animal. Antibodies capable of binding to the human IL-33 protein were cloned from such a library and the human naive antibody library by phage display technique. Eight anti-IL-33 monoclonal antibodies (Antibodies A to H) were thereby prepared.

[Peptide Array Scanning]

In order to identify the epitope for the resulting IL-33 antibodies, peptide array scanning was carried out to confirm the binding of each antibody to each of the partial peptides (20 residues in length) of human IL-33. Peptides consisting of 20 amino acids were synthesized, each shifted by 10 amino acids within the sequence spanning valine at N-terminal position 101 (V101) and threonine at N-terminal position 270 (T270) to cover the major part of mature human IL-33 molecules. Sixteen peptides (PEP11 to PEP26) in total were thereby synthesized. The sequence and position of each of these peptides are shown in FIG. 12.

Figure 2:
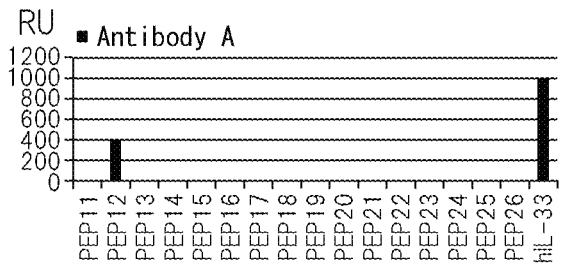
FIG. 2 shows a binding activity of each of antibodies to a human IL-33 protein (residues 112 to 270) and each partial peptide fragments thereof (PEP11 to PEP26).
Figure 2:
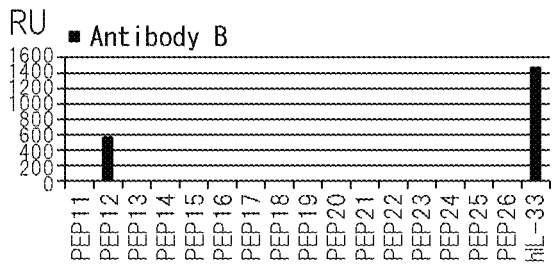
Figure 2:
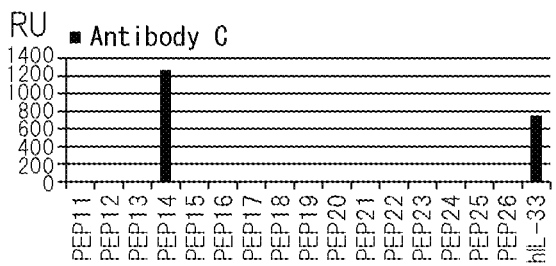
Figure 2:
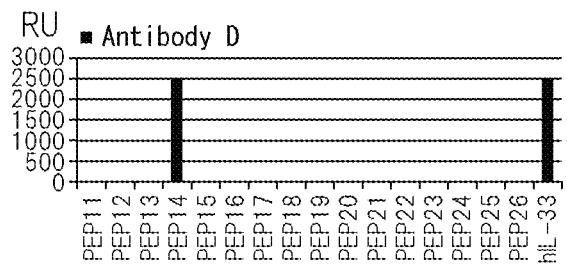
Figure 2:
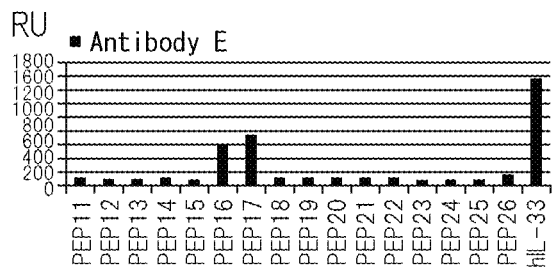
Figure 2:
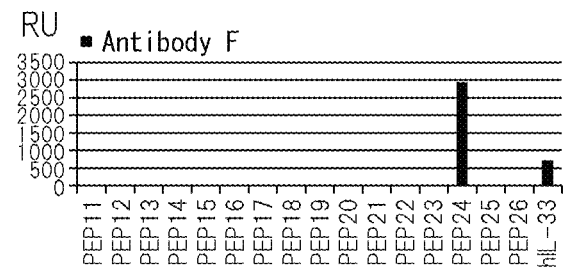
Figure 2:
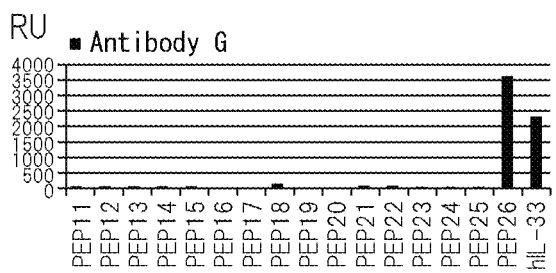
Figure 2:
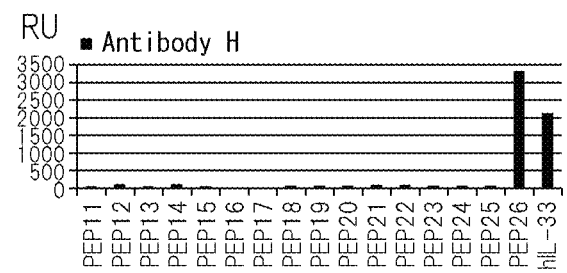

Each peptide was N-terminally biotinylated, and was immobilized as ligand onto a NeutrAvidin sensor chip of a surface plasmon resonance (SPR) system (ProteOn XPR36, available from Bio-Rad Laboratories, Inc.). As positive control, the mature human IL-33 (residues 112 to 270) was N-terminally linked with the Avitag sequence, and was biotinylated by biotin ligase reaction specific for the AviTag sequence. The resulting protein (hIL-33) as a ligand was immobilized onto the SPR sensor chip. Each test antibody, the human IL-33 receptor protein (recombinant human ST2 Fc chimera) (ALX-201-367-C050, available from Enzo Life Science, Inc.), or buffer (0.05% Tween20/PBS) alone was then loaded as an analyte onto the sensor chip containing the ligand immobilized thereon (antibody concentration: 10 µg/ml; flow rate: 100 µl/min), to allow them to bind to the ligand. After washing, the amount of analyte (amount of antibody) bound to the ligand on the sensor chip was measured as RU value. The results are shown in FIG. 2.

The antibodies were designated, in sequence, in accordance with the position of epitope in the human IL-33 protein: the antibody to the epitope located at the most N-terminal portion was designated "Antibody A". The Antibodies A and B bound to PEP12, the Antibodies C and D bound to PEP14, the Antibody E bound to both PEP16 and PEP17, the Antibody F bound to PEP24, and the Antibodies G and H bound to PEP26. A commercially available anti-human IL-33 polyclonal antibody (AF3625, available from R&D Systems, Inc.) bound to most of the 16 human IL-33 peptides studied. The human IL-33 receptor (ST2) bound to the human IL-33 protein, but substantially did not bind to the human IL-33 peptides (PEP11 to PEP26). The experiment failed to identify what portion of the IL-33 was significant for the binding with ST2. No binding with the ligand was observed in the buffer alone or murine IgG (MAB002, available from R&D Systems, Inc.). The tested antibodies were compared for the binding ability to hIL-33 (residues 112 to 270). The descending order of the binding ability of the antibody to hIL-33 (residues 112 to 270) was Antibody G, Antibody H, Antibody D, Antibody E, Antibody B, Antibody A, Antibody C, and Antibody F.

Example 2: Evaluation of IL-33 Neutralizing Activity of Anti-IL-33 Monoclonal Antibodies—1

The Antibodies A, B, E, and F were measured for the IL-33 neutralizing activity, based on the inhibitory effect on the binding between immobilized human ST2 and humanIL-33 as indicator. Recombinant human ST2 Fc chimera (ALX-201-367-C050, available from Enzo Life Science, Inc.) diluted with phosphate buffered saline (PBS) was dispensed into a 96-well microplate (Nunc™, #442404) (1 µg/mL, 50 L/well), and was left to stand overnight at a temperature of 4° C. The following day, the microplate was washed once with 1% BSA-containing PBS (PBS-B), and PBS-B was added to the microplate (250 µL/well) for blocking at a room temperature for two hours. After the blocking, a mixed solution of each test antibody diluted with PBS-B (final concentration: 10 µg/mL) and a recombinant human IL-33 protein (ILC0701, available from ATGen Co. Ltd) (final concentration: 1 µg/mL) was added to the microplate (50 µL/well), and the solution was incubated at a room temperature for two hours. After the microplate was washed with 0.1% Tween 20-containing PBS (PBS-T) for five times, goat anti-human IL-33 antibody (AF3625, available from R&D Systems, Inc.; final concentration: 1 µg/mL; 50 µL/well) diluted with PBS-B was subsequently added to the microplate, and the solution was then incubated at a room temperature for one hour. After the microplate was washed with PBS-T for five times, the HRP-labeled rabbit anti-goat IgG antibody (Invitrogen:61-1620, 50 µL/well) diluted to 2000-fold with PBS-B was added, and the solution was incubated at a room temperature for one hour. After the microplate was washed with PBS-T for five times, SureBlue™ TMB Microwell Peroxidase Substrate (KPL:52-00-01, 50 µL/well) was added. The solution was allowed to react at a room temperature for 20 minutes, and then the reaction was stopped with TMB Stop Solution (KPL: 50-85-05, 50 µL/well). The difference between the absorbance at wavelength of 450 nm and that at wavelength of 620 nm was measured with a microplate reader (SpectraMax 190, available from Molecular Devices, LLC.). A sample was prepared by replacing the human IL-33 with human IL-1β (Pepro-Tech, 200-01B) (final concentration: 1 µg/mL), and the results observed in this sample was set as background. The inhibitory effect of each antibody on the binding of ST2 and IL-33 (competitive inhibition percentage in IL-33/ST2 binding system) was determined by calculating the percentage of inhibition (%) of binding by each antibody relative to the binding observed in a sample containing the human IL-33 alone (final concentration: 1 µg/mL). According to the results, the Antibody A (epitope: PEP12) exhibited 66% inhibition, the Antibody B (epitope: PEP12) exhibited 55% inhibition, the Antibody E (epitopes: PEP16 and PEP17) exhibited 0% inhibition, and the Antibody F (epitope: PEP24) exhibited 39% inhibition. All of the four antibodies tested, except for the Antibody E, (i.e. Antibodies A, B and F) exhibited inhibition percentage of 30% or higher at final concentration of 10 µg/mL.

TABLE 8

| | Epitope | Competitive Inhibition Percentage in IL-33/ST2 binding system [%] |
|---|---|---|
| Antibody A | PEP12 | 66 |
| Antibody B | PEP12 | 55 |
| Antibody E | PEP16-17 | <0 |
| Antibody F | PEP24 | 39 |

Example 3: Evaluation of the IL-33 Neutralizing Effect of Anti-IL-33 Monoclonal Antibody—2

Each of the test antibodies (Antibodies A to H) was measured for the IL-33 neutralizing activity based on the inhibitory effect on human IL-33-induced IL-6 production in normal human umbilical vein endothelial cells (HUVEC) (CLC2517A, available from LONZA Group Ltd.) as indicator. The HUVEC cells were inoculated in a 96-well microplate (IWAKI, MT4940-010) ($6 \times 10^3$/0.1 mL/well), and cell confluence was confirmed. Each anti-IL-33 antibody (final concentration: 10 μg/mL) and recombinant human IL-33 (ILC0701, available from ATGen Co. Ltd; final concentration: 100 ng/mL) were added (0.2 mL/well) to a medium (EGM-2 medium (CLCC-3156 and CLCC-4176, available from LONZA Group Ltd.)), and the solution was incubated at a temperature of 37° C. for 24 hours. After 24 hours, the IL-6 concentration in the medium was measured with a commercially available ELISA kit (EH2IL6, available from Thermo Scientific). After collection of the medium, cell viability was measured with a cell counting kit (345-06463, available from Dojindo Molecular Technologies, Inc.), so as to confirm that the inhibitory effect on IL-6 production was not caused by a decrease in the viable cell count. In order to determine the IL-33 neutralizing activity of each test antibody (inhibition % of IL-6 production in HUVEC system), the percentage of inhibition (%) of IL-6 production relative to the IL-6 production caused by the treatment with recombinant human IL-33 alone was calculated. According to the results, the Antibody A (epitope: PEP12) exhibited 51% inhibition, the Antibody B (epitope: PEP12) exhibited 48% inhibition, the Antibody C (epitope: PEP14) exhibited 33% inhibition, the Antibody D (epitope: PEP14) exhibited 38% inhibition, the Antibody E (epitope: PEP16 to PEP17) exhibited 0% inhibition, the Antibody F (epitope: PEP24) exhibited 38% inhibition, the Antibody G (epitope: PEP26) exhibited 48% inhibition, and the Antibody H (epitope: PEP26) exhibited 56% inhibition. All of the eight antibodies tested, except for the Antibody E, exhibited inhibition percentage of 30% or higher (Table 9). Among these antibodies, those that were capable of binding to an epitope consisting of a sequence selected from the group consisting of positions 111 to 130, 131 to 150, 231 to 250, and 251 to 270 of SEQ ID NO:1 in the Sequence Listing exhibited significant increases in the neutralizing activity, at the antibody concentration of 3, 10, and 30 μg/mL (for example, the Antibody D exhibited inhibition of 23%, 42%, and 61%, respectively); the results demonstrate that such epitopes are suitable for producing an antibody having an antagonistic action.

TABLE 9

|  | Epitope | Inhibition Percentage of IL-6 production in HUVEC system [%] |
|---|---|---|
| Antibody A | PEP12 | 51 |
| Antibody B | PEP12 | 48 |
| Antibody C | PEP14 | 33 |
| Antibody D | PEP 14 | 38 |
| Antibody E | PEP16-17 | <0 |
| Antibody F | PEP24 | 38 |
| Antibody G | PEP26 | 48 |
| Antibody H | PEP26 | 56 |

The Antibody E bound to hIL-33 (FIG. 2), but did not exhibit functional neutralizing ability (Tables 8 and 9). PTL 2 (WO 2008/132709) discloses three epitopes: epitope 1 (positions 155 to 198), epitope 2 (positions 165 to 188), and epitope 3 (positions 175 to 178). The present experiments revealed that these epitopes had a sequence overlapping with the epitope peptides for the Antibody E (positions 151 to 180) which was confirmed not to have IL-33 neutralizing activity. These results suggest that antibodies to the epitopes disclosed in PTL 2 cannot sufficiently inhibit the binding of IL-33 with ST2, its receptor, and has no or very low IL-33 neutralizing activity.

Theoretically, possible causes for the absence of IL-33 neutralizing activity in the Antibody E would be inferiority of the epitope and insufficiency of affinity. The Antibodies D, G, and H tended to have lower avidity with hIL-33, as compared to the Antibody E, but clearly exhibited IL-33 neutralizing activity. In view of the existence of such clones, it is believed that the absence of the neutralizing activity is probably not caused by insufficiency of affinity. Based on such findings, the four epitopes currently found by the inventors (PEP12, PEP14, PEP24, and PEP26) are believed to be functional epitopes when the purpose is neutralization of IL-33 cytokine, in that the avidity between IL-33 and antibodies for the epitopes is relevant to the IL-33 neutralizing activity of the antibodies, unlike the epitopes disclosed in PTL 2. An antibody that is capable of binding to a functional epitope has high antagonistic effect on IL-33, while an antibody that is capable of binding to a non-functional epitope has a low or no antagonistic effect on IL-33.

Example 4: Mapping of Epitope Peptides to the Conformation of Human IL-33

Figure 3:
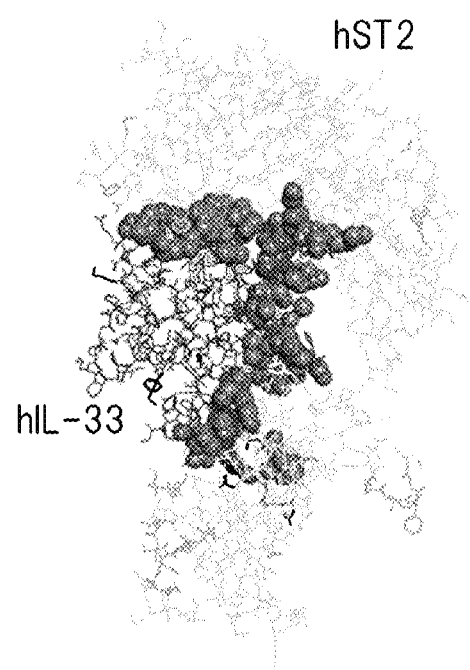
FIG. 3 shows conformational model of a complex of mature human IL-33 (residues 117 to 270) (shown as "S117-T270" in FIG. 3) and human ST2 (hST2).
Figure 4:
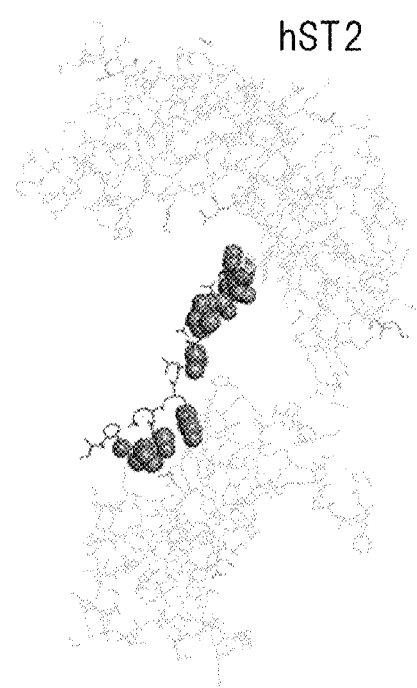
FIG. 4 shows a part of the conformational model in FIG. 3 illustrating human ST2 and a partial conformation of PEP12 epitope of human IL-33 (corresponding to positions 117 to 130 of SEQ ID NO:226 in the Sequence Listing and is represented by "5117-N130" in FIG. 4; hereinafter, other epitopes are represented in the same way).
Figure 5:
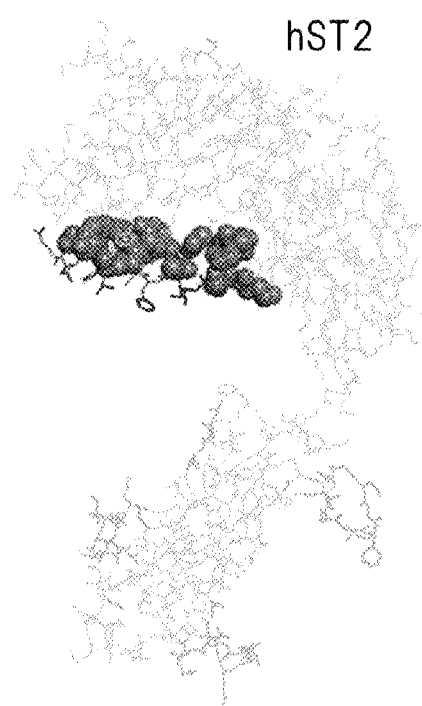
FIG. 5 shows a part of the conformational model in FIG. 3 illustrating only PEP 14 epitope of human IL-33 and human ST2.
Figure 6:
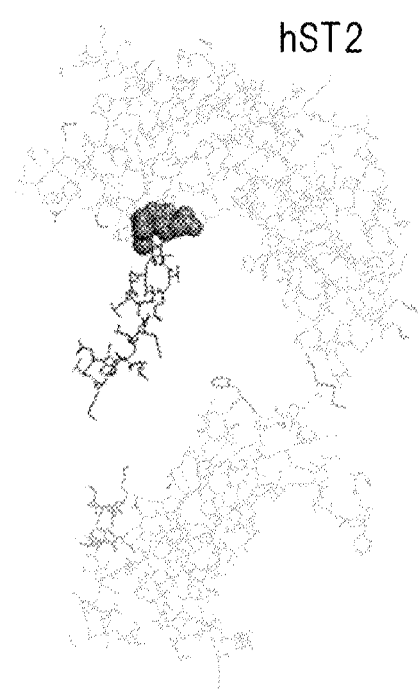
FIG. 6 shows a part of the conformational model in FIG. 3 illustrating only PEP24 epitope of human IL-33, d and human ST2.
Figure 7:
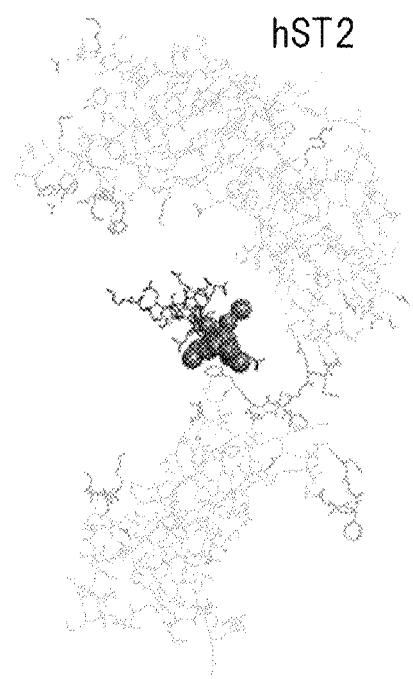
FIG. 7 shows a part of the conformational model in FIG. 3 illustrating only PEP26 epitope of human IL-33, and human ST2.

In order to identify the interfacial atoms (the atom of IL-33 located at the atomic distance of 5 Å or less from a component atom of ST2, when the two atoms are in the closest proximity) which would be a preferred epitope for production of an antibody with antagonistic effect, the four epitope peptides were mapped on the conformation of the human IL-33/human ST2 complex. The X-ray crystallographic structure of the human IL-33/human ST2 complex (Research Collaboratory for Structural Bioinformatics: PDB ID 4KC3) lacked a partial structure of the IL-33 protein, and thus it was impossible to show the positions of all the epitope peptides identified in the invention. The inventors thus created homology model based on the X-ray crystallographic structure (4KC3) as template (FIG. 3; Discovery Studio 3.5 (available from Accelrys) was used), and the epitope peptides (PEP12, PEP14, PEP24, and PEP26) corresponding to the antibodies which exhibited neutralizing activity in the present experiments were mapped on the model (FIG. 4 to FIG. 7). In FIG. 4 to FIG. 7, human IL-33 and epitope peptides are shown in dark grey, and ST2 bound to the IL-33 or epitope peptides are shown in light grey. The interfacial atoms are highlighted by indicating them with larger spheres in order to clearly show the position of interface between the IL-33 protein and IL-33 receptors on the IL-33 protein surface. The results demonstrated that these epitope peptides (PEP12, PEP14, PEP24, and PEP26) each have amino acids containing interfacial atoms. Examples of amino acids containing the interfacial atoms include P118, I119, T120, Y122, L123, R124, S125, L126, S127, Y129, and N130 of PEP12; D131, Q132, S133, T135, A137, L138, E139, S142, Y143, E144, I145, Y146, E148, D149, and L150 of PEP14; D244, N245, and H246 of PEP24; and K266, L267, S268, and E269 of PEP26. A preferred epitope to which an antibody with antagonistic effect is to bind specifically is believed to have amino acids containing the interfacial atoms.

Example 5: Preparation of Human Anti-IL-33 Antibodies (Parental Clones)

Using a human scFv phage display library (n-CoDeR, available from BioInvent International AB) (Soderlind et al., Nature biotechnology, 2000 Vol. 18(8), p. 852), two different parental clones (scFv) (it indicates that the molecular form is scFv; hereinafter, represented in the same way) were prepared (clones designated A00-0070 and A00-0036), which were capable of binding to mature IL-33 (residues 112 to 270) to inhibit the binding of IL-33 to ST2 and inhibit IL-33 activity, when they were analyzed based on the IL-33-dependent IL-6 production in normal human umbilical vein endothelial cells (HUVEC) as described below. The antibodies were sequenced to obtain their base sequences and amino acid sequences of light-chain and heavy-chain variable regions. A00-0070 and A00-0036 respectively had amino acid sequences of light-chain and heavy-chain variable regions in accordance with the combinations V29 and V30, respectively, shown in Table 2.

Example 6: Determination of Amino Acid Substitution for Improving Complementarity-Determining Regions The complementarity-determining regions of two parental clones were modified by Fab ribosome display and Fab phage display techniques, for increased affinity with IL-33 and improved physical properties (i.e. reduced surface hydrophobicity and consequent decreased aggregation and increased solubility) of the clones. The complementarity-determining regions were modified in the following two steps: the first step of determination of single-amino acid substitutions for improving the affinity with IL-33 and the physical properties; and the second step of determination of combinations of such single-amino acid substitutions (Fujino et al., Biochem. Biophys. Res. Commun., 2012 Vol. 428(3), p. 395).

A Fab ribosome display vector was constructed based on the light-chain and heavy-chain variable regions of the two parental clones, and was then subjected to multistep PCR reactions involving site-directed mutagenesis PCR and overlap extension PCR, to construct a comprehensive library of single-amino acid substitution variants covering all single-amino acid substitutions within the six complementarity-determining regions (LCDR1, LCDR2, LCDR3, HCDR1, HCDR2, and HCDR3) of the antibody. Amino acid residues respectively were replaced with 20 natural amino acids in total. The Fab ribosome display process (Fujino et al., Biochem. Biophys. Res. Commun., 2012 Vol. 428(3), p. 395) was performed in a reconstituted cell-free translation system, PURE system (PUREfrex, available from Gene-Frontier Corporation) (Shimizu et al., Nature Biotechnology, 2001, Vol. 19(8), p. 751) over the comprehensive library of single-amino acid substitution variants. Library selection was repeated several rounds using a recombinant human IL-33 protein (ILC0701, available from ATGen Co. Ltd) as bait, to enrich the library. Each of the clones (Fab) ("clone (Fab)" indicates that the clone has a molecular form of Fab; hereinafter, the same representation is used) contained in the library before the enrichment (i.e. just after construction) and after the enrichment was sequenced with a next-generation sequencer (Roche, 454) to determine the base sequences of the light-chain and heavy-chain variable regions. Sequence data with several thousands of reads of the library before and after the enrichment was obtained to calculate the frequency of each of all variants having single-amino acid substitution in the complementarity-determining regions. The ratio of change between the frequencies in the library before and after the enrichment (i.e. enrichment ratio) was calculated for each of all single-amino acid substitution variants. The magnitude of the enrichment ratio in the library enrichment was used as an indicator to determine some single-amino acid substitutions assumed to be useful for improving affinity with the human IL-33 protein. Based on the total number of the single-amino acid substitutions and the distribution on the amino acid sequence, positions where the amino acid substitutions were to be introduced were determined for construction of the custom library in the second step.

In the parental clone A00-0070, introduction of amino acid substitutions in the following positions was determined: asparagine at position 12 of LCDR1 (SEQ ID NO:2 in the Sequence Listing); glutamine at position 4 of LCDR2 (SEQ ID NO:11 in the Sequence Listing); serine at position 2, tyrosine at position 3, and serine at position 6 of LCDR3 (SEQ ID NO:23 in the Sequence Listing); aspartic acid at position 1 and asparagine at position 5 of HCDR1(SEQ ID NO:43 in the Sequence Listing), serine at position 4, serine at position 5, serine at position 7, and isoleucine at position 9 of HCDR2 (SEQ ID NO:64 in the Sequence Listing). In the parental clone A00-0036, introduction of amino acid substitutions in the following positions was determined: asparagine at position 9 and asparagine at position 13 of LCDR1 (SEQ ID NO:6 in the Sequence Listing); arginine at position 6 and leucine at position 7 of LCDR2 (SEQ ID NO:20 in the Sequence Listing); alanine at position 1, alanine at position 9, and valine at position 10 of LCDR3 (SEQ ID NO:40 in the Sequence Listing); asparagine at position 1 of HCDR1 (SEQ ID NO:47 in the Sequence Listing); serine at position 4, serine at position 5, serine at position 6, serine at position 7, tyrosine at position 8, isoleucine at position 9, tyrosine at position 10, tyrosine at position 11, aspartic acid at position 13, and lysine at position 16 of HCDR2 (SEQ ID NO:64 in the Sequence Listing); and glycine at position 2, histidine at position 5, and aspartic acid at position 6 of HCDR3 (SEQ ID NO:78 in the Sequence Listing).

For improving physical properties of the clones, homology models of the two parental clones were generated with a protein structure analysis program (Discovery Studio, available from Accelrys) to predict regions with high surface hydrophobicity within the complementarity-determining regions, and then to determine positions to be substituted for reducing the surface hydrophobicity of the predicted regions. In the parental clone A00-0070, introduction of amino acid substitutions in the following positions was determined: tyrosine at position 3 of LCDR3 (SEQ ID NO:23 in the Sequence Listing); and serine at position 7 and isoleucine at position 9 of HCDR2 (SEQ ID NO:64 in the Sequence Listing). In the parental clone A00-0036, introduction of amino acid substitutions in the following positions was determined: arginine at position 6 and leucine at position 7 of LCDR2 (SEQ ID NO:20 in the Sequence Listing); and serine at position 7, tyrosine at position 8, and isoleucine at position 9 of HCDR2 (SEQ ID NO:64 in the Sequence Listing). Based on the data on enrichment ratio obtained in the analysis of mutation using the comprehensive library of single-amino acid substitution variants, the amino acid substitutions assumed to be useful for reducing the surface hydrophobicity without affecting the binding ability to the human IL-33 protein was determined among these sites.

Example 7: Production of a Human Anti-IL-33 Antibody with Modified Complementarity-Determining Regions Two or more of the useful amino acid substitutions for improvements in affinity and physical properties as described above were combined to design a full-scale custom library for modifying the complementarity-determining regions. Vectors for Fab ribosome display and Fab phage display processes were constructed. The Fab ribosome display vector was then subjected to multistep PCR reactions involving site-directed mutagenesis PCR and overlap extension PCR, and the Fab phage display vector was used as a template to perform site-specific mutagenesis by Kunkel mutagenesis method (Fellouse et al., J. Mol. Biol. 2007 Vol. 373, p. 924), to construct a custom library for improvement of complementarity-determining regions, in which the positions in the complementarity-determining regions were randomized based on the design described above. The Fab ribosome display and Fab phage display processes were performed. Library selection was repeated for several rounds using Human IL-33 protein and cynomolgus monkey IL-33 protein (GenBank: EHH57404; spanning from Ser residue 112 to Glu residue 269 in SEQ ID NO:227 in the Sequence Listing) as bait, to enrich the library. In the latter half of the rounds, negative selection was performed with hydrophobic column carriers such as octyl sepharose (GE Healthcare) or phenyl sepharose (GE Healthcare) before allowing the binding with the IL-33 proteins, so as to enrich the Fab having high affinity with the IL-33 protein and low surface hydrophobicity. The recombinant proteins used as bait were prepared by the following process. A gene sequence encoding the mature humanIL-33 (residues 112 to 270) and mature cynomolgus monkey IL-33 (residues 112 to 269 of SEQ ID NO:227 in the Sequence Listing) was N-terminally linked with 6His tag-AviTag, and the resulting sequence was inserted into pET30a(−) to construct an expression vector to prepare the recombinant protein. *Escherichia coli* BL21(DE3) strain including the expression vector was pre-cultured in 5 mL of LB medium, and then 1 mL of the pre-culture solution was inoculated into 50 mL of expression medium (Overnight Express, available from Merck Millipore Corporation; supplemented with kanamycin). The bacterial cells were cultured for protein expression for 18 hours at 200 rpm and at a temperature of 30° C. The bacterial cells were collected and washed, and then were bacteriolyzed with BagBuster (Novagen), and the supernatant was recovered. The 6His-AviTag-linked cynomolgus monkey IL 33 (residues 112 to 269) contained in the supernatant was purified with Ni-NTA Agarose (available from QIAGEN), and was biotinylated. The biotin modification specific for the AviTag portion was introduced with a commercially available biotin ligase (BirA, available from Avidity LLC).

The library after the enrichment was used to construct a library of *Escherichia coli* secreting and expressing Fab. The culture supernatants of several hundreds of clones of *Escherichia coli* were subjected to measurement of dissociation rate constant (koff) by surface plasmon resonance (SPR) (ProteOn XPR36, available from Bio-Rad Laboratories, Inc.). The biotinylated human IL-33 protein (4 μg/mL) and cynomolgus monkey IL-33 protein (4 μg/mL) were loaded as ligands on a sensor chip (NLC sensor chip, available from Bio-Rad Laboratories, Inc.), to immobilize the human IL-33 protein at an amount equivalent to 1300 to 1600 RU, and the cynomolgus monkeyIL-33 protein at an amount equivalent to 1100 to 1500 RU. The culture supernatant of *Escherichia coli* was then loaded thereon as analyte to obtain a sensorgram with association phase of one minute and dissociation phase of 10 to 30 minutes. The sensorgram was subjected to interspot correction and blank correction using an SPR data analysis program (ProteOn Manager v3.1.0, available from Bio-Rad Laboratories, Inc.), and then values of koff were determined by off-rate analysis of Langmuir model.

Among the clones (Fab) with modified complementarity-determining regions, 28 clones (corresponding to V1 to V28 in Table 2) that had an increased affinity with human IL-33 protein and had binding ability to cynomolgus monkey IL-33 protein were selected to be analyzed in higher-level tests in Example 8 and following Examples. As shown in Table 10, the selected clones (Fab) had higher affinity (i.e. low koff value) with the human and cynomolgus monkey IL-33 proteins, as compared to their parental clones (Fab). These clones had no amino acid substitution within the framework regions in the variable regions. Even two variants have an identical single-amino acid substitution in the complementarity-determining regions, the effect of improving affinity is different between a single-amino acid substitution variant and a variant with two or more amino acid substitutions. For such a reason, some amino acid substitutions were frequent in the sequences of the 28 clones for higher-level evaluation, although the enrichment ratio of single-amino acid substitution variants containing such substitutions was low in the first step in the comprehensive library of single-amino acid substitution variants, and vice versa.

TABLE 10

| Clone Name | Combination of Variable Region | Human IL-33 koff (/sec) | Human IL-33 Binding Amount (RU) | Cynomolgus Monkey IL-33 koff (/sec) | Cynomolgus Monkey IL-33 Binding Amount (RU) |
| --- | --- | --- | --- | --- | --- |
| A10-1C04 | V1 | 1.00E−05 | 26 | 1.65E−04 | 20 |
| A12-1E04 | V2 | 2.19E−05 | 414 | 5.58E−05 | 512 |
| A12-1H04 | V3 | 1.94E−05 | 94 | 4.83E−05 | 131 |
| A12-1H08 | V4 | 1.00E−05 | 77 | 7.51E−05 | 102 |
| A13-1F05 | V5 | 1.32E−05 | 127 | 5.79E−05 | 171 |
| A13-1F07 | V6 | 1.00E−05 | 112 | 3.48E−05 | 151 |
| A13-1G05 | V7 | 1.00E−05 | 59 | 5.45E−05 | 80 |
| A23-1A05 | V8 | 1.58E−05 | 52 | 2.61E−05 | 54 |
| A25-2D01 | V9 | 1.00E−05 | 950 | 1.00E−05 | 832 |
| A25-2B02 | V10 | 1.00E−05 | 256 | 1.00E−05 | 237 |
| A25-2E04 | V11 | 1.27E−05 | 195 | 1.00E−05 | 199 |
| A25-2C06 | V12 | 1.36E−05 | 480 | 1.59E−05 | 501 |
| A25-2C07 | V13 | 3.41E−05 | 334 | 7.37E−05 | 330 |
| A25-2H11 | V14 | 1.22E−05 | 534 | 2.57E−05 | 492 |
| A25-2C02 | V15 | 1.00E−05 | 930 | 1.00E−05 | 839 |
| A25-3G05 | V16 | 1.34E−05 | 135 | 2.02E−05 | 143 |
| A25-3H04 | V17 | 1.00E−05 | .62 | 1.00E−05 | 179 |
| A26-1F02 | V18 | 1.00E−05 | 96 | 1.00E−05 | 100 |

TABLE 10-continued

| Clone Name | Combination of Variable Region | Human IL-33 koff (/sec) | Human IL-33 Binding Amount (RU) | Cynomolgus Monkey IL-33 koff (/sec) | Cynomolgus Monkey IL-33 Binding Amount (RU) |
|---|---|---|---|---|---|
| A26-2A05 | V19 | 1.00E−05 | 153 | 1.00E−05 | 147 |
| A26-2B01 | V20 | 1.00E−05 | 364 | 1.00E−05 | 363 |
| A27-1A06 | V21 | 1.00E−05 | 306 | 1.00E−05 | 320 |
| A27-1C06 | V22 | 1.00E−05 | 294 | 1.14E−05 | 304 |
| A28-1C08 | V23 | 1.00E−05 | 156 | 1.00E−05 | 144 |
| A28-1G07 | V24 | 1.00E−05 | 165 | 1.05E−05 | 173 |
| A28-2C06 | V25 | 1.00E−05 | 123 | 1.00E−05 | 134 |
| A28-2F01 | V26 | 1.00E−05 | 289 | 1.00E−05 | 258 |
| A28-2G07 | V27 | 1.00E−05 | 289 | 1.14E−05 | 259 |
| A28-2H06 | V28 | 1.00E−05 | 349 | 1.00E−05 | 317 |
| A00-0070 | V29 | 4.27E−03 | 571 | 5.22E−03 | 270 |
| A00-0036 | V30 | 1.52E−02 | 78 | 3.47E−02 | 59 |

Example 8: Preparation of IgG Antibodies

DNAs which respectively encode amino acid sequences of light and heavy chains of the seven human anti-IL-33 antibody clones prepared above (A10-1C04, A23-1A05, A25-2C02, A25-3H04, A26-1F02, A00-0070, and A00-0036) were each inserted downstream of a CMV promoter to construct an expression vector for mammalian cells for expression of IgG. The DNA sequences of the light chain of the clones were those shown in SEQ ID NOs:228, 232, 239, 241, 242, 230, and 253, respectively, in the Sequence Listing. The DNA sequences of the heavy chain of the clones were those shown in SEQ ID NOs:254, 261, 262, 264, 265, 276, and 277, respectively, in the Sequence Listing. Each of the expression vectors was transfected into FreeStyle 293-F cells (Life Technologies) using a transfection reagent Neo-Fection-293-1 (available from Astec Co., Ltd.). After the transfection, the cells were cultured for five days, and then the culture supernatant was collected. Stable cell lines of CHO cells were established with GS system (available from LONZA Group Ltd.) using a pConPlus vector and CHO K1SV cells. The stable cell lines of CHO cells were cultured, starting from a concentration of $0.3 \times 10^6$ cells/mL using WAVE Bioreactor SYSTEM 20/50 EHT (GE Healthcare), and the culture solution containing secreted IgG was collected. IgG was purified from the culture supernatant by affinity chromatography using AKTA explorer 100 (GE Healthcare) and a Protein A resin (HiTrap MabSelect SuRe, available from GE Healthcare). IgG bound to the protein A resin was eluted with an elution buffer with a pH of 3.2, and then the eluate was immediately neutralized to have an approximately neutral pH, and then was dialyzed with PBS (with a pH of 7.2). IgG after the purification with the protein A column was further purified with CHT (ceramic hydroxyapatite Type I resin, available from Bio-Rad Laboratories, Inc.) to increase the purity. IgG bound to CHT was eluted with NaCl concentration gradient. Fractions of interest were collected and then were dialyzed with PBS (with pH of 7.2). The antibodies obtained by this purification process are referred to as "neutral-purified antibodies".

Another purification process was also performed, which further involves the step of washing with six-column volume of 100 mM sodium carbonate buffer (with a pH of 11.0) for six minutes prior to the step of elution of IgG from the protein A resin in the purification process described above. The antibodies obtained from this purification process are referred to as "alkaline-purified antibodies". Recovery rates of the individual alkaline-purified antibodies after each step are shown in Table 11. The alkaline-purified antibodies after purification were concentrated by centrifugal ultrafiltration with VIVASPIN Turbo15 30000 MWCO (Sartorius AG).

TABLE 11

| Clone Name | Collection Rate by Protein A Purification (%) | Collection Rate by CHT Purification (%) | Collection Rate by condensation (%) |
|---|---|---|---|
| A10-1C04 | 87 | 90 | 79 |
| A23-1A05 | 64 | 86 | 72 |
| A25-3H04 | 91 | 91 | 101 |
| A25-2C02 | 64 | 80 | 65 |
| A26-1F02 | 93 | 82 | 108 |

Example 9: Affinity with IL-33 Protein

Each test antibody (IgG) ("antibody (IgG)" indicates an antibody having a molecular form of IgG; hereinafter, the same representation is used) was analyzed to confirm the affinity with the human IL-33 protein by measuring dissociation constant (Kd) between each test antibody and the human IL-33 protein in PBS by kinetic exclusion assay (KinExA) (KinExA3200, available from Sapidyne Instruments, Inc.). Mixture samples of a test antibody and a human IL-33 protein (ILC0701, available from ATGen Co. Ltd) were prepared. The human IL-33 protein was titrated to a constant concentration of test antibody (final concentration: several tens of pM to several hundreds of pM) over a wide concentration range of the human IL-33 protein (so that it covered the concentrations of the human IL-33 protein resulting from 12-step serial doubling dilutions, i.e. one- to 2048-fold, with the upper limit of final concentration set to several nM to several tens of nM). The mixture samples were incubated at a room temperature until the antigen-antibody reaction reached equilibrium. After the reaction reached equilibrium, the percentage of free anti-IL-33 antibody in each sample was analyzed using KinExA3200. The values of Kd were calculated by fitting the plot of percentages of anti-IL-33 antibody not bound to the human IL-33 protein (vertical axis) and concentrations of antigen (horizontal axis) to a theoretical formula, using a KinExA data analysis program (KinExA Pro Software v3.5.3, available from Sapidyne Instruments, Inc.). Beads for capturing the anti-IL-33 antibody were prepared by suspending 50 mg of Azlactone beads (Sapidyne) in 1 mL of coating solution (10 μg/mL human IL-33 protein (ILC0701, available from ATGen Co. Ltd), 50 mM sodium carbonate at pH of 9.6) and incubating the solution at a room temperature for one hour. The antibody for detection used was anti-human F(ab)'2-DyLight649 (Jackson, 309-495-006). As shown in Table 12, the antibodies with modified complementarity-determining regions (A10-1C04, A23-1A05, A25-2C02, A25-3H04, A26-1F02) exhibited affinity with the human IL-33 protein of Kd=231 pM at the lowest (A23-1A05) and Kd=720 fM at the highest (A25-2C02), in the case where they were evaluated in the form of neutral-purified antibodies.

Each of the alkaline-purified antibodies was analyzed to confirm the affinity with the human IL-33 protein (residues 112 to 270) (ILC0701, available from ATGen Co. Ltd) or full-length human IL-33 protein with KinExA instrument (Table 12), as in the evaluation described above. The affinity with the human IL-33 protein (residues 112 to 270) was as follows: A10-1C04 exhibited affinity of Kd=100.3 pM; A23-1A05 exhibited affinity of Kd=195.3 pM; A25-2C02 exhibited affinity of Kd=700 fM; A25-3H04 exhibited affinity of Kd=7.7 pM; and A26-1F02 exhibited affinity of Kd=5.3 pM. The affinity with the full-length human IL-33 protein was as follows: A10-1C04 exhibited Kd=179.8 pM, and A26-1F02 exhibited affinity of Kd=10.4 pM.

The recombinant protein used as ligand was prepared by the following process. The gene sequence encoding the full-length human IL-33 protein was N-terminally linked with NusA tag-6His tag-TEV Protease cleaving sequence, and the resulting sequence was inserted into pET30a(+) to construct an expression vector to prepare the recombinant protein. Escherichia coli BL21 (DE3) strain including the expression vector was pre-cultured, and the bacterial cells were inoculated into 50 mL of LB medium at a density of OD=0.5, and were cultured with shaking for four hours at a temperature of 37° C. After four hours, the culturing temperature was changed to 13° C., and the cells were cultured with shaking for 30 minutes. IPTG was added to a final concentration of 0.1 mM, and the cells were further cultured with shaking for 72 hours at a temperature of 13° C. The Escherichia coli expressing the full-length IL-33 was thereby obtained. The Escherichia coli expressing the full-length IL-33 was bacteriolyzed with BugBuster Master Mix (Novagen), and then the supernatant fraction was collected by centrifugal separation. The supernatant fraction was then subjected to IMAC purification with HisTrap FF Crude column (GE Healthcare) and then to anion exchange purification with CaptoQ Impress column (GE Healthcare), to increase the protein purity. Each sample after the anion exchange was concentrated by centrifugal ultrafiltration using VIVASPIN6 (5,000 MWCO). To 1750 μL of the concentrate, 100 μL of Turbo TEV protease (Nacalai Tesque, Inc.) and 4.5 μL of 1M DTT were added. The resulting solution was incubated at a temperature of 4° C. to cleave the NusTag and HisTag. After the cleavage of the tags, the solution was passed through a Ni Sepharose Excel column (GE Healthcare) in order to remove the NusTag and Turbo TEV protease (fused with HisTag) in the solution, and the flow-through fraction was collected. DTT was added to the flow-through fraction to a final concentration of 3.3 mM, and the resultant was used as the full-length human IL-33 protein in the measurement with KinExA.

TABLE 12

| Purification Method Ligand | Neutral-Purified Antibody | AlkalinE-Purified Antibody | |
|---|---|---|---|
| | Human IL-33 (Residues 112 - 270) | Human IL-33 (Residues 112 - 270) | Human IL-33 (Full-Length) |
| A10-1C04 | 166* | 100.3 | 179.8 |
| A23-1A05 | 231 | 195.3 | NCW |
| A25-3H04 | 5.38 | 7.7 | NCW |
| A25-2C02 | 0.72 | 0.7 | NCW |
| A26-1F02 | 10.8 | 5.3 | 10.4 |

*The numerical value in the table means dissociation constant of anti IL-33 monoclonal antibody (IgG) purified by a specific method for each ligand Example 10: Evaluation of In Vitro Neutralizing Activity Against Human IL-33 in HUVEC Each test antibody (IgG) was evaluated for in vitro neutralizing activity against human IL-33, based on IL-33-dependent IL-6 production by HUVEC as indicator. A commercially available polyclonal anti-IL-33 antibody (AF3625, available from R&D Systems, Inc.) was used as a positive control. HUVECs (CLC2517A, available from LONZA Group Ltd.) were suspended in an EGM-2 medium (CLCC-3156 and CLCC-4176, available from LONZA Group Ltd.), and were inoculated in a 96-well microplate (IWAKI) ($6 \times 10^3$/well), and the cell density was confirmed to be confluent. A mixed solution of each anti-IL-33 antibody (final concentration: 1 μg/mL (about 6.7 nM)) and a recombinant human IL-33 protein (ILC0701, available from ATGen Co. Ltd) (final concentration: 100 ng/mL (about 5 nM)) was added to the medium, and the resulting solution was incubated at a temperature of 37° C. for 24 hours. The medium was then collected, and the IL-6 concentration in the culture supernatant was measured with a commercially available ELISA kit (EH2IL6, available from Thermo Scientific). Cell viability after the collection of the medium was also measured with a cell counting kit (345-06463, available from Dojindo Molecular Technologies, Inc.), to confirm that the inhibitory effect on IL-6 production was not caused by a decrease in the viable cell count. The percentage of inhibition (%) of IL-6 production relative to the IL-6 production caused by the treatment with IL-33 alone was calculated to determine the IL-33 neutralizing activity of each test antibody. In the evaluation of neutral-purified form, A10-1C04 exhibited 67% inhibition, A23-1A05 exhibited 74% inhibition, A25-2C02 exhibited 96% inhibition, A25-3H04 exhibited 97% inhibition, A26-1F02 exhibited 96% inhibition, A00-0070 exhibited 4% inhibition, and A00-0036 exhibited −2% inhibition. The results demonstrate that the clones exhibited strong neutralizing activity, while the parental clones exhibited very low neutralizing activity. When the concentration was increased to 10 μg/mL, the parental clones exhibited moderate neutralizing activity: A00-0070 exhibited 42% inhibition, and A00-0036 exhibited 38% inhibition. The commercially available polyclonal antibody (AF3625, available from R&D Systems, Inc.) exhibited 30% inhibition, indicating moderate neutralizing activity, when it was added to a final concentration of 1 μg/mL.

As well as the evaluation above, a mixed solution of each alkaline-purified test antibody (final concentration: 0.1 to 10 μg/mL (about 0.67 to 67 nM)) and the recombinant human IL-33 (ILC0701, available from ATGen Co. Ltd) (final concentration: 100 ng/mL (about 5 nM)) was added to the HUVECs. The inhibitory effect on IL6 production relative to the IL-6 production caused by the treatment with IL-33 alone was calculated ($IC_{50}$ value) to determine the neutralizing activity of the antibody. The results were as follows: A10-1C04 had $IC_{50}$=0.35 μg/mL; A23-1A05 had $IC_{50}$=0.27 μg/mL; A25-2C02 had $IC_{50}$=0.19 μg/mL; A25-3H04 had $IC_{50}$=0.21 μg/mL; and A26-1F02 had $IC_{50}$=0.23 μg/mL.

Further, a mixture solution of each alkaline-purified antibody (final concentration: 0.1 to 3 μg/mL) and recombinant cynomolgus monkey IL-33 (prepared as in Example 7 and was used without biotinylation) (final concentration: 100 ng/mL) was added to the HUVECs. The inhibitory effect on IL6 production relative to the IL-6 production caused by the treatment with IL-33 alone was calculated ($IC_{50}$ value) to determine the neutralizing activity of the antibody. A10-1C04 had $IC_{50}$=0.43 μg/mL, and was confirmed to neutralize human IL-33 and cynomolgus monkey IL-33 at a similar level.

Example 11: Evaluation of In Vitro Neutralizing Activity Against Human IL-33 in KU-812 Cells Each test antibody (IgG) was evaluated for in vitro neutralizing activity against human IL-33, based on IL-33-dependent production of IL-5, IL-6, and IL-13 by KU-812 cells as indicator. A commercially available polyclonal anti-IL-33 antibody (AF3625, available from R&D Systems, Inc.) was used as a positive control. Human basophil cell line, KU-812 cells (ECACC, EC90071807) were inoculated in a 96-well microplate (Falcon) ($1×10^4$/well). A mixed solution of each test antibody (final concentration: 3 μg/mL (about 20 nM)) and a recombinant human IL-33 protein (ILC0701, available from ATGen Co. Ltd) (final concentration: 100 ng/mL (about 5 nM)) was added to the medium, and the resulting solution was incubated at a temperature of 37° C. for 24 hours. The concentrations of IL-5, IL-6, and IL-13 in the RPMI-1640 medium containing 10% FBS were measured using Human IL-5 Flex set, Human IL-6 Flex set, and Human IL-13 Flex set of BD™ Cytometric Bead Array (BD Biosciences). Cell viability after the collection of the medium was also measured with a cell counting kit (345-06463, available from Dojindo Molecular Technologies, Inc.), so as to confirm that the inhibitory effect on the production of IL-5, IL-6, and IL-13 was not caused by a decrease in the viable cell count. In the evaluation of neutral-purified form, A26-1F02 inhibited production of IL-5, IL-6, and IL-13 by 70%, 82%, and 72%, respectively, in this evaluation system. The results indicate that A26-1F02 exhibited stronger neutralizing activity on production of all the cytokines, as compared to the commercially available polyclonal antibody (it exhibited 47%, 51%, and 41% inhibition, respectively).

As in the evaluation above, a mixed solution of each alkaline-purified test antibody (final concentration: 100 to 0.01 μg/mL (about 667 to 0.067 nM)) and the recombinant human IL-33 (ILC0701, available from ATGen Co. Ltd) (final concentration: 3 ng/mL (about 0.15 nM)), human IL-3 (PeproTech, 200-03; final concentration: 10 ng/mL (about 0.67 nM)), and human complement C5a (C5788, available from Sigma-Aldrich Co. LLC.) (final concentration: 1 nM) was added to the KU-812 cells. The resulting solution was incubated at a temperature of 37° C. for 24 hours. The concentrations of IL-5 and IL-13 in the RPMI-1640 medium containing 10% FBS were measured. Cell viability after the collection of the medium was also measured with a cell counting kit, so as to confirm that the inhibitory effect on the production of IL-5 and IL-13 was not caused by a decrease in the viable cell count. In this evaluation system, alkaline-purified test antibodies (A10-1C04, A23-1A05, A25-2C02, A25-3H04, and A26-1F02) each exhibited an inhibitory effect of 50% or higher inhibition against production of IL-5 and IL-13 at a final concentration of 1 μg/mL.

Example 12: Evaluation of In Vitro Neutralizing Activity Against Human IL-33 in Human Peripheral Blood Mononuclear Cells Each test antibody (IgG) was evaluated for in vitro neutralizing activity against human IL-33, based on IL-33-dependent IFN-γ production by human peripheral blood mononuclear cell (PBMC) as indicator. A commercially available polyclonal anti-IL-33 antibody (AF3625, available from R&D Systems, Inc.) was used as a positive control. PBMCs were prepared and were inoculated in a 96-well microplate ($2×10^5$/well), and a recombinant human IL-12 (Wako Pure Chemical Industries, Inc.) was added (final concentration: 10 ng/mL) to the microplate. A mixture of each test antibody and a recombinant human IL-33 protein (10 ng/mL) was added to the microplate, and the resulting solution was incubated at a temperature of 37° C. for 48 hours. The culture supernatant was then collected, and the IFN-γ production level in the medium was measured with AlfaLISA™ human IFN-γ immunoassay kit (PerkinElmer Inc.) to evaluate IL-33 neutralizing activity. In this evaluation system, when the alkaline-purified antibodies were allowed to act at a final concentration of 10 μg/mL, the inhibition percentages were as follows: A10-1C04 exhibited 96.9% inhibition, A23-1A05 shows 97.5% inhibition, A25-2C02 exhibited 98.75% inhibition, A25-3H04 exhibited 97.9% inhibition, and A26-1F02 exhibited 98.25% inhibition.

Example 13: Evaluation of Effects on Inflammation Induced by Intraperitoneal Administration of Human IL-33

Intraperitoneal administration of human IL-33 to mice induced various inflammatory changes, i.e. increases in blood IgE, IgA, and IL-5, and blood neutrophil count, blood eosinophil count, and blood basophil count, and an increase in splenic cells (an increase in spleen weight), and pathological changes in various mucosal organs. Based on these changes as indicators, anti-inflammatory action in vivo of test antibody (IgG) was evaluated.

Human IL-33 protein (R&D Systems, 3625-IL-010) was intraperitoneally administered to male C57BL6 (six- to eight-weeks-old) (Charles River Laboratories International, Inc.) at a dose of 0.4 μg/individual for seven days (day 0 to day 6). The test antibody (IgG) was also administered intraperitoneally for seven days (day 0 to day 6). Seven days after initiation of the administration (day 7), the animals administered with PBS instead of human IL-33 protein (represented as "vehicle" in the figures) had a mean spleen weight of 76±4 mg, while the animals administered with IL-33 protein had a mean spleen weight of 90±7 mg. The animals intraperitoneally administered with 10 mg/kg (represented as "mpk" in the figures) of human control IgG (MP Biomedicals, 55908) in addition to the IL-33 protein had a mean spleen weight of 93±4 mg, while the animals intraperitoneally administered with 10 mg/kg of the neutral-purified antibody A26-1F02 in addition to the IL-33 protein had a mean spleen weight of 66±3 mg.

Figure 8:
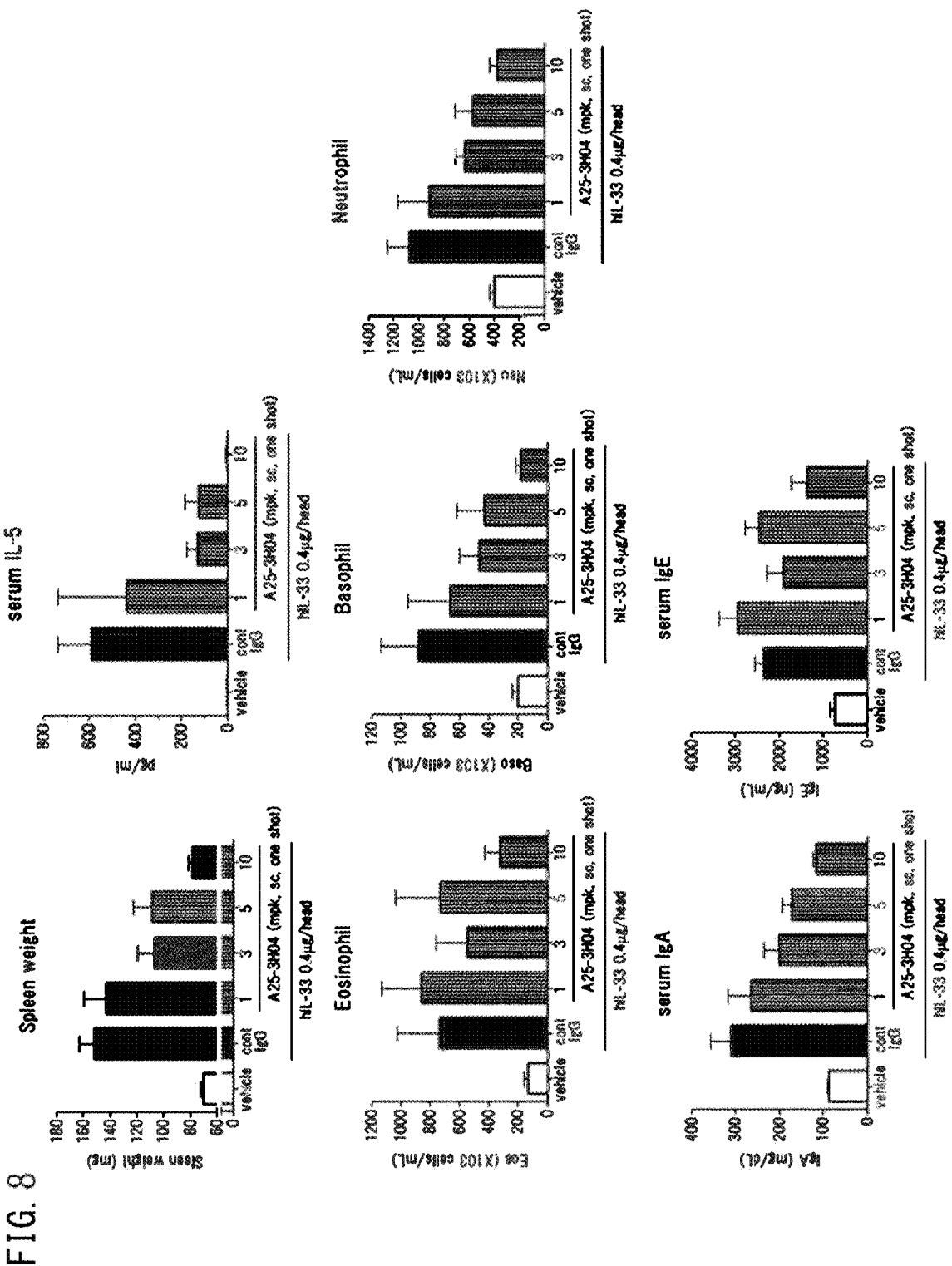
FIG. 8 shows effects of a human anti-IL-33 neutralizing monoclonal antibody designated A25-3H04 on inflammation induced by intraperitoneal administration of human IL-33, based on inflammatory markers (spleen weight, serum IL-5 concentration, blood eosinophil count, blood basophil count, blood neutrophil count, serum IgA concentration, and serum IgE concentration).

The alkaline-purified antibody was then evaluated. The alkaline-purified antibody was subcutaneously administered only once (sc, one shot), on the day before the administration of the human IL-33 protein (Day −1) and the evaluation was performed. Seven days after initiation of the administration (day 7), the animals administered with PBS instead of human IL-33 protein had a mean spleen weight of 70 mg, while the animals subcutaneously administered only once with the human control IgG (10 mg/kg) in addition to the IL-33 protein had a mean spleen weight of 152 mg. Contrarily, the animals subcutaneously administered with A25-3H04 (1, 3, 5, and 10 mg/kg) in addition to the IL-33 protein had spleen weights of 143, 106, 109, and 78 mg, respectively, as shown in FIG. 8. The results indicated that A25-3H04 exhibited dose-dependent inhibition of increase in spleen weight caused by inflammation. In addition to the anti-inflammatory effects on the spleen weight, A25-3H04 was confirmed to have anti-inflammatory effects on increases in serum IgA concentration, serum IgE concentration, blood neutrophil count, blood basophil count, and blood eosinophil count, and serum IL-5 concentration, which had been caused by administration of human IL-33 (FIG. 8). These results confirm that A25-3H04 exhibits inhibitory effect on the inflammatory response induced in vivo by IL-33. The blood A25-3H04 concentration in mice was measured seven days after the initiation of the administration (day 7). The measured concentrations in the animals administered with the antibody at doses of 1, 3, 5, and 10 mg/kg, respectively, were 0.6, 3.7, 6.5, and 20.3 µg/ml.

Figure 9:
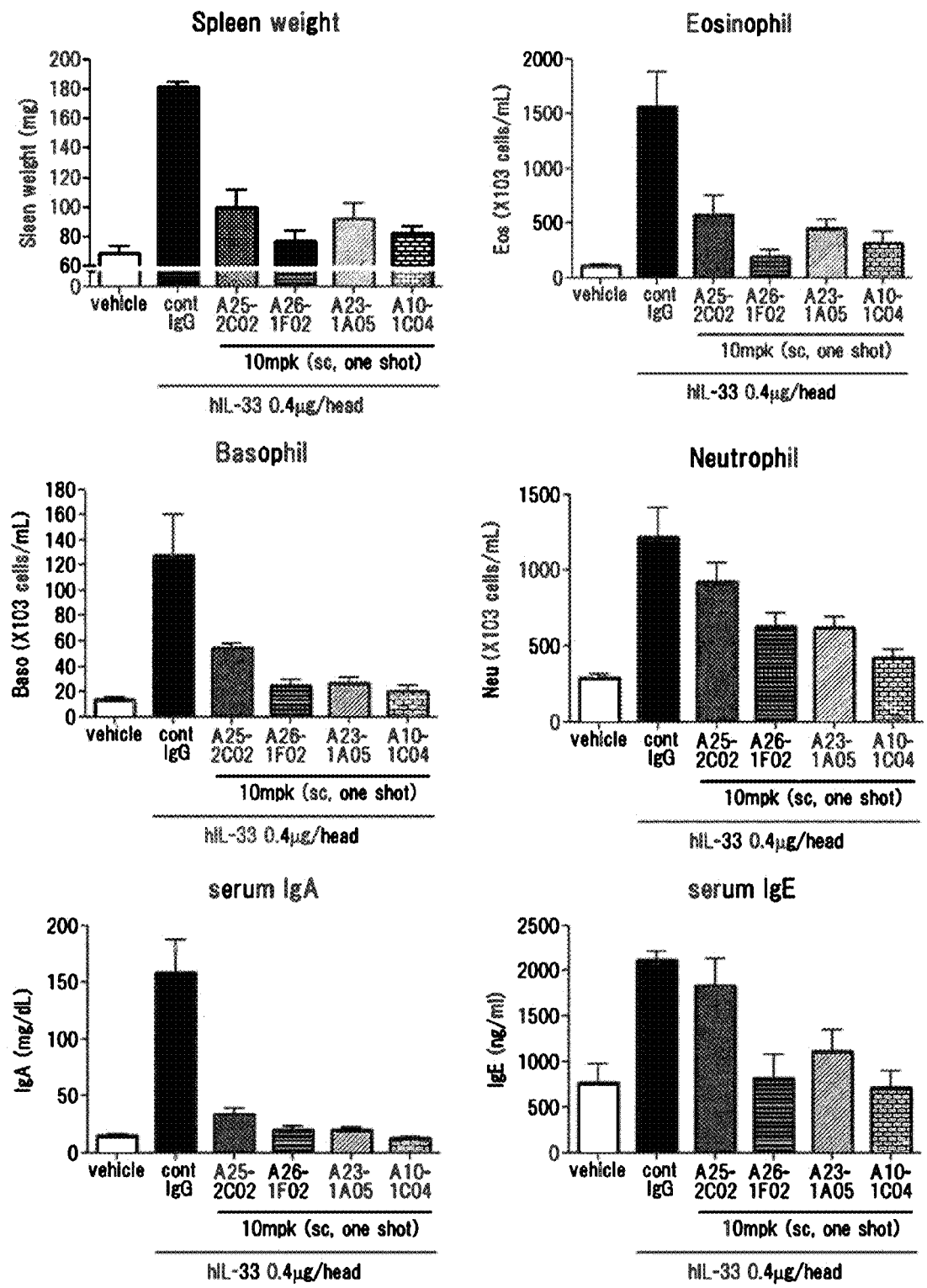
FIG. 9 shows effects of human anti-IL-33 neutralizing monoclonal antibodies designated A10-1C04, A23-1A05, A25-2C02, and A26-1F02 on inflammation induced by intraperitoneal administration of human IL-33, based on inflammatory markers (spleen weight, blood eosinophil count, blood basophil count, blood neutrophil count, serum IgA concentration, and serum IgE concentration).

Other test antibodies (IgG) were also evaluated for in vivo anti-inflammatory effects by subcutaneous administration in accordance with the same protocol (10 mg/kg). As a result, the animals subcutaneously administered with human control IgG had a mean spleen weight of 181 mg, the animals subcutaneously administered with alkaline-purified antibody (A10-1C04, A23-1A05, A25-2C02, or A26-1F02) in addition to administration of IL-33 protein had mean spleen weights of 82 mg, 92 mg, 100 mg, and 77 mg, respectively, as shown in FIG. 9. The results indicate that each antibody inhibited increase in spleen weight caused by inflammation. In addition to the anti-inflammatory effects on the spleen weight, each alkaline-purified antibody (A10-1C04, A23-1A05, A25-2C02, and A26-1F02) was confirmed to have anti-inflammatory effects on increases in serum IgA concentration, serum IgE concentration, blood neutrophil count, blood basophil count, and blood eosinophil count, which had been caused by administration of human IL-33 protein (FIG. 9). These results confirm that these antibodies (A10-1C04, A23-1A05, A25-2C02, and A26-1F02), in addition to A25-3H04, also exhibit inhibitory effects on the inflammatory response induced in vivo by IL-33.

Example 14: Evaluation of Effects on Pulmonary Disorders Induced by Intratracheal Administration of Human IL-33

Mice are intratracheally administered with human IL-33 protein, and then the bronchoalveolar lavage fluid (BALF) is collected from the mice. Increases in the total cell count, eosinophil count, and neutrophil count are observed in the BALF, and mucosal hyperplasia in the tracheal epithelium is observed. Production of cytokines, such as IL-4, IL-5, IL-6, and IL-13, is also observed in the BALF. Effects of each test antibody on the pulmonary disorders can be evaluated by intraperitoneal, subcutaneous, or intravenous administration of the test antibody (IgG) to the system.

Example 15: Evaluation of Effects on Airway Hyperresponsiveness Induced by Intranasal Administration of Human IL-33

Intranasal administration of an IL-33 protein induces airway hyperresponsiveness to subsequently inhaled methacholine. Effects of the test antibody on airway hyperresponsiveness can be evaluated by intraperitoneal, subcutaneous, or intravenous administration of the test antibody (IgG) to the evaluation system.

Example 16: Evaluation of Effects of IL-33 on Human IL-33-Knockin Mice

Administration of *Dermatophagoides* antigen or papain to human IL-33-knockin mice by nasal dripping or intratracheal administration induces airway inflammation. The BALF collected from the mice exhibits an increased total cell count in the BALF. Regarding airway inflammation induced by *Dermatophagoides* antigen or papain, it is known that protease activity of *Dermatophagoides* antigen or papain causes release of IL-33 from the airway epithelial cells (Oboki et al., Proceedings of the National Academy of Sciences of the United States of America, 2010, vol. 107, p18581). Effects of each test antibody on the protease-induced airway inflammation and on IL-33-induced in vivo can be evaluated by intraperitoneal, subcutaneous, or intravenous administration of the test antibody (IgG) to the evaluation system.

Example 17: Evaluation of Anti-Inflammatory Effects on Sepsis Model Intraperitoneally Administered with LPS Intraperitoneal administration of LPS to human IL-33-knockin mice induces sepsis (Oboki et al., Proceedings of the National Academy of Sciences of the United States of America, 2010, vol. 107, p18581). Intraperitoneal, subcutaneous, or intravenous administration of the test antibody (IgG) prior to the administration of LPS allows evaluation of effects of the test antibody on subsequent mortality of the mice. Inflammatory cytokines, such as IL-6 and TNF-α, are detected in blood at high concentrations within several hours after the administration of LPS. Anti-inflammatory effects of the test antibody can be evaluated by measuring concentrations of such inflammatory cytokines.

Example 18: Evaluation of In Vivo Effects on Cancer in Cancer-Bearing Mice

Murine or human cancer cell line cells are subcutaneously or intravenously transferred into mice, and are then administered with human IL-33. The number of cells to be transferred is appropriately determined depending on the cancer cell line, and the site of transfer is the same among animals. The mice are administered intraperitoneally, subcutaneously or intravenously with each test antibody (IgG), and are analyzed to confirm the number of cancer cells in the primary cancer site and in the metastatic lesion in other organ after the transfer of the cancer cell line cells on the basis of volume or cell count. The effects of each test antibody on cancer can be thereby evaluated.

Example 19: Evaluation of Colloidal Stability of Antibodies

Each test antibody (IgG) was analyzed to confirm colloidal stability by dynamic light scattering based on the presence of aggregates. Each alkaline-purified antibody was concentrated to a level of approximately 50 mg/mL with VIVASPIN or VIVASPIN TURBO (available from Sartorius AG; 10000 to 50000 MWCO). The centrifugation was performed at a temperature of 4° C., while the revolutions per minute and the duration were appropriately changed. The solution of each test antibody was sequentially diluted, and 200 to 250 µL of each sample was subjected to measurement of dynamic light scattering (Nanotrac UPA UT-151, available from NIKKISO CO., LTD.), to obtain data within a concentration range covering approximately 1 mg/mL to approximately 50 mg/mL. The particle size distribution of each antibody protein was calculated based on the data accumulated over 200 seconds, to evaluate the presence of aggregates. The particle size distribution of the test antibodies (A10-1C04, A23-1A05, A25-2C02, A25-3H04, and A26-1F02) showed a very slight peak shift from approximately 10 nm towards larger particle sizes along with the increase of antibody concentration, and did not have peak at particle size exceeding several tens of nanometers, i.e. it did not have a peak assumed not to be dependent on the antibody concentration but to be caused by irreversible aggregation. These results confirm that the test antibodies have excellent colloidal stability.

In order to quantitatively evaluate the colloidal stability, the interaction parameter ($k_D$) was calculated. The interaction parameter indicates concentration dependence of the diffusion coefficient (inversely proportional to the particle size), and is an important indicator used in formulation design of high-concentration protein formulations, such as antibodies. It is reported that an interaction parameter greater than −12.4 mL/g indicates high colloidal stability and low self-association due to repulsive interaction (Saito et al., Pharm. Res., 2013.Vol. 30 p. 1263). Each test antibody solution dissolved in PBS (at pH of 7.2) was concentrated by ultrafiltration to a concentration of several tens of mg/mL, and was subjected to serial doubling dilutions with the same solvent to prepare samples. Each sample was analyzed to confirm the particle size with a dynamic light scattering analyzer (Nanotrac UPA UT 151, available from NIKKISO CO., LTD.). Based on the measured particle size, the diffusion coefficient was calculated by the following Stokes-Einstein equation:

[Mathematical Formula 1]

where D is the diffusion coefficient (cm$^2$/sec); $K_B$ is the Boltzmann's constant (J/K); T is the thermodynamic temperature (K); π is the constant Pi; η is the viscosity P (poise) of the diluted solution; and d is the particle size (nm).

The concentration dependence of the diffusion coefficient was plotted, and the plot was fit to the following equation to determine the interaction parameter.

[Mathematical Formula 2]

where D is the diffusion coefficient calculated by the Stokes-Einstein equation; $D_0$ is the diffusion coefficient in the infinite dilution; and c is the measured concentration of each test antibody (g/mL). Based on the equation, the interaction parameter ($k_D$) representing the inclination of the fitting line was calculated. The results are as follows: A10-1C04 had an interaction parameter $k_D$=−8.1 mL/g (analytical range: 0.41-63.7 mg/mL); A23-1A05 had an interaction parameter $k_D$=−5.6 mL/g (analytical range: 0.40-61.8 mg/mL); A25-2C02 had an interaction parameter $k_D$=−6.2 mL/g (analytical range: 0.43-66.3 mg/mL); A25-3H04 had an interaction parameter $k_D$=−7.5 mL/g (analytical range of 0.34-56.5 mg/mL); A26-1F02 had an interaction parameter $k_D$=−6.7 mL/g (analytical range: 0.35-62.7 mg/mL). The results demonstrate that all the test antibodies had an interaction parameter exceeding −12.4 mL/g, indicating excellent colloidal stability.

Example 20: Evaluation of Thermodynamic Stability of Antibodies

Each test antibody (IgG) was analyzed to confirm thermodynamic stability at a temperature where the folding of immunoglobulin domain disappeared (Tm). Protein Thermal Shift Dye (Life Technologies) was added to each test antibody solution at a concentration of several tens of g/mL in accordance with the instruction manual. The fluorescence intensity of the diluted solution was measured with Real-Time PCR 7500 Fast (Life Technologies) while the temperature was increased at a rate of about 1° C./min. The obtained data was analyzed with Protein Thermal Shift (Life Technologies) to determine the temperature Tm. If two or more temperatures Tm were observed, the lowest temperature was defined as Tm1, the second lowest temperature as Tm2, and so on. The results of evaluation of neutral-purified antibodies were as follows: A10-1C04 had Tm=73.9° C.; A23-1A05 had Tm1=69.3° C. and Tm2=77.6° C.; A25-2C02 had Tm1=69.3° C. and Tm2=80.3° C.; A25-3H04 had Tm1=70.0° C. and Tm2=76.4° C.; and A26-1F02 had Tm=74.5° C. The results of evaluation of alkaline-purified antibodies were as follows: A10-1C04 had Tm=73.7° C.; A23-1A05 had Tm1=69.5° C. and Tm2=77.5° C.; A25-2C02 had Tm1=69.5° C. and Tm2=80.4° C.; A25-3H04 had Tm1=70.1° C. and Tm2=76.4° C.; and A26-1F02 had Tm=74.4° C. The results indicate that all antibodies had a temperature Tm exceeding 65° C., demonstrating excellent thermodynamic stability.

Example 21: Evaluation of Preservation Stability of Antibodies

Each alkaline-purified antibody was dissolved in a citrate buffer (50 mM citric acid; 150 mM NaCl (pH: 6.3)) at a concentration of about 10 mg/mL, and was preserved at a temperature of 40° C. for four weeks, to evaluate the preservation stability of each test antibody (IgG). For evaluation of the monomer purity of each antibody after the preservation, monomer purity was measured by size exclusion chromatography analysis (SEC) and microchip capillary SDS electrophoresis (mCE-SDS), and antigen-binding activity was measured by surface plasmon resonance.

Two TSKgel G3000SWXL columns (available from Tosoh Bioscience LLC) were linked together and were mounted on an HPLC system (Beckman System Gold (126 solvent manager, 166 detector, and 508 auto sampler)) and gel filtration analysis was performed. The mobile phase solvent was 0.1 M phosphate buffer (at pH of 6.7) containing 0.1 M sodium sulfate. Each sample was separated at a flow rate of 0.5 mL/min, and was detected at absorbance of UV 215 nm. The sample for analysis was prepared by diluting about 10 mg/mL of the preserved antibody solution to 100-fold, and 50 µL of the sample for analysis was injected to the columns. Monomer purity determined by the size exclusion chromatography is shown in Table 13. The results indicate that all the test antibodies (A10-1C04, A23-1A05, A25-2C02, A25-3H04, and A26-1F02) retained a monomer purity exceeding 90% after preservation at a temperature of 40° C. for four weeks, demonstrating excellent preservation stability.

Capillary SDS electrophoresis was performed using Lab Chip GX II (available from PerkinElmer Inc.). Each sample was reduced with the reagent kit dedicated for the system, HT Protein Express Reagent (available from PerkinElmer Inc.), in accordance with the manufacturer's standard protocol, under denaturing conditions. As an analytical sample, 2 µL of preserved antibody solution with a concentration of about 10 mg/mL was added. The reagent used for the electrophoresis was taken from the kit and was added to a dedicated chip, HT Protein Express Lab Chip, version 2 (available from PerkinElmer Inc.), and the sample was measured in accordance with the built-in protocol for analysis of antibodies, HT Antibody 200. As shown in Table 13, under denaturing and reducing conditions, all the test antibodies (A10-1C04, A23-1A05, A25-2C02, A25-3H04, and A26-1F02) retained a monomer purity exceeding 90% after preservation at a temperature of 40° C. for four weeks, demonstrating excellent preservation stability.

In order to confirm the presence or absence of irreversible aggregation not dependent on the antibody concentration after the preservation, the particle size of each test antibody was measured. Each sample for analysis was prepared by diluting each preserved antibody solution to 10-fold with a citrate buffer (50 mM citric acid, 150 mM NaCl (pH: 6.3)) (final concentration: about 1 mg/mL), and was analyzed by dynamic light scattering technique (Nanotrac UPA UT-151, available from NIKKISO CO., LTD.) to measure the particle size of each test antibody. The accumulation time was 200 seconds. No aggregate was detected in the analysis of the test antibodies (A10-1C04, A23-1A05, A25-2C02, A25-3H04, A26-1F02, A00-0070, A00-0036) after preservation at a temperature of 40° C. for four weeks, demonstrating excellent preservation stability.

In order to confirm the presence of the antigen-binding ability after the preservation, the antigen-binding activity was measured with a surface plasmon resonance system, Biacore T200 (available from GE Healthcare). A human IL-33 protein (ILC0701, available from ATGen Co. Ltd) was immobilized onto a Sensor Chip CM5 (GE Healthcare) (the amount of immobilized protein was about 3000 to 6000 RU) with Amine Coupling Kit (GE Healthcare). Each preserved antibody solution was then diluted to 10-fold with a citric buffer (50 mM citric acid, 150 mM NaCl (pH: 6.3)), and the resulting solution was analyzed to measure the total protein concentration in the solution, using a microvolume spectrophotometer, Astragene II (Astranet Systems, Ltd.) (protein concentration: about 1 mg/mL). The antibody solution after the measurement of the total protein concentration was diluted to 1000-fold with HBS-EP buffer (10 mM HEPES, 150 mM NaCl, 3 mM EDTA, 0.05% (v/v) Surfactant P20 (at pH of 7.4)). The analyte was thereby prepared. The measurement temperature was 25° C. Each analyte was added for 36 seconds at two flow rates of 5 µL/min and 100 µL/min to obtain sensorgrams of the association phase. The sensorgrams were then analyzed by Calibration Free Concentration Analysis using a data analysis program (GE Healthcare, Biacore T200 Evaluation Software v1.0) to determine the concentration of the antibody having antigen-binding activity. As control, each test antibody after preservation at a temperature of 4° C. for four weeks was also analyzed to confirm the antigen-binding activity, to calculate the ratio of antigen-binding activity of each test antibody after the preservation at a temperature of 40° C. for four weeks. As shown in Table 13, all the test antibodies (A10-1C04, A23-1A05, A25-2C02, A25-3H04, and A26-1F02) retained antigen-binding activity exceeding 90% even after preservation at a temperature of 40° C. for four weeks, demonstrating excellent preservation stability.

TABLE 13

| | Preservation Stability at 40° C. for 4 W | | |
|---|---|---|---|
| Antibody | SEC % monomer | mCE-SDS % monomer | Antigen Binding Activity % Active IgG |
| A23-1A05 | 95.8 | 97.7 | 101.8 |
| A10-1C04 | 96.5 | 97.4 | 99.3 |
| A26-1F02 | 95.9 | 98.2 | 101.1 |
| A25-2C02 | 95.7 | 97.9 | 100.4 |
| A25-3H04 | 95.8 | 98.0 | 101.8 |

Example 22: Evaluation of Stability of Antibodies by Forced Oxidation

Each test antibody (IgG) was analyzed to confirm influences of oxidation on its antigen-binding activity. To each alkaline-purified antibody with a final concentration of about 1 mg/mL, a hydrogen peroxide solution (final concentration: 1%) was added, and the resulting solution was oxidized at a temperature of 37° C. for 24 hours. To the resulting solution, 80 mM methionine solution was then added to stop oxidation. Each test antibody solution was then replaced with PBS with a desalting column, Zebaspin (available from Thermo Scientific). The oxidized test antibodies were each analyzed with a surface plasmon resonance system Biacore T200 (GE Healthcare) to confirm antigen-binding activity, as in Example 21. The ratio of antigen-binding activity of the oxidized antibody to that of untreated test antibody was calculated. The results are as follows: A10-1C04 retained 83% binding activity, A23-1A05 retained 95% binding activity, A25-2C02 retained 100.5% binding activity, A25-3H04 retained 98.7% binding activity, and A26-1F02 retained 89.5% binding activity. These results indicate that all the test antibodies (A10-1C04, A23-1A05, A25-2C02, A25-3H04, and A26-1F02) exhibited stability such that they retained antigen-binding activity exceeding 80% even after forced oxidation by treatment with 1% hydrogen peroxide solution.

Example 23: Evaluation of Aggregation Caused by Physical Stress (Stirring)

Each test antibody (IgG) was diluted with PBS to a concentration of 0.2 mg/mL, and the diluted solution was stirred in a batch cell placed on the Aggregates Sizer (available from Shimadzu Corporation) to apply physical stress. Each solution was stirred by vertical motion of stirring plate at a room temperature for 30 minutes (190 vibrations/min), and then was analyzed to confirm concentrations of aggregates having a particle size of 40 nm to 20 m with the Aggregates Sizer. In the evaluation of each alkaline-purified antibody, the concentrations of aggregates produced by stirring were as follows: 17.2 µg/mL in A10-1C04; 16.4 µg/mL in A23-1A05; 13.3 µg/mL in A25-2C02; 23.4 µg/mL in A25-3H04; and 17.0 µg/mL in A26-1F02. The results indicate that all the antibodies exhibited 15% or less aggregation induced by physical stress, demonstrating that all the test antibodies were stable against physical stress.

Example 24: Evaluation of Plasma Concentration of the Antibodies in Mice

Figure 10:
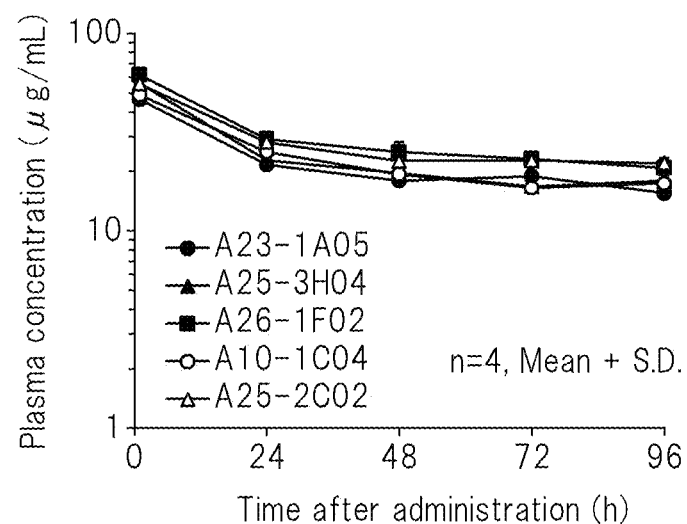
FIG. 10 shows variations in plasma concentration of each of the human anti-IL-33 neutralizing monoclonal antibodies (A23-1A05, A25-3H04, A26-1F02, A10-1C04, and A25-2C02) in mice.

Each test antibody (IgG) was fluorescent-labeled, and was intravenously administered (3 mg/kg) to male C57BL6 mice (eight- to ten-weeks-old) (Charles River Laboratories International, Inc.). The concentration of the test antibody was measured by detecting the fluorescence in the plasma. As shown in FIG. 10, in the evaluation of each alkaline-purified antibody, all the test antibodies (A10-1C04, A23-1A05, A25-2C02, A25-3H04, and A26-1F02) had an elimination half-life of 100 hours or more, indicating good pharmacokinetic profile.

Example 25: Evaluation of Serum Concentration of the Antibodies in Monkeys

Figure 11:
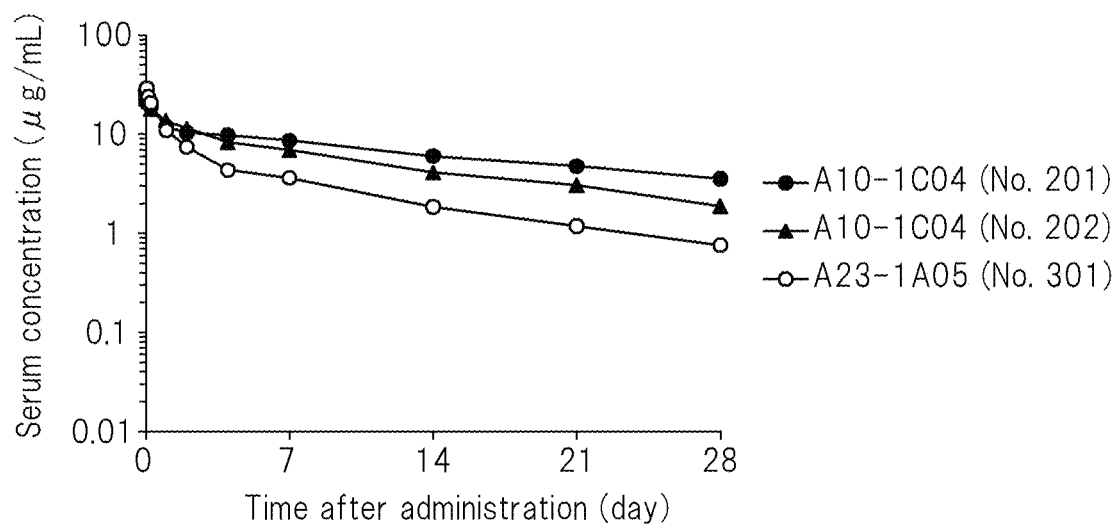
FIG. 11 shows variations in serum concentration of each of the human anti-IL-33 neutralizing monoclonal antibodies (A10-1C04 and A23-1A05) in monkeys.

Each test antibody (IgG) (1 mg/kg) was intravenously administered to male cynomolgus monkeys (two- to three-years old) (Hamri Co., Ltd.), and then the serum concentration of the test antibody was measured with Human Therapeutic IgG1 EIA Kit (500910, available from Cayman Chemical). The alkaline-purified antibody A10-1C04 was administered to two cynomolgus monkeys (Nos. 201 and 202), and the alkaline-purified antibody A23-1A05 was administered to one cynomolgus monkey (No. 301). As shown in FIG. 11, the elimination half-life of A10-1C04 was 16.56 days (No. 201) and 11.40 days (No. 202), and the clearance was 3.598 mL/day/kg (No. 201) and 5.451 mL/day/kg (No. 202). A23-1A05 had an elimination half-life of 10.87 days, and a clearance of 10.07 mL/day/kg. Both test antibodies exhibited good pharmacokinetic profiles in cynomolgus monkeys.

Example 26: Evaluation of Immunogenicity of Antibodies

Each test antibody (IgG) was evaluated for immunogenicity potential by in vitro T-cell assay (LONZA Group Ltd.). Samples were collected from 50 donors to represent the target population, and 50 µg/mL of each alkaline-purified antibody was added to dendritic cells of human peripheral blood collected from the donors, so that the antibody was taken in the dendritic cells. CD4-positive T-cells of human peripheral blood collected from an identical donor were isolated. Subsequently, both cells, that is, the dendritic cells which had taken the test antibody and the CD4-positive T-cells, were co-cultured, to determine the reaction (proliferation) of the CD4-positive T-cells. As a negative control, a buffer (PBS) not containing any test antibody was used in the same reaction of CD4-positive T-cells, and the results were compared to evaluate the immunogenicity potential of each antibody. The results indicate that none of the test antibodies (A10-1C04, A25-2C02, A25-3H04, and A26-1F02) showed immunogenicity potential in the test condition Example 27: Evaluation of Human Tissue Cross-Reactivity Each test antibody (IgG) was evaluated for cross-reactivity to human tissues (frozen specimen of 35 tissues which satisfy the FDA and EMA guidelines, from one donor) by immunohistochemical staining (Covance Laboratories Ltd.). The 35 tissues include adrenal gland, bladder, blood cells, bone marrow, mammary gland, cerebellum, cerebral cortex, colon, endothelial cells (blood vessel), eyeball, oviduct, gastrointestinal tract (including smooth muscle), heart, kidney (glomerulus and renal tubule), liver, lung, lymph node, ovary, pancreas, parathyroid gland, parotid gland, peripheral nerve, pituitary gland, placenta, prostate gland, skin, spinal cord, spleen, striated muscle, testis, thymus, thyroid, tonsil, ureter, and uterus (cervical region and, endometrium). As a result, in the evaluation of alkaline-purified antibodies, all the test antibodies (A10-1C04, A23-1A05, A26-1F02, and A25-2C02) intensively stained vascular endothelial cells (positive control). IL-33 is known to be broadly expressed in the vascular endothelial cells. In various tissues such as epithelium, interstitial cells, neural tissues, muscular tissues, and hemocytes, cross-reactivity to the cytoplasm or nucleus was confirmed, but cross-reactivity to the cytoplasmic membrane was not observed in any tissue. According to the ICH S6(R1) guidelines and other articles (Toxicologic Pathology 2010, 38(7):1138-1166), cross-reactivity to the cytoplasm or nucleus, where an antibody is less likely to reach in vivo, has less toxicological significance. Therefore, none of the test antibodies (A10-1C04, A23-1A05, A26-1F02, and A25-2C02) exhibited toxicological concern.

Example 28: Narrowing of the Epitope Regions of A10-1C04 and A25-3H04

The anti-IL-33 monoclonal antibodies A10-1C04 and A25-3H04 bound to the epitope PEP14 as described in the Example 1. Experiments were performed with a phage display library of continuous amino acid sequences that are included in PEP14 consisting of 20 amino acids and are shorter than PEP14, and two different epitopes (LEDESYEIYV (SEQ ID NO:426 in the Sequence Listing) and EDESYEIYV (SEQ ID NO:427 in the Sequence Listing)) were found. The peptide LEDESYEIYV corresponds to the sequence spanning residues 138 to 147 of human IL-33 shown in SEQ ID NO:226 in the Sequence Listing, and the peptide EDESYEIYV corresponds to the sequence spanning residues 139 to 147 of human IL-33 shown in SEQ ID NO:226 in the Sequence Listing. These peptides were synthesized, and the affinity with the alkali-purified antibodies was calculated as Kd by the KinExA experiment as in Example 9 (Table 14).

TABLE 14

| Peptide | Kd | |
| --- | --- | --- |
| | A10-1C04 | A25-3H04 |
| DQSITFALEDESYEIYVEDL (PEP14) | 9.0nM | 1.5pM |
| LEDESYEIYV | 386.2nM | 11.0nM |
| EDESYEIYV | 2070.0nM | 301.3nM |

INDUSTRIAL APPLICABILITY

The antibody with neutralizing effect of the present invention can be used as a pharmaceutical composition for diagnosis, treatment, prevention, or alleviation of diseases associated with IL-33.

SEQUENCE LISTING

```
Sequence total quantity: 427
SEQ ID NO: 1          moltype = AA  length = 14
FEATURE               Location/Qualifiers
REGION                1..14
                      note = LCDR1-1
source                1..14
```

```
                            mol_type = protein
                            organism = synthetic construct
SEQUENCE: 1
TGSSSNIGAV YDVH                                                                  14

SEQ ID NO: 2                moltype = AA   length = 14
FEATURE                     Location/Qualifiers
REGION                      1..14
                            note = LCDR1-2
source                      1..14
                            mol_type = protein
                            organism = synthetic construct
SEQUENCE: 2
TGSSSNIGAV YNVH                                                                  14

SEQ ID NO: 3                moltype = AA   length = 13
FEATURE                     Location/Qualifiers
REGION                      1..13
                            note = LCDR1-3
source                      1..13
                            mol_type = protein
                            organism = synthetic construct
SEQUENCE: 3
SGSSSNIGNN AVS                                                                   13

SEQ ID NO: 4                moltype = AA   length = 13
FEATURE                     Location/Qualifiers
REGION                      1..13
                            note = LCDR1-4
source                      1..13
                            mol_type = protein
                            organism = synthetic construct
SEQUENCE: 4
SGSSSNIGRN AVN                                                                   13

SEQ ID NO: 5                moltype = AA   length = 13
FEATURE                     Location/Qualifiers
REGION                      1..13
                            note = LCDR1-5
source                      1..13
                            mol_type = protein
                            organism = synthetic construct
SEQUENCE: 5
SGSCSNIGRN AVN                                                                   13

SEQ ID NO: 6                moltype = AA   length = 13
FEATURE                     Location/Qualifiers
REGION                      1..13
                            note = LCDR1-6
source                      1..13
                            mol_type = protein
                            organism = synthetic construct
SEQUENCE: 6
SGSSSNIGNN AVN                                                                   13

SEQ ID NO: 7                moltype = AA   length = 13
FEATURE                     Location/Qualifiers
REGION                      1..13
                            note = LCDR1-7
source                      1..13
                            mol_type = protein
                            organism = synthetic construct
SEQUENCE: 7
SGSSSNIGSN AVS                                                                   13

SEQ ID NO: 8                moltype = AA   length = 13
FEATURE                     Location/Qualifiers
REGION                      1..13
                            note = LCDR1-8
source                      1..13
                            mol_type = protein
                            organism = synthetic construct
SEQUENCE: 8
SGSSSNIGRN AVS                                                                   13

SEQ ID NO: 9                moltype = AA   length = 13
FEATURE                     Location/Qualifiers
REGION                      1..13
                            note = LCDR1-9
```

```
source                  1..13
                        mol_type = protein
                        organism = synthetic construct
SEQUENCE: 9
SGSSSNIGHN AVS                                                                    13

SEQ ID NO: 10           moltype = AA  length = 13
FEATURE                 Location/Qualifiers
REGION                  1..13
                        note = LCDR1-10
source                  1..13
                        mol_type = protein
                        organism = synthetic construct
SEQUENCE: 10
SGSSSNIGHN AVW                                                                    13

SEQ ID NO: 11           moltype = AA  length = 7
FEATURE                 Location/Qualifiers
REGION                  1..7
                        note = LCDR2-1
source                  1..7
                        mol_type = protein
                        organism = synthetic construct
SEQUENCE: 11
RNNQRPS                                                                            7

SEQ ID NO: 12           moltype = AA  length = 7
FEATURE                 Location/Qualifiers
REGION                  1..7
                        note = LCDR2-2
source                  1..7
                        mol_type = protein
                        organism = synthetic construct
SEQUENCE: 12
ASNMRVI                                                                            7

SEQ ID NO: 13           moltype = AA  length = 7
FEATURE                 Location/Qualifiers
REGION                  1..7
                        note = LCDR2-3
source                  1..7
                        mol_type = protein
                        organism = synthetic construct
SEQUENCE: 13
ASNMRVL                                                                            7

SEQ ID NO: 14           moltype = AA  length = 7
FEATURE                 Location/Qualifiers
REGION                  1..7
                        note = LCDR2-4
source                  1..7
                        mol_type = protein
                        organism = synthetic construct
SEQUENCE: 14
ASNMRGS                                                                            7

SEQ ID NO: 15           moltype = AA  length = 7
FEATURE                 Location/Qualifiers
REGION                  1..7
                        note = LCDR2-5
source                  1..7
                        mol_type = protein
                        organism = synthetic construct
SEQUENCE: 15
ASNMRVS                                                                            7

SEQ ID NO: 16           moltype = AA  length = 7
FEATURE                 Location/Qualifiers
REGION                  1..7
                        note = LCDR2-6
source                  1..7
                        mol_type = protein
                        organism = synthetic construct
SEQUENCE: 16
ASNMRGL                                                                            7

SEQ ID NO: 17           moltype = AA  length = 7
FEATURE                 Location/Qualifiers
REGION                  1..7
```

```
                        note = LCDR2-7
source                  1..7
                        mol_type = protein
                        organism = synthetic construct
SEQUENCE: 17
ASNMRRS                                                                 7

SEQ ID NO: 18           moltype = AA  length = 7
FEATURE                 Location/Qualifiers
REGION                  1..7
                        note = LCDR2-8
source                  1..7
                        mol_type = protein
                        organism = synthetic construct
SEQUENCE: 18
ASNMRRP                                                                 7

SEQ ID NO: 19           moltype = AA  length = 7
FEATURE                 Location/Qualifiers
REGION                  1..7
                        note = LCDR2-9
source                  1..7
                        mol_type = protein
                        organism = synthetic construct
SEQUENCE: 19
ASNMRRM                                                                 7

SEQ ID NO: 20           moltype = AA  length = 7
FEATURE                 Location/Qualifiers
REGION                  1..7
                        note = LCDR2-10
source                  1..7
                        mol_type = protein
                        organism = synthetic construct
SEQUENCE: 20
ASNMRRL                                                                 7

SEQ ID NO: 21           moltype = AA  length = 7
FEATURE                 Location/Qualifiers
REGION                  1..7
                        note = LCDR2-11
source                  1..7
                        mol_type = protein
                        organism = synthetic construct
SEQUENCE: 21
ASNMRGM                                                                 7

SEQ ID NO: 22           moltype = AA  length = 9
FEATURE                 Location/Qualifiers
REGION                  1..9
                        note = LCDR3-1
source                  1..9
                        mol_type = protein
                        organism = synthetic construct
SEQUENCE: 22
QTYDSSRWV                                                               9

SEQ ID NO: 23           moltype = AA  length = 9
FEATURE                 Location/Qualifiers
REGION                  1..9
                        note = LCDR3-2
source                  1..9
                        mol_type = protein
                        organism = synthetic construct
SEQUENCE: 23
QSYDSSRWV                                                               9

SEQ ID NO: 24           moltype = AA  length = 9
FEATURE                 Location/Qualifiers
REGION                  1..9
                        note = LCDR3-3
source                  1..9
                        mol_type = protein
                        organism = synthetic construct
SEQUENCE: 24
QSYDSRRWV                                                               9

SEQ ID NO: 25           moltype = AA  length = 11
FEATURE                 Location/Qualifiers
```

```
REGION                   1..11
                         note = LCDR3-4
source                   1..11
                         mol_type = protein
                         organism = synthetic construct
SEQUENCE: 25
GAWDDSQKAL V                                                                      11

SEQ ID NO: 26            moltype = AA   length = 11
FEATURE                  Location/Qualifiers
REGION                   1..11
                         note = LCDR3-5
source                   1..11
                         mol_type = protein
                         organism = synthetic construct
SEQUENCE: 26
AAWDDSQKAW V                                                                      11

SEQ ID NO: 27            moltype = AA   length = 11
FEATURE                  Location/Qualifiers
REGION                   1..11
                         note = LCDR3-6
source                   1..11
                         mol_type = protein
                         organism = synthetic construct
SEQUENCE: 27
WAWDDSQKAV V                                                                      11

SEQ ID NO: 28            moltype = AA   length = 11
FEATURE                  Location/Qualifiers
REGION                   1..11
                         note = LCDR3-7
source                   1..11
                         mol_type = protein
                         organism = synthetic construct
SEQUENCE: 28
EAWDDSQKGV V                                                                      11

SEQ ID NO: 29            moltype = AA   length = 11
FEATURE                  Location/Qualifiers
REGION                   1..11
                         note = LCDR3-8
source                   1..11
                         mol_type = protein
                         organism = synthetic construct
SEQUENCE: 29
GAWDDSQKRY V                                                                      11

SEQ ID NO: 30            moltype = AA   length = 11
FEATURE                  Location/Qualifiers
REGION                   1..11
                         note = LCDR3-9
source                   1..11
                         mol_type = protein
                         organism = synthetic construct
SEQUENCE: 30
AAWDDSQKGQ V                                                                      11

SEQ ID NO: 31            moltype = AA   length = 11
FEATURE                  Location/Qualifiers
REGION                   1..11
                         note = LCDR3-10
source                   1..11
                         mol_type = protein
                         organism = synthetic construct
SEQUENCE: 31
AAWDDSQKVV V                                                                      11

SEQ ID NO: 32            moltype = AA   length = 11
FEATURE                  Location/Qualifiers
REGION                   1..11
                         note = LCDR3-11
source                   1..11
                         mol_type = protein
                         organism = synthetic construct
SEQUENCE: 32
WAWDDSQKVG V                                                                      11

SEQ ID NO: 33            moltype = AA   length = 11
```

```
                           -continued

FEATURE                 Location/Qualifiers
REGION                  1..11
                        note = LCDR3-12
source                  1..11
                        mol_type = protein
                        organism = synthetic construct
SEQUENCE: 33
GAWDDSQKVF V                                                              11

SEQ ID NO: 34           moltype = AA  length = 11
FEATURE                 Location/Qualifiers
REGION                  1..11
                        note = LCDR3-13
source                  1..11
                        mol_type = protein
                        organism = synthetic construct
SEQUENCE: 34
SAWDDSQKVV V                                                              11

SEQ ID NO: 35           moltype = AA  length = 11
FEATURE                 Location/Qualifiers
REGION                  1..11
                        note = LCDR3-14
source                  1..11
                        mol_type = protein
                        organism = synthetic construct
SEQUENCE: 35
EAWDDSQKAV V                                                              11

SEQ ID NO: 36           moltype = AA  length = 11
FEATURE                 Location/Qualifiers
REGION                  1..11
                        note = LCDR3-15
source                  1..11
                        mol_type = protein
                        organism = synthetic construct
SEQUENCE: 36
AAWDDSQKAF V                                                              11

SEQ ID NO: 37           moltype = AA  length = 11
FEATURE                 Location/Qualifiers
REGION                  1..11
                        note = LCDR3-16
source                  1..11
                        mol_type = protein
                        organism = synthetic construct
SEQUENCE: 37
AAWDDSQKVF V                                                              11

SEQ ID NO: 38           moltype = AA  length = 11
FEATURE                 Location/Qualifiers
REGION                  1..11
                        note = LCDR3-17
source                  1..11
                        mol_type = protein
                        organism = synthetic construct
SEQUENCE: 38
GAWDDSQKAF V                                                              11

SEQ ID NO: 39           moltype = AA  length = 11
FEATURE                 Location/Qualifiers
REGION                  1..11
                        note = LCDR3-18
source                  1..11
                        mol_type = protein
                        organism = synthetic construct
SEQUENCE: 39
GAWDDSQKVV V                                                              11

SEQ ID NO: 40           moltype = AA  length = 11
FEATURE                 Location/Qualifiers
REGION                  1..11
                        note = LCDR3-19
source                  1..11
                        mol_type = protein
                        organism = synthetic construct
SEQUENCE: 40
AAWDDSQKAV V                                                              11
```

```
SEQ ID NO: 41            moltype = AA   length = 11
FEATURE                  Location/Qualifiers
REGION                   1..11
                         note = LCDR3-20
source                   1..11
                         mol_type = protein
                         organism = synthetic construct
SEQUENCE: 41
SAWDDSQKAG V                                                                    11

SEQ ID NO: 42            moltype = AA   length = 11
FEATURE                  Location/Qualifiers
REGION                   1..11
                         note = LCDR3-21
source                   1..11
                         mol_type = protein
                         organism = synthetic construct
SEQUENCE: 42
AAWDDSQKAL V                                                                    11

SEQ ID NO: 43            moltype = AA   length = 5
FEATURE                  Location/Qualifiers
REGION                   1..5
                         note = HCDR1-1
source                   1..5
                         mol_type = protein
                         organism = synthetic construct
SEQUENCE: 43
DYYMN                                                                            5

SEQ ID NO: 44            moltype = AA   length = 5
FEATURE                  Location/Qualifiers
REGION                   1..5
                         note = HCDR1-2
source                   1..5
                         mol_type = protein
                         organism = synthetic construct
SEQUENCE: 44
DYYMD                                                                            5

SEQ ID NO: 45            moltype = AA   length = 5
FEATURE                  Location/Qualifiers
REGION                   1..5
                         note = HCDR1-3
source                   1..5
                         mol_type = protein
                         organism = synthetic construct
SEQUENCE: 45
VYYMN                                                                            5

SEQ ID NO: 46            moltype = AA   length = 5
FEATURE                  Location/Qualifiers
REGION                   1..5
                         note = HCDR1-4
source                   1..5
                         mol_type = protein
                         organism = synthetic construct
SEQUENCE: 46
DYYVN                                                                            5

SEQ ID NO: 47            moltype = AA   length = 5
FEATURE                  Location/Qualifiers
REGION                   1..5
                         note = HCDR1-5
source                   1..5
                         mol_type = protein
                         organism = synthetic construct
SEQUENCE: 47
NYYMH                                                                            5

SEQ ID NO: 48            moltype = AA   length = 5
FEATURE                  Location/Qualifiers
REGION                   1..5
                         note = HCDR1-6
source                   1..5
                         mol_type = protein
                         organism = synthetic construct
SEQUENCE: 48
HYYMH                                                                            5
```

```
SEQ ID NO: 49            moltype = AA   length = 5
FEATURE                  Location/Qualifiers
REGION                   1..5
                         note = HCDR1-7
source                   1..5
                         mol_type = protein
                         organism = synthetic construct
SEQUENCE: 49
RYYMH                                                                        5

SEQ ID NO: 50            moltype = AA   length = 5
FEATURE                  Location/Qualifiers
REGION                   1..5
                         note = HCDR1-8
source                   1..5
                         mol_type = protein
                         organism = synthetic construct
SEQUENCE: 50
SYYMH                                                                        5

SEQ ID NO: 51            moltype = AA   length = 17
FEATURE                  Location/Qualifiers
REGION                   1..17
                         note = HCDR2-1
source                   1..17
                         mol_type = protein
                         organism = synthetic construct
SEQUENCE: 51
SISRYSSYIY YADSVKG                                                          17

SEQ ID NO: 52            moltype = AA   length = 17
FEATURE                  Location/Qualifiers
REGION                   1..17
                         note = HCDR2-2
source                   1..17
                         mol_type = protein
                         organism = synthetic construct
SEQUENCE: 52
SISRYSGYVY YADSVKG                                                          17

SEQ ID NO: 53            moltype = AA   length = 17
FEATURE                  Location/Qualifiers
REGION                   1..17
                         note = HCDR2-3
source                   1..17
                         mol_type = protein
                         organism = synthetic construct
SEQUENCE: 53
SISRASSYVY YADSVKG                                                          17

SEQ ID NO: 54            moltype = AA   length = 17
FEATURE                  Location/Qualifiers
REGION                   1..17
                         note = HCDR2-4
source                   1..17
                         mol_type = protein
                         organism = synthetic construct
SEQUENCE: 54
SISRYSGYIY YADSVKG                                                          17

SEQ ID NO: 55            moltype = AA   length = 17
FEATURE                  Location/Qualifiers
REGION                   1..17
                         note = HCDR2-5
source                   1..17
                         mol_type = protein
                         organism = synthetic construct
SEQUENCE: 55
SISARSRYHY YADSVKG                                                          17

SEQ ID NO: 56            moltype = AA   length = 17
FEATURE                  Location/Qualifiers
REGION                   1..17
                         note = HCDR2-6
source                   1..17
                         mol_type = protein
                         organism = synthetic construct
SEQUENCE: 56
```

```
SISARSSYIY YADSVKG                                                    17

SEQ ID NO: 57         moltype = AA   length = 17
FEATURE               Location/Qualifiers
REGION                1..17
                      note = HCDR2-7
source                1..17
                      mol_type = protein
                      organism = synthetic construct
SEQUENCE: 57
SISALSSYIY YADSVRG                                                    17

SEQ ID NO: 58         moltype = AA   length = 17
FEATURE               Location/Qualifiers
REGION                1..17
                      note = HCDR2-8
source                1..17
                      mol_type = protein
                      organism = synthetic construct
SEQUENCE: 58
SISAQSSHIY YADSVEG                                                    17

SEQ ID NO: 59         moltype = AA   length = 17
FEATURE               Location/Qualifiers
REGION                1..17
                      note = HCDR2-9
source                1..17
                      mol_type = protein
                      organism = synthetic construct
SEQUENCE: 59
SISARSSYLY YADSVKG                                                    17

SEQ ID NO: 60         moltype = AA   length = 17
FEATURE               Location/Qualifiers
REGION                1..17
                      note = HCDR2-10
source                1..17
                      mol_type = protein
                      organism = synthetic construct
SEQUENCE: 60
SISARSSYRY YADSVKG                                                    17

SEQ ID NO: 61         moltype = AA   length = 17
FEATURE               Location/Qualifiers
REGION                1..17
                      note = HCDR2-11
source                1..17
                      mol_type = protein
                      organism = synthetic construct
SEQUENCE: 61
SISARSSYIY YAGSVKG                                                    17

SEQ ID NO: 62         moltype = AA   length = 17
FEATURE               Location/Qualifiers
REGION                1..17
                      note = HCDR2-12
source                1..17
                      mol_type = protein
                      organism = synthetic construct
SEQUENCE: 62
SISSRSSHQY YAGSVKG                                                    17

SEQ ID NO: 63         moltype = AA   length = 17
FEATURE               Location/Qualifiers
REGION                1..17
                      note = HCDR2-13
source                1..17
                      mol_type = protein
                      organism = synthetic construct
SEQUENCE: 63
SISALSSYRY YADSVKG                                                    17

SEQ ID NO: 64         moltype = AA   length = 17
FEATURE               Location/Qualifiers
REGION                1..17
                      note = HCDR2-14
source                1..17
                      mol_type = protein
                      organism = synthetic construct
```

```
SEQUENCE: 64
SISSSSSYIY YADSVKG                                                    17

SEQ ID NO: 65          moltype = AA  length = 7
FEATURE                Location/Qualifiers
REGION                 1..7
                       note = HCDR3-1
source                 1..7
                       mol_type = protein
                       organism = synthetic construct
SEQUENCE: 65
DIGGMDV                                                                7

SEQ ID NO: 66          moltype = AA  length = 10
FEATURE                Location/Qualifiers
REGION                 1..10
                       note = HCDR3-2
source                 1..10
                       mol_type = protein
                       organism = synthetic construct
SEQUENCE: 66
LATRHNAFDI                                                            10

SEQ ID NO: 67          moltype = AA  length = 10
FEATURE                Location/Qualifiers
REGION                 1..10
                       note = HCDR3-3
source                 1..10
                       mol_type = protein
                       organism = synthetic construct
SEQUENCE: 67
LATRNNAFDI                                                            10

SEQ ID NO: 68          moltype = AA  length = 10
FEATURE                Location/Qualifiers
REGION                 1..10
                       note = HCDR3-4
source                 1..10
                       mol_type = protein
                       organism = synthetic construct
SEQUENCE: 68
LATRRDAFDI                                                            10

SEQ ID NO: 69          moltype = AA  length = 10
FEATURE                Location/Qualifiers
REGION                 1..10
                       note = HCDR3-5
source                 1..10
                       mol_type = protein
                       organism = synthetic construct
SEQUENCE: 69
LATRQNAFDI                                                            10

SEQ ID NO: 70          moltype = AA  length = 10
FEATURE                Location/Qualifiers
REGION                 1..10
                       note = HCDR3-6
source                 1..10
                       mol_type = protein
                       organism = synthetic construct
SEQUENCE: 70
LATRHVAFDI                                                            10

SEQ ID NO: 71          moltype = AA  length = 10
FEATURE                Location/Qualifiers
REGION                 1..10
                       note = HCDR3-7
source                 1..10
                       mol_type = protein
                       organism = synthetic construct
SEQUENCE: 71
LATRHGAFDI                                                            10

SEQ ID NO: 72          moltype = AA  length = 10
FEATURE                Location/Qualifiers
REGION                 1..10
                       note = HCDR3-8
source                 1..10
                       mol_type = protein
```

```
                        organism = synthetic construct
SEQUENCE: 72
LATRHLAFDI                                                                    10

SEQ ID NO: 73           moltype = AA  length = 10
FEATURE                 Location/Qualifiers
REGION                  1..10
                        note = HCDR3-9
source                  1..10
                        mol_type = protein
                        organism = synthetic construct
SEQUENCE: 73
LATRHSAFDI                                                                    10

SEQ ID NO: 74           moltype = AA  length = 10
FEATURE                 Location/Qualifiers
REGION                  1..10
                        note = HCDR3-10
source                  1..10
                        mol_type = protein
                        organism = synthetic construct
SEQUENCE: 74
LGTRRVAFDI                                                                    10

SEQ ID NO: 75           moltype = AA  length = 10
FEATURE                 Location/Qualifiers
REGION                  1..10
                        note = HCDR3-11
source                  1..10
                        mol_type = protein
                        organism = synthetic construct
SEQUENCE: 75
LGLRHDAFDI                                                                    10

SEQ ID NO: 76           moltype = AA  length = 10
FEATURE                 Location/Qualifiers
REGION                  1..10
                        note = HCDR3-12
source                  1..10
                        mol_type = protein
                        organism = synthetic construct
SEQUENCE: 76
LATRRIAFDI                                                                    10

SEQ ID NO: 77           moltype = AA  length = 10
FEATURE                 Location/Qualifiers
REGION                  1..10
                        note = HCDR3-13
source                  1..10
                        mol_type = protein
                        organism = synthetic construct
SEQUENCE: 77
LATRRVAFDI                                                                    10

SEQ ID NO: 78           moltype = AA  length = 10
FEATURE                 Location/Qualifiers
REGION                  1..10
                        note = HCDR3-14
source                  1..10
                        mol_type = protein
                        organism = synthetic construct
SEQUENCE: 78
LGTRHDAFDI                                                                    10

SEQ ID NO: 79           moltype = AA  length = 109
FEATURE                 Location/Qualifiers
REGION                  1..109
                        note = VL-1
source                  1..109
                        mol_type = protein
                        organism = synthetic construct
SEQUENCE: 79
QSVLTQPPSA SGTPGQRVTI SCTGSSSNIG AVYDVHWYQQ LPGTAPKLLI YRNNQRPSGV              60
PDRFSGSKSG TSASLAISGL RSEDEADYYC QTYDSSRWVF GGGTKLTVL                         109

SEQ ID NO: 80           moltype = AA  length = 109
FEATURE                 Location/Qualifiers
REGION                  1..109
                        note = VL-2
```

```
                        source          1..109
                                        mol_type = protein
                                        organism = synthetic construct
SEQUENCE: 80
QSVLTQPPSA SGTPGQRVTI SCTGSSSNIG AVYDVHWYQQ LPGTAPKLLI YRNNQRPSGV    60
PDRFSGSKSG TSASLAISGL RSEDEADYYC QSYDSSRWVF GGGTKLTVL               109

SEQ ID NO: 81           moltype = AA  length = 109
FEATURE                 Location/Qualifiers
REGION                  1..109
                        note = VL-3
source                  1..109
                        mol_type = protein
                        organism = synthetic construct
SEQUENCE: 81
QSVLTQPPSA SGTPGQRVTI SCTGSSSNIG AVYNVHWYQQ LPGTAPKLLI YRNNQRPSGV    60
PDRFSGSKSG TSASLAISGL RSEDEADYYC QSYDSSRWVF GGGTKLTVL               109

SEQ ID NO: 82           moltype = AA  length = 109
FEATURE                 Location/Qualifiers
REGION                  1..109
                        note = VL-4
source                  1..109
                        mol_type = protein
                        organism = synthetic construct
SEQUENCE: 82
QSVLTQPPSA SGTPGQRVTI SCTGSSSNIG AVYNVHWYQQ LPGTAPKLLI YRNNQRPSGV    60
PDRFSGSKSG TSASLAISGL RSEDEADYYC QSYDSRRWVF GGGTKLTVL               109

SEQ ID NO: 83           moltype = AA  length = 110
FEATURE                 Location/Qualifiers
REGION                  1..110
                        note = VL-5
source                  1..110
                        mol_type = protein
                        organism = synthetic construct
SEQUENCE: 83
QSVLTQPPSA SGTPGQRVTI SCSGSSSNIG NNAVSWYQQL PGTAPKLLIY ASNMRVIGVP    60
DRFSGSKSGT SASLAISGLR SEDEADYYCG AWDDSQKALV FGGGTKLTVL              110

SEQ ID NO: 84           moltype = AA  length = 110
FEATURE                 Location/Qualifiers
REGION                  1..110
                        note = VL-6
source                  1..110
                        mol_type = protein
                        organism = synthetic construct
SEQUENCE: 84
QSVLTQPPSA SGTPGQRVTI SCSGSSSNIG RNAVNWYQQL PGTAPKLLIY ASNMRVIGVP    60
DRFSGSKSGT SASLAISGLR SEDEADYYCA AWDDSQKAWV FGGGTKLTVL              110

SEQ ID NO: 85           moltype = AA  length = 110
FEATURE                 Location/Qualifiers
REGION                  1..110
                        note = VL-7
source                  1..110
                        mol_type = protein
                        organism = synthetic construct
SEQUENCE: 85
QSVLTQPPSA SGTPGQRVTI SCSGSSSNIG RNAVNWYQQL PGTAPKLLIY ASNMRVLGVP    60
DRFSGSKSGT SASLAISGLR SEDEADYYCW AWDDSQKAVV FGGGTKLTVL              110

SEQ ID NO: 86           moltype = AA  length = 110
FEATURE                 Location/Qualifiers
REGION                  1..110
                        note = VL-8
source                  1..110
                        mol_type = protein
                        organism = synthetic construct
SEQUENCE: 86
QSVLTQPPSA SGTPGQRVTI SCSGSCSNIG RNAVNWYQQL PGTAPKLLIY ASNMRVIGVP    60
DRFSGSKSGT SASLAISGLR SEDEADYYCE AWDDSQKGVV FGGGTKLTVL              110

SEQ ID NO: 87           moltype = AA  length = 110
FEATURE                 Location/Qualifiers
REGION                  1..110
                        note = VL-9
source                  1..110
                        mol_type = protein
```

```
                        organism = synthetic construct
SEQUENCE: 87
QSVLTQPPSA SGTPGQRVTI SCSGSSSNIG RNAVNWYQQL PGTAPKLLIY ASNMRVIGVP    60
DRFSGSKSGT SASLAISGLR SEDEADYYCG AWDDSQKRYV FGGGTKLTVL             110

SEQ ID NO: 88           moltype = AA   length = 110
FEATURE                 Location/Qualifiers
REGION                  1..110
                        note = VL-10
source                  1..110
                        mol_type = protein
                        organism = synthetic construct
SEQUENCE: 88
QSVLTQPPSA SGTPGQRVTI SCSGSSSNIG NNAVNWYQQL PGTAPKLLIY ASNMRGSGVP    60
DRFSGSKSGT SASLAISGLR SEDEADYYCA AWDDSQKGQV FGGGTKLTVL             110

SEQ ID NO: 89           moltype = AA   length = 110
FEATURE                 Location/Qualifiers
REGION                  1..110
                        note = VL-11
source                  1..110
                        mol_type = protein
                        organism = synthetic construct
SEQUENCE: 89
QSVLTQPPSA SGTPGQRVTI SCSGSSSNIG SNAVSWYQQL PGTAPKLLIY ASNMRGSGVP    60
DRFSGSKSGT SASLAISGLR SEDEADYYCA AWDDSQKVVV FGGGTKLTVL             110

SEQ ID NO: 90           moltype = AA   length = 110
FEATURE                 Location/Qualifiers
REGION                  1..110
                        note = VL-12
source                  1..110
                        mol_type = protein
                        organism = synthetic construct
SEQUENCE: 90
QSVLTQPPSA SGTPGQRVTI SCSGSSSNIG RNAVNWYQQL PGTAPKLLIY ASNMRVSGVP    60
DRFSGSKSGT SASLAISGLR SEDEADYYCW AWDDSQKVGV FGGGTKLTVL             110

SEQ ID NO: 91           moltype = AA   length = 110
FEATURE                 Location/Qualifiers
REGION                  1..110
                        note = VL-13
source                  1..110
                        mol_type = protein
                        organism = synthetic construct
SEQUENCE: 91
QSVLTQPPSA SGTPGQRVTI SCSGSSSNIG NNAVNWYQQL PGTAPKLLIY ASNMRGLGVP    60
DRFSGSKSGT SASLAISGLR SEDEADYYCG AWDDSQKVFV FGGGTKLTVL             110

SEQ ID NO: 92           moltype = AA   length = 110
FEATURE                 Location/Qualifiers
REGION                  1..110
                        note = VL-14
source                  1..110
                        mol_type = protein
                        organism = synthetic construct
SEQUENCE: 92
QSVLTQPPSA SGTPGQRVTI SCSGSSSNIG RNAVNWYQQL PGTAPKLLIY ASNMRRSGVP    60
DRFSGSKSGT SASLAISGLR SEDEADYYCS AWDDSQKVVV FGGGTKLTVL             110

SEQ ID NO: 93           moltype = AA   length = 110
FEATURE                 Location/Qualifiers
REGION                  1..110
                        note = VL-15
source                  1..110
                        mol_type = protein
                        organism = synthetic construct
SEQUENCE: 93
QSVLTQPPSA SGTPGQRVTI SCSGSSSNIG NNAVNWYQQL PGTAPKLLIY ASNMRRPGVP    60
DRFSGSKSGT SASLAISGLR SEDEADYYCE AWDDSQKAVV FGGGTKLTVL             110

SEQ ID NO: 94           moltype = AA   length = 110
FEATURE                 Location/Qualifiers
REGION                  1..110
                        note = VL-16
source                  1..110
                        mol_type = protein
                        organism = synthetic construct
SEQUENCE: 94
```

```
QSVLTQPPSA SGTPGQRVTI SCSGSSSNIG NNAVNWYQQL PGTAPKLLIY ASNMRRMGVP    60
DRFSGSKSGT SASLAISGLR SEDEADYYCA AWDDSQKAFV FGGGTKLTVL             110

SEQ ID NO: 95           moltype = AA  length = 110
FEATURE                 Location/Qualifiers
REGION                  1..110
                        note = VL-17
source                  1..110
                        mol_type = protein
                        organism = synthetic construct
SEQUENCE: 95
QSVLTQPPSA SGTPGQRVTI SCSGSSSNIG NNAVNWYQQL PGTAPKLLIY ASNMRRLGVP    60
DRFSGSKSGT SASLAISGLR SEDEADYYCA AWDDSQKAWV FGGGTKLTVL             110

SEQ ID NO: 96           moltype = AA  length = 110
FEATURE                 Location/Qualifiers
REGION                  1..110
                        note = VL-18
source                  1..110
                        mol_type = protein
                        organism = synthetic construct
SEQUENCE: 96
QSVLTQPPSA SGTPGQRVTI SCSGSSSNIG NNAVNWYQQL PGTAPKLLIY ASNMRRPGVP    60
DRFSGSKSGT SASLAISGLR SEDEADYYCA AWDDSQKVFV FGGGTKLTVL             110

SEQ ID NO: 97           moltype = AA  length = 110
FEATURE                 Location/Qualifiers
REGION                  1..110
                        note = VL-19
source                  1..110
                        mol_type = protein
                        organism = synthetic construct
SEQUENCE: 97
QSVLTQPPSA SGTPGQRVTI SCSGSSSNIG NNAVNWYQQL PGTAPKLLIY ASNMRRLGVP    60
DRFSGSKSGT SASLAISGLR SEDEADYYCG AWDDSQKAFV FGGGTKLTVL             110

SEQ ID NO: 98           moltype = AA  length = 110
FEATURE                 Location/Qualifiers
REGION                  1..110
                        note = VL-20
source                  1..110
                        mol_type = protein
                        organism = synthetic construct
SEQUENCE: 98
QSVLTQPPSA SGTPGQRVTI SCSGSSSNIG RNAVSWYQQL PGTAPKLLIY ASNMRRLGVP    60
DRFSGSKSGT SASLAISGLR SEDEADYYCW AWDDSQKAVV FGGGTKLTVL             110

SEQ ID NO: 99           moltype = AA  length = 110
FEATURE                 Location/Qualifiers
REGION                  1..110
                        note = VL-21
source                  1..110
                        mol_type = protein
                        organism = synthetic construct
SEQUENCE: 99
QSVLTQPPSA SGTPGQRVTI SCSGSSSNIG HNAVSWYQQL PGTAPKLLIY ASNMRRLGVP    60
DRFSGSKSGT SASLAISGLR SEDEADYYCG AWDDSQKVVV FGGGTKLTVL             110

SEQ ID NO: 100          moltype = AA  length = 110
FEATURE                 Location/Qualifiers
REGION                  1..110
                        note = VL-22
source                  1..110
                        mol_type = protein
                        organism = synthetic construct
SEQUENCE: 100
QSVLTQPPSA SGTPGQRVTI SCSGSSSNIG RNAVNWYQQL PGTAPKLLIY ASNMRGMGVP    60
DRFSGSKSGT SASLAISGLR SEDEADYYCS AWDDSQKVVV FGGGTKLTVL             110

SEQ ID NO: 101          moltype = AA  length = 110
FEATURE                 Location/Qualifiers
REGION                  1..110
                        note = VL-23
source                  1..110
                        mol_type = protein
                        organism = synthetic construct
SEQUENCE: 101
QSVLTQPPSA SGTPGQRVTI SCSGSSSNIG HNAVWWYQQL PGTAPKLLIY ASNMRRMGVP    60
DRFSGSKSGT SASLAISGLR SEDEADYYCA AWDDSQKAVV FGGGTKLTVL             110
```

```
SEQ ID NO: 102          moltype = AA   length = 110
FEATURE                 Location/Qualifiers
REGION                  1..110
                        note = VL-24
source                  1..110
                        mol_type = protein
                        organism = synthetic construct
SEQUENCE: 102
QSVLTQPPSA SGTPGQRVTI SCSGSSSNIG RNAVNWYQQL PGTAPKLLIY ASNMRRPGVP   60
DRFSGSKSGT SASLAISGLR SEDEADYYCS AWDDSQKAGV FGGGTKLTVL             110

SEQ ID NO: 103          moltype = AA   length = 110
FEATURE                 Location/Qualifiers
REGION                  1..110
                        note = VL-25
source                  1..110
                        mol_type = protein
                        organism = synthetic construct
SEQUENCE: 103
QSVLTQPPSA SGTPGQRVTI SCSGSSSNIG NNAVNWYQQL PGTAPKLLIY ASNMRRLGVP   60
DRFSGSKSGT SASLAISGLR SEDEADYYCA AWDDSQKALV FGGGTKLTVL              110

SEQ ID NO: 104          moltype = AA   length = 110
FEATURE                 Location/Qualifiers
REGION                  1..110
                        note = VL-26
source                  1..110
                        mol_type = protein
                        organism = synthetic construct
SEQUENCE: 104
QSVLTQPPSA SGTPGQRVTI SCSGSSSNIG NNAVNWYQQL PGTAPKLLIY ASNMRRLGVP   60
DRFSGSKSGT SASLAISGLR SEDEADYYCA AWDDSQKAVV FGGGTKLTVL              110

SEQ ID NO: 105          moltype = AA   length = 116
FEATURE                 Location/Qualifiers
REGION                  1..116
                        note = VH-1
source                  1..116
                        mol_type = protein
                        organism = synthetic construct
SEQUENCE: 105
EVQLLESGGG LVQPGGSLRL SCAASGFTFS DYYMNWVRQA PGKGLEWVSS ISRYSSYIYY   60
ADSVKGRFTI SRDNSKNTLY LQMNSLRAED TAVYYCARDI GGMDVWGQGT LVTVSS      116

SEQ ID NO: 106          moltype = AA   length = 116
FEATURE                 Location/Qualifiers
REGION                  1..116
                        note = VH-2
source                  1..116
                        mol_type = protein
                        organism = synthetic construct
SEQUENCE: 106
EVQLLESGGG LVQPGGSLRL SCAASGFTFS DYYMNWVRQA PGKGLEWVSS ISRYSGYVYY   60
ADSVKGRFTI SRDNSKNTLY LQMNSLRAED TAVYYCARDI GGMDVWGQGT LVTVSS      116

SEQ ID NO: 107          moltype = AA   length = 116
FEATURE                 Location/Qualifiers
REGION                  1..116
                        note = VH-3
source                  1..116
                        mol_type = protein
                        organism = synthetic construct
SEQUENCE: 107
EVQLLESGGG LVQPGGSLRL SCAASGFTFS DYYMDWVRQA PGKGLEWVSS ISRYSGYVYY   60
ADSVKGRFTI SRDNSKNTLY LQMNSLRAED TAVYYCARDI GGMDVWGQGT LVTVSS      116

SEQ ID NO: 108          moltype = AA   length = 116
FEATURE                 Location/Qualifiers
REGION                  1..116
                        note = VH-4
source                  1..116
                        mol_type = protein
                        organism = synthetic construct
SEQUENCE: 108
EVQLLESGGG LVQPGGSLRL SCAASGFTFS DYYMDWVRQA PGKGLEWVSS ISRASSYVYY   60
ADSVKGRFTI SRDNSKNTLY LQMNSLRAED TAVYYCARDI GGMDVWGQGT LVTVSS      116

SEQ ID NO: 109          moltype = AA   length = 116
```

```
FEATURE                 Location/Qualifiers
REGION                  1..116
                        note = VH-5
source                  1..116
                        mol_type = protein
                        organism = synthetic construct
SEQUENCE: 109
EVQLLESGGG LVQPGGSLRL SCAASGFTFS DYYMNWVRQA PGKGLEWVSS ISRYSGYIYY    60
ADSVKGRFTI SRDNSKNTLY LQMNSLRAED TAVYYCARDI GGMDVWGQGT LVTVSS       116

SEQ ID NO: 110          moltype = AA  length = 116
FEATURE                 Location/Qualifiers
REGION                  1..116
                        note = VH-6
source                  1..116
                        mol_type = protein
                        organism = synthetic construct
SEQUENCE: 110
EVQLLESGGG LVQPGGSLRL SCAASGFTFS VYYMNWVRQA PGKGLEWVSS ISRYSGYVYY    60
ADSVKGRFTI SRDNSKNTLY LQMNSLRAED TAVYYCARDI GGMDVWGQGT LVTVSS       116

SEQ ID NO: 111          moltype = AA  length = 116
FEATURE                 Location/Qualifiers
REGION                  1..116
                        note = VH-7
source                  1..116
                        mol_type = protein
                        organism = synthetic construct
SEQUENCE: 111
EVQLLESGGG LVQPGGSLRL SCAASGFTFS DYYVNWVRQA PGKGLEWVSS ISRYSGYVYY    60
ADSVKGRFTI SRDNSKNTLY LQMNSLRAED TAVYYCARDI GGMDVWGQGT LVTVSS       116

SEQ ID NO: 112          moltype = AA  length = 119
FEATURE                 Location/Qualifiers
REGION                  1..119
                        note = VH-8
source                  1..119
                        mol_type = protein
                        organism = synthetic construct
SEQUENCE: 112
EVQLLESGGG LVQPGGSLRL SCAASGFTFS NYYMHWVRQA PGKGLEWVSS ISARSRYHYY    60
ADSVKGRFTI SRDNSKNTLY LQMNSLRAED TAVYYCARLA TRHNAFDIWG QGTLVTVSS    119

SEQ ID NO: 113          moltype = AA  length = 119
FEATURE                 Location/Qualifiers
REGION                  1..119
                        note = VH-9
source                  1..119
                        mol_type = protein
                        organism = synthetic construct
SEQUENCE: 113
EVQLLESGGG LVQPGGSLRL SCAASGFTFS NYYMHWVRQA PGKGLEWVSS ISARSSYIYY    60
ADSVKGRFTI SRDNSKNTLY LQMNSLRAED TAVYYCARLA TRNNAFDIWG QGTLVTVSS    119

SEQ ID NO: 114          moltype = AA  length = 119
FEATURE                 Location/Qualifiers
REGION                  1..119
                        note = VH-10
source                  1..119
                        mol_type = protein
                        organism = synthetic construct
SEQUENCE: 114
EVQLLESGGG LVQPGGSLRL SCAASGFTFS HYYMHWVRQA PGKGLEWVSS ISALSSYIYY    60
ADSVRGRFTI SRDNSKNTLY LQMNSLRAED TAVYYCARLA TRRDAFDIWG QGTLVTVSS    119

SEQ ID NO: 115          moltype = AA  length = 119
FEATURE                 Location/Qualifiers
REGION                  1..119
                        note = VH-11
source                  1..119
                        mol_type = protein
                        organism = synthetic construct
SEQUENCE: 115
EVQLLESGGG LVQPGGSLRL SCAASGFTFS RYYMHWVRQA PGKGLEWVSS ISAQSSHIYY    60
ADSVEGRFTI SRDNSKNTLY LQMNSLRAED TAVYYCARLA TRQNAFDIWG QGTLVTVSS    119

SEQ ID NO: 116          moltype = AA  length = 119
FEATURE                 Location/Qualifiers
REGION                  1..119
```

```
                        note = VH-12
source                  1..119
                        mol_type = protein
                        organism = synthetic construct
SEQUENCE: 116
EVQLLESGGG LVQPGGSLRL SCAASGFTFS NYYMHWVRQA PGKGLEWVSS ISARSSYLYY    60
ADSVKGRFTI SRDNSKNTLY LQMNSLRAED TAVYYCARLA TRHVAFDIWG QGTLVTVSS    119

SEQ ID NO: 117          moltype = AA  length = 119
FEATURE                 Location/Qualifiers
REGION                  1..119
                        note = VH-13
source                  1..119
                        mol_type = protein
                        organism = synthetic construct
SEQUENCE: 117
EVQLLESGGG LVQPGGSLRL SCAASGFTFS NYYMHWVRQA PGKGLEWVSS ISARSSYIYY    60
ADSVKGRFTI SRDNSKNTLY LQMNSLRAED TAVYYCARLA TRHGAFDIWG QGTLVTVSS    119

SEQ ID NO: 118          moltype = AA  length = 119
FEATURE                 Location/Qualifiers
REGION                  1..119
                        note = VH-14
source                  1..119
                        mol_type = protein
                        organism = synthetic construct
SEQUENCE: 118
EVQLLESGGG LVQPGGSLRL SCAASGFTFS NYYMHWVRQA PGKGLEWVSS ISARSSYIYY    60
ADSVKGRFTI SRDNSKNTLY LQMNSLRAED TAVYYCARLA TRHNAFDIWG QGTLVTVSS    119

SEQ ID NO: 119          moltype = AA  length = 119
FEATURE                 Location/Qualifiers
REGION                  1..119
                        note = VH-15
source                  1..119
                        mol_type = protein
                        organism = synthetic construct
SEQUENCE: 119
EVQLLESGGG LVQPGGSLRL SCAASGFTFS NYYMHWVRQA PGKGLEWVSS ISARSSYRYY    60
ADSVKGRFTI SRDNSKNTLY LQMNSLRAED TAVYYCARLA TRHLAFDIWG QGTLVTVSS    119

SEQ ID NO: 120          moltype = AA  length = 119
FEATURE                 Location/Qualifiers
REGION                  1..119
                        note = VH-16
source                  1..119
                        mol_type = protein
                        organism = synthetic construct
SEQUENCE: 120
EVQLLESGGG LVQPGGSLRL SCAASGFTFS NYYMHWVRQA PGKGLEWVSS ISARSSYIYY    60
ADSVKGRFTI SRDNSKNTLY LQMNSLRAED TAVYYCARLA TRHSAFDIWG QGTLVTVSS    119

SEQ ID NO: 121          moltype = AA  length = 119
FEATURE                 Location/Qualifiers
REGION                  1..119
                        note = VH-17
source                  1..119
                        mol_type = protein
                        organism = synthetic construct
SEQUENCE: 121
EVQLLESGGG LVQPGGSLRL SCAASGFTFS RYYMHWVRQA PGKGLEWVSS ISARSSYIYY    60
ADSVKGRFTI SRDNSKNTLY LQMNSLRAED TAVYYCARLA TRRDAFDIWG QGTLVTVSS    119

SEQ ID NO: 122          moltype = AA  length = 119
FEATURE                 Location/Qualifiers
REGION                  1..119
                        note = VH-18
source                  1..119
                        mol_type = protein
                        organism = synthetic construct
SEQUENCE: 122
EVQLLESGGG LVQPGGSLRL SCAASGFTFS NYYMHWVRQA PGKGLEWVSS ISARSSYRYY    60
ADSVKGRFTI SRDNSKNTLY LQMNSLRAED TAVYYCARLA TRHSAFDIWG QGTLVTVSS    119

SEQ ID NO: 123          moltype = AA  length = 119
FEATURE                 Location/Qualifiers
REGION                  1..119
                        note = VH-19
source                  1..119
```

```
                              mol_type = protein
                              organism = synthetic construct
SEQUENCE: 123
EVQLLESGGG LVQPGGSLRL SCAASGFTFS NYYMHWVRQA PGKGLEWVSS ISARSSYIYY    60
AGSVKGRFTI SRDNSKNTLY LQMNSLRAED TAVYYCARLG TRRVAFDIWG QGTLVTVSS    119

SEQ ID NO: 124           moltype = AA   length = 119
FEATURE                  Location/Qualifiers
REGION                   1..119
                         note = VH-20
source                   1..119
                         mol_type = protein
                         organism = synthetic construct
SEQUENCE: 124
EVQLLESGGG LVQPGGSLRL SCAASGFTFS NYYMHWVRQA PGKGLEWVSS ISSRSSHQYY    60
AGSVKGRFTI SRDNSKNTLY LQMNSLRAED TAVYYCARLG LRHDAFDIWG QGTLVTVSS   119

SEQ ID NO: 125           moltype = AA   length = 119
FEATURE                  Location/Qualifiers
REGION                   1..119
                         note = VH-21
source                   1..119
                         mol_type = protein
                         organism = synthetic construct
SEQUENCE: 125
EVQLLESGGG LVQPGGSLRL SCAASGFTFS SYYMHWVRQA PGKGLEWVSS ISARSSYIYY    60
ADSVKGRFTI SRDNSKNTLY LQMNSLRAED TAVYYCARLA TRRIAFDIWG QGTLVTVSS   119

SEQ ID NO: 126           moltype = AA   length = 119
FEATURE                  Location/Qualifiers
REGION                   1..119
                         note = VH-22
source                   1..119
                         mol_type = protein
                         organism = synthetic construct
SEQUENCE: 126
EVQLLESGGG LVQPGGSLRL SCAASGFTFS NYYMHWVRQA PGKGLEWVSS ISALSSYRYY    60
ADSVKGRFTI SRDNSKNTLY LQMNSLRAED TAVYYCARLA TRRVAFDIWG QGTLVTVSS   119

SEQ ID NO: 127           moltype = AA   length = 116
FEATURE                  Location/Qualifiers
REGION                   1..116
                         note = VH-23
source                   1..116
                         mol_type = protein
                         organism = synthetic construct
SEQUENCE: 127
EVQLLESGGG LVQPGGSLRL SCAASGFTFS DYYMNWVRQA PGKGLEWVSS ISSSSSYIYY    60
ADSVKGRFTI SRDNSKNTLY LQMNSLRAED TAVYYCARDI GGMDVWGQGT LVTVSS       116

SEQ ID NO: 128           moltype = AA   length = 119
FEATURE                  Location/Qualifiers
REGION                   1..119
                         note = VH-24
source                   1..119
                         mol_type = protein
                         organism = synthetic construct
SEQUENCE: 128
EVQLLESGGG LVQPGGSLRL SCAASGFTFS NYYMHWVRQA PGKGLEWVSS ISSSSSYIYY    60
ADSVKGRFTI SRDNSKNTLY LQMNSLRAED TAVYYCARLG TRHDAFDIWG QGTLVTVSS   119

SEQ ID NO: 129           moltype = DNA  length = 42
FEATURE                  Location/Qualifiers
misc_feature             1..42
                         note = N-LCDR1-1
source                   1..42
                         mol_type = other DNA
                         organism = synthetic construct
SEQUENCE: 129
actgggagca gctccaacat cggggcagtt tatgatgtac ac                       42

SEQ ID NO: 130           moltype = DNA  length = 42
FEATURE                  Location/Qualifiers
misc_feature             1..42
                         note = N-LCDR1-2
source                   1..42
                         mol_type = other DNA
                         organism = synthetic construct
SEQUENCE: 130
```

```
actgggagca gctccaacat cggggcagtt tataatgtac ac                              42

SEQ ID NO: 131           moltype = DNA   length = 39
FEATURE                  Location/Qualifiers
misc_feature             1..39
                         note = N-LCDR1-3
source                   1..39
                         mol_type = other DNA
                         organism = synthetic construct
SEQUENCE: 131
tctggaagca gctccaacat cggaaataat gctgtaagc                                  39

SEQ ID NO: 132           moltype = DNA   length = 39
FEATURE                  Location/Qualifiers
misc_feature             1..39
                         note = N-LCDR1-4
source                   1..39
                         mol_type = other DNA
                         organism = synthetic construct
SEQUENCE: 132
tctgaaagca gctccaacat cggacgtaat gctgtaaac                                  39

SEQ ID NO: 133           moltype = DNA   length = 39
FEATURE                  Location/Qualifiers
misc_feature             1..39
                         note = N-LCDR1-5
source                   1..39
                         mol_type = other DNA
                         organism = synthetic construct
SEQUENCE: 133
tctggaagct gctccaacat cggacgtaat gctgtaaac                                  39

SEQ ID NO: 134           moltype = DNA   length = 39
FEATURE                  Location/Qualifiers
misc_feature             1..39
                         note = N-LCDR1-6
source                   1..39
                         mol_type = other DNA
                         organism = synthetic construct
SEQUENCE: 134
tctggaagca gctccaacat cggaaataat gctgtaaac                                  39

SEQ ID NO: 135           moltype = DNA   length = 39
FEATURE                  Location/Qualifiers
misc_feature             1..39
                         note = N-LCDR1-7
source                   1..39
                         mol_type = other DNA
                         organism = synthetic construct
SEQUENCE: 135
tctggaagca gctccaacat cggaagtaat gctgtaagc                                  39

SEQ ID NO: 136           moltype = DNA   length = 39
FEATURE                  Location/Qualifiers
misc_feature             1..39
                         note = N-LCDR1-8
source                   1..39
                         mol_type = other DNA
                         organism = synthetic construct
SEQUENCE: 136
tctggaagca gctccaacat cggacgcaat gctgtaagc                                  39

SEQ ID NO: 137           moltype = DNA   length = 39
FEATURE                  Location/Qualifiers
misc_feature             1..39
                         note = N-LCDR1-9
source                   1..39
                         mol_type = other DNA
                         organism = synthetic construct
SEQUENCE: 137
tctggaagca gctccaacat cggacacaat gctgtaagc                                  39

SEQ ID NO: 138           moltype = DNA   length = 39
FEATURE                  Location/Qualifiers
misc_feature             1..39
                         note = N-LCDR1-10
source                   1..39
                         mol_type = other DNA
                         organism = synthetic construct
```

```
SEQUENCE: 138
tctggaagca gctccaacat cggacgcaat gctgtaaac                              39

SEQ ID NO: 139          moltype = DNA   length = 39
FEATURE                 Location/Qualifiers
misc_feature            1..39
                        note = N-LCDR1-11
source                  1..39
                        mol_type = other DNA
                        organism = synthetic construct
SEQUENCE: 139
tctggaagca gctccaacat cggacacaat gctgtatgg                              39

SEQ ID NO: 140          moltype = DNA   length = 21
FEATURE                 Location/Qualifiers
misc_feature            1..21
                        note = N-LCDR1-12
source                  1..21
                        mol_type = other DNA
                        organism = synthetic construct
SEQUENCE: 140
aggaataatc agcggccctc a                                                 21

SEQ ID NO: 141          moltype = DNA   length = 21
FEATURE                 Location/Qualifiers
misc_feature            1..21
                        note = N-LCDR2-1
source                  1..21
                        mol_type = other DNA
                        organism = synthetic construct
SEQUENCE: 141
gccagtaaca tgagagtcat t                                                 21

SEQ ID NO: 142          moltype = DNA   length = 21
FEATURE                 Location/Qualifiers
misc_feature            1..21
                        note = N-LCDR2-2
source                  1..21
                        mol_type = other DNA
                        organism = synthetic construct
SEQUENCE: 142
gccagtaaca tgagagtctt a                                                 21

SEQ ID NO: 143          moltype = DNA   length = 21
FEATURE                 Location/Qualifiers
misc_feature            1..21
                        note = N-LCDR2-3
source                  1..21
                        mol_type = other DNA
                        organism = synthetic construct
SEQUENCE: 143
gccagtaaca tgagagtcat a                                                 21

SEQ ID NO: 144          moltype = DNA   length = 21
FEATURE                 Location/Qualifiers
misc_feature            1..21
                        note = N-LCDR2-4
source                  1..21
                        mol_type = other DNA
                        organism = synthetic construct
SEQUENCE: 144
gccagtaaca tgagaggctc t                                                 21

SEQ ID NO: 145          moltype = DNA   length = 21
FEATURE                 Location/Qualifiers
misc_feature            1..21
                        note = N-LCDR2-5
source                  1..21
                        mol_type = other DNA
                        organism = synthetic construct
SEQUENCE: 145
gccagtaaca tgagagtctc t                                                 21

SEQ ID NO: 146          moltype = DNA   length = 21
FEATURE                 Location/Qualifiers
misc_feature            1..21
                        note = N-LCDR2-6
source                  1..21
                        mol_type = other DNA
```

```
                          organism = synthetic construct
SEQUENCE: 146
gccagtaaca tgagaggctt a                                              21

SEQ ID NO: 147          moltype = DNA  length = 21
FEATURE                 Location/Qualifiers
misc_feature            1..21
                        note = N-LCDR2-7
source                  1..21
                        mol_type = other DNA
                        organism = synthetic construct
SEQUENCE: 147
gccagtaaca tgagacgctc t                                              21

SEQ ID NO: 148          moltype = DNA  length = 21
FEATURE                 Location/Qualifiers
misc_feature            1..21
                        note = N-LCDR2-8
source                  1..21
                        mol_type = other DNA
                        organism = synthetic construct
SEQUENCE: 148
gccagtaaca tgagacgccc g                                              21

SEQ ID NO: 149          moltype = DNA  length = 21
FEATURE                 Location/Qualifiers
misc_feature            1..21
                        note = N-LCDR2-9
source                  1..21
                        mol_type = other DNA
                        organism = synthetic construct
SEQUENCE: 149
gccagtaaca tgagacgcat g                                              21

SEQ ID NO: 150          moltype = DNA  length = 21
FEATURE                 Location/Qualifiers
misc_feature            1..21
                        note = N-LCDR2-10
source                  1..21
                        mol_type = other DNA
                        organism = synthetic construct
SEQUENCE: 150
gccagtaaca tgagacgcct g                                              21

SEQ ID NO: 151          moltype = DNA  length = 21
FEATURE                 Location/Qualifiers
misc_feature            1..21
                        note = N-LCDR2-11
source                  1..21
                        mol_type = other DNA
                        organism = synthetic construct
SEQUENCE: 151
gccagtaaca tgagacgtct g                                              21

SEQ ID NO: 152          moltype = DNA  length = 21
FEATURE                 Location/Qualifiers
misc_feature            1..21
                        note = N-LCDR2-12
source                  1..21
                        mol_type = other DNA
                        organism = synthetic construct
SEQUENCE: 152
gccagtaaca tgagaggtat g                                              21

SEQ ID NO: 153          moltype = DNA  length = 21
FEATURE                 Location/Qualifiers
misc_feature            1..21
                        note = N-LCDR2-13
source                  1..21
                        mol_type = other DNA
                        organism = synthetic construct
SEQUENCE: 153
gccagtaaca tgagacgtat g                                              21

SEQ ID NO: 154          moltype = DNA  length = 21
FEATURE                 Location/Qualifiers
misc_feature            1..21
                        note = N-LCDR2-14
source                  1..21
```

```
                        mol_type = other DNA
                        organism = synthetic construct
SEQUENCE: 154
gccagtaaca tgagacgtcc g                                             21

SEQ ID NO: 155          moltype = DNA   length = 21
FEATURE                 Location/Qualifiers
misc_feature            1..21
                        note = N-LCDR2-15
source                  1..21
                        mol_type = other DNA
                        organism = synthetic construct
SEQUENCE: 155
gccagtaaca tgagacgctt a                                             21

SEQ ID NO: 156          moltype = DNA   length = 27
FEATURE                 Location/Qualifiers
misc_feature            1..27
                        note = N-LCDR3-1
source                  1..27
                        mol_type = other DNA
                        organism = synthetic construct
SEQUENCE: 156
cagacttatg acagcagccg ttgggtg                                       27

SEQ ID NO: 157          moltype = DNA   length = 27
FEATURE                 Location/Qualifiers
misc_feature            1..27
                        note = N-LCDR3-2
source                  1..27
                        mol_type = other DNA
                        organism = synthetic construct
SEQUENCE: 157
cagtcctatg acagcagccg ttgggtg                                       27

SEQ ID NO: 158          moltype = DNA   length = 27
FEATURE                 Location/Qualifiers
misc_feature            1..27
                        note = N-LCDR3-3
source                  1..27
                        mol_type = other DNA
                        organism = synthetic construct
SEQUENCE: 158
cagtcctatg acagccgccg ttgggtg                                       27

SEQ ID NO: 159          moltype = DNA   length = 33
FEATURE                 Location/Qualifiers
misc_feature            1..33
                        note = N-LCDR3-4
source                  1..33
                        mol_type = other DNA
                        organism = synthetic construct
SEQUENCE: 159
ggagcatggg atgacagcca gaaggctctt gtt                                33

SEQ ID NO: 160          moltype = DNA   length = 33
FEATURE                 Location/Qualifiers
misc_feature            1..33
                        note = N-LCDR3-5
source                  1..33
                        mol_type = other DNA
                        organism = synthetic construct
SEQUENCE: 160
gcagcatggg atgacagcca gaaggcttgg gtt                                33

SEQ ID NO: 161          moltype = DNA   length = 33
FEATURE                 Location/Qualifiers
misc_feature            1..33
                        note = N-LCDR3-6
source                  1..33
                        mol_type = other DNA
                        organism = synthetic construct
SEQUENCE: 161
tgggcatggg atgacagcca gaaggctgtg gtt                                33

SEQ ID NO: 162          moltype = DNA   length = 33
FEATURE                 Location/Qualifiers
misc_feature            1..33
                        note = N-LCDR3-7
```

```
source                  1..33
                        mol_type = other DNA
                        organism = synthetic construct
SEQUENCE: 162
gaggcatggg atgacagcca gaagggtgtg gtt                                    33

SEQ ID NO: 163          moltype = DNA  length = 33
FEATURE                 Location/Qualifiers
misc_feature            1..33
                        note = N-LCDR3-8
source                  1..33
                        mol_type = other DNA
                        organism = synthetic construct
SEQUENCE: 163
ggagcatggg atgacagcca gaagcgttat gtt                                    33

SEQ ID NO: 164          moltype = DNA  length = 33
FEATURE                 Location/Qualifiers
misc_feature            1..33
                        note = N-LCDR3-9
source                  1..33
                        mol_type = other DNA
                        organism = synthetic construct
SEQUENCE: 164
gcggcatggg atgacagcca gaagggtcag gtt                                    33

SEQ ID NO: 165          moltype = DNA  length = 33
FEATURE                 Location/Qualifiers
misc_feature            1..33
                        note = N-LCDR3-10
source                  1..33
                        mol_type = other DNA
                        organism = synthetic construct
SEQUENCE: 165
gcagcatggg atgacagcca gaaggttgtg gtt                                    33

SEQ ID NO: 166          moltype = DNA  length = 33
FEATURE                 Location/Qualifiers
misc_feature            1..33
                        note = N-LCDR3-11
source                  1..33
                        mol_type = other DNA
                        organism = synthetic construct
SEQUENCE: 166
tgggcatggg atgacagcca gaaggttggt gtt                                    33

SEQ ID NO: 167          moltype = DNA  length = 33
FEATURE                 Location/Qualifiers
misc_feature            1..33
                        note = N-LCDR3-12
source                  1..33
                        mol_type = other DNA
                        organism = synthetic construct
SEQUENCE: 167
ggggcatggg atgacagcca gaaggttttt gtt                                    33

SEQ ID NO: 168          moltype = DNA  length = 33
FEATURE                 Location/Qualifiers
misc_feature            1..33
                        note = N-LCDR3-13
source                  1..33
                        mol_type = other DNA
                        organism = synthetic construct
SEQUENCE: 168
tcagcatggg atgacagcca gaaggttgtg gtt                                    33

SEQ ID NO: 169          moltype = DNA  length = 33
FEATURE                 Location/Qualifiers
misc_feature            1..33
                        note = N-LCDR3-14
source                  1..33
                        mol_type = other DNA
                        organism = synthetic construct
SEQUENCE: 169
gaggcatggg atgacagcca gaaggctgtt gtt                                    33

SEQ ID NO: 170          moltype = DNA  length = 33
FEATURE                 Location/Qualifiers
misc_feature            1..33
```

```
                        note = N-LCDR3-15
source                  1..33
                        mol_type = other DNA
                        organism = synthetic construct
SEQUENCE: 170
gcggcatggg atgacagcca gaaggctttt gtt                                    33

SEQ ID NO: 171          moltype = DNA   length = 33
FEATURE                 Location/Qualifiers
misc_feature            1..33
                        note = N-LCDR3-16
source                  1..33
                        mol_type = other DNA
                        organism = synthetic construct
SEQUENCE: 171
gcggcatggg atgacagcca gaaggcttgg gtt                                    33

SEQ ID NO: 172          moltype = DNA   length = 33
FEATURE                 Location/Qualifiers
misc_feature            1..33
                        note = N-LCDR3-17
source                  1..33
                        mol_type = other DNA
                        organism = synthetic construct
SEQUENCE: 172
gcggcatggg atgacagcca gaaggttttt gtt                                    33

SEQ ID NO: 173          moltype = DNA   length = 33
FEATURE                 Location/Qualifiers
misc_feature            1..33
                        note = N-LCDR3-18
source                  1..33
                        mol_type = other DNA
                        organism = synthetic construct
SEQUENCE: 173
ggggcatggg atgacagcca gaaggctttt gtt                                    33

SEQ ID NO: 174          moltype = DNA   length = 33
FEATURE                 Location/Qualifiers
misc_feature            1..33
                        note = N-LCDR3-19
source                  1..33
                        mol_type = other DNA
                        organism = synthetic construct
SEQUENCE: 174
tgggcatggg atgacagcca gaaggctgtt gtt                                    33

SEQ ID NO: 175          moltype = DNA   length = 33
FEATURE                 Location/Qualifiers
misc_feature            1..33
                        note = N-LCDR3-20
source                  1..33
                        mol_type = other DNA
                        organism = synthetic construct
SEQUENCE: 175
ggggcatggg atgacagcca gaaggttgtg gtt                                    33

SEQ ID NO: 176          moltype = DNA   length = 33
FEATURE                 Location/Qualifiers
misc_feature            1..33
                        note = N-LCDR3-21
source                  1..33
                        mol_type = other DNA
                        organism = synthetic construct
SEQUENCE: 176
tcggcatggg atgacagcca gaaggttgtt gtt                                    33

SEQ ID NO: 177          moltype = DNA   length = 33
FEATURE                 Location/Qualifiers
misc_feature            1..33
                        note = N-LCDR3-22
source                  1..33
                        mol_type = other DNA
                        organism = synthetic construct
SEQUENCE: 177
gcggcatggg atgacagcca gaaggctgtt gtt                                    33

SEQ ID NO: 178          moltype = DNA   length = 33
FEATURE                 Location/Qualifiers
```

```
misc_feature            1..33
                        note = N-LCDR3-23
source                  1..33
                        mol_type = other DNA
                        organism = synthetic construct
SEQUENCE: 178
tcggcatggg atgacagcca gaaggctggg gtt                                    33

SEQ ID NO: 179          moltype = DNA  length = 33
FEATURE                 Location/Qualifiers
misc_feature            1..33
                        note = N-LCDR3-24
source                  1..33
                        mol_type = other DNA
                        organism = synthetic construct
SEQUENCE: 179
gcggcatggg atgacagcca gaaggctttg gtt                                    33

SEQ ID NO: 180          moltype = DNA  length = 33
FEATURE                 Location/Qualifiers
misc_feature            1..33
                        note = N-LCDR3-25
source                  1..33
                        mol_type = other DNA
                        organism = synthetic construct
SEQUENCE: 180
gcagcatggg atgacagcca gaaggctgtt gtt                                    33

SEQ ID NO: 181          moltype = DNA  length = 15
FEATURE                 Location/Qualifiers
misc_feature            1..15
                        note = N-HCDR1-1
source                  1..15
                        mol_type = other DNA
                        organism = synthetic construct
SEQUENCE: 181
gactactaca tgaac                                                        15

SEQ ID NO: 182          moltype = DNA  length = 15
FEATURE                 Location/Qualifiers
misc_feature            1..15
                        note = N-HCDR1-2
source                  1..15
                        mol_type = other DNA
                        organism = synthetic construct
SEQUENCE: 182
gactactaca tggac                                                        15

SEQ ID NO: 183          moltype = DNA  length = 15
FEATURE                 Location/Qualifiers
misc_feature            1..15
                        note = N-HCDR1-3
source                  1..15
                        mol_type = other DNA
                        organism = synthetic construct
SEQUENCE: 183
gtctactaca tgaac                                                        15

SEQ ID NO: 184          moltype = DNA  length = 15
FEATURE                 Location/Qualifiers
misc_feature            1..15
                        note = N-HCDR1-4
source                  1..15
                        mol_type = other DNA
                        organism = synthetic construct
SEQUENCE: 184
gactactacg tgaac                                                        15

SEQ ID NO: 185          moltype = DNA  length = 15
FEATURE                 Location/Qualifiers
misc_feature            1..15
                        note = N-HCDR1-5
source                  1..15
                        mol_type = other DNA
                        organism = synthetic construct
SEQUENCE: 185
aattactaca tgcac                                                        15

SEQ ID NO: 186          moltype = DNA  length = 15
```

| | | |
|---|---|---|
| FEATURE | Location/Qualifiers | |
| misc_feature | 1..15 | |
| | note = N-HCDR1-6 | |
| source | 1..15 | |
| | mol_type = other DNA | |
| | organism = synthetic construct | |
| SEQUENCE: 186 | | |
| cattactaca tgcac | | 15 |
| | | |
| SEQ ID NO: 187 | moltype = DNA  length = 15 | |
| FEATURE | Location/Qualifiers | |
| misc_feature | 1..15 | |
| | note = N-HCDR1-7 | |
| source | 1..15 | |
| | mol_type = other DNA | |
| | organism = synthetic construct | |
| SEQUENCE: 187 | | |
| cgttactaca tgcac | | 15 |
| | | |
| SEQ ID NO: 188 | moltype = DNA  length = 15 | |
| FEATURE | Location/Qualifiers | |
| misc_feature | 1..15 | |
| | note = N-HCDR1-8 | |
| source | 1..15 | |
| | mol_type = other DNA | |
| | organism = synthetic construct | |
| SEQUENCE: 188 | | |
| cgctactaca tgcac | | 15 |
| | | |
| SEQ ID NO: 189 | moltype = DNA  length = 15 | |
| FEATURE | Location/Qualifiers | |
| misc_feature | 1..15 | |
| | note = N-HCDR1-9 | |
| source | 1..15 | |
| | mol_type = other DNA | |
| | organism = synthetic construct | |
| SEQUENCE: 189 | | |
| aactactaca tgcac | | 15 |
| | | |
| SEQ ID NO: 190 | moltype = DNA  length = 15 | |
| FEATURE | Location/Qualifiers | |
| misc_feature | 1..15 | |
| | note = N-HCDR1-10 | |
| source | 1..15 | |
| | mol_type = other DNA | |
| | organism = synthetic construct | |
| SEQUENCE: 190 | | |
| agctactaca tgcac | | 15 |
| | | |
| SEQ ID NO: 191 | moltype = DNA  length = 51 | |
| FEATURE | Location/Qualifiers | |
| misc_feature | 1..51 | |
| | note = N-HCDR2-1 | |
| source | 1..51 | |
| | mol_type = other DNA | |
| | organism = synthetic construct | |
| SEQUENCE: 191 | | |
| tccattagtc ggtatagtag ttacatatac tacgcagact cagtgaaggg c | | 51 |
| | | |
| SEQ ID NO: 192 | moltype = DNA  length = 51 | |
| FEATURE | Location/Qualifiers | |
| misc_feature | 1..51 | |
| | note = N-HCDR2-2 | |
| source | 1..51 | |
| | mol_type = other DNA | |
| | organism = synthetic construct | |
| SEQUENCE: 192 | | |
| tccattagtc ggtatagtgg ctacgtttac tacgcagact cagtgaaggg c | | 51 |
| | | |
| SEQ ID NO: 193 | moltype = DNA  length = 51 | |
| FEATURE | Location/Qualifiers | |
| misc_feature | 1..51 | |
| | note = N-HCDR2-3 | |
| source | 1..51 | |
| | mol_type = other DNA | |
| | organism = synthetic construct | |
| SEQUENCE: 193 | | |
| tccattagtc gggctagtag ctacgtttac tacgcagact cagtgaaggg c | | 51 |

| SEQ ID NO: 194 | moltype = DNA   length = 51 |
| --- | --- |
| FEATURE | Location/Qualifiers |
| misc_feature | 1..51 |
| | note = N-HCDR2-4 |
| source | 1..51 |
| | mol_type = other DNA |
| | organism = synthetic construct |

SEQUENCE: 194
tccattagtc ggtatagtgg ctacatatac tacgcagact cagtgaaggg c    51

| SEQ ID NO: 195 | moltype = DNA   length = 51 |
| --- | --- |
| FEATURE | Location/Qualifiers |
| misc_feature | 1..51 |
| | note = N-HCDR2-5 |
| source | 1..51 |
| | mol_type = other DNA |
| | organism = synthetic construct |

SEQUENCE: 195
tccattagtg ctaggagtcg ttaccactac tacgcagact cagtgaaggg c    51

| SEQ ID NO: 196 | moltype = DNA   length = 51 |
| --- | --- |
| FEATURE | Location/Qualifiers |
| misc_feature | 1..51 |
| | note = N-HCDR2-6 |
| source | 1..51 |
| | mol_type = other DNA |
| | organism = synthetic construct |

SEQUENCE: 196
tccattagtg ctcgtagtag ttacatatac tacgcagact cagtgaaggg c    51

| SEQ ID NO: 197 | moltype = DNA   length = 51 |
| --- | --- |
| FEATURE | Location/Qualifiers |
| misc_feature | 1..51 |
| | note = N-HCDR2-7 |
| source | 1..51 |
| | mol_type = other DNA |
| | organism = synthetic construct |

SEQUENCE: 197
tccattagtg ctcttagtag ttacatatac tacgcagact cagtgagggg c    51

| SEQ ID NO: 198 | moltype = DNA   length = 51 |
| --- | --- |
| FEATURE | Location/Qualifiers |
| misc_feature | 1..51 |
| | note = N-HCDR2-8 |
| source | 1..51 |
| | mol_type = other DNA |
| | organism = synthetic construct |

SEQUENCE: 198
tccattagtg ctcagagtag tcacatatac tacgcagact cagtggaggg c    51

| SEQ ID NO: 199 | moltype = DNA   length = 51 |
| --- | --- |
| FEATURE | Location/Qualifiers |
| misc_feature | 1..51 |
| | note = N-HCDR2-9 |
| source | 1..51 |
| | mol_type = other DNA |
| | organism = synthetic construct |

SEQUENCE: 199
tccattagtg ctcggagtag ctacctatac tacgcagact cagtgaaggg c    51

| SEQ ID NO: 200 | moltype = DNA   length = 51 |
| --- | --- |
| FEATURE | Location/Qualifiers |
| misc_feature | 1..51 |
| | note = N-HCDR2-10 |
| source | 1..51 |
| | mol_type = other DNA |
| | organism = synthetic construct |

SEQUENCE: 200
tccattagtg ctcggagtag ctacatatac tacgcagact cagtgaaggg c    51

| SEQ ID NO: 201 | moltype = DNA   length = 51 |
| --- | --- |
| FEATURE | Location/Qualifiers |
| misc_feature | 1..51 |
| | note = N-HCDR2-11 |
| source | 1..51 |
| | mol_type = other DNA |
| | organism = synthetic construct |

SEQUENCE: 201
tccattagtg ctcgcagtag ctaccgctac tacgcagact cagtgaaggg c    51

```
SEQ ID NO: 202          moltype = DNA  length = 51
FEATURE                 Location/Qualifiers
misc_feature            1..51
                        note = N-HCDR2-12
source                  1..51
                        mol_type = other DNA
                        organism = synthetic construct
SEQUENCE: 202
tccattagtg ctcggagtag ctacatctac tacgcagatt cagtgaaggg c          51

SEQ ID NO: 203          moltype = DNA  length = 51
FEATURE                 Location/Qualifiers
misc_feature            1..51
                        note = N-HCDR2-13
source                  1..51
                        mol_type = other DNA
                        organism = synthetic construct
SEQUENCE: 203
tccattagtg ctcggagtag ctaccgctac tacgcagatt cagtgaaggg c          51

SEQ ID NO: 204          moltype = DNA  length = 51
FEATURE                 Location/Qualifiers
misc_feature            1..51
                        note = N-HCDR2-14
source                  1..51
                        mol_type = other DNA
                        organism = synthetic construct
SEQUENCE: 204
tccattagtg ctcggagtag ctacatctac tacgcaggtt cagtgaaggg c          51

SEQ ID NO: 205          moltype = DNA  length = 51
FEATURE                 Location/Qualifiers
misc_feature            1..51
                        note = N-HCDR2-15
source                  1..51
                        mol_type = other DNA
                        organism = synthetic construct
SEQUENCE: 205
tccattagtt ctaggagtag ccaccaatac tacgcaggtt cagtgaaggg c          51

SEQ ID NO: 206          moltype = DNA  length = 51
FEATURE                 Location/Qualifiers
misc_feature            1..51
                        note = N-HCDR2-16
source                  1..51
                        mol_type = other DNA
                        organism = synthetic construct
SEQUENCE: 206
tccattagtg ctaggagtag ctacatctac tacgcagatt cagtgaaggg c          51

SEQ ID NO: 207          moltype = DNA  length = 51
FEATURE                 Location/Qualifiers
misc_feature            1..51
                        note = N-HCDR2-17
source                  1..51
                        mol_type = other DNA
                        organism = synthetic construct
SEQUENCE: 207
tccattagtg ctctgagtag ctaccgatac tacgcagatt cagtgaaggg c          51

SEQ ID NO: 208          moltype = DNA  length = 51
FEATURE                 Location/Qualifiers
misc_feature            1..51
                        note = N-HCDR2-18
source                  1..51
                        mol_type = other DNA
                        organism = synthetic construct
SEQUENCE: 208
tccattagta gtagtagtag ttacatatac tacgcagact cagtgaaggg c          51

SEQ ID NO: 209          moltype = DNA  length = 21
FEATURE                 Location/Qualifiers
misc_feature            1..21
                        note = N-HCDR3-1
source                  1..21
                        mol_type = other DNA
                        organism = synthetic construct
SEQUENCE: 209
```

```
gatattggcg gtatggacgt c                                               21

SEQ ID NO: 210         moltype = DNA   length = 30
FEATURE                Location/Qualifiers
misc_feature           1..30
                       note = N-HCDR3-2
source                 1..30
                       mol_type = other DNA
                       organism = synthetic construct
SEQUENCE: 210
cttgctacga ggcataatgc ttttgatatc                                      30

SEQ ID NO: 211         moltype = DNA   length = 30
FEATURE                Location/Qualifiers
misc_feature           1..30
                       note = N-HCDR3-3
source                 1..30
                       mol_type = other DNA
                       organism = synthetic construct
SEQUENCE: 211
cttgctacga ggaataatgc ttttgatatc                                      30

SEQ ID NO: 212         moltype = DNA   length = 30
FEATURE                Location/Qualifiers
misc_feature           1..30
                       note = N-HCDR3-4
source                 1..30
                       mol_type = other DNA
                       organism = synthetic construct
SEQUENCE: 212
cttgctacga ggcgtgatgc ttttgatatc                                      30

SEQ ID NO: 213         moltype = DNA   length = 30
FEATURE                Location/Qualifiers
misc_feature           1..30
                       note = N-HCDR3-5
source                 1..30
                       mol_type = other DNA
                       organism = synthetic construct
SEQUENCE: 213
cttgctacga ggcaaaacgc ttttgatatc                                      30

SEQ ID NO: 214         moltype = DNA   length = 30
FEATURE                Location/Qualifiers
misc_feature           1..30
                       note = N-HCDR3-6
source                 1..30
                       mol_type = other DNA
                       organism = synthetic construct
SEQUENCE: 214
cttgctacca ggcatgtcgc ttttgatatc                                      30

SEQ ID NO: 215         moltype = DNA   length = 30
FEATURE                Location/Qualifiers
misc_feature           1..30
                       note = N-HCDR3-7
source                 1..30
                       mol_type = other DNA
                       organism = synthetic construct
SEQUENCE: 215
cttgctacca ggcatggcgc ttttgatatc                                      30

SEQ ID NO: 216         moltype = DNA   length = 30
FEATURE                Location/Qualifiers
misc_feature           1..30
                       note = N-HCDR3-8
source                 1..30
                       mol_type = other DNA
                       organism = synthetic construct
SEQUENCE: 216
cttgctacca ggcataacgc ttttgatatc                                      30

SEQ ID NO: 217         moltype = DNA   length = 30
FEATURE                Location/Qualifiers
misc_feature           1..30
                       note = N-HCDR3-9
source                 1..30
                       mol_type = other DNA
                       organism = synthetic construct
```

```
SEQUENCE: 217
cttgctacca ggcatctcgc ttttgatatc                                              30

SEQ ID NO: 218         moltype = DNA  length = 30
FEATURE                Location/Qualifiers
misc_feature           1..30
                       note = N-HCDR3-10
source                 1..30
                       mol_type = other DNA
                       organism = synthetic construct
SEQUENCE: 218
cttgctacca ggcatagcgc ttttgatatc                                              30

SEQ ID NO: 219         moltype = DNA  length = 30
FEATURE                Location/Qualifiers
misc_feature           1..30
                       note = N-HCDR3-11
source                 1..30
                       mol_type = other DNA
                       organism = synthetic construct
SEQUENCE: 219
cttgctacca ggcgcgacgc ttttgatatc                                              30

SEQ ID NO: 220         moltype = DNA  length = 30
FEATURE                Location/Qualifiers
misc_feature           1..30
                       note = N-HCDR3-12
source                 1..30
                       mol_type = other DNA
                       organism = synthetic construct
SEQUENCE: 220
cttgctacca ggcacagcgc ttttgatatc                                              30

SEQ ID NO: 221         moltype = DNA  length = 30
FEATURE                Location/Qualifiers
misc_feature           1..30
                       note = N-HCDR3-13
source                 1..30
                       mol_type = other DNA
                       organism = synthetic construct
SEQUENCE: 221
cttggtacca ggcgcgtcgc ttttgatatc                                              30

SEQ ID NO: 222         moltype = DNA  length = 30
FEATURE                Location/Qualifiers
misc_feature           1..30
                       note = N-HCDR3-14
source                 1..30
                       mol_type = other DNA
                       organism = synthetic construct
SEQUENCE: 222
cttggtctca ggcacgacgc ttttgatatc                                              30

SEQ ID NO: 223         moltype = DNA  length = 30
FEATURE                Location/Qualifiers
misc_feature           1..30
                       note = N-HCDR3-15
source                 1..30
                       mol_type = other DNA
                       organism = synthetic construct
SEQUENCE: 223
cttgctacca ggcgcatcgc ttttgatatc                                              30

SEQ ID NO: 224         moltype = DNA  length = 30
FEATURE                Location/Qualifiers
misc_feature           1..30
                       note = N-HCDR3-16
source                 1..30
                       mol_type = other DNA
                       organism = synthetic construct
SEQUENCE: 224
cttgctacca ggcgcgtcgc ttttgatatc                                              30

SEQ ID NO: 225         moltype = DNA  length = 30
FEATURE                Location/Qualifiers
misc_feature           1..30
                       note = N-HCDR3-17
source                 1..30
                       mol_type = other DNA
```

```
                              organism = synthetic construct
SEQUENCE: 225
cttggtacga ggcatgatgc ttttgatatc                                        30

SEQ ID NO: 226          moltype = AA   length = 270
FEATURE                 Location/Qualifiers
source                  1..270
                        mol_type = protein
                        organism = Homo sapiens
SEQUENCE: 226
MKPKMKYSTN KISTAKWKNT ASKALCFKLG KSQQKAKEVC PMYFMKLRSG LMIKKEACYF        60
RRETTKRPSL KTGRKHKRHL VLAACQQQST VECFAFGISG VQKYTRALHD SSITGISPIT       120
EYLASLSTYN DQSITFALED ESYEIYVEDL KKDEKKDKVL LSYYESQHPS NESGDGVDGK       180
MLMVTLSPTK DFWLHANNKE HSVELHKCEK PLPDQAFFVL HNMHSNCVSF ECKTDPGVFI       240
GVKDNHLALI KVDSSENLCT ENILFKLSET                                       270

SEQ ID NO: 227          moltype = AA   length = 269
FEATURE                 Location/Qualifiers
source                  1..269
                        mol_type = protein
                        organism = Macaca fascicularis
SEQUENCE: 227
MKPKMKYSTN KISTAKRKNT ASKALCFKLG KSQQKAKEVC HVYFMKLRSG LMIKKEACYF        60
RRETTKRPSL KTGGKHKGHL VLAACQQQST VECFAFGISG VPKYTRALHD SSITGISPIT       120
ESLASLSTYN DQSITFALED ESYEIYVEDL KKDKKKDKVL LSYYESQHPS SESGDGVDGK       180
MLMVTLSPTK DFWLQANNKE HSVELHKCEK PLPDQAFFVL HNRSFNCVSF ECKTDPGVFI       240
GVKDNHLALI KVDYSENLGS ENILFKLSE                                        269

SEQ ID NO: 228          moltype = DNA   length = 645
FEATURE                 Location/Qualifiers
misc_feature            1..645
                        note = N-LC-1
source                  1..645
                        mol_type = other DNA
                        organism = synthetic construct
SEQUENCE: 228
cagtctgtgc tgactcagcc accctcagcg tctgggaccc ccgggcagag ggtcaccatc        60
tcctgcactg ggagcagctc caacatcggg gcagtttatg atgtacactg gtatcagcag       120
ctcccaggaa cggcccccaa actcctcatc tataggaata tcagcggcc ctcagggggtc       180
cctgaccgat tctctggctc caagtctggc acctcagcct ccctggccat cagtgggctc       240
cggtccgagg atgaggctga ttattactgc cagacttatg acagcagccg ttgggtgttc       300
ggcggaggaa ccaagctgac ggtcctaggt caacccaagg ccgctcccag cgtgaccctg       360
ttccccccca gcagcgagga gctgcaggcc aacaaggcca cccctggtgtg tctgatcagc      420
gacttctacc caggcgccgt gaccgtggcc tggaaggccg acagcagccc cgtgaaggcc       480
ggcgtggaga ccaccacccc cagcaagcag agcaacaaca agtacgccgc cagcagctac       540
ctgagcctga ccccagagca gtggaagagc acaggagct acagctgcca ggtcacccac       600
gagggcagca ccgtggaaaa gaccgtggcc caaccgagt gctcc                        645

SEQ ID NO: 229          moltype = DNA   length = 645
FEATURE                 Location/Qualifiers
misc_feature            1..645
                        note = N-LC-2
source                  1..645
                        mol_type = other DNA
                        organism = synthetic construct
SEQUENCE: 229
cagtctgtgc tgactcagcc accctcagcg tctgggaccc ccgggcagag ggtcaccatc        60
tcctgcactg ggagcagctc caacatcggg gcagtttatg atgtacactg gtatcagcag       120
ctcccaggaa cggcccccaa actcctcatc tataggaata tcagcggcc ctcagggggtc       180
cctgaccgat tctctggctc caagtctggc acctcagcct ccctggccat cagtgggctc       240
cggtccgagg atgaggctga ttattactgc cagtcctatg acagcagccg ttgggtgttc       300
ggcggaggaa ccaagctgac ggtcctaggt caacccaagg ccgctcccag cgtgaccctg       360
ttccccccca gcgcgagga gctgcaggcc aacaaggcca cccctggtgtg tctgatcagc       420
gacttctacc caggcgccgt gaccgtggcc tggaaggccg acagcagccc cgtgaaggcc       480
ggcgtggaga ccaccacccc cagcaagcag agcaacaaca agtacgccgc cagcagctac       540
ctgagcctga ccccagagca gtggaagagc acaggagct acagctgcca ggtcacccac       600
gagggcagca ccgtggaaaa gaccgtggcc caaccgagt gctcc                        645

SEQ ID NO: 230          moltype = DNA   length = 645
FEATURE                 Location/Qualifiers
misc_feature            1..645
                        note = N-LC-3
source                  1..645
                        mol_type = other DNA
                        organism = synthetic construct
SEQUENCE: 230
cagtctgtgc tgactcagcc accctcagcg tctgggaccc ccgggcagag ggtcaccatc        60
tcctgcactg ggagcagctc caacatcggg gcagtttata atgtacactg gtatcagcag       120
ctcccaggaa cggcccccaa actcctcatc tataggaata tcagcggcc ctcagggggtc       180
```

```
cctgaccgat tctctggctc caagtctggc acctcagcct ccctggccat cagtgggctc    240
cggtccgagg atgaggctga ttattactgc cagtcctatg acagcagccg ttgggtgttc    300
ggcggaggaa ccaagctgac ggtcctaggt caacccaagg ccgctcccag cgtgaccctg    360
ttccccccca gcagcgagga gctgcaggcc aacaaggcca cctggtgtg tctgatcagc     420
gacttctacc caggcgccgt gaccgtggcc tggaaggccg acagcagccc cgtgaaggcc    480
ggcgtggaga ccaccacccc cagcaagcag agcaacaaca agtacgccgc cagcagctac    540
ctgagcctga cccagagca gtggaagagc acaggagct acagctgcca ggtcacccac      600
gagggcagca ccgtggaaaa gaccgtggcc caaccgagt gctcc                     645

SEQ ID NO: 231          moltype = DNA   length = 645
FEATURE                 Location/Qualifiers
misc_feature            1..645
                        note = N-LC-4
source                  1..645
                        mol_type = other DNA
                        organism = synthetic construct
SEQUENCE: 231
cagtctgtgc tgactcagcc accctcagcg tctgggaccc ccgggcagag ggtcaccatc    60
tcctgcactg ggagcagctc caacatcggg gcagtttata atgtacactg gtatcagcag    120
ctcccaggaa cggcccccaa actcctcatc tataggaata atcagcggcc ctcaggggtc    180
cctgaccgat tctctggctc caagtctggc acctcagcct ccctggccat cagtgggctc    240
cggtccgagg atgaggctga ttattactgc cagtcctatg acagcagccg ttgggtgttc    300
ggcggaggaa ccaagctgac ggtcctaggt caacccaagg ccgctcccag cgtgaccctg    360
ttccccccca gcagcgagga gctgcaggcc aacaaggcca cctggtgtg tctgatcagc     420
gacttctacc caggcgccgt gaccgtggcc tggaaggccg acagcagccc cgtgaaggcc    480
ggcgtggaga ccaccacccc cagcaagcag agcaacaaca agtacgccgc cagcagctac    540
ctgagcctga cccagagca gtggaagagc acaggagct acagctgcca ggtcacccac      600
gagggcagca ccgtggaaaa gaccgtggcc caaccgagt gctcc                     645

SEQ ID NO: 232          moltype = DNA   length = 648
FEATURE                 Location/Qualifiers
misc_feature            1..648
                        note = N-LC-5
source                  1..648
                        mol_type = other DNA
                        organism = synthetic construct
SEQUENCE: 232
cagtctgtgc tgactcagcc accctcagcg tctgggaccc ccgggcagag ggtcacgata    60
tcctgttctg gaagcagctc caacatcgga aataatgctg taagctggta tcagcagctc    120
ccaggaacgg cccccaaaact cctcatctat gccagtaaca tgagagtcat tggggtccct  180
gaccgattct ctggctccaa gtctggcacc tcagcctccc tggccatcag tgggctccgg   240
tccgaggatg aggctgatta ttactgtgga gcatgggatg acagcagaa ggctcttgtt    300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agcacagga gctacagctg ccaggtcacc    600
cacgagggca gcaccgtgga aaagaccgtg gccccaaccg agtgctcc                648

SEQ ID NO: 233          moltype = DNA   length = 648
FEATURE                 Location/Qualifiers
misc_feature            1..648
                        note = N-LC-6
source                  1..648
                        mol_type = other DNA
                        organism = synthetic construct
SEQUENCE: 233
cagtctgtgc tgactcagcc accctcagcg tctgggaccc ccgggcagag ggtcacgata    60
tcctgttctg gaagcagctc caacatcgga cgtaatgctg taaactggta tcagcagctc    120
ccaggaacgg cccccaaaact cctcatctat gccagtaaca tgagagtcat tggggtccct  180
gaccgattct ctggctccaa gtctggcacc tcagcctccc tggccatcag tgggctccgg   240
tccgaggatg aggctgatta ttactgtgca gcatgggatg acagcagaa ggcttgggtt    300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agcacagga gctacagctg ccaggtcacc    600
cacgagggca gcaccgtgga aaagaccgtg gccccaaccg agtgctcc                648

SEQ ID NO: 234          moltype = DNA   length = 648
FEATURE                 Location/Qualifiers
misc_feature            1..648
                        note = N-LC-7
source                  1..648
                        mol_type = other DNA
                        organism = synthetic construct
SEQUENCE: 234
cagtctgtgc tgactcagcc accctcagcg tctgggaccc ccgggcagag ggtcacgata    60
tcctgttctg gaagcagctc caacatcgga cgtaatgctg taaactggta tcagcagctc    120
```

```
ccaggaacgg cccccaaact cctcatctat gccagtaaca tgagagtctt aggggtccct    180
gaccgattct ctggctccaa gtctggcacc tcagcctccc tggccatcag tgggctccgg    240
tccgaggatg aggctgatta ttactgttgg gcatgggatg acagccagaa ggctgtggtt    300
ttcggcggag gaaccaagct tacggtccta ggtcaaccca aggccgctcc cagcgtgacc    360
ctgttccccc ccagcagcga ggagctgcag gccaacaagg ccaccctggt gtgtctgatc    420
agcgacttct acccaggcgc cgtgaccgtg gcctggaagg ccgacagcag ccccgtgaag    480
gccggcgtgg agaccaccac ccccagcaag cagagcaaca acaagtacgc cgccagcagc    540
tacctgagcc tgaccccaga gcagtggaag agccacagga gctacagctg ccaggtcacc    600
cacgagggca gcaccgtgga aaagaccgtg gccccaaccg agtgctcc                 648
```

SEQ ID NO: 235         moltype = DNA   length = 648
FEATURE                Location/Qualifiers
misc_feature           1..648
                       note = N-LC-8
source                 1..648
                       mol_type = other DNA
                       organism = synthetic construct
SEQUENCE: 235

```
cagtctgtgc tgactcagcc accctcagcg tctgggaccc ccgggcagag ggtcacgata    60
tcctgttctg gaagctgctc caacatcgga cgtaatgctg taaactggta tcagcagctc   120
ccaggaacgg cccccaaact cctcatctat gccagtaaca tgagagtcat aggggtccct   180
gaccgattct ctggctccaa gtctggcacc tcagcctccc tggccatcag tgggctccgg   240
tccgaggatg aggctgatta ttactgtgag gcatgggatg acagccagaa gggtgtggtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc                648
```

SEQ ID NO: 236         moltype = DNA   length = 648
FEATURE                Location/Qualifiers
misc_feature           1..648
                       note = N-LC-9
source                 1..648
                       mol_type = other DNA
                       organism = synthetic construct
SEQUENCE: 236

```
cagtctgtgc tgactcagcc accctcagcg tctgggaccc ccgggcagag ggtcacgata    60
tcctgttctg gaagcagctc caacatcgga cgtaatgctg taaactggta tcagcagctc   120
ccaggaacgg cccccaaact cctcatctat gccagtaaca tgagagtcat tggggtccct   180
gaccgattct ctggctccaa gtctggcacc tcagcctccc tggccatcag tgggctccgg   240
tccgaggatg aggctgatta ttactgtgga gcatgggatg acagccagaa gcgttatgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc                648
```

SEQ ID NO: 237         moltype = DNA   length = 648
FEATURE                Location/Qualifiers
misc_feature           1..648
                       note = N-LC-10
source                 1..648
                       mol_type = other DNA
                       organism = synthetic construct
SEQUENCE: 237

```
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaact cctcatctat gccagtaaca tgagaggctc tggggtccct   180
gaccgattct ctggctccaa gtctggcacc tcagcctccc tggccatcag tgggctccgg   240
tccgaggatg aggctgatta ttactgtgcg gcatgggatg acagccagaa gggtcaggtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc                648
```

SEQ ID NO: 238         moltype = DNA   length = 648
FEATURE                Location/Qualifiers
misc_feature           1..648
                       note = N-LC-11
source                 1..648
                       mol_type = other DNA
                       organism = synthetic construct
SEQUENCE: 238

```
cagtctgtgc tgactcagcc accctcagcg tctgggaccc ccgggcagag ggtcacgata    60
```

```
tcctgttctg gaagcagctc caacatcgga agtaatgctg taagctggta tcagcagctc    120
ccaggaacgg ccccccaaact cctcatctat gccagtaaca tgagaggctc tggggtccct   180
gaccgattct ctggctccaa gtctggcacc tcagcctccc tggccatcag tgggctccgg    240
tccgaggatg aggctgatta ttactgtgca gcatgggatg acagccagaa ggttgtggtt    300
ttcggcggag gaaccaagct tacggtccta ggtcaaccca aggccgctcc cagcgtgacc    360
ctgttccccc ccagcagcga ggagctgcag gccaacaagg ccaccctggt gtgtctgatc    420
agcgacttct acccaggcgc cgtgaccgtg gcctggaagg ccgacagcag ccccgtgaag    480
gccggcgtgg agaccaccac ccccagcaag cagagcaaca caagtacgc  cgccagcagc    540
tacctgagcc tgaccccaga gcagtggaag agccacagga gctacagctg ccaggtcacc    600
cacgagggca gcaccgtgga aaagaccgtg gccccaaccg agtgctcc                 648

SEQ ID NO: 239          moltype = DNA   length = 648
FEATURE                 Location/Qualifiers
misc_feature            1..648
                        note = N-LC-12
source                  1..648
                        mol_type = other DNA
                        organism = synthetic construct
SEQUENCE: 239
cagtctgtgc tgactcagcc accctcagcg tctgggaccc ccgggcagag ggtcacgata    60
tcctgttctg gaagcagctc caacatcgga cgtaatgctg taaactggta tcagcagctc   120
ccaggaacgg ccccccaaact cctcatctat gccagtaaca tgagagtctc tggggtccct   180
gaccgattct ctggctccaa gtctggcacc tcagcctccc tggccatcag tgggctccgg    240
tccgaggatg aggctgatta ttactgttgg gcatgggatg acagccagaa ggttgtgtt    300
ttcggcggag gaaccaagct tacggtccta ggtcaaccca aggccgctcc cagcgtgacc    360
ctgttccccc ccagcagcga ggagctgcag gccaacaagg ccaccctggt gtgtctgatc    420
agcgacttct acccaggcgc cgtgaccgtg gcctggaagg ccgacagcag ccccgtgaag    480
gccggcgtgg agaccaccac ccccagcaag cagagcaaca caagtacgc  cgccagcagc    540
tacctgagcc tgaccccaga gcagtggaag agccacagga gctacagctg ccaggtcacc    600
cacgagggca gcaccgtgga aaagaccgtg gccccaaccg agtgctcc                 648

SEQ ID NO: 240          moltype = DNA   length = 648
FEATURE                 Location/Qualifiers
misc_feature            1..648
                        note = N-LC-13
source                  1..648
                        mol_type = other DNA
                        organism = synthetic construct
SEQUENCE: 240
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg ccccccaaact cctcatctat gccagtaaca tgagaggctt aggggtccct   180
gaccgattct ctggctccaa gtctggcacc tcagcctccc tggccatcag tgggctccgg    240
tccgaggatg aggctgatta ttactgtggg gcatgggatg acagccagaa ggttttttgtt  300
ttcggcggag gaaccaagct tacggtccta ggtcaaccca aggccgctcc cagcgtgacc    360
ctgttccccc ccagcagcga ggagctgcag gccaacaagg ccaccctggt gtgtctgatc    420
agcgacttct acccaggcgc cgtgaccgtg gcctggaagg ccgacagcag ccccgtgaag    480
gccggcgtgg agaccaccac ccccagcaag cagagcaaca caagtacgc  cgccagcagc    540
tacctgagcc tgaccccaga gcagtggaag agccacagga gctacagctg ccaggtcacc    600
cacgagggca gcaccgtgga aaagaccgtg gccccaaccg agtgctcc                 648

SEQ ID NO: 241          moltype = DNA   length = 648
FEATURE                 Location/Qualifiers
misc_feature            1..648
                        note = N-LC-14
source                  1..648
                        mol_type = other DNA
                        organism = synthetic construct
SEQUENCE: 241
cagtctgtgc tgactcagcc accctcagcg tctgggaccc ccgggcagag ggtcacgata    60
tcctgttctg gaagcagctc caacatcgga cgtaatgctg taaactggta tcagcagctc   120
ccaggaacgg ccccccaaact cctcatctat gccagtaaca tgagacgctc tggggtccct   180
gaccgattct ctggctccaa gtctggcacc tcagcctccc tggccatcag tgggctccgg    240
tccgaggatg aggctgatta ttactgttca gcatgggatg acagccagaa ggttgtggtt    300
ttcggcggag gaaccaagct tacggtccta ggtcaaccca aggccgctcc cagcgtgacc    360
ctgttccccc ccagcagcga ggagctgcag gccaacaagg ccaccctggt gtgtctgatc    420
agcgacttct acccaggcgc cgtgaccgtg gcctggaagg ccgacagcag ccccgtgaag    480
gccggcgtgg agaccaccac ccccagcaag cagagcaaca caagtacgc  cgccagcagc    540
tacctgagcc tgaccccaga gcagtggaag agccacagga gctacagctg ccaggtcacc    600
cacgagggca gcaccgtgga aaagaccgtg gccccaaccg agtgctcc                 648

SEQ ID NO: 242          moltype = DNA   length = 648
FEATURE                 Location/Qualifiers
misc_feature            1..648
                        note = N-LC-15
source                  1..648
                        mol_type = other DNA
                        organism = synthetic construct
SEQUENCE: 242
```

```
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaact cctcatctat gccagtaaca tgagacgccc gggggtccct   180
gaccgattct ctggctccaa gtctggcacc tcagcctccc tggccatcag tgggctccgg   240
tccgaggatg aggctgatta ttactgtgag gcatggatg acagccagaa ggctgttgtt    300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca caagtacgc cgccagcagc    540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 243       moltype = DNA  length = 648
FEATURE              Location/Qualifiers
misc_feature         1..648
                     note = N-LC-16
source               1..648
                     mol_type = other DNA
                     organism = synthetic construct
SEQUENCE: 243
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaact cctcatctat gccagtaaca tgagacgcat gggggtccct   180
gaccgattct ctggctccaa gtctggcacc tcagcctccc tggccatcag tgggctccgg   240
tccgaggatg aggctgatta ttactgtgcg gcatgggatg acagccagaa ggcttttgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca caagtacgc cgccagcagc    540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 244       moltype = DNA  length = 648
FEATURE              Location/Qualifiers
misc_feature         1..648
                     note = N-LC-17
source               1..648
                     mol_type = other DNA
                     organism = synthetic construct
SEQUENCE: 244
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaact cctcatctat gccagtaaca tgagacgccc gggggtccct   180
gaccgattct ctggctccaa gtctggcacc tcagcctccc tggccatcag tgggctccgg   240
tccgaggatg aggctgatta ttactgtgcg gcatgggatg acagccagaa ggcttgggtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca caagtacgc cgccagcagc    540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 245       moltype = DNA  length = 648
FEATURE              Location/Qualifiers
misc_feature         1..648
                     note = N-LC-18
source               1..648
                     mol_type = other DNA
                     organism = synthetic construct
SEQUENCE: 245
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaact cctcatctat gccagtaaca tgagacgccc gggggtccct   180
gaccgattct ctggctccaa gtctggcacc tcagcctccc tggccatcag tgggctccgg   240
tccgaggatg aggctgatta ttactgtgcg gcatgggatg acagccagaa ggttttttgtt  300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca caagtacgc cgccagcagc    540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 246       moltype = DNA  length = 648
FEATURE              Location/Qualifiers
misc_feature         1..648
                     note = N-LC-19
source               1..648
                     mol_type = other DNA
                     organism = synthetic construct
```

```
SEQUENCE: 246
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaact cctcatctat gccagtaaca tgagacgcct gggggtccct   180
gaccgattct ctggctccaa gtctggcacc tcagcctccc tggccatcag tgggctccgg   240
tccgaggatg aggctgatta ttactgtggg gcatgggatg acagccagaa ggcttttgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc              648

SEQ ID NO: 247          moltype = DNA   length = 648
FEATURE                 Location/Qualifiers
misc_feature            1..648
                        note = N-LC-20
source                  1..648
                        mol_type = other DNA
                        organism = synthetic construct
SEQUENCE: 247
cagtctgtgc tgactcagcc accctcagcg tctgggaccc ccgggcagag ggtcacgata    60
tcctgttctg gaagcagctc caacatcgga cgcaatgctg taagctggta tcagcagctc   120
ccaggaacgg cccccaaact cctcatctat gccagtaaca tgagacgtct gggggtccct   180
gaccgattct ctggctccaa gtctggcacc tcagcctccc tggccatcag tgggctccgg   240
tccgaggatg aggctgatta ttactgttgg gcatgggatg acagccagaa ggctgttgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc              648

SEQ ID NO: 248          moltype = DNA   length = 648
FEATURE                 Location/Qualifiers
misc_feature            1..648
                        note = N-LC-21
source                  1..648
                        mol_type = other DNA
                        organism = synthetic construct
SEQUENCE: 248
cagtctgtgc tgactcagcc accctcagcg tctgggaccc ccgggcagag ggtcacgata    60
tcctgttctg gaagcagctc caacatcgga cacaatgctg taagctggta tcagcagctc   120
ccaggaacgg cccccaaact cctcatctat gccagtaaca tgagacgtct gggggtccct   180
gaccgattct ctggctccaa gtctggcacc tcagcctccc tggccatcag tgggctccgg   240
tccgaggatg aggctgatta ttactgtggg gcatgggatg acagccagaa ggttgttgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc              648

SEQ ID NO: 249          moltype = DNA   length = 648
FEATURE                 Location/Qualifiers
misc_feature            1..648
                        note = N-LC-22
source                  1..648
                        mol_type = other DNA
                        organism = synthetic construct
SEQUENCE: 249
cagtctgtgc tgactcagcc accctcagcg tctgggaccc ccgggcagag ggtcacgata    60
tcctgttctg gaagcagctc caacatcgga cgcaatgctg taaactggta tcagcagctc   120
ccaggaacgg cccccaaact cctcatctat gccagtaaca tgagaggtat gggggtccct   180
gaccgattct ctggctccaa gtctggcacc tcagcctccc tggccatcag tgggctccgg   240
tccgaggatg aggctgatta ttactgttcg gcatgggatg acagccagaa ggttgttgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc              648

SEQ ID NO: 250          moltype = DNA   length = 648
FEATURE                 Location/Qualifiers
misc_feature            1..648
                        note = N-LC-23
source                  1..648
                        mol_type = other DNA
```

```
                    organism = synthetic construct
SEQUENCE: 250
cagtctgtgc tgactcagcc accctcagcg tctgggaccc ccgggcagag ggtcacgata    60
tcctgttctg gaagcagctc caacatcgga cacaatgctg tatggtggta tcagcagctc   120
ccaggaacgg cccccaaaact cctcatctat gccagtaaca tgagacgtat gggggtccct   180
gaccgattct ctggctccaa gtctggcacc tcagcctccc tggccatcag tgggctccgg   240
tccgaggatg aggctgatta ttactgtgcg gcatgggatg acagccagaa ggctgttgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 251          moltype = DNA   length = 648
FEATURE                 Location/Qualifiers
misc_feature            1..648
                        note = N-LC-24
source                  1..648
                        mol_type = other DNA
                        organism = synthetic construct
SEQUENCE: 251
cagtctgtgc tgactcagcc accctcagcg tctgggaccc ccgggcagag ggtcacgata    60
tcctgttctg gaagcagctc caacatcgga cgcaatgctg taaactggta tcagcagctc   120
ccaggaacgg cccccaaaact cctcatctat gccagtaaca tgagacgtcc ggggtccct    180
gaccgattct ctggctccaa gtctggcacc tcagcctccc tggccatcag tgggctccgg   240
tccgaggatg aggctgatta ttactgttcg gcatgggatg acagccagaa ggctggggtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 252          moltype = DNA   length = 648
FEATURE                 Location/Qualifiers
misc_feature            1..648
                        note = N-LC-25
source                  1..648
                        mol_type = other DNA
                        organism = synthetic construct
SEQUENCE: 252
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaaact cctcatctat gccagtaaca tgagacgctt aggggtccct   180
gaccgattct ctggctccaa gtctggcacc tcagcctccc tggccatcag tgggctccgg   240
tccgaggatg aggctgatta ttactgtgcg gcatgggatg acagccagaa ggctttggtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 253          moltype = DNA   length = 648
FEATURE                 Location/Qualifiers
misc_feature            1..648
                        note = N-LC-26
source                  1..648
                        mol_type = other DNA
                        organism = synthetic construct
SEQUENCE: 253
cagtctgtgc tgactcagcc accctcagcg tctgggaccc ccgggcagag ggtcacgata    60
tcctgttctg gaagcagctc caacatcgga aataatgctg taaactggta tcagcagctc   120
ccaggaacgg cccccaaaact cctcatctat gccagtaaca tgagacgctt aggggtccct   180
gaccgattct ctggctccaa gtctggcacc tcagcctccc tggccatcag tgggctccgg   240
tccgaggatg aggctgatta ttactgtgca gcatgggatg acagccagaa ggctgttgtt   300
ttcggcggag gaaccaagct tacggtccta ggtcaaccca aggccgctcc cagcgtgacc   360
ctgttccccc ccagcagcga ggagctgcag gccaacaagg ccaccctggt gtgtctgatc   420
agcgacttct acccaggcgc cgtgaccgtg gcctggaagg ccgacagcag ccccgtgaag   480
gccggcgtgg agaccaccac ccccagcaag cagagcaaca acaagtacgc cgccagcagc   540
tacctgagcc tgaccccaga gcagtggaag agccacagga gctacagctg ccaggtcacc   600
cacgagggca gcaccgtgga aaagaccgtg gccccaaccg agtgctcc                648

SEQ ID NO: 254          moltype = DNA   length = 1338
FEATURE                 Location/Qualifiers
misc_feature            1..1338
                        note = N-HC-1
source                  1..1338
```

SEQUENCE: 254
```
gaggtgcagc tgttggagtc tgggggaggc ttggtacagc ctgggggggtc cctgagactc  60
tcctgtgcag cctctggatt caccttcagt gactactaca tgaactgggt ccgccaggct  120
ccagggaagg ggctggagtg ggtctcatcc attagtcggt atagtagtta catatactac  180
gcagactcag tgaagggccg attcaccatc tccagagaca attccaagaa cacgctgtat  240
ctgcaaatga acagcctgag agccgaggac actgccgtgt attactgtgc gagagatatt  300
ggcggtatgg acgtctgggg ccaaggtaca ctggtcaccg tgagcagcgc cagcaccaag  360
ggcccaagcg tgttccccct ggcccccagc agcaagagca ccagcggcgg cacagccgcc  420
ctgggctgcc tggtgaagga ctacttcccc gagcccgtga ccgtgtcctg aacagcgga  480
gccctgacct ccggcgtgca caccttcccc gccgtgctgc agagcagcgg cctgtacagc  540
ctgagcagcg tggtgaccgt gcccagcagc agcctgggca cccagaccta catctgtaac  600
gtgaaccaca agcccagcaa caccaaggtg gacaagaagg tggagcccaa gagctgtgac  660
aagacccaca cctgcccccc ctgcccagcc cccgagctgc tgggcggacc cagcgtgttc  720
ctgttccccc ccaagcccaa ggacaccctg atgatcagca gaacccccga ggtgacctgt  780
gtggtggtgg acgtgtccca cgaggaccca gaggtgaagt tcaactggta cgtggacggc  840
gtggaggtgc acaacgccaa gaccaagccc agagaggagc agtacaacag cacctacagg  900
gtggtgtccg tgctgaccgt gctgcaccag gactggctga acggcaagga gtacaagtgt  960
aaggtgtcca caaggccct gccagcccca atcgaaaaga ccatcagcaa ggccaaggc 1020
cagccaagag agcccaggt gtacaccctg ccacccagca gggacgagct gaccaagaac 1080
caggtgtccc tgacctgtct ggtgaagggc ttctacccaa gcgacatcgc cgtggagtgg 1140
gagagcaacg gccagcccga gaacaactac aagaccaccc cccagtgct ggacagcgac 1200
ggcagcttct tcctgtacag caagctgacc gtgacaaga gcagatggca gcagggcaac 1260
gtgttcagct gctccgtgat gcacgaggcc ctgcacaacc actaccccca gaagagcctg 1320
agcctgtccc caggcaag                                              1338
```

SEQ ID NO: 255          moltype = DNA  length = 1338
FEATURE                 Location/Qualifiers
misc_feature            1..1338
                        note = N-HC-2
source                  1..1338
                        mol_type = other DNA
                        organism = synthetic construct
SEQUENCE: 255
```
gaggtgcagc tgttggagtc tgggggaggc ttggtacagc ctggggggtc cctgagactc    60
tcctgtgcag cctctggatt caccttcagt gactactaca tgaactgggt ccgccaggct   120
ccagggaagg ggctggagtg ggtctcatcc attagtcggt atagtggcta cgtttactac   180
gcagactcag tgaagggccg attcaccatc tccagagaca attccaagaa cacgctgtat   240
ctgcaaatga acagcctgag agccgaggac actgccgtgt attactgtgc gagagatatt   300
ggcggtatgg acgtctgggg ccaaggtaca ctggtcaccg tgagcagcgc cagcaccaag   360
ggcccaagcg tgttccccct ggcccccagc agcaagagca ccagcggcgg cacagccgcc   420
ctgggctgcc tggtgaagga ctacttcccc gagcccgtga ccgtgtcctg aacagcgga   480
gccctgacct ccggcgtgca caccttcccc gccgtgctgc agagcagcgg cctgtacagc   540
ctgagcagcg tggtgaccgt gcccagcagc agcctgggca cccagaccta catctgtaac   600
gtgaaccaca agcccagcaa caccaaggtg gacaagaagg tggagcccaa gagctgtgac   660
aagacccaca cctgcccccc ctgcccagcc cccgagctgc tgggcggacc cagcgtgttc   720
ctgttccccc ccaagcccaa ggacaccctg atgatcagca gaacccccga ggtgacctgt   780
gtggtggtgg acgtgtccca cgaggaccca gaggtgaagt tcaactggta cgtggacggc   840
gtggaggtgc acaacgccaa gaccaagccc agagaggagc agtacaacag cacctacagg   900
gtggtgtccg tgctgaccgt gctgcaccag gactggctga acggcaagga gtacaagtgt   960
aaggtgtcca caaggccct gccagcccca atcgaaaaga ccatcagcaa ggccaaggc  1020
cagccaagag agcccaggt gtacaccctg ccacccagca gggacgagct gaccaagaac  1080
caggtgtccc tgacctgtct ggtgaagggc ttctacccaa gcgacatcgc cgtggagtgg  1140
gagagcaacg gccagcccga gaacaactac aagaccaccc cccagtgct ggacagcgac  1200
ggcagcttct tcctgtacag caagctgacc gtgacaaga gcagatggca gcagggcaac  1260
gtgttcagct gctccgtgat gcacgaggcc ctgcacaacc actaccccca gaagagcctg  1320
agcctgtccc caggcaag                                               1338
```

SEQ ID NO: 256          moltype = DNA  length = 1338
FEATURE                 Location/Qualifiers
misc_feature            1..1338
                        note = N-HC-3
source                  1..1338
                        mol_type = other DNA
                        organism = synthetic construct
SEQUENCE: 256
```
gaggtgcagc tgttggagtc tgggggaggc ttggtacagc ctggggggtc cctgagactc    60
tcctgtgcag cctctggatt caccttcagt gactactaca tggactgggt ccgccaggct   120
ccagggaagg ggctggagtg ggtctcatcc attagtcggt atagtggcta cgtttactac   180
gcagactcag tgaagggccg attcaccatc tccagagaca attccaagaa cacgctgtat   240
ctgcaaatga acagcctgag agccgaggac actgccgtgt attactgtgc gagagatatt   300
ggcggtatgg acgtctgggg ccaaggtaca ctggtcaccg tgagcagcgc cagcaccaag   360
ggcccaagcg tgttccccct ggcccccagc agcaagagca ccagcggcgg cacagccgcc   420
ctgggctgcc tggtgaagga ctacttcccc gagcccgtga ccgtgtcctg aacagcgga   480
gccctgacct ccggcgtgca caccttcccc gccgtgctgc agagcagcgg cctgtacagc   540
ctgagcagcg tggtgaccgt gcccagcagc agcctgggca cccagaccta catctgtaac   600
gtgaaccaca agcccagcaa caccaaggtg gacaagaagg tggagcccaa gagctgtgac   660
aagacccaca cctgcccccc ctgcccagcc cccgagctgc tgggcggacc cagcgtgttc   720
```

```
ctgttccccc caagcccaa ggacaccctg atgatcagca gaaccccga ggtgacctgt    780
gtggtggtgg acgtgtccca cgaggaccca gaggtgaagt tcaactggta cgtggacggc   840
gtggaggtgc acaacgccaa gaccaagccc agagaggagc agtacaacag cacctacagg   900
gtggtgtccg tgctgaccgt gctgcaccag gactggctga acggcaagga gtacaagtgt   960
aaggtgtcca acaaggccct gccagcccca atcgaaaaga ccatcagcaa ggccaagggc  1020
cagccaagag agcccaggt gtacaccctg ccacccagca gggacgagct gaccaagaac  1080
caggtgtccc tgacctgtct ggtgaagggc ttctacccaa gcgacatcgc cgtggagtgg  1140
gagagcaacg gccagcccga gaacaactac aagaccaccc ccccagtgct ggacagcgac  1200
ggcagcttct tcctgtacag caagctgacc gtggacaaga gcagatggca gcagggcaac  1260
gtgttcagct gctccgtgat gcacgaggcc ctgcacaacc actacaccca gaagagcctg  1320
agcctgtccc caggcaag                                                  1338

SEQ ID NO: 257           moltype = DNA  length = 1338
FEATURE                  Location/Qualifiers
misc_feature             1..1338
                         note = N-HC-4
source                   1..1338
                         mol_type = other DNA
                         organism = synthetic construct
SEQUENCE: 257
gaggtgcagc tgttggagtc tgggggaggc ttggtacagc ctgggggtc cctgagactc     60
tcctgtgcag cctctggatt cacctcagt gactactaca tggactgggt ccgccaggct   120
ccagggaagg ggctggagtg ggtctcatcc attagtcggg ctagtagcta cgtttactac   180
gcagactcag tgaagggccg attcaccatc tccagagaca attccaagaa cacgctgtat   240
ctgcaaatga acagcctgag agccgaggac actgccgtgt attactgtgc gagagatatt   300
ggcggtatgg acgtctgggg ccaaggtaca ctggtcaccg tgagcagcgc cagcaccaag   360
ggcccaagcg tgttcccct ggcccccagc agcaagagca ccagcggcgg cacagccgcc   420
ctgggctgcc tggtgaagga ctacttcccc gagcccgtga ccgtgtcctg aacagcgga   480
gccctgacct ccggcgtgca caccttcccc gccgtgctgc agagcagcgg cctgtacagc   540
ctgagcagcg tggtgaccgt gcccagcagc agcctgggca cccagaccta catctgtaac   600
gtgaaccaca agcccagcaa caccaaggtg gacaagaagg tggagcccaa gagctgtgac   660
aagacccaca cctgcccccc ctgcccagcc cccgagctgc tgggcggacc cagcgtgttc   720
ctgttccccc caagcccaa ggacaccctg atgatcagca gaaccccga ggtgacctgt    780
gtggtggtgg acgtgtccca cgaggaccca gaggtgaagt tcaactggta cgtggacggc   840
gtggaggtgc acaacgccaa gaccaagccc agagaggagc agtacaacag cacctacagg   900
gtggtgtccg tgctgaccgt gctgcaccag gactggctga acggcaagga gtacaagtgt   960
aaggtgtcca acaaggccct gccagcccca atcgaaaaga ccatcagcaa ggccaagggc  1020
cagccaagag agcccaggt gtacaccctg ccacccagca gggacgagct gaccaagaac  1080
caggtgtccc tgacctgtct ggtgaagggc ttctacccaa gcgacatcgc cgtggagtgg  1140
gagagcaacg gccagcccga gaacaactac aagaccaccc ccccagtgct ggacagcgac  1200
ggcagcttct tcctgtacag caagctgacc gtggacaaga gcagatggca gcagggcaac  1260
gtgttcagct gctccgtgat gcacgaggcc ctgcacaacc actacaccca gaagagcctg  1320
agcctgtccc caggcaag                                                  1338

SEQ ID NO: 258           moltype = DNA  length = 1338
FEATURE                  Location/Qualifiers
misc_feature             1..1338
                         note = N-HC-5
source                   1..1338
                         mol_type = other DNA
                         organism = synthetic construct
SEQUENCE: 258
gaggtgcagc tgttggagtc tgggggaggc ttggtacagc ctgggggtc cctgagactc     60
tcctgtgcag cctctggatt caccttcagt gactactaca tgaactgggt ccgccaggct   120
ccaggggaagg ggctggagtg ggtctcatcc attagtggga atagtggtac atatactac   180
gcagactcag tgaagggccg attcaccatc tccagagaca attccaagaa cacgctgtat   240
ctgcaaatga acagcctgag agccgaggac actgccgtgt attactgtgc gagagatatt   300
ggcggtatgg acgtctgggg ccaaggtaca ctggtcaccg tgagcagcgc cagcaccaag   360
ggcccaagcg tgttcccct ggcccccagc agcaagagca ccagcggcgg cacagccgcc   420
ctgggctgcc tggtgaagga ctacttcccc gagcccgtga ccgtgtcctg aacagcgga   480
gccctgacct ccggcgtgca caccttcccc gccgtgctgc agagcagcgg cctgtacagc   540
ctgagcagcg tggtgaccgt gcccagcagc agcctgggca cccagaccta catctgtaac   600
gtgaaccaca agcccagcaa caccaaggtg gacaagaagg tggagcccaa gagctgtgac   660
aagacccaca cctgcccccc ctgcccagcc cccgagctgc tgggcggacc cagcgtgttc   720
ctgttccccc caagcccaa ggacaccctg atgatcagca gaaccccga ggtgacctgt    780
gtggtggtgg acgtgtccca cgaggaccca gaggtgaagt tcaactggta cgtggacggc   840
gtggaggtgc acaacgccaa gaccaagccc agagaggagc agtacaacag cacctacagg   900
gtggtgtccg tgctgaccgt gctgcaccag gactggctga acggcaagga gtacaagtgt   960
aaggtgtcca acaaggccct gccagcccca atcgaaaaga ccatcagcaa ggccaagggc  1020
cagccaagag agcccaggt gtacaccctg ccacccagca gggacgagct gaccaagaac  1080
caggtgtccc tgacctgtct ggtgaagggc ttctacccaa gcgacatcgc cgtggagtgg  1140
gagagcaacg gccagcccga gaacaactac aagaccaccc ccccagtgct ggacagcgac  1200
ggcagcttct tcctgtacag caagctgacc gtggacaaga gcagatggca gcagggcaac  1260
gtgttcagct gctccgtgat gcacgaggcc ctgcacaacc actacaccca gaagagcctg  1320
agcctgtccc caggcaag                                                  1338

SEQ ID NO: 259           moltype = DNA  length = 1338
FEATURE                  Location/Qualifiers
misc_feature             1..1338
```

```
                        note = N-HC-6
source                  1..1338
                        mol_type = other DNA
                        organism = synthetic construct
SEQUENCE: 259
gaggtgcagc tgttggagtc tgggggaggc ttggtacagc ctgggggtc cctgagactc   60
tcctgtgcag cctcgggatt caccttcagt gtctactaca tgaactgggt ccgccaggct  120
ccagggaagg ggctggagtg ggtctcatcc attagtcggt atagtggcta cgtttactac  180
gcagactcag tgaagggccg attcaccatc tccagagaca attccaagaa cacgctgtat  240
ctgcaaatga acagcctgag agccgaggac actgccgtgt attactgtgc gagagatatt  300
ggcggtatgg acgtctgggg ccaaggtaca ctggtcaccg tgagcagcgc cagcaccaag  360
ggcccaagcg tgttccccct ggccccagc agcaagagca ccagcggcgg cacagccgcc  420
ctgggctgcc tggtgaagga ctacttcccc gagcccgtga ccgtgtcctg aacagcgga   480
gccctgacct ccggcgtgca caccttcccc gccgtgctgc agagcagcgg cctgtacagc  540
ctgagcagcg tggtgaccgt gcccagcagc agcctgggca cccagaccta catctgtaac  600
gtgaaccaca gcccagcaa caccaaggtg gacaagaagg tggagcccaa gagctgtgac  660
aagacccaca cctgccccc ctgcccagcc ccgagctgc tgggcggacc cagcgtgttc   720
ctgttccccc caagcccaa ggacaccctg atgatcagca gaacccccga ggtgacctgt  780
gtggtggtgg acgtgtccca cgaggaccca gaggtgaagt tcaactggta cgtggacggc  840
gtggaggtgc acaacgccaa gaccaagccc agagaggagc agtacaacag cacctacagg  900
gtggtgtccg tgctgaccgt gctgcaccag gactggctga acggcaagga gtacaagtgt  960
aaggtgtcca acaaggccct gccagcccca atcgaaaaga ccatcagcaa ggccaagggc  1020
cagccaagag agcccaggt gtacaccctg ccacccagca gggacgagct gaccaagaac  1080
caggtgtccc tgacctgtct ggtgaagggc ttctacccaa gcgacatcgc cgtggagtgg  1140
gagagcaacg gccagcccga gaacaactac aagaccaccc cccagtgct ggacagcgac  1200
ggcagcttct tcctgtacag caagctgacc gtggacaaga gcagatggca gcagggcaac  1260
gtgttcagct gctccgtgat gcacgaggcc ctgcacaacc actacaccca gaagagctg  1320
agcctgtccc caggcaag                                                1338

SEQ ID NO: 260          moltype = DNA   length = 1338
FEATURE                 Location/Qualifiers
misc_feature            1..1338
                        note = N-HC-7
source                  1..1338
                        mol_type = other DNA
                        organism = synthetic construct
SEQUENCE: 260
gaggtgcagc tgttggagtc tgggggaggc ttggtacagc ctgggggtc cctgagactc   60
tcctgtgcag cctctggatt caccttcagt gactactacg tgaactgggt ccgccaggct  120
ccagggaagg ggctggagtg ggtctcatcc attagtcggt atagtggcta cgtttactac  180
gcagactcag tgaagggccg attcaccatc tccagagaca attccaagaa cacgctgtat  240
ctgcaaatga acagcctgag agccgaggac actgccgtgt attactgtgc gagagatatt  300
ggcggtatgg acgtctgggg ccaaggtaca ctggtcaccg tgagcagcgc cagcaccaag  360
ggcccaagcg tgttccccct ggccccagc agcaagagca ccagcggcgg cacagccgcc  420
ctgggctgcc tggtgaagga ctacttcccc gagcccgtga ccgtgtcctg aacagcgga   480
gccctgacct ccggcgtgca caccttcccc gccgtgctgc agagcagcgg cctgtacagc  540
ctgagcagcg tggtgaccgt gcccagcagc agcctgggca cccagaccta catctgtaac  600
gtgaaccaca gcccagcaa caccaaggtg gacaagaagg tggagcccaa gagctgtgac  660
aagacccaca cctgccccc ctgcccagcc ccgagctgc tgggcggacc cagcgtgttc   720
ctgttccccc caagcccaa ggacaccctg atgatcagca gaacccccga ggtgacctgt  780
gtggtggtgg acgtgtccca cgaggaccca gaggtgaagt tcaactggta cgtggacggc  840
gtggaggtgc acaacgccaa gaccaagccc agagaggagc agtacaacag cacctacagg  900
gtggtgtccg tgctgaccgt gctgcaccag gactggctga acggcaagga gtacaagtgt  960
aaggtgtcca acaaggccct gccagcccca atcgaaaaga ccatcagcaa ggccaagggc  1020
cagccaagag agcccaggt gtacaccctg ccacccagca gggacgagct gaccaagaac  1080
caggtgtccc tgacctgtct ggtgaagggc ttctacccaa gcgacatcgc cgtggagtgg  1140
gagagcaacg gccagcccga gaacaactac aagaccaccc cccagtgct ggacagcgac  1200
ggcagcttct tcctgtacag caagctgacc gtggacaaga gcagatggca gcagggcaac  1260
gtgttcagct gctccgtgat gcacgaggcc ctgcacaacc actacaccca gaagagctg  1320
agcctgtccc caggcaag                                                1338

SEQ ID NO: 261          moltype = DNA   length = 1347
FEATURE                 Location/Qualifiers
misc_feature            1..1347
                        note = N-HC-8
source                  1..1347
                        mol_type = other DNA
                        organism = synthetic construct
SEQUENCE: 261
gaggtgcagc tgttggagtc tgggggaggc ttggtacagc ctgggggaag cttgagactc   60
tcctgtgcag cctctggatt caccttcagt aattactaca tgcactgggt ccgccaagct  120
ccagggaagg ggctggagtg ggtctcatcc attagtgcta gggtcgtta ccactactac   180
gcagactcag tgaagggccg attcaccatc tccagagaca attccaagaa cacgctgtat  240
ctgcaaatga acagcctgag agccgaggac actgccgtgt attactgtgc gagactttgt  300
acgaggcata atgcttttga tatctggggc caggtacca tggtcaccgt gagctcagc   360
agcaccaagg gcccaagcgt gttccccctg gccccagca gcaagagcac cagcggcgg   420
acagccgccc tgggctgcct ggtgaaggac tacttcccg agcccgtgac cgtgtcctgg  480
aacagcggag ccctgacctc cggcgtgcac accttcccg ccgtgctgca gagcagcggc  540
ctgtacagcc tgagcagcgt ggtgaccgtg cccagcagca gcctgggcac ccagacctac  600
```

```
atctgtaacg tgaaccacaa gcccagcaac accaaggtgg acaagaaggt ggagcccaag    660
agctgtgaca agaccacaca ctgcccccc  tgcccagccc ccgagctgct gggcggaccc    720
agcgtgttcc tgttccccc  caagcccaag acaccctga  tgatcagcag aaccccgag    780
gtgacctgtg tggtggtgga cgtgtcccac gaggacccag aggtgaagtt caactggtac    840
gtggacggcg tggaggtgca caacgccaag accaagccca gagaggagca gtacaacagc    900
acctacaggg tggtgtccgt gctgaccgtg ctgcaccagg actggctgaa cggcaaggag    960
tacaagtgta aggtgtccaa caaggccctg ccagccccaa tcgaaaagac catcagcaag   1020
gccaagggcc agccaagaga gccccaggtg tacaccctgc cacccagcag ggacgagctg   1080
accaagaacc aggtgtccct gacctgtctg gtgaagggct tctacccaag cgacatccag   1140
gtggagtggg agagcaacgg ccagcccgag aacaactaca agaccacccc cccagtgctg   1200
gacagcgacg gcagcttctt cctgtacagc aagctgaccg tggacaagag cagatggcag   1260
cagggcaacg tgttcagctg ctccgtgatg cacgaggccc tgcacaacca ctacacccag   1320
aagagcctga gcctgtcccc aggcaag                                        1347

SEQ ID NO: 262          moltype = DNA   length = 1347
FEATURE                 Location/Qualifiers
misc_feature            1..1347
                        note = N-HC-9
source                  1..1347
                        mol_type = other DNA
                        organism = synthetic construct
SEQUENCE: 262
gaggtgcagc tgttggagtc tggggggaggc ttggtacagc ctgggggaag cttgagactc    60
tcctgtgcag catctggatt caccttcagt aattactaca tgcactgggt ccgccaagct   120
ccagggaagg ggctggagtg ggtctcatcc attagtgctc gtagtagtta catatactac   180
gcagactcag tgaagggccg attcaccatc tccagagaca acagccaagaa cacgctgtat   240
ctgcaaatga acagcctgag agccgaggac actgccgtgt attactgtgc gagacttgct   300
acgaggaata atgcttttga tatctggggc cagggtacac tggtcaccgt gagctcagcc   360
agcaccaagg gcccaagcgt gttccccctg gcccccagca gcaagagcac cagcggcggc   420
acagccgccc tgggctgcct ggtgaaggac tacttccccg agcccgtgac cgtgtcctgg   480
aacagcggag ccctgacctc cggcgtgcac accttccccg ccgtgctgca gagcagcggc   540
ctgtacagcc tgagcagcgt ggtgaccgtg cccagcagca gcctgggcac ccagacctac   600
atctgtaacg tgaaccacaa gcccagcaac accaaggtgg acaagaaggt ggagcccaag   660
agctgtgaca agaccacaca ctgcccccc  tgcccagccc ccgagctgct gggcggaccc   720
agcgtgttcc tgttccccc  caagcccaag acaccctga  tgatcagcag aaccccgag   780
gtgacctgtg tggtggtgga cgtgtcccac gaggacccag aggtgaagtt caactggtac   840
gtggacggcg tggaggtgca caacgccaag accaagccca gagaggagca gtacaacagc   900
acctacaggg tggtgtccgt gctgaccgtg ctgcaccagg actggctgaa cggcaaggag   960
tacaagtgta aggtgtccaa caaggccctg ccagccccaa tcgaaaagac catcagcaag  1020
gccaagggcc agccaagaga gccccaggtg tacaccctgc cacccagcag ggacgagctg  1080
accaagaacc aggtgtccct gacctgtctg gtgaagggct tctacccaag cgacatcgcc  1140
gtggagtggg agagcaacgg ccagcccgag aacaactaca gaccaccccc cccagtgctg  1200
gacagcgacg gcagcttctt cctgtacagc aagctgaccg tggacaagag cagatggcag  1260
cagggcaacg tgttcagctg ctccgtgatg cacgaggccc tgcacaacca ctacacccag  1320
aagagcctga gcctgtcccc aggcaag                                        1347

SEQ ID NO: 263          moltype = DNA   length = 1347
FEATURE                 Location/Qualifiers
misc_feature            1..1347
                        note = N-HC-10
source                  1..1347
                        mol_type = other DNA
                        organism = synthetic construct
SEQUENCE: 263
gaggtgcagc tgttggagtc tgggggaggc ttggtacaac ctgggggaag cttgagactc    60
tcctgtgcag cctctggatt caccttcagt cattactaca tgcactgggt ccgccaagct   120
ccagggaagg ggctggagtg ggtctcatcc attagtgctc ttagtagtta catatactac   180
gcagactcag tgaggggccg attcaccatc tccagagaca attccaagaa cacgctgtat   240
ctgcaaatga acagcctgag agccgaggac actgccgtgt attactgtgc gagacttgct   300
acgaggcgtg atgcttttga tatctggggc cagggtacac tggtcaccgt gagctcagcc   360
agcaccaagg gcccaagcgt gttccccctg gcccccagca gcaagagcac cagcggcggc   420
acagccgccc tgggctgcct ggtgaaggac tacttccccg agcccgtgac cgtgtcctgg   480
aacagcggag ccctgacctc cggcgtgcac accttccccg ccgtgctgca gagcagcggc   540
ctgtacagcc tgagcagcgt ggtgaccgtg cccagcagca gcctgggcac ccagacctac   600
atctgtaacg tgaaccacaa gcccagcaac accaaggtgg acaagaaggt ggagcccaag   660
agctgtgaca agaccacaca ctgcccccc  tgcccagccc ccgagctgct gggcggaccc   720
agcgtgttcc tgttccccc  caagcccaag acaccctga  tgatcagcag aaccccgag   780
gtgacctgtg tggtggtgga cgtgtcccac gaggacccag aggtgaagtt caactggtac   840
gtggacggcg tggaggtgca caacgccaag accaagccca gagaggagca gtacaacagc   900
acctacaggg tggtgtccgt gctgaccgtg ctgcaccagg actggctgaa cggcaaggag   960
tacaagtgta aggtgtccaa caaggccctg ccagccccaa tcgaaaagac catcagcaag  1020
gccaagggcc agccaagaga gccccaggtg tacaccctgc cacccagcag ggacgagctg  1080
accaagaacc aggtgtccct gacctgtctg gtgaagggct tctacccaag cgacatcgcc  1140
gtggagtggg agagcaacgg ccagcccgag aacaactaca agaccacccc cccagtgctg  1200
gacagcgacg gcagcttctt cctgtacagc aagctgaccg tggacaagag cagatggcag  1260
cagggcaacg tgttcagctg ctccgtgatg cacgaggccc tgcacaacca ctacacccag  1320
aagagcctga gcctgtcccc aggcaag                                        1347

SEQ ID NO: 264          moltype = DNA   length = 1347
```

| | | |
|---|---|---|
| FEATURE | Location/Qualifiers | |
| misc_feature | 1..1347 | |
| | note = N-HC-11 | |
| source | 1..1347 | |
| | mol_type = other DNA | |
| | organism = synthetic construct | |

SEQUENCE: 264

```
gaggtgcagc tgttggagtc tggggggaggc ttggtacagc ctgggggaag cttgagactc   60
tcctgtgcag cctctggatt caccttcagt cgttactaca tgcactgggt ccgccaagct  120
ccagggaagg ggctggagtg ggtctcatcc attagtgctc agagtagtca catatactac  180
gcagactcag tgagggccg attcaccatc tccagagaca attccaagaa cacgctgtat  240
ctgcaaatga acagcctgag agccgaggac actgccgtgt attactgtgc gagacttgct  300
acgaggcaaa acgcttttga tatctggggc cagggtacac tggtcaccgt gagctcagcc  360
agcaccaagg gcccaagcgt gttccccctg gcccccagca gcaagagcac cagcggcggc  420
acagccgccc tgggctgcct ggtgaaggac tacttccccg agcccgtgac cgtgtcctgg  480
aacagcggag ccctgacctc cggcgtgcac accttcccg ccgtgctgca gagcagcggc  540
ctgtacagcc tgagcagcgt ggtgaccgtg cccagcagca gcctgggcac ccagacctac  600
atctgtaacg tgaaccacaa gcccagcaac accaaggtgg acaagaaggt gagcccaag  660
agctgtgaca agacccacac ctgccccccc tgcccagccc cgagctgct gggcggaccc  720
agcgtgttcc tgttccccc caagcccaag acaccctga tgatcagcag aacccccgag  780
gtgacctgtg tggtggtgga cgtgtcccac gaggacccag aggtgaagtt caactggtac  840
gtggacggcg tggaggtgca caacgccaag accaagccca gagaggagca gtacaacagc  900
acctacaggg tggtgtccgt gctgaccgtg ctgcaccagg actggctgaa cggcaaggag  960
tacaagtgta aggtgtccaa caaggccctg ccagcccaa tcgaaaagac catcagcaag 1020
gccaagggcc agcaagaga gccccaggtg tacaccctgc cacccagcag ggacgagctg 1080
accaagaacc aggtgtccct gacctgtctg gtgaagggct tctacccaag cgacatcgcc 1140
gtggagtggg agagcaacgg ccagcccgag aacaactaca agaccaccc cccagtgctg 1200
gacagcgacg gcagcttctt cctgtacagc aagctgaccg tggacaagag cagatggcag 1260
cagggcaacg tgttcagctg ctccgtgatg cacgaggccc tgcacaacca ctacacccag 1320
aagagcctga gcctgtcccc aggcaag                                      1347
```

| | | |
|---|---|---|
| SEQ ID NO: 265 | moltype = DNA length = 1347 | |
| FEATURE | Location/Qualifiers | |
| misc_feature | 1..1347 | |
| | note = N-HC-12 | |
| source | 1..1347 | |
| | mol_type = other DNA | |
| | organism = synthetic construct | |

SEQUENCE: 265

```
gaggtgcagc tgttggagtc tggggggaggc ttggtacagc ctgggggaag cttgagactc   60
tcctgtgcag cctctggatt caccttcagt aattactaca tgcactgggt ccgccaagct  120
ccagggaagg ggctggagtg ggtctcatcc attagtgctc ggagtagcta cctatactac  180
gcagactcag tgaagggccg attcaccatc tccagagaca attccaagaa cacgctgtat  240
ctgcaaatga acagcctgag agccgaggac actgccgtgt attactgtgc gagacttgct  300
accaggcatg tcgcttttga tatctggggc cagggtacac tggtcaccgt gagctcagcc  360
agcaccaagg gcccaagcgt gttccccctg gcccccagca gcaagagcac cagcggcggc  420
acagccgccc tgggctgcct ggtgaaggac tacttccccg agcccgtgac cgtgtcctgg  480
aacagcggag ccctgacctc cggcgtgcac accttcccg ccgtgctgca gagcagcggc  540
ctgtacagcc tgagcagcgt ggtgaccgtg cccagcagca gcctgggcac ccagacctac  600
atctgtaacg tgaaccacaa gcccagcaac accaaggtgg acaagaaggt ggagcccaag  660
agctgtgaca agacccacac ctgccccccc tgcccagccc ccgagctgct gggcggaccc  720
agcgtgttcc tgttccccc caagcccaag acaccctga tgatcagcag aacccccgag  780
gtgacctgtg tggtggtgga cgtgtcccac gaggacccag aggtgaagtt caactggtac  840
gtggacggcg tggaggtgca caacgccaag accaagccca gagaggagca gtacaacagc  900
acctacaggg tggtgtccgt gctgaccgtg ctgcaccagg actggctgaa cggcaaggag  960
tacaagtgta aggtgtccaa caaggccctg ccagcccaa tcgaaaagac catcagcaag 1020
gccaagggcc agcaagaga gccccaggtg tacaccctgc cacccagcag ggacgagctg 1080
accaagaacc aggtgtccct gacctgtctg gtgaagggct tctacccaag cgacatcgcc 1140
gtggagtggg agagcaacgg ccagcccgag aacaactaca agaccaccc cccagtgctg 1200
gacagcgacg gcagcttctt cctgtacagc aagctgaccg tggacaagag cagatggcag 1260
cagggcaacg tgttcagctg ctccgtgatg cacgaggccc tgcacaacca ctacacccag 1320
aagagcctga gcctgtcccc aggcaag                                      1347
```

| | | |
|---|---|---|
| SEQ ID NO: 266 | moltype = DNA length = 1347 | |
| FEATURE | Location/Qualifiers | |
| misc_feature | 1..1347 | |
| | note = N-HC-13 | |
| source | 1..1347 | |
| | mol_type = other DNA | |
| | organism = synthetic construct | |

SEQUENCE: 266

```
gaggtgcagc tgttggagtc tggggggaggc ttggtacagc ctgggggaag cttgagactc   60
tcctgtgcag cctctggatt caccttcagt aattactaca tgcactgggt ccgccaagct  120
ccagggaagg ggctggagtg ggtctcatcc attagtgctc ggagtagcta cctatactac  180
gcagactcag tgaagggccg attcaccatc tccagagaca attccaagaa cacgctgtat  240
ctgcaaatga acagcctgag agccgaggac actgccgtgt attactgtgc gagacttgct  300
accaggcatg gcgcttttga tatctggggc cagggtacac tggtcaccgt gagctcagcc  360
agcaccaagg gcccaagcgt gttccccctg gcccccagca gcaagagcac cagcggcggc  420
acagccgccc tgggctgcct ggtgaaggac tacttccccg agcccgtgac cgtgtcctgg  480
```

```
aacagcggag ccctgacctc cggcgtgcac accttccccg ccgtgctgca gagcagcggc 540
ctgtacagcc tgagcagcgt ggtgaccgtg cccagcagca gcctgggcac ccagacctac 600
atctgtaacg tgaaccacaa gcccagcaac accaaggtgg acaagaaggt ggagcccaag 660
agctgtgaca agacccacac ctgcccccc tgcccagccc ccgagctgct gggcggaccc 720
agcgtgttcc tgttccccc caagcccaag gacaccctga tgatcagcag aacccccgag 780
gtgacctgtg tggtggtgga cgtgtcccac gaggacccag aggtgaagtt caactggtac 840
gtggacggcg tggaggtgca caacgccaag accaagccca gagaggagca gtacaacagc 900
acctacaggg tggtgtccgt gctgaccgtg ctgcaccagg actggctgaa cggcaaggag 960
tacaagtgta aggtgtccaa caaggccctg ccagccccaa tcgaaaagac catcagcaag 1020
gccaagggcc agccaagaga gccccaggtg tacaccctgc cacccagcag ggacgagctg 1080
accaagaacc aggtgtccct gacctgtctg gtgaagggct tctacccaag cgacatcgcc 1140
gtggagtggg agagcaacgg ccagcccgag aacaactaca agaccacccc ccagtgctg 1200
gacagcgacg gcagcttctt cctgtacagc aagctgaccg tggacaagag cagatggcag 1260
cagggcaacg tgttcagctg ctccgtgatg cacgaggccc tgcacaacca ctacacccag 1320
aagagcctga gcctgtcccc aggcaag                                      1347

SEQ ID NO: 267          moltype = DNA   length = 1347
FEATURE                 Location/Qualifiers
misc_feature            1..1347
                        note = N-HC-14
source                  1..1347
                        mol_type = other DNA
                        organism = synthetic construct
SEQUENCE: 267
gaggtgcagc tgttggagtc tgggggaggc ttggtacagc ctgggggaag cttgagactc 60
tcctgtgcag cctctggatt caccttcagt aattactgca tgcactgggt ccgccaagct 120
ccagggaagg ggctggagtg ggtctcatcc attagtgctc ggagtagcta catatactac 180
gcagactcag tgaagggccg attcaccatc tccagagaca attccaagaa cacgctgtat 240
ctgcaaatga acagcctgag agccgaggac actgccgtgt attactgtgc gagacttgct 300
accaggcata acgcttttga tatctggggc cagggtacac tggtcaccgt gagctcagcc 360
agcaccaagg gcccaagcgt gttccccctg gcccccagca gcaagagcac cagcggcggc 420
acagccgccc tgggctgcct ggtgaaggac tacttccccg agcccgtgac cgtgtcctgg 480
aacagcggag ccctgacctc cggcgtgcac accttccccg ccgtgctgca gagcagcggc 540
ctgtacagcc tgagcagcgt ggtgaccgtg cccagcagca gcctgggcac ccagacctac 600
atctgtaacg tgaaccacaa gcccagcaac accaaggtgg acaagaaggt ggagcccaag 660
agctgtgaca agacccacac ctgcccccc tgcccagccc ccgagctgct gggcggaccc 720
agcgtgttcc tgttccccc caagcccaag gacaccctga tgatcagcag aacccccgag 780
gtgacctgtg tggtggtgga cgtgtcccac gaggacccag aggtgaagtt caactggtac 840
gtggacggcg tggaggtgca caacgccaag accaagccca gagaggagca gtacaacagc 900
acctacaggg tggtgtccgt gctgaccgtg ctgcaccagg actggctgaa cggcaaggag 960
tacaagtgta aggtgtccaa caaggccctg ccagccccaa tcgaaaagac catcagcaag 1020
gccaagggcc agccaagaga gccccaggtg tacaccctgc acccagcag ggacgagctg 1080
accaagaacc aggtgtccct gacctgtctg gtgaagggct tctacccaag cgacatcgcc 1140
gtggagtggg agagcaacgg ccagcccgag aacaactaca agaccacccc ccagtgctg 1200
gacagcgacg gcagcttctt cctgtacagc aagctgaccg tggacaagag cagatggcag 1260
cagggcaacg tgttcagctg ctccgtgatg cacgaggccc tgcacaacca ctacacccag 1320
aagagcctga gcctgtcccc aggcaag                                      1347

SEQ ID NO: 268          moltype = DNA   length = 1347
FEATURE                 Location/Qualifiers
misc_feature            1..1347
                        note = N-HC-15
source                  1..1347
                        mol_type = other DNA
                        organism = synthetic construct
SEQUENCE: 268
gaggtgcagc tgttggagtc tgggggaggc ttggtacagc ctgggggaag cttgagactc 60
tcctgtgcag cctctggatt caccttcagt aattactaca tgcactgggt ccgccaagct 120
ccagggaagg ggctggagtg ggtctcatcc attagtgctc gcagtagcta ccgctactac 180
gcagactcag tgaagggccg attcaccatc tccagagaca attccaagaa cacgctgtat 240
ctgcaaatga acagcctgag agccgaggac actgccgtgt attactgtgc gagacttgct 300
accaggcatc tcgcttttga tatctgggc cagggtacac tggtcaccgt gagctcagcc 360
agcaccaagg gcccaagcgt gttccccctg gcccccagca gcaagagcac cagcggcggc 420
acagccgccc tgggctgcct ggtgaaggac tacttccccg agcccgtgac cgtgtcctgg 480
aacagcggag ccctgacctc cggcgtgcac accttccccg ccgtgctgca gagcagcggc 540
ctgtacagcc tgagcagcgt ggtgaccgtg cccagcagca gcctgggcac ccagacctac 600
atctgtaacg tgaaccacaa gcccagcaac accaaggtgg acaagaaggt ggagcccaag 660
agctgtgaca agacccacac ctgcccccc tgcccagccc ccgagctgct gggcggaccc 720
agcgtgttcc tgttccccc caagcccaag gacaccctga tgatcagcag aacccccgag 780
gtgacctgtg tggtggtgga cgtgtcccac gaggacccag aggtgaagtt caactggtac 840
gtggacggcg tggaggtgca caacgccaag accaagccca gagaggagca gtacaacagc 900
acctacaggg tggtgtccgt gctgaccgtg ctgcaccagg actggctgaa cggcaaggag 960
tacaagtgta aggtgtccaa caaggccctg ccagccccaa tcgaaaagac catcagcaag 1020
gccaagggcc agccaagaga gccccaggtg tacaccctgc acccagcag ggacgagctg 1080
accaagaacc aggtgtccct gacctgtctg gtgaagggct tctacccaag cgacatcgcc 1140
gtggagtggg agagcaacgg ccagcccgag aacaactaca agaccacccc ccagtgctg 1200
gacagcgacg gcagcttctt cctgtacagc aagctgaccg tggacaagag cagatggcag 1260
cagggcaacg tgttcagctg ctccgtgatg cacgaggccc tgcacaacca ctacacccag 1320
aagagcctga gcctgtcccc aggcaag                                      1347
```

```
SEQ ID NO: 269          moltype = DNA  length = 1347
FEATURE                 Location/Qualifiers
misc_feature            1..1347
                        note = N-HC-16
source                  1..1347
                        mol_type = other DNA
                        organism = synthetic construct
SEQUENCE: 269
gaggtgcagc tgttggagtc tgggggaggc ttggtacagc ctgggggaag cttgagactc   60
tcctgtgcag cctctggatt caccttcagt aattactaca tgcactggg ccgccaagct   120
ccagggaagg ggctggagtg ggtctcatcc attagtgctc ggagtagcta catatactac  180
gcagactcag tgaagggccg attcaccatc tccagagaca attccaagaa cacgctgtat  240
ctgcaaatga acagcctgag agccgaggac actgccgtgt attactgtgc gagacttgct  300
accaggcata gcgcttttga tatctggggc cagggtacac tggtcaccgt gagctcagcc  360
agcaccaagg gcccaagcgt gttcccctg gcccccagca gcaagagcac cagcggcggc   420
acagccgccc tgggctgcct ggtgaaggac tacttcccg agcccgtgac cgtgtcctgg   480
aacagcggag ccctgacctc cggcgtgcac accttccccg ccgtgctgca gagcagcggc   540
ctgtacagcc tgagcagcgt ggtgaccgtg cccagcagca gcctgggcac ccagacctac   600
atctgtaacg tgaaccacaa gcccagcaac accaaggtgg acaagaaggt ggagcccaag   660
agctgtgaca gacccacac ctgccccccc tgcccagccc cgagctgct gggcggaccc     720
agcgtgttcc tgttcccccc caagcccaag gacaccctga tcagcagaa ccccccgag    780
gtgacctgtg tggtggtgga cgtgtcccac gaggacccag aggtgaagtt caactggtac   840
gtggacggcg tggaggtgca caacgccaag accaagccca gaggagca gtacaacagc    900
acctacaggg tggtgtccgt gctgaccgtg ctgcaccagg actggctgaa cggcaaggag   960
tacaagtgta aggtgtccaa caaggccctg ccagccccaa tcgaaaagac catcagcaag  1020
gccaagggcc agccaagaga gccccaggtg tacaccctgc cacccagcag ggacgagctg  1080
accaagaacc aggtgtccct gacctgtctg gtgaagggct tctacccaag cgacatcgcc  1140
gtggagtggg agagcaacgg ccagcccgag aacaactaca gaccaccccc ccagtgctg  1200
gacagcgacg gcagcttctt cctgtacagc aagctgaccg tggacaagag cagatggcag  1260
cagggcaacg tgttcagctg ctccgtgatg cacgaggccc tgcacaacca ctacacccag  1320
aagagcctga gcctgtcccc aggcaag                                     1347

SEQ ID NO: 270          moltype = DNA  length = 1347
FEATURE                 Location/Qualifiers
misc_feature            1..1347
                        note = N-HC-17
source                  1..1347
                        mol_type = other DNA
                        organism = synthetic construct
SEQUENCE: 270
gaggtgcagc tgttggagtc tgggggaggc ttggtacagc ctgggggaag cttgagactc   60
tcctgtgcag cctctggatt caccttcagt cgctactaca tgcactgggt ccgccaagct  120
ccagggaagg ggctggagtg ggtctcatcc attagtgctc ggagtagcta catctactac  180
gcagattcag tgaagggccg attcaccatc tccagagaca attccaagaa cacgctgtat  240
ctgcaaatga acagcctgag agccgaggac actgccgtgt attactgtgc gagacttgct  300
accaggcgcg acgcttttga tatctggggc cagggtacac tggtcaccgt gagctcagcc  360
agcaccaagg gcccaagcgt gttcccctg gcccccagca gcaagagcac cagcggcggc   420
acagccgccc tgggctgcct ggtgaaggac tacttcccg agcccgtgac cgtgtcctgg   480
aacagcggag ccctgacctc cggcgtgcac accttccccg ccgtgctgca gagcagcggc   540
ctgtacagcc tgagcagcgt ggtgaccgtg cccagcagca gcctgggcac ccagacctac   600
atctgtaacg tgaaccacaa gcccagcaac accaaggtgg acaagaaggt ggagcccaag   660
agctgtgaca gacccacac ctgccccccc tgcccagccc cgagctgct gggcggaccc     720
agcgtgttcc tgttcccccc caagcccaag gacaccctga tcagcagaa ccccccgag    780
gtgacctgtg tggtggtgga cgtgtcccac gaggacccag aggtgaagtt caactggtac   840
gtggacggcg tggaggtgca caacgccaag accaagccca gaggagca gtacaacagc    900
acctacaggg tggtgtccgt gctgaccgtg ctgcaccagg actggctgaa cggcaaggag   960
tacaagtgta aggtgtccaa caaggccctg ccagccccaa tcgaaaagac catcagcaag  1020
gccaagggcc agccaagaga gccccaggtg tacaccctgc cacccagcag ggacgagctg  1080
accaagaacc aggtgtccct gacctgtctg gtgaagggct tctacccaag cgacatcgcc  1140
gtggagtggg agagcaacgg ccagcccgag aacaactaca gaccaccccc ccagtgctg  1200
gacagcgacg gcagcttctt cctgtacagc aagctgaccg tggacaagag cagatggcag  1260
cagggcaacg tgttcagctg ctccgtgatg cacgaggccc tgcacaacca ctacacccag  1320
aagagcctga gcctgtcccc aggcaag                                     1347

SEQ ID NO: 271          moltype = DNA  length = 1347
FEATURE                 Location/Qualifiers
misc_feature            1..1347
                        note = N-HC-18
source                  1..1347
                        mol_type = other DNA
                        organism = synthetic construct
SEQUENCE: 271
gaggtgcagc tgttggagtc tgggggaggc ttggtacagc ctgggggaag cttgagactc   60
tcctgtgcag cctctggatt caccttcagt aactactaca tgcactgggt ccgccaagct  120
ccagggaagg ggctggagtg ggtctcatcc attagtgctc ggagtagcta ccgctactac  180
gcagattcag tgaagggccg attcaccatc tccagagaca attccaagaa cacgctgtat  240
ctgcaaatga acagcctgag agccgaggac actgccgtgt attactgtgc gagacttgct  300
accaggcaca gcgcttttga tatctggggc cagggtacac tggtcaccgt gagctcagcc  360
```

```
agcaccaagg gcccaagcgt gttcccctg gcccccagca gcaagagcac cagcggcggc  420
acagccgccc tgggctgcct ggtgaaggac tacttcccg agcccgtgac cgtgtcctgg  480
aacagcggag ccctgacctc cggcgtgcac accttcccg ccgtgctgca gagcagcggc  540
ctgtacagcc tgagcagcgt ggtgaccgtg cccagcagca gctgggcac ccagacctac  600
atctgtaacg tgaaccacaa gcccagcaac accaaggtgg acaagaaggt ggagcccaag  660
agctgtgaca agacccacac ctgccccccc tgcccagccc cgagctgct gggcggaccc  720
agcgtgttcc tgttcccccc caagcccaag gacaccctga tgatcagcag aacccccgag  780
gtgacctgtg tggtggtgga cgtgtcccac gaggacccag aggtgaagtt caactggtac  840
gtggacggcg tggaggtgca caacgccaag accaagccca gagaggagca gtacaacagc  900
acctacaggg tggtgtccgt gctgaccgtg ctgcaccagg actggctgaa cggcaaggag  960
tacaagtgta aggtgtccaa caaggccctg ccagcccaa tcgaaaagac catcagcaag  1020
gccaagggcc agccaagaga gccccaggtg tacaccctgc cacccagcag ggacgagctg  1080
accaagaacc aggtgtccct gacctgtctg gtgaagggct tctacccaag cgacatcgcc  1140
gtggagtggg agagcaacgg ccagcccgag aacaactaca agaccacccc ccagtgctg  1200
gacagcgacg gcagcttctt cctgtacagc aagctgaccg tggacaagag cagatggcag  1260
cagggcaacg tgttcagctg ctccgtgatg cacgaggccc tgcacaacca ctacacccag  1320
aagagcctga gcctgtcccc aggcaag                                        1347

SEQ ID NO: 272        moltype = DNA   length = 1347
FEATURE               Location/Qualifiers
misc_feature          1..1347
                      note = N-HC-19
source                1..1347
                      mol_type = other DNA
                      organism = synthetic construct
SEQUENCE: 272
gaggtgcagc tgttggagtc tgggggaggc ttggtacagc ctgggggaag cttgagactc  60
tcctgtgcag cctctggatt caccttcagt aactactaca tgcactgggt ccgccaagct  120
ccagggaagg ggctggagtg ggtctcatcc attagtgctc ggagtagcta catctactac  180
gcaggttcag tgaagggccg attcaccatc tccagagaca attccaagaa cacgctgtgc  240
ctgcaaatga acagcctgag agccgaggac actgccgtgt attactgtgc gagacttggt  300
accaggcgcg tcgcttttga tatctggggc cagggtacac tggtcaccgt gagctcagcc  360
agcaccaagg gcccaagcgt gttcccctg gcccccagca gcaagagcac cagcggcggc  420
acagccgccc tgggctgcct ggtgaaggac tacttcccg agcccgtgac cgtgtcctgg  480
aacagcggag ccctgacctc cggcgtgcac accttcccg ccgtgctgca gagcagcggc  540
ctgtacagcc tgagcagcgt ggtgaccgtg cccagcagca gctgggcac ccagacctac  600
atctgtaacg tgaaccacaa gcccagcaac accaaggtgg acaagaaggt ggagcccaag  660
agctgtgaca agacccacac ctgccccccc tgcccagccc cgagctgct gggcggaccc  720
agcgtgttcc tgttcccccc caagcccaag gacaccctga tgatcagcag aacccccgag  780
gtgacctgtg tggtggtgga cgtgtcccac gaggacccag aggtgaagtt caactggtac  840
gtggacggcg tggaggtgca caacgccaag accaagccca gagaggagca gtacaacagc  900
acctacaggg tggtgtccgt gctgaccgtg ctgcaccagg actggctgaa cggcaaggag  960
tacaagtgta aggtgtccaa caaggccctg ccagcccaa tcgaaaagac catcagcaag  1020
gccaagggcc agccaagaga gccccaggtg tacaccctgc cacccagcag ggacgagctg  1080
accaagaacc aggtgtccct gacctgtctg gtgaagggct tctacccaag cgacatcgcc  1140
gtggagtggg agagcaacgg ccagcccgag aacaactaca agaccacccc ccagtgctg  1200
gacagcgacg gcagcttctt cctgtacagc aagctgaccg tggacaagag cagatggcag  1260
cagggcaacg tgttcagctg ctccgtgatg cacgaggccc tgcacaacca ctacacccag  1320
aagagcctga gcctgtcccc aggcaag                                        1347

SEQ ID NO: 273        moltype = DNA   length = 1347
FEATURE               Location/Qualifiers
misc_feature          1..1347
                      note = N-HC-20
source                1..1347
                      mol_type = other DNA
                      organism = synthetic construct
SEQUENCE: 273
gaggtgcagc tgttggagtc tgggggaggc ttggtacagc ctgggggaag cttgagactc  60
tcctgtgcag cctctggatt caccttcagt aactactaca tgcactgggt ccgccaagct  120
ccagggaagg ggctggagtg ggtctcatcc attagttcta ggagtagcca ccaatactac  180
gcaggttcag tgaagggccg attcaccatc tccagagaca attccaagaa cacgctgtat  240
ctgcaaatga acagcctgag agccgaggac actgccgtgt attactgtgc gagacttggt  300
ctcaggcacg acgcttttga tatctggggc cagggtacac tggtcaccgt gagctcagcc  360
agcaccaagg gcccaagcgt gttcccctg gcccccagca gcaagagcac cagcggcggc  420
acagccgccc tgggctgcct ggtgaaggac tacttcccg agcccgtgac cgtgtcctgg  480
aacagcggag ccctgacctc cggcgtgcac accttcccg ccgtgctgca gagcagcggc  540
ctgtacagcc tgagcagcgt ggtgaccgtg cccagcagca gctgggcac ccagacctac  600
atctgtaacg tgaaccacaa gcccagcaac accaaggtgg acaagaaggt ggagcccaag  660
agctgtgaca agacccacac ctgccccccc tgcccagccc cgagctgct gggcggaccc  720
agcgtgttcc tgttcccccc caagcccaag gacaccctga tgatcagcag aacccccgag  780
gtgacctgtg tggtggtgga cgtgtcccac gaggacccag aggtgaagtt caactggtac  840
gtggacggcg tggaggtgca caacgccaag accaagccca gagaggagca gtacaacagc  900
acctacaggg tggtgtccgt gctgaccgtg ctgcaccagg actggctgaa cggcaaggag  960
tacaagtgta aggtgtccaa caaggccctg ccagcccaa tcgaaaagac catcagcaag  1020
gccaagggcc agccaagaga gccccaggtg tacaccctgc cacccagcag ggacgagctg  1080
accaagaacc aggtgtccct gacctgtctg gtgaagggct tctacccaag cgacatcgcc  1140
gtggagtggg agagcaacgg ccagcccgag aacaactaca agaccacccc ccagtgctg  1200
gacagcgacg gcagcttctt cctgtacagc aagctgaccg tggacaagag cagatggcag  1260
```

```
caggg caacg tgttcagctg ctccgtgatg cacgaggccc tgcacaacca ctacacccag   1320
aagagcctga gcctgtcccc aggcaag                                         1347

SEQ ID NO: 274          moltype = DNA   length = 1347
FEATURE                 Location/Qualifiers
misc_feature            1..1347
                        note = N-HC-21
source                  1..1347
                        mol_type = other DNA
                        organism = synthetic construct
SEQUENCE: 274
gaggtgcagc tgttggagtc tgggggaggc ttggtacagc ctgggggaag cttgagactc   60
tcctgtgcag cctctggatt caccttcagt agctactaca tgcactgggt ccgccaagct   120
ccagggaagg ggctggagtg ggtctcatcc attagtgcta ggagtagcta catctactac   180
gcagattcag tgaagggccg attcaccatc tccagagaca attccaagaa cacgctgtat   240
ctgcaaatga acagcctgag agccgaggac actgccgtgt attactgtgc gagacttgct   300
accaggcgca tcgcttttga tatctggggc cagggtacac tggtcaccgt gagctcagcc   360
agcaccaagg gcccaagcgt gttccccctg gccccagcaa gcaagagcac cagcggcggc   420
acagccgccc tgggctgcct ggtgaaggac tacttccccg agcccgtgac cgtgtcctgg   480
aacagcggag ccctgacctc cggcgtgcac accttccccg ccgtgctgca gagcagcggc   540
ctgtacagcc tgagcagcgt ggtgaccgtg ccagcagca gcctgggcac ccagacctac   600
atctgtaacg tgaaccacaa gcccagcaac accaaggtgg acaagaaggt ggagcccaag   660
agctgtgaca agacccacac ctgcccccc tgcccagccc cgagctgct gggcggaccc   720
agcgtgttcc tgttcccccc caagcccaag gacaccctga tgatcagcag aacccccgag   780
gtgacctgtg tggtggtgga cgtgtcccac gaggacccag aggtgaagtt caactggtac   840
gtggacggcg tggaggtgca caacgccaag accaagccca gagaggagca gtacaacagc   900
acctacaggg tggtgtccgt gctgaccgtg ctgcaccagg actggctgaa cggcaaggag   960
tacaagtgta aggtgtccaa caaggccctg ccagcccaaa tcgaaaagac catcagcaag   1020
gccaagggcc agccaagaga gccccaggtg tacaccctgc cacccagcag ggacgagctg   1080
accaagaacc aggtgtccct gacctgtctg gtgaagggct tctacccaag cgacatcgcc   1140
gtggagtggg agagcaacgg ccagcccgag aacaactaca agaccacccc cccagtgctg   1200
gacagcgacg gcagcttctt cctgtacagc aagctgaccg tggacaagag cagatggcag   1260
cagggcaacg tgttcagctg ctccgtgatg cacgaggccc tgcacaacca ctacacccag   1320
aagagcctga gcctgtcccc aggcaag                                         1347

SEQ ID NO: 275          moltype = DNA   length = 1347
FEATURE                 Location/Qualifiers
misc_feature            1..1347
                        note = N-HC-22
source                  1..1347
                        mol_type = other DNA
                        organism = synthetic construct
SEQUENCE: 275
gaggtgcagc tgttggagtc tgggggaggc ttggtacagc ctgggggaag cttgagactc   60
tcctgtgcag cctctggatt caccttcagt aattactaca tgcactgggt ccgccaagct   120
ccagggaagg ggctggagtg ggtctcatcc attagtgctc tgagtagcta ccgatactac   180
gcagattcag tgaagggccg attcaccatc tccagagaca attccaagaa cacgctgtat   240
ctgcaaatga acagcctgag agccgaggac actgccgtgt attactgtgc gagacttgct   300
accaggcgcg tcgcttttga tatctggggc cagggtacac tggtcaccgt gagctcagcc   360
agcaccaagg gcccaagcgt gttccccctg gccccagcaa gcaagagcac cagcggcggc   420
acagccgccc tgggctgcct ggtgaaggac tacttccccg agcccgtgac cgtgtcctgg   480
aacagcggag ccctgacctc cggcgtgcac accttccccg ccgtgctgca gagcagcggc   540
ctgtacagcc tgagcagcgt ggtgaccgtg ccagcagca gcctgggcac ccagacctac   600
atctgtaacg tgaaccacaa gcccagcaac accaaggtgg acaagaaggt ggagcccaag   660
agctgtgaca agacccacac ctgcccccc tgcccagccc cgagctgct gggcggaccc   720
agcgtgttcc tgttcccccc caagcccaag gacaccctga tgatcagcag aacccccgag   780
gtgacctgtg tggtggtgga cgtgtcccac gaggacccag aggtgaagtt caactggtac   840
gtggacggcg tggaggtgca caacgccaag accaagccca gagaggagca gtacaacagc   900
acctacaggg tggtgtccgt gctgaccgtg ctgcaccagg actggctgaa cggcaaggag   960
tacaagtgta aggtgtccaa caaggccctg ccagcccaa tcgaaaagac catcagcaag   1020
gccaagggcc agccaagaga gccccaggtg tacaccctgc cacccagcag ggacgagctg   1080
accaagaacc aggtgtccct gacctgtctg gtgaagggct tctacccaag cgacatcgcc   1140
gtggagtggg agagcaacgg ccagcccgag aacaactaca agaccacccc cccagtgctg   1200
gacagcgacg gcagcttctt cctgtacagc aagctgaccg tggacaagag cagatggcag   1260
cagggcaacg tgttcagctg ctccgtgatg cacgaggccc tgcacaacca ctacacccag   1320
aagagcctga gcctgtcccc aggcaag                                         1347

SEQ ID NO: 276          moltype = DNA   length = 1338
FEATURE                 Location/Qualifiers
misc_feature            1..1338
                        note = N-HC-23
source                  1..1338
                        mol_type = other DNA
                        organism = synthetic construct
SEQUENCE: 276
gaggtgcagc tgttggagtc tgggggaggc ttggtacagc ctgggggtc cctgagactc   60
tcctgtgcag cctctggatt caccttcagt gactactaca tgaactgggt ccgccaggct   120
ccagggaagg ggctggagtg ggtctcatcc attagtagta gtagtagtta catatactac   180
gcagactcag tgaagggccg attcaccatc tccagagaca attccaagaa cacgctgtat   240
```

```
ctgcaaatga acagcctgag agccgaggac actgccgtgt attactgtgc gagagatatt    300
ggcggtatgg acgtctgggg ccaaggtaca ctggtcaccg tgagcagcgc cagcaccaag    360
ggcccaagcg tgttccccct ggcccccagc agcaagagca ccagcggcgg cacagccgcc    420
ctgggctgcc tggtgaagga ctacttcccc gagcccgtga ccgtgtcctg aacagcgga    480
gccctgacct ccggcgtgca caccttcccc gccgtgctgc agagcagcgg cctgtacagc    540
ctgagcagcg tggtgaccgt gcccagcagc agcctgggca cccagaccta catctgtaac    600
gtgaaccaca agcccagcaa caccaaggtg gacaagaagg tggagcccaa gagctgtgac    660
aagacccaca cctgcccccc ctgcccagcc cccgagctgc tgggcggacc cagcgtgttc    720
ctgttccccc caagcccaa ggacaccctg atgatcagca aaccccga ggtgacctgt    780
gtggtggtgg acgtgtccca cgaggaccca gaggtgaagt tcaactggta cgtggacggc    840
gtggaggtgc acaacgccaa gaccaagccc agagaggagc agtacaacag cacctacagg    900
gtggtgtccg tgctgaccgt gctgcaccag gactggctga acggcaagga gtacaagtgt    960
aaggtgtcca acaaggccct gccagcccca tcgaaaaga ccatcagcaa ggccaagggc    1020
cagccaagag agcccaggt gtacaccctg ccacccagca gggacgagct gaccaagaac    1080
caggtgtccc tgacctgtct ggtgaagggc ttctacccaa gcgacatcgc cgtggagtgg    1140
gagagcaacg gccagcccga gaacaactac aagaccaccc cccagtgct ggacagcgac    1200
ggcagcttct tcctgtacag caagctgacc gtggacaaga gcagatggca gcagggcaac    1260
gtgttcagct gctccgtgat gcacgaggcc ctgcacaacc actacaccca gaagagcctg    1320
agcctgtccc caggcaag                                                  1338

SEQ ID NO: 277          moltype = DNA  length = 1347
FEATURE                 Location/Qualifiers
misc_feature            1..1347
                        note = N-HC-24
source                  1..1347
                        mol_type = other DNA
                        organism = synthetic construct
SEQUENCE: 277
gaggtgcagc tgttggagtc tgggggaggc ttggtacagc ctgggggaag cttgagactc    60
tcctgtgcag cctctggatt cacccttcagt aattactaca tgcactgggt ccgccaagct    120
ccagggaagg ggctggagtg ggtctcatcc attagtagta gtagtagtta catatactac    180
gcagactcag tgaagggccg attcaccatc tccagagaca attccaagaa cacgctgtat    240
ctgcaaatga acagcctgag agccgaggac actgccgtgt attactgtgc gagacttggt    300
acgaggcatg atgcttttga tatctggggc cagggtacac tggtcaccgt gagctccagc    360
agcaccaagg gcccaagcgt gttcccctg gcccccagca gcaagagcac cagcggcggc    420
acagccgccc tgggctgcct ggtgaaggac tacttccccg agcccgtgac cgtgtcctgg    480
aacagcggag ccctgacctc cggcgtgcac accttcccg ccgtgctgca gagcagcggc    540
ctgtacagcc tgagcagcgt ggtgaccgtg cccagcagca gcctgggcac ccagacctac    600
atctgtaacg tgaaccacaa gcccagcaac accaaggtg acaagaaggt gggagcccaa    660
agctgtgaca gacccacac ctgcccccc tgcccagcc ccgagctgct gggcggaccc    720
agcgtgttcc tgttcccccc caagcccaag gacaccctga tgatcagcag aaccccgag    780
gtgacctgtg tggtggtgga cgtgtcccac gaggacccca aggtgaagtt caactggtac    840
gtggacggcg tggaggtgca caacgccaag accaagccca gagaggagca gtacaacagc    900
acctacaggg tggtgtccgt gctgaccgtg ctgcaccagg actggctgaa cggcaaggag    960
tacaagtgta aggtgtccaa caaggccctg ccagccccaa tcgaaaagac catcagcaag    1020
gccaaggccc agcaagaga gccccaggtg tacaccctgc cacccagcag ggacgagctg    1080
accaagaacc aggtgtccct gacctgtctg gtgaagggct tctacccaag cgacatcgcc    1140
gtggagtggg agagcaacgg ccagcccgag aacaactaca agaccacccc cccagtgctg    1200
gacagcgacg gcagcttctt cctgtacagc aagctgaccg tggacaagag cagatggcag    1260
cagggcaacg tgttcagctg ctccgtgatg cacgaggccc tgcacaacca ctacacccag    1320
aagagcctga gcctgtcccc caggcaag                                       1347

SEQ ID NO: 278          moltype = AA  length = 95
FEATURE                 Location/Qualifiers
source                  1..95
                        mol_type = protein
                        organism = Homo sapiens
SEQUENCE: 278
DIQMTQSPST LSASVGDRVT ITCRASQSIS SWLAWYQQKP GKAPKLLIYD ASSLESGVPS    60
RFSGSGSGTE FTLTISSLQP DDFATYYCQQ YNSYS                              95

SEQ ID NO: 279          moltype = AA  length = 95
FEATURE                 Location/Qualifiers
source                  1..95
                        mol_type = protein
                        organism = Homo sapiens
SEQUENCE: 279
AIQMTQSPSS LSASVGDRVT ITCRASQGIR NDLGWYQQKP GKAPKLLIYA ASSLQSGVPS    60
RFSGSGSGTD FTLTISSLQP EDFATYYCLQ DYNYP                              95

SEQ ID NO: 280          moltype = AA  length = 95
FEATURE                 Location/Qualifiers
source                  1..95
                        mol_type = protein
                        organism = Homo sapiens
SEQUENCE: 280
AIRMTQSPSS FSASTGDRVT ITCRASQGIS SYLAWYQQKP GKAPKLLIYA ASTLQSGVPS    60
RFSGSGSGTD FTLTISCLQS EDFATYYCQQ YYSYP                              95
```

```
SEQ ID NO: 281         moltype = AA  length = 95
FEATURE                Location/Qualifiers
source                 1..95
                       mol_type = protein
                       organism = Homo sapiens
SEQUENCE: 281
DIQLTQSPSF LSASVGDRVT ITCRASQGIS SYLAWYQQKP GKAPKLLIYA ASTLQSGVPS    60
RFSGSGSGTE FTLTISSLQP EDFATYYCQQ LNSYP                              95

SEQ ID NO: 282         moltype = AA  length = 95
FEATURE                Location/Qualifiers
source                 1..95
                       mol_type = protein
                       organism = Homo sapiens
SEQUENCE: 282
DIQMTQSPSS VSASVGDRVT ITCRASQGIS SWLAWYQQKP GKAPKLLIYA ASSLQSGVPS    60
RFSGSGSGTD FTLTISSLQP EDFATYYCQQ ANSFP                              95

SEQ ID NO: 283         moltype = AA  length = 95
FEATURE                Location/Qualifiers
source                 1..95
                       mol_type = protein
                       organism = Homo sapiens
SEQUENCE: 283
DIQMTQSPSS LSASVGDRVT ITCRASQGIS NYLAWFQQKP GKAPKSLIYA ASSLQSGVPS    60
RFSGSGSGTD FTLTISSLQP EDFATYYCQQ YNSYP                              95

SEQ ID NO: 284         moltype = AA  length = 95
FEATURE                Location/Qualifiers
source                 1..95
                       mol_type = protein
                       organism = Homo sapiens
SEQUENCE: 284
DIQMTQSPSS LSASVGDRVT ITCRASQGIR NDLGWYQQKP GKAPKRLIYA ASSLQSGVPS    60
RFSGSGSGTE FTLTISSLQP EDFATYYCLQ HNSYP                              95

SEQ ID NO: 285         moltype = AA  length = 95
FEATURE                Location/Qualifiers
source                 1..95
                       mol_type = protein
                       organism = Homo sapiens
SEQUENCE: 285
DIQMTQSPSS LSASVGDRVT ITCRASQGIS NYLAWYQQKP GKVPKLLIYA ASTLQSGVPS    60
RFSGSGSGTD FTLTISSLQP EDVATYYCQK YNSAP                              95

SEQ ID NO: 286         moltype = AA  length = 95
FEATURE                Location/Qualifiers
source                 1..95
                       mol_type = protein
                       organism = Homo sapiens
SEQUENCE: 286
DIQMTQSPSS LSASVGDRVT ITCQASQDIS NYLNWYQQKP GKAPKLLIYD ASNLETGVPS    60
RFSGSGSGTD FTFTISSLQP EDIATYYCQQ YDNLP                              95

SEQ ID NO: 287         moltype = AA  length = 95
FEATURE                Location/Qualifiers
source                 1..95
                       mol_type = protein
                       organism = Homo sapiens
SEQUENCE: 287
DIQMTQSPSS LSASVGDRVT ITCRASQSIS SYLNWYQQKP GKAPKLLIYA ASSLQSGVPS    60
RFSGSGSGTD FTLTISSLQP EDFATYYCQQ SYSTP                              95

SEQ ID NO: 288         moltype = AA  length = 95
FEATURE                Location/Qualifiers
source                 1..95
                       mol_type = protein
                       organism = Homo sapiens
SEQUENCE: 288
VIWMTQSPSL LSASTGDRVT ISCRMSQGIS SYLAWYQQKP GKAPELLIYA ASTLQSGVPS    60
RFSGSGSGTD FTLTISCLQS EDFATYYCQQ YYSFP                              95

SEQ ID NO: 289         moltype = AA  length = 95
FEATURE                Location/Qualifiers
source                 1..95
                       mol_type = protein
                       organism = Homo sapiens
SEQUENCE: 289
AIQLTQSPSS LSASVGDRVT ITCRASQGIS SALAWYQQKP GKAPKLLIYD ASSLESGVPS    60
```

```
RFSGSGSGTD FTLTISSLQP EDFATYYCQQ FNNYP                               95

SEQ ID NO: 290          moltype = AA  length = 95
FEATURE                 Location/Qualifiers
source                  1..95
                        mol_type = protein
                        organism = Homo sapiens
SEQUENCE: 290
DIQMTQSPSS LSASVGDRVT ITCRASQGIS SWLAWYQQKP EKAPKSLIYA ASSLQSGVPS    60
RFSGSGSGTD FTLTISSLQP EDFATYYCQQ YNSYP                               95

SEQ ID NO: 291          moltype = AA  length = 95
FEATURE                 Location/Qualifiers
source                  1..95
                        mol_type = protein
                        organism = Homo sapiens
SEQUENCE: 291
NIQMTQSPSA MSASVGDRVT ITCRARQGIS NYLAWFQQKP GKVPKHLIYA ASSLQSGVPS    60
RFSGSGSGTE FTLTISSLQP EDFATYYCLQ HNSYP                               95

SEQ ID NO: 292          moltype = AA  length = 95
FEATURE                 Location/Qualifiers
source                  1..95
                        mol_type = protein
                        organism = Homo sapiens
SEQUENCE: 292
AIRMTQSPFS LSASVGDRVT ITCWASQGIS SYLAWYQQKP AKAPKLFIYY ASSLQSGVPS    60
RFSGSGSGTD YTLTISSLQP EDFATYYCQQ YYSTP                               95

SEQ ID NO: 293          moltype = AA  length = 95
FEATURE                 Location/Qualifiers
source                  1..95
                        mol_type = protein
                        organism = Homo sapiens
SEQUENCE: 293
DIQMTQSPSS LSASVGDRVT ITCRASQGIS NSLAWYQQKP GKAPKLLLYA ASRLESGVPS    60
RFSGSGSGTD YTLTISSLQP EDFATYYCQQ YYSTP                               95

SEQ ID NO: 294          moltype = AA  length = 100
FEATURE                 Location/Qualifiers
source                  1..100
                        mol_type = protein
                        organism = Homo sapiens
SEQUENCE: 294
DIVMTQTPLS SPVTLGQPAS ISCRSSQSLV HSDGNTYLSW LQQRPGQPPR LLIYKISNRF    60
SGVPDRFSGS GAGTDFTLKI SRVEAEDVGV YYCMQATQFP                          100

SEQ ID NO: 295          moltype = AA  length = 100
FEATURE                 Location/Qualifiers
source                  1..100
                        mol_type = protein
                        organism = Homo sapiens
SEQUENCE: 295
DIVMTQSPLS LPVTPGEPAS ISCRSSQSLL HSNGYNYLDW YLQKPGQSPQ LLIYLGSNRA    60
SGVPDRFSGS GSGTDFTLKI SRVEAEDVGV YYCMQALQTP                          100

SEQ ID NO: 296          moltype = AA  length = 100
FEATURE                 Location/Qualifiers
source                  1..100
                        mol_type = protein
                        organism = Homo sapiens
SEQUENCE: 296
DVVMTQSPLS LPVTLGQPAS ISCRSSQSLV YSDGNTYLNW FQQRPGQSPR RLIYKVSNRD    60
SGVPDRFSGS GSGTDFTLKI SRVEAEDVGV YYCMQGTHWP                          100

SEQ ID NO: 297          moltype = AA  length = 101
FEATURE                 Location/Qualifiers
source                  1..101
                        mol_type = protein
                        organism = Homo sapiens
SEQUENCE: 297
DIVMTQTPLS LPVTPGEPAS ISCRSSQSLL DSDDGNTYLD WYLQKPGQSP QLLIYTLSYR    60
ASGVPDRFSG SGSGTDFTLK ISRVEAEDVG VYYCMQRIEF P                        101

SEQ ID NO: 298          moltype = AA  length = 100
FEATURE                 Location/Qualifiers
source                  1..100
                        mol_type = protein
                        organism = Homo sapiens
```

```
SEQUENCE: 298
EIVMTQTPLS LSITPGEQAS ISCRSSQSLL HSDGYTYLYW FLQKARPVST LLIYEVSNRF    60
SGVPDRFSGS GSGTDFTLKI SRVEAEDFGV YYCMQDAQDP                        100

SEQ ID NO: 299            moltype = AA   length = 100
FEATURE                   Location/Qualifiers
source                    1..100
                          mol_type = protein
                          organism = Homo sapiens
SEQUENCE: 299
DIVMTQTPLS LSVTPGQPAS ISCKSSQSLL HSDGKTYLYW YLQKPGQPPQ LLIYEVSNRF    60
SGVPDRFSGS GSGTDFTLKI SRVEAEDVGV YYCMQSIQLP                        100

SEQ ID NO: 300            moltype = AA   length = 100
FEATURE                   Location/Qualifiers
source                    1..100
                          mol_type = protein
                          organism = Homo sapiens
SEQUENCE: 300
DVVMTQSPLS LPVTLGQPAS ISCRSSQSLV YSDGNTYLNW FQQRPGQSPR RLIYKVSNWD    60
SGVPDRFSGS GSGTDFTLKI SRVEAEDVGV YYCMQGTHWP                        100

SEQ ID NO: 301            moltype = AA   length = 95
FEATURE                   Location/Qualifiers
source                    1..95
                          mol_type = protein
                          organism = Homo sapiens
SEQUENCE: 301
EIVLTQSPAT LSLSPGERAT LSCRASQSVS SYLAWYQQKP GQAPRLLIYD ASNRATGIPA    60
RFSGSGSGTD FTLTISSLEP EDFAVYYCQQ RSNWP                              95

SEQ ID NO: 302            moltype = AA   length = 95
FEATURE                   Location/Qualifiers
source                    1..95
                          mol_type = protein
                          organism = Homo sapiens
SEQUENCE: 302
EIVMTQSPAT LSVSPGERAT LSCRASQSVS SNLAWYQQKP GQAPRLLIYG ASTRATGIPA    60
RFSGSGSGTE FTLTISSLQS EDFAVYYCQQ YNNWP                              95

SEQ ID NO: 303            moltype = AA   length = 96
FEATURE                   Location/Qualifiers
source                    1..96
                          mol_type = protein
                          organism = Homo sapiens
SEQUENCE: 303
EIVLTQSPGT LSLSPGERAT LSCRASQSVS SSYLAWYQQK PGQAPRLLIY GASSRATGIP    60
DRFSGSGSGT DFTLTISRLE PEDFAVYYCQ QYGSSP                             96

SEQ ID NO: 304            moltype = AA   length = 96
FEATURE                   Location/Qualifiers
source                    1..96
                          mol_type = protein
                          organism = Homo sapiens
SEQUENCE: 304
EIVMTQSPAT LSLSPGERAT LSCRASQSVS SSYLSWYQQK PGQAPRLLIY GASTRATGIP    60
ARFSGSGSGT DFTLTISSLQ PEDFAVYYCQ QDYNLP                             96

SEQ ID NO: 305            moltype = AA   length = 95
FEATURE                   Location/Qualifiers
source                    1..95
                          mol_type = protein
                          organism = Homo sapiens
SEQUENCE: 305
EIVLTQSPAT LSLSPGERAT LSCRASQGVS SYLAWYQQKP GQAPRLLIYD ASNRATGIPA    60
RFSGSGPGTD FTLTISSLEP EDFAVYYCQQ RSNWH                              95

SEQ ID NO: 306            moltype = AA   length = 96
FEATURE                   Location/Qualifiers
source                    1..96
                          mol_type = protein
                          organism = Homo sapiens
SEQUENCE: 306
EIVLTQSPAT LSLSPGERAT LSCGASQSVS SSYLAWYQQK PGLAPRLLIY DASSRATGIP    60
DRFSGSGSGT DFTLTISRLE PEDFAVYYCQ QYGSSP                             96

SEQ ID NO: 307            moltype = AA   length = 89
FEATURE                   Location/Qualifiers
source                    1..89
```

```
                        mol_type = protein
                        organism = Homo sapiens
SEQUENCE: 307
EIVLTQSPAT LSLSPGERAT LSCRASQSVS SYLAWYQQKP GQAPRLLIYG ASTRATGIPA    60
RFSGSGSGTE FTLTISSLQS EDFAVYYCQ                                      89

SEQ ID NO: 308          moltype = AA  length = 89
FEATURE                 Location/Qualifiers
source                  1..89
                        mol_type = protein
                        organism = Homo sapiens
SEQUENCE: 308
EIVLTQSPAT LSLSPGERAT LSCRASQGVS SYLAWYQQKP GQAPRLLIYD ASSRATGIPA    60
RFSGSGPGTD FTLTISSLEP EDFAVYYCQ                                      89

SEQ ID NO: 309          moltype = AA  length = 90
FEATURE                 Location/Qualifiers
source                  1..90
                        mol_type = protein
                        organism = Homo sapiens
SEQUENCE: 309
EIVLTQSPGT LSLSPGERAT LSCRASQSVS SSYLAWYQQK PGLAPRLLIY GASTRATGIP    60
ARFSGSGSGT EFTLTISRLQ SEDFAVYYCQ                                     90

SEQ ID NO: 310          moltype = AA  length = 95
FEATURE                 Location/Qualifiers
source                  1..95
                        mol_type = protein
                        organism = Homo sapiens
SEQUENCE: 310
EIVLTQSPAT LSLSPGERAT LSCRASQGVS SNLAWYQQKP GQAPRLLIYD ASNRATGIPA    60
RFSGSGPGTD FTLTISSLEP EDFAVYYCQQ RSNWH                               95

SEQ ID NO: 311          moltype = AA  length = 96
FEATURE                 Location/Qualifiers
source                  1..96
                        mol_type = protein
                        organism = Homo sapiens
SEQUENCE: 311
EIVLTQSPAT LSLSPGERAT LSCRASQSVS SSYLAWYQQK PGQAPRLLIY DASSRATGIP    60
DRFSGSGSGT DFTLTISRLE PEDFAVYYCQ QRSNWH                              96

SEQ ID NO: 312          moltype = AA  length = 101
FEATURE                 Location/Qualifiers
source                  1..101
                        mol_type = protein
                        organism = Homo sapiens
SEQUENCE: 312
DIVMTQSPDS LAVSLGERAT INCKSSQSVL YSSNNKNYLA WYQQKPGQPP KLLIYWASTR    60
ESGVPDRFSG SGSGTDFTLT ISSLQAEDVA VYYCQQYYST P                        101

SEQ ID NO: 313          moltype = AA  length = 95
FEATURE                 Location/Qualifiers
source                  1..95
                        mol_type = protein
                        organism = Homo sapiens
SEQUENCE: 313
ETTLTQSPAF MSATPGDKVN ISCKASQDID DDMNWYQQKP GEAAIFIIQE ATTLVPGIPP    60
RFSGSGYGTD FTLTINNIES EDAAYYFCLQ HDNFP                               95

SEQ ID NO: 314          moltype = AA  length = 98
FEATURE                 Location/Qualifiers
source                  1..98
                        mol_type = protein
                        organism = Homo sapiens
SEQUENCE: 314
QSVLTQPPSV SEAPRQRVTI SCSGSSSNIG NNAVNWYQQL PGKAPKLLIY YDDLLPSGVS    60
DRFSGSKSGT SASLAISGLQ SEDEADYYCA AWDDSLNG                            98

SEQ ID NO: 315          moltype = AA  length = 99
FEATURE                 Location/Qualifiers
source                  1..99
                        mol_type = protein
                        organism = Homo sapiens
SEQUENCE: 315
QSVLTQPPSV SGAPGQRVTI SCTGSSSNIG AGYDVHWYQQ LPGTAPKLLI YGNSNRPSGV    60
PDRFSGSKSG TSASLAITGL QAEDEADYYC QSYDSSLSG                           99

SEQ ID NO: 316          moltype = AA  length = 98
```

```
FEATURE                 Location/Qualifiers
source                  1..98
                        mol_type = protein
                        organism = Homo sapiens
SEQUENCE: 316
QSVLTQPPSA SGTPGQRVTI SCSGSSSNIG SNTVNWYQQL PGTAPKLLIY SNNQRPSGVP    60
DRFSGSKSGT SASLAISGLQ SEDEADYYCA AWDDSLNG                            98

SEQ ID NO: 317          moltype = AA  length = 98
FEATURE                 Location/Qualifiers
source                  1..98
                        mol_type = protein
                        organism = Homo sapiens
SEQUENCE: 317
QSVLTQPPSA SGTPGQRVTI SCSGSSSNIG SNYVYWYQQL PGTAPKLLIY RNNQRPSGVP    60
DRFSGSKSGT SASLAISGLR SEDEADYYCA AWDDSLSG                            98

SEQ ID NO: 318          moltype = AA  length = 98
FEATURE                 Location/Qualifiers
source                  1..98
                        mol_type = protein
                        organism = Homo sapiens
SEQUENCE: 318
QSVLTQPPSV SAAPGQKVTI SCSGSSSNIG NNYVSWYQQL PGTAPKLLIY DNNKRPSGIP    60
DRFSGSKSGT SATLGITGLQ TGDEADYYCG TWDSSLSA                            98

SEQ ID NO: 319          moltype = AA  length = 99
FEATURE                 Location/Qualifiers
source                  1..99
                        mol_type = protein
                        organism = Homo sapiens
SEQUENCE: 319
QSALTQPPSA SGSPGQSVTI SCTGTSSDVG GYNYVSWYQQ HPGKAPKLMI YEVSKRPSGV    60
PDRFSGSKSG NTASLTVSGL QAEDEADYYC SSYAGSNNF                           99

SEQ ID NO: 320          moltype = AA  length = 99
FEATURE                 Location/Qualifiers
source                  1..99
                        mol_type = protein
                        organism = Homo sapiens
SEQUENCE: 320
QSALTQPRSV SGSPGQSVTI SCTGTSSDVG GYNYVSWYQQ HPGKAPKLMI YDVSKRPSGV    60
PDRFSGSKSG NTASLTISGL QAEDEADYYC CSYAGSYTF                           99

SEQ ID NO: 321          moltype = AA  length = 99
FEATURE                 Location/Qualifiers
source                  1..99
                        mol_type = protein
                        organism = Homo sapiens
SEQUENCE: 321
QSALTQPASV SGSPGQSITI SCTGTSSDVG GYNYVSWYQQ HPGKAPKLMI YEVSNRPSGV    60
SNRFSGSKSG NTASLTISGL QAEDEADYYC SSYTSSSTL                           99

SEQ ID NO: 322          moltype = AA  length = 99
FEATURE                 Location/Qualifiers
source                  1..99
                        mol_type = protein
                        organism = Homo sapiens
SEQUENCE: 322
QSALTQPPSV SGSPGQSVTI SCTGTSSDVG SYNRVSWYQQ PPGTAPKLMI YEVSNRPSGV    60
PDRFSGSKSG NTASLTISGL QAEDEADYYC SLYTSSSTF                           99

SEQ ID NO: 323          moltype = AA  length = 99
FEATURE                 Location/Qualifiers
source                  1..99
                        mol_type = protein
                        organism = Homo sapiens
SEQUENCE: 323
QSALTQPASV SGSPGQSITI SCTGTSSDVG SYNLVSWYQQ HPGKAPKLMI YEGSKRPSGV    60
SNRFSGSKSG NTASLTISGL QAEDEADYYC CSYAGSSTL                           99

SEQ ID NO: 324          moltype = AA  length = 95
FEATURE                 Location/Qualifiers
source                  1..95
                        mol_type = protein
                        organism = Homo sapiens
SEQUENCE: 324
SYELTQPPSV SVSPGQTASI TCSGDKLGDK YACWYQQKPG QSPVLVIYQD SKRPSGIPER    60
FSGSNSGNTA TLTISGTQAM DEADYYCQAW DSSTA                               95
```

```
SEQ ID NO: 325          moltype = AA  length = 95
FEATURE                 Location/Qualifiers
source                  1..95
                        mol_type = protein
                        organism = Homo sapiens
SEQUENCE: 325
SYELTQPLSV SVALGQTARI TCGGNNIGSK NVHWYQQKPG QAPVLVIYRD SNRPSGIPER    60
FSGSNSGNTA TLTISRAQAG DEADYYCQVW DSSTA                                95

SEQ ID NO: 326          moltype = AA  length = 96
FEATURE                 Location/Qualifiers
source                  1..96
                        mol_type = protein
                        organism = Homo sapiens
SEQUENCE: 326
SYELTQPPSV SVSPGQTARI TCSGDALPKK YAYWYQQKSG QAPVLVIYED SKRPSGIPER    60
FSGSSSGTMA TLTISGAQVE DEADYYCYST DSSGNH                               96

SEQ ID NO: 327          moltype = AA  length = 96
FEATURE                 Location/Qualifiers
source                  1..96
                        mol_type = protein
                        organism = Homo sapiens
SEQUENCE: 327
SYELTQPHSV SVATAQMARI TCGGNNIGSK AVHWYQQKPG QDPVLVIYSD SNRPSGIPER    60
FSGSNPGNTT TLTISRIEAG DEADYYCQVW DSSSDH                               96

SEQ ID NO: 328          moltype = AA  length = 96
FEATURE                 Location/Qualifiers
source                  1..96
                        mol_type = protein
                        organism = Homo sapiens
SEQUENCE: 328
SYELTQPPSV SVSLGQMARI TCSGEALPKK YAYWYQQKPG QFPVLVIYKD SERPSGIPER    60
FSGSSSGTIV TLTISGVQAE DEADYYCLSA DSSGTY                               96

SEQ ID NO: 329          moltype = AA  length = 96
FEATURE                 Location/Qualifiers
source                  1..96
                        mol_type = protein
                        organism = Homo sapiens
SEQUENCE: 329
SSELTQDPAV SVALGQTVRI TCQGDSLRSY YASWYQQKPG QAPVLVIYGK NNRPSGIPDR    60
FSGSSSGNTA SLTITGAQAE DEADYYCNSR DSSGNH                               96

SEQ ID NO: 330          moltype = AA  length = 96
FEATURE                 Location/Qualifiers
source                  1..96
                        mol_type = protein
                        organism = Homo sapiens
SEQUENCE: 330
SYVLTQPPSV SVAPGKTARI TCGGNNIGSK SVHWYQQKPG QAPVLVIYYD SDRPSGIPER    60
FSGSNSGNTA TLTISRVEAG DEADYYCQVW DSSSDH                               96

SEQ ID NO: 331          moltype = AA  length = 94
FEATURE                 Location/Qualifiers
source                  1..94
                        mol_type = protein
                        organism = Homo sapiens
SEQUENCE: 331
SYELTQLPSV SVSPGQTARI TCSGDVLGEN YADWYQQKPG QAPELVIYED SERYPGIPER    60
FSGSTSGNTT TLTISRVLTE DEADYYCLSG DEDN                                 94

SEQ ID NO: 332          moltype = AA  length = 96
FEATURE                 Location/Qualifiers
source                  1..96
                        mol_type = protein
                        organism = Homo sapiens
SEQUENCE: 332
SYELMQPPSV SVSPGQTARI TCSGDALPKQ YAYWYQQKPG QAPVLVIYKD SERPSGIPER    60
FSGSSSGTTV TLTISGVQAE DEADYYCQSA DSSGTY                               96

SEQ ID NO: 333          moltype = AA  length = 94
FEATURE                 Location/Qualifiers
source                  1..94
                        mol_type = protein
                        organism = Homo sapiens
SEQUENCE: 333
```

```
SYELTQPSSV SVSPGQTARI TCSGDVLAKK YARWFQQKPG QAPVLVIYKD SERPSGIPER    60
FSGSSSGTTV TLTISGAQVE DEADYYCYSA ADNN                               94

SEQ ID NO: 334          moltype = AA  length = 103
FEATURE                 Location/Qualifiers
source                  1..103
                        mol_type = protein
                        organism = Homo sapiens
SEQUENCE: 334
LPVLTQPPSA SALLGASIKL TCTLSSEHST YTIEWYQQRP GRSPQYIMKV KSDGSHSKGD    60
GIPDRFMGSS SGADRYLTFS NLQSDDEAEY HCGESHTIDG QVG                     103

SEQ ID NO: 335          moltype = AA  length = 99
FEATURE                 Location/Qualifiers
source                  1..99
                        mol_type = protein
                        organism = Homo sapiens
SEQUENCE: 335
QPVLTQSSSA SASLGSSVKL TCTLSSGHSS YIIAWHQQQP GKAPRYLMKL EGSGSYNKGS    60
GVPDRFSGSS SGADRYLTIS NLQLEDEADY YCETWDSNT                          99

SEQ ID NO: 336          moltype = AA  length = 99
FEATURE                 Location/Qualifiers
source                  1..99
                        mol_type = protein
                        organism = Homo sapiens
SEQUENCE: 336
QLVLTQSPSA SASLGASVKL TCTLSSGHSS YAIAWHQQQP EKGPRYLMKL NSDGSHSKGD    60
GIPDRFSGSS SGAERYLTIS SLQSEDEADY YCQTWGTGI                          99

SEQ ID NO: 337          moltype = AA  length = 104
FEATURE                 Location/Qualifiers
source                  1..104
                        mol_type = protein
                        organism = Homo sapiens
SEQUENCE: 337
QPVLTQPPSS SASPGESARL TCTLPSDINV GSYNIYWYQQ KPGSPPRYLL YYYSDSDKGQ    60
GSGVPSRFSG SKDASANTGI LLISGLQSED EADYYCMIWP SNAS                    104

SEQ ID NO: 338          moltype = AA  length = 104
FEATURE                 Location/Qualifiers
source                  1..104
                        mol_type = protein
                        organism = Homo sapiens
SEQUENCE: 338
QPVLTQPTSL SASPGASARF TCTLRSGINV GTYRIYWYQQ KPGSLPRYLL RYKSDSDKQQ    60
GSGVPSRFSG SKDASTNAGL LLISGLQSED EADYYCAIWY SSTS                    104

SEQ ID NO: 339          moltype = AA  length = 104
FEATURE                 Location/Qualifiers
source                  1..104
                        mol_type = protein
                        organism = Homo sapiens
SEQUENCE: 339
QAVLTQPASL SASPGASASL TCTLRSGINV GTYRIYWYQQ KPGSPPQYLL RYKSDSDKQQ    60
GSGVPSRFSG SKDASANAGI LLISGLQSED EADYYCMIWH SSAS                    104

SEQ ID NO: 340          moltype = AA  length = 105
FEATURE                 Location/Qualifiers
source                  1..105
                        mol_type = protein
                        organism = Homo sapiens
SEQUENCE: 340
QPVLTQPSSH SASSGASVRL TCMLSSGFSV GDFWIRWYQQ KPGNPPRYLL YYHSDSNKGQ    60
GSGVPSRFSG SNDASANAGI LRISGLQPED EADYYCGTWH SNSKT                   105

SEQ ID NO: 341          moltype = AA  length = 98
FEATURE                 Location/Qualifiers
source                  1..98
                        mol_type = protein
                        organism = Homo sapiens
SEQUENCE: 341
NFMLTQPHSV SESPGKTVTI SCTRSSGSIA SNYVQWYQQR PGSSPTTVIY EDNQRPSGVP    60
DRFSGSIDSS SNSASLTISG LKTEDEADYY CQSYDSSN                           98

SEQ ID NO: 342          moltype = AA  length = 98
FEATURE                 Location/Qualifiers
source                  1..98
                        mol_type = protein
```

```
                        organism = Homo sapiens
SEQUENCE: 342
QTVVTQEPSL TVSPGGTVTL TCASSTGAVT SGYYPNWFQQ KPGQAPRALI YSTSNKHSWT    60
PARFSGSLLG KAALTLSGV QPEDEAEYYC LLYYGGAQ                             98

SEQ ID NO: 343          moltype = AA  length = 98
FEATURE                 Location/Qualifiers
source                  1..98
                        mol_type = protein
                        organism = Homo sapiens
SEQUENCE: 343
QAVVTQEPSL TVSPGGTVTL TCGSSTGAVT SGHYPYWFQQ KPGQAPRTLI YDTSNKHSWT    60
PARFSGSLLG KAALTLSGA QPEDEAEYYC LLSYSGAR                             98

SEQ ID NO: 344          moltype = AA  length = 98
FEATURE                 Location/Qualifiers
source                  1..98
                        mol_type = protein
                        organism = Homo sapiens
SEQUENCE: 344
QTVVTQEPSF SVSPGGTVTL TCGLSSGSVS TSYYPSWYQQ TPGQAPRTLI YSTNTRSSGV    60
PDRFSGSILG NKAALTITGA QADDESDYYC VLYMGSGI                            98

SEQ ID NO: 345          moltype = AA  length = 104
FEATURE                 Location/Qualifiers
source                  1..104
                        mol_type = protein
                        organism = Homo sapiens
SEQUENCE: 345
QPVLTQPPSA SASLGASVTL TCTLSSGYSN YKVDWYQQRP GKGPRFVMRV GTGGIVGSKG    60
DGIPDRFSVL GSGLNRYLTI KNIQEEDESD YHCGADHGSG SNFV                    104

SEQ ID NO: 346          moltype = AA  length = 98
FEATURE                 Location/Qualifiers
source                  1..98
                        mol_type = protein
                        organism = Homo sapiens
SEQUENCE: 346
QAGLTQPPSV SKGLRQTATL TCTGNSNNVG NQGAAWLQQH QGHPPKLLSY RNNNRPSGIS    60
ERLSASRSGN TASLTITGLQ PEDEADYYCS AWDSSLSA                            98

SEQ ID NO: 347          moltype = AA  length = 98
FEATURE                 Location/Qualifiers
source                  1..98
                        mol_type = protein
                        organism = Homo sapiens
SEQUENCE: 347
QVQLVQSGAE VKKPGASVKV SCKASGYTFT GYYMHWVRQA PGQGLEWMGR INPNSGGTNY    60
AQKFQGRVTS TRDTSISTAY MELSRLRSDD TVVYYCAR                            98

SEQ ID NO: 348          moltype = AA  length = 98
FEATURE                 Location/Qualifiers
source                  1..98
                        mol_type = protein
                        organism = Homo sapiens
SEQUENCE: 348
QVQLVQSGAE VKKPGASVKV SCKASGYTFT SYAMHWVRQA PGQRLEWMGW INAGNGNTKY    60
SQKFQGRVTI TRDTSASTAY MELSSLRSED TAVYYCAR                            98

SEQ ID NO: 349          moltype = AA  length = 98
FEATURE                 Location/Qualifiers
source                  1..98
                        mol_type = protein
                        organism = Homo sapiens
SEQUENCE: 349
QVQLVQSGAE VKKPGASVKV SCKASGYTFT SYDINWVRQA TGQGLEWMGW MNPNSGNTGY    60
AQKFQGRVTM TRNTSISTAY MELSSLRSED TAVYYCAR                            98

SEQ ID NO: 350          moltype = AA  length = 98
FEATURE                 Location/Qualifiers
source                  1..98
                        mol_type = protein
                        organism = Homo sapiens
SEQUENCE: 350
QVQLVQSGAE VKKPGASVKV SCKASGYTFT SYGISWVRQA PGQGLEWMGW ISAYNGNTNY    60
AQKLQGRVTM TTDTSTSTAY MELRSLRSDD TAVYYCAR                            98

SEQ ID NO: 351          moltype = AA  length = 98
FEATURE                 Location/Qualifiers
```

```
source                    1..98
                          mol_type = protein
                          organism = Homo sapiens
SEQUENCE: 351
QVQLVQSGAE VKKPGASVKV SCKVSGYTLT ELSMHWVRQA PGKGLEWMGG FDPEDGETIY    60
AQKFQGRVTM TEDTSTDTAY MELSSLRSED TAVYYCAT                            98

SEQ ID NO: 352            moltype = AA  length = 98
FEATURE                   Location/Qualifiers
source                    1..98
                          mol_type = protein
                          organism = Homo sapiens
SEQUENCE: 352
QMQLVQSGAE VKKTGSSVKV SCKASGYTFT YRYLHWVRQA PGQALEWMGW ITPFNGNTNY    60
AQKFQDRVTI TRDRSMSTAY MELSSLRSED TAMYYCAR                            98

SEQ ID NO: 353            moltype = AA  length = 98
FEATURE                   Location/Qualifiers
source                    1..98
                          mol_type = protein
                          organism = Homo sapiens
SEQUENCE: 353
QVQLVQSGAE VKKPGASVKV SCKASGYTFT SYYMHWVRQA PGQGLEWMGI INPSGGSTSY    60
AQKFQGRVTM TRDTSTSTVY MELSSLRSED TAVYYCAR                            98

SEQ ID NO: 354            moltype = AA  length = 98
FEATURE                   Location/Qualifiers
source                    1..98
                          mol_type = protein
                          organism = Homo sapiens
SEQUENCE: 354
QMQLVQSGPE VKKPGTSVKV SCKASGFTFT SSAVQWVRQA RGQRLEWIGW IVVGSGNTNY    60
AQKFQERVTI TRDMSTSTAY MELSSLRSED TAVYYCAA                            98

SEQ ID NO: 355            moltype = AA  length = 98
FEATURE                   Location/Qualifiers
source                    1..98
                          mol_type = protein
                          organism = Homo sapiens
SEQUENCE: 355
EVQLVQSGAE VKKPGATVKI SCKVSGYTFT DYYMHWVQQA PGKGLEWMGL VDPEDGETIY    60
AEKFQGRVTI TADTSTDTAY MELSSLRSED TAVYYCAT                            98

SEQ ID NO: 356            moltype = AA  length = 98
FEATURE                   Location/Qualifiers
source                    1..98
                          mol_type = protein
                          organism = Homo sapiens
SEQUENCE: 356
QVQLVQSGAE VKKPGSSVKV SCKASGGTFS SYAISWVRQA PGQGLEWMGG IIPIFGTANY    60
AQKFQGRVTI TADESTSTAY MELSSLRSED TAVYYCAR                            98

SEQ ID NO: 357            moltype = AA  length = 100
FEATURE                   Location/Qualifiers
source                    1..100
                          mol_type = protein
                          organism = Homo sapiens
SEQUENCE: 357
QITLKESGPT LVKPTQTLTL TCTFSGFSLS TSGVGVGWIR QPPGKALEWL ALIYWNDDKR    60
YSPSLKSRLT ITKDTSKNQV VLTMTNMDPV DTATYYCAHR                         100

SEQ ID NO: 358            moltype = AA  length = 100
FEATURE                   Location/Qualifiers
source                    1..100
                          mol_type = protein
                          organism = Homo sapiens
SEQUENCE: 358
QVTLKESGPV LVKPTETLTL TCTVSGFSLS NARMGVSWIR QPPGKALEWL AHIFSNDEKS    60
YSTSLKSRLT ISKDTSKSQV VLTMTNMDPV DTATYYCARI                         100

SEQ ID NO: 359            moltype = AA  length = 100
FEATURE                   Location/Qualifiers
source                    1..100
                          mol_type = protein
                          organism = Homo sapiens
SEQUENCE: 359
QVTLRESGPA LVKPTQTLTL TCTFSGFSLS TSGMCVSWIR QPPGKALEWL ALIDWDDDKY    60
YSTSLKTRLT ISKDTSKNQV VLTMTNMDPV DTATYYCARI                         100
```

```
SEQ ID NO: 360          moltype = AA   length = 98
FEATURE                 Location/Qualifiers
source                  1..98
                        mol_type = protein
                        organism = Homo sapiens
SEQUENCE: 360
EVQLVESGGG LVQPGGSLRL SCAASGFTFS SYWMSWVRQA PGKGLEWVAN IKQDGSEKYY   60
VDSVKGRFTI SRDNAKNSLY LQMNSLRAED TAVYYCAR                          98

SEQ ID NO: 361          moltype = AA   length = 99
FEATURE                 Location/Qualifiers
source                  1..99
                        mol_type = protein
                        organism = Homo sapiens
SEQUENCE: 361
EVQLVESGGG LVQPGRSLRL SCAASGFTFD DYAMHWVRQA PGKGLEWVSG ISWNSGSIGY   60
ADSVKGRFTI SRDNAKNSLY LQMNSLRAED TALYYCAKD                         99

SEQ ID NO: 362          moltype = AA   length = 98
FEATURE                 Location/Qualifiers
source                  1..98
                        mol_type = protein
                        organism = Homo sapiens
SEQUENCE: 362
QVQLVESGGG LVKPGGSLRL SCAASGFTFS DYYMSWIRQA PGKGLEWVSY ISSSGSTIYY   60
ADSVKGRFTI SRDNAKNSLY LQMNSLRAED TAVYYCAR                          98

SEQ ID NO: 363          moltype = AA   length = 97
FEATURE                 Location/Qualifiers
source                  1..97
                        mol_type = protein
                        organism = Homo sapiens
SEQUENCE: 363
EVQLVESGGG LVQPGGSLRL SCAASGFTFS SYDMHWVRQA TGKGLEWVSA IGTAGDTYYP   60
GSVKGRFTIS RENAKNSLYL QMNSLRAGDT AVYYCAR                           97

SEQ ID NO: 364          moltype = AA   length = 100
FEATURE                 Location/Qualifiers
source                  1..100
                        mol_type = protein
                        organism = Homo sapiens
SEQUENCE: 364
EVQLVESGGG LVKPGGSLRL SCAASGFTFS NAWMSWVRQA PGKGLEWVGR IKSKTDGGTT   60
DYAAPVKGRF TISRDDSKNT LYLQMNSLKT EDTAVYYCTT                        100

SEQ ID NO: 365          moltype = AA   length = 98
FEATURE                 Location/Qualifiers
source                  1..98
                        mol_type = protein
                        organism = Homo sapiens
SEQUENCE: 365
EVQLVESGGG VVRPGGSLRL SCAASGFTFD DYGMSWVRQA PGKGLEWVSG INWNGGSTGY   60
ADSVKGRFTI SRDNAKNSLY LQMNSLRAED TALYHCAR                          98

SEQ ID NO: 366          moltype = AA   length = 98
FEATURE                 Location/Qualifiers
source                  1..98
                        mol_type = protein
                        organism = Homo sapiens
SEQUENCE: 366
EVQLVESGGG LVKPGGSLRL SCAASGFTFS SYSMNWVRQA PGKGLEWVSS ISSSSSYIYY   60
ADSVKGRFTI SRDNAKNSLY LQMNSLRAED TAVYYCAR                          98

SEQ ID NO: 367          moltype = AA   length = 98
FEATURE                 Location/Qualifiers
source                  1..98
                        mol_type = protein
                        organism = Homo sapiens
SEQUENCE: 367
EVQLLESGGG LVQPGGSLRL SCAASGFTFS SYAMSWVRQA PGKGLEWVSA ISGSGGSTYY   60
ADSVKGRFTI SRDNSKNTLY LQMNSLRAED TAVYYCAK                          98

SEQ ID NO: 368          moltype = AA   length = 98
FEATURE                 Location/Qualifiers
source                  1..98
                        mol_type = protein
                        organism = Homo sapiens
SEQUENCE: 368
QVQLVESGGG VVQPGRSLRL SCAASGFTFS SYAMHWVRQA PGKGLEWVAV ISYDGSNKYY   60
```

```
ADSVKGRFTI SRDNSKNTLY LQMNSLRAED TAVYYCAR                              98

SEQ ID NO: 369           moltype = AA  length = 98
FEATURE                  Location/Qualifiers
source                   1..98
                         mol_type = protein
                         organism = Homo sapiens
SEQUENCE: 369
QVQLVESGGG VVQPGRSLRL SCAASGFTFS SYGMHWVRQA PGKGLEWVAV IWYDGSNKYY       60
ADSVKGRFTI SRDNSKNTLY LQMNSLRAED TAVYYCAR                              98

SEQ ID NO: 370           moltype = AA  length = 99
FEATURE                  Location/Qualifiers
source                   1..99
                         mol_type = protein
                         organism = Homo sapiens
SEQUENCE: 370
EVQLVESGGV VVQPGGSLRL SCAASGFTFD DYTMHWVRQA PGKGLEWVSL ISWDGGSTYY       60
ADSVKGRFTI SRDNSKNSLY LQMNSLRTED TALYYCAKD                             99

SEQ ID NO: 371           moltype = AA  length = 98
FEATURE                  Location/Qualifiers
source                   1..98
                         mol_type = protein
                         organism = Homo sapiens
SEQUENCE: 371
EVQLVESGGG LVQPGGSLRL SCAASGFTFS SYSMNWVRQA PGKGLEWVSY ISSSSSTIYY       60
ADSVKGRFTI SRDNAKNSLY LQMNSLRAED TAVYYCAR                              98

SEQ ID NO: 372           moltype = AA  length = 100
FEATURE                  Location/Qualifiers
source                   1..100
                         mol_type = protein
                         organism = Homo sapiens
SEQUENCE: 372
EVQLVESGGG LVQPGRSLRL SCTASGFTFG DYAMSWFRQA PGKGLEWVGF IRSKAYGGTT       60
EYTASVKGRF TISRDGSKSI AYLQMNSLKT EDTAVYYCTR                            100

SEQ ID NO: 373           moltype = AA  length = 97
FEATURE                  Location/Qualifiers
source                   1..97
                         mol_type = protein
                         organism = Homo sapiens
SEQUENCE: 373
EVQLVESGGG LIQPGGSLRL SCAASGFTVS SNYMSWVRQA PGKGLEWVSV IYSGGSTYYA       60
DSVKGRFTIS RDNSKNTLYL QMNSLRAEDT AVYYCAR                               97

SEQ ID NO: 374           moltype = AA  length = 98
FEATURE                  Location/Qualifiers
source                   1..98
                         mol_type = protein
                         organism = Homo sapiens
SEQUENCE: 374
EVQLVESGGG LVQPGGSLRL SCAASGFTFS SYAMHWVRQA PGKGLEYVSA ISSNGGSTYY       60
ANSVKGRFTI SRDNSKNTLY LQMGSLRAED MAVYYCAR                              98

SEQ ID NO: 375           moltype = AA  length = 97
FEATURE                  Location/Qualifiers
source                   1..97
                         mol_type = protein
                         organism = Homo sapiens
SEQUENCE: 375
EVQLVESGGG LVQPGGSLRL SCAASGFTVS SNYMSWVRQA PGKGLEWVSV IYSGGSTYYA       60
DSVKGRFTIS RDNSKNTLYL QMNSLRAEDT AVYYCAR                               97

SEQ ID NO: 376           moltype = AA  length = 100
FEATURE                  Location/Qualifiers
source                   1..100
                         mol_type = protein
                         organism = Homo sapiens
SEQUENCE: 376
EVQLVESGGG LVQPGGSLRL SCAASGFTFS DHYMDWVRQA PGKGLEWVGR TRNKANSYTT       60
EYAASVKGRF TISRDDSKNS LYLQMNSLKT EDTAVYYCAR                           100

SEQ ID NO: 377           moltype = AA  length = 100
FEATURE                  Location/Qualifiers
source                   1..100
                         mol_type = protein
                         organism = Homo sapiens
```

-continued

```
SEQUENCE: 377
EVQLVESGGG LVQPGGSLKL SCAASGFTFS GSAMHWVRQA SGKGLEWVGR IRSKANSYAT    60
AYAASVKGRF TISRDDSKNT AYLQMNSLKT EDTAVYYCTR                         100

SEQ ID NO: 378          moltype = AA  length = 98
FEATURE                 Location/Qualifiers
source                  1..98
                        mol_type = protein
                        organism = Homo sapiens
SEQUENCE: 378
EVQLVESGGG LVQPGGSLRL SCAASGFTFS SYWMHWVRQA PGKGLVWVSR INSDGSSTSY    60
ADSVKGRFTI SRDNAKNTLY LQMNSLRAED TAVYYCAR                           98

SEQ ID NO: 379          moltype = AA  length = 96
FEATURE                 Location/Qualifiers
source                  1..96
                        mol_type = protein
                        organism = Homo sapiens
SEQUENCE: 379
EVQLVESRGV LVQPGGSLRL SCAASGFTVS SNEMSWVRQA PGKGLEWVSS ISGGSTYYAD    60
SRKGRFTISR DNSKNTLHLQ MNSLRAEDTA VYYCKK                             96

SEQ ID NO: 380          moltype = AA  length = 98
FEATURE                 Location/Qualifiers
source                  1..98
                        mol_type = protein
                        organism = Homo sapiens
SEQUENCE: 380
QVQLVESGGG VVQPGGSLRL SCAASGFTFS SYGMHWVRQA PGKGLEWVSV IYSGGSSTYY    60
ADSVKGRFTI SRDNSKNTLY LQMNSLRAED TAVYYCAK                           98

SEQ ID NO: 381          moltype = AA  length = 98
FEATURE                 Location/Qualifiers
source                  1..98
                        mol_type = protein
                        organism = Homo sapiens
SEQUENCE: 381
QVQLQESGPG LVKPPGTLSL TCAVSGGSIS SSNWWSWVRQ PPGKGLEWIG EIYHSGSTNY    60
NPSLKSRVTI SVDKSKNQFS LKLSSVTAAD TAVYCCAR                           98

SEQ ID NO: 382          moltype = AA  length = 98
FEATURE                 Location/Qualifiers
source                  1..98
                        mol_type = protein
                        organism = Homo sapiens
SEQUENCE: 382
QVQLQESGPG LVKPSDTLSL TCAVSGYSIS SSNWWGWIRQ PPGKGLEWIG YIYYSGSTYY    60
NPSLKSRVTM SVDTSKNQFS LKLSSVTAVD TAVYYCAR                           98

SEQ ID NO: 383          moltype = AA  length = 99
FEATURE                 Location/Qualifiers
source                  1..99
                        mol_type = protein
                        organism = Homo sapiens
SEQUENCE: 383
QLQLQESGSG LVKPSQTLSL TCAVSGGSIS SGGYSWSWIR QPPGKGLEWI GYIYHSGSTY    60
YNPSLKSRVT ISVDRSKNQF SLKLSSVTAA DTAVYYCAR                          99

SEQ ID NO: 384          moltype = AA  length = 99
FEATURE                 Location/Qualifiers
source                  1..99
                        mol_type = protein
                        organism = Homo sapiens
SEQUENCE: 384
QVQLQESGPG LVKPSQTLSL TCTVSGGSIS SGDYYWSWIR QPPGKGLEWI GYIYYSGSTY    60
YNPSLKSRVT ISVDTSKNQF SLKLSSVTAA DTAVYYCAR                          99

SEQ ID NO: 385          moltype = AA  length = 99
FEATURE                 Location/Qualifiers
source                  1..99
                        mol_type = protein
                        organism = Homo sapiens
SEQUENCE: 385
QVQLQESGPG LVKPSQTLSL TCTVSGGSIS SGGYYWSWIR QHPGKGLEWI GYIYYSGSTY    60
YNPSLKSLVT ISVDTSKNQF SLKLSSVTAA DTAVYYCAR                          99

SEQ ID NO: 386          moltype = AA  length = 97
FEATURE                 Location/Qualifiers
source                  1..97
```

```
                              mol_type = protein
                              organism = Homo sapiens
SEQUENCE: 386
QVQLQQWGAG LLKPSETLSL TCAVYGGSFS GYYWSWIRQP PGKGLEWIGE INHSGSTNYN    60
PSLKSRVTIS VDTSKNQFSL KLSSVTAADT AVYYCAR                            97

SEQ ID NO: 387           moltype = AA   length = 99
FEATURE                  Location/Qualifiers
source                   1..99
                         mol_type = protein
                         organism = Homo sapiens
SEQUENCE: 387
QLQLQESGPG LVKPSETLSL TCTVSGGSIS SSSYYWGWIR QPPGKGLEWI GSIYYSGSTY    60
YNPSLKSRVT ISVDTSKNQF SLKLSSVTAA DTAVYYCAR                          99

SEQ ID NO: 388           moltype = AA   length = 97
FEATURE                  Location/Qualifiers
source                   1..97
                         mol_type = protein
                         organism = Homo sapiens
SEQUENCE: 388
QVQLQESGPG LVKPSETLSL TCTVSGGSIS SYYWSWIRQP PGKGLEWIGY IYYSGSTNYN    60
PSLKSRVTIS VDTSKNQFSL KLSSVTAADT AVYYCAR                            97

SEQ ID NO: 389           moltype = AA   length = 98
FEATURE                  Location/Qualifiers
source                   1..98
                         mol_type = protein
                         organism = Homo sapiens
SEQUENCE: 389
QVQLQESGPG LVKPSETLSL TCAVSGYSIS SGYYWGWIRQ PPGKGLEWIG SIYHSGSTYY    60
NPSLKSRVTI SVDTSKNQFS LKLSSVTAAD TAVYYCAR                           98

SEQ ID NO: 390           moltype = AA   length = 99
FEATURE                  Location/Qualifiers
source                   1..99
                         mol_type = protein
                         organism = Homo sapiens
SEQUENCE: 390
QVQLQESGPG LVKPSETLSL TCTVSGGSVS SGSYYWSWIR QPPGKGLEWI GYIYYSGSTN    60
YNPSLKSRVT ISVDTSKNQF SLKLSSVTAA DTAVYYCAR                          99

SEQ ID NO: 391           moltype = AA   length = 98
FEATURE                  Location/Qualifiers
source                   1..98
                         mol_type = protein
                         organism = Homo sapiens
SEQUENCE: 391
EVQLVQSGAE VKKPGESLRI SCKGSGYSFT SYWISWVRQM PGKGLEWMGR IDPSDSYTNY    60
SPSFQGHVTI SADKSISTAY LQWSSLKASD TAMYYCAR                           98

SEQ ID NO: 392           moltype = AA   length = 98
FEATURE                  Location/Qualifiers
source                   1..98
                         mol_type = protein
                         organism = Homo sapiens
SEQUENCE: 392
EVQLVQSGAE VKKPGESLKI SCKGSGYSFT SYWIGWVRQM PGKGLEWMGI IYPGDSDTRY    60
SPSFQGQVTI SADKSISTAY LQWSSLKASD TAMYYCAR                           98

SEQ ID NO: 393           moltype = AA   length = 101
FEATURE                  Location/Qualifiers
source                   1..101
                         mol_type = protein
                         organism = Homo sapiens
SEQUENCE: 393
QVQLQQSGPG LVKPSQTLSL TCAISGDSVS SNSAAWNWIR QSPSRGLEWL GRTYYRSKWY    60
NDYAVSVKSR ITINPDTSKN QFSLQLNSVT PEDTAVYYCA R                       101

SEQ ID NO: 394           moltype = AA   length = 98
FEATURE                  Location/Qualifiers
source                   1..98
                         mol_type = protein
                         organism = Homo sapiens
SEQUENCE: 394
QVQLVQSGSE LKKPGASVKV SCKASGYTFT SYAMNWVRQA PGQGLEWMGW INTNTGNPTY    60
AQGFTGRFVF SLDTSVSTAY LQICSLKAED TAVYYCAR                           98

SEQ ID NO: 395           moltype = AA   length = 12
```

```
FEATURE                     Location/Qualifiers
source                      1..12
                            mol_type = protein
                            organism = Homo sapiens
SEQUENCE: 395
WTFGQGTKVE IK                                                                    12

SEQ ID NO: 396              moltype = AA  length = 12
FEATURE                     Location/Qualifiers
source                      1..12
                            mol_type = protein
                            organism = Homo sapiens
SEQUENCE: 396
YTFGQGTKLE IK                                                                    12

SEQ ID NO: 397              moltype = AA  length = 12
FEATURE                     Location/Qualifiers
source                      1..12
                            mol_type = protein
                            organism = Homo sapiens
SEQUENCE: 397
FTFGPGTKVD IK                                                                    12

SEQ ID NO: 398              moltype = AA  length = 12
FEATURE                     Location/Qualifiers
source                      1..12
                            mol_type = protein
                            organism = Homo sapiens
SEQUENCE: 398
LTFGGGTKVE IK                                                                    12

SEQ ID NO: 399              moltype = AA  length = 12
FEATURE                     Location/Qualifiers
source                      1..12
                            mol_type = protein
                            organism = Homo sapiens
SEQUENCE: 399
ITFGQGTRLE IK                                                                    12

SEQ ID NO: 400              moltype = AA  length = 12
FEATURE                     Location/Qualifiers
source                      1..12
                            mol_type = protein
                            organism = Homo sapiens
SEQUENCE: 400
YVFGTGTKVT VL                                                                    12

SEQ ID NO: 401              moltype = AA  length = 12
FEATURE                     Location/Qualifiers
source                      1..12
                            mol_type = protein
                            organism = Homo sapiens
SEQUENCE: 401
VVFGGGTKLT VL                                                                    12

SEQ ID NO: 402              moltype = AA  length = 12
FEATURE                     Location/Qualifiers
source                      1..12
                            mol_type = protein
                            organism = Homo sapiens
SEQUENCE: 402
NVFGSGTKVT VL                                                                    12

SEQ ID NO: 403              moltype = AA  length = 12
FEATURE                     Location/Qualifiers
source                      1..12
                            mol_type = protein
                            organism = Homo sapiens
SEQUENCE: 403
AVFGGGTQLT VL                                                                    12

SEQ ID NO: 404              moltype = AA  length = 17
FEATURE                     Location/Qualifiers
source                      1..17
                            mol_type = protein
                            organism = Homo sapiens
SEQUENCE: 404
AEYFQHWGQG TLVTVSS                                                               17
```

```
SEQ ID NO: 405              moltype = AA  length = 17
FEATURE                     Location/Qualifiers
source                      1..17
                            mol_type = protein
                            organism = Homo sapiens
SEQUENCE: 405
YWYFDLWGRG TLVTVSS                                                           17

SEQ ID NO: 406              moltype = AA  length = 16
FEATURE                     Location/Qualifiers
source                      1..16
                            mol_type = protein
                            organism = Homo sapiens
SEQUENCE: 406
DAFDVWGQGT MVTVSS                                                            16

SEQ ID NO: 407              moltype = AA  length = 15
FEATURE                     Location/Qualifiers
source                      1..15
                            mol_type = protein
                            organism = Homo sapiens
SEQUENCE: 407
YFDYWGQGTL VTVSS                                                             15

SEQ ID NO: 408              moltype = AA  length = 16
FEATURE                     Location/Qualifiers
source                      1..16
                            mol_type = protein
                            organism = Homo sapiens
SEQUENCE: 408
NWFDSWGQGT LVTVSS                                                            16

SEQ ID NO: 409              moltype = AA  length = 20
FEATURE                     Location/Qualifiers
source                      1..20
                            mol_type = protein
                            organism = Homo sapiens
SEQUENCE: 409
YYYYYGMDVW GQGTTVTVSS                                                        20

SEQ ID NO: 410              moltype = AA  length = 20
FEATURE                     Location/Qualifiers
source                      1..20
                            mol_type = protein
                            organism = Homo sapiens
SEQUENCE: 410
VQKYTRALHD SSITGISPIT                                                        20

SEQ ID NO: 411              moltype = AA  length = 20
FEATURE                     Location/Qualifiers
source                      1..20
                            mol_type = protein
                            organism = Homo sapiens
SEQUENCE: 411
SSITGISPIT EYLASLSTYN                                                        20

SEQ ID NO: 412              moltype = AA  length = 20
FEATURE                     Location/Qualifiers
source                      1..20
                            mol_type = protein
                            organism = Homo sapiens
SEQUENCE: 412
EYLASLSTYN DQSITFALED                                                        20

SEQ ID NO: 413              moltype = AA  length = 20
FEATURE                     Location/Qualifiers
source                      1..20
                            mol_type = protein
                            organism = Homo sapiens
SEQUENCE: 413
DQSITFALED ESYEIYVEDL                                                        20

SEQ ID NO: 414              moltype = AA  length = 20
FEATURE                     Location/Qualifiers
source                      1..20
                            mol_type = protein
                            organism = Homo sapiens
SEQUENCE: 414
ESYEIYVEDL KKDEKKDKVL                                                        20
```

```
SEQ ID NO: 415            moltype = AA  length = 20
FEATURE                   Location/Qualifiers
source                    1..20
                          mol_type = protein
                          organism = Homo sapiens
SEQUENCE: 415
KKDEKKDKVL LSYYESQHPS                                                   20

SEQ ID NO: 416            moltype = AA  length = 20
FEATURE                   Location/Qualifiers
source                    1..20
                          mol_type = protein
                          organism = Homo sapiens
SEQUENCE: 416
LSYYESQHPS NESGDGVDGK                                                   20

SEQ ID NO: 417            moltype = AA  length = 20
FEATURE                   Location/Qualifiers
source                    1..20
                          mol_type = protein
                          organism = Homo sapiens
SEQUENCE: 417
NESGDGVDGK MLMVTLSPTK                                                   20

SEQ ID NO: 418            moltype = AA  length = 20
FEATURE                   Location/Qualifiers
source                    1..20
                          mol_type = protein
                          organism = Homo sapiens
SEQUENCE: 418
MLMVTLSPTK DFWLHANNKE                                                   20

SEQ ID NO: 419            moltype = AA  length = 20
FEATURE                   Location/Qualifiers
source                    1..20
                          mol_type = protein
                          organism = Homo sapiens
SEQUENCE: 419
DFWLHANNKE HSVELHKCEK                                                   20

SEQ ID NO: 420            moltype = AA  length = 20
FEATURE                   Location/Qualifiers
source                    1..20
                          mol_type = protein
                          organism = Homo sapiens
SEQUENCE: 420
HSVELHKCEK PLPDQAFFVL                                                   20

SEQ ID NO: 421            moltype = AA  length = 20
FEATURE                   Location/Qualifiers
source                    1..20
                          mol_type = protein
                          organism = Homo sapiens
SEQUENCE: 421
PLPDQAFFVL HNMHSNCVSF                                                   20

SEQ ID NO: 422            moltype = AA  length = 20
FEATURE                   Location/Qualifiers
source                    1..20
                          mol_type = protein
                          organism = Homo sapiens
SEQUENCE: 422
HNMHSNCVSF ECKTDPGVFI                                                   20

SEQ ID NO: 423            moltype = AA  length = 20
FEATURE                   Location/Qualifiers
source                    1..20
                          mol_type = protein
                          organism = Homo sapiens
SEQUENCE: 423
ECKTDPGVFI GVKDNHLALI                                                   20

SEQ ID NO: 424            moltype = AA  length = 20
FEATURE                   Location/Qualifiers
source                    1..20
                          mol_type = protein
                          organism = Homo sapiens
SEQUENCE: 424
```

```
GVKDNHLALI KVDSSENLCT                                                    20

SEQ ID NO: 425          moltype = AA  length = 20
FEATURE                 Location/Qualifiers
source                  1..20
                        mol_type = protein
                        organism = Homo sapiens
SEQUENCE: 425
KVDSSENLCT ENILFKLSET                                                    20

SEQ ID NO: 426          moltype = AA  length = 10
FEATURE                 Location/Qualifiers
source                  1..10
                        mol_type = protein
                        organism = Homo sapiens
SEQUENCE: 426
LEDESYEIYV                                                               10

SEQ ID NO: 427          moltype = AA  length = 9
FEATURE                 Location/Qualifiers
source                  1..9
                        mol_type = protein
                        organism = Homo sapiens
SEQUENCE: 427
EDESYEIYV                                                                 9
```

What is claimed is:

1. A method of making a monoclonal antibody, comprising:
 immunizing an animal with an immunogen that comprises a continuous amino acid SEQ ID NO:226;
 sequence included in positions 131 to 150 of collecting B cells from the immunized animal;
 fusing the collected B cells with immortalized cells to form hybridoma cells;
 screening the hybridoma cells to identify a hybridoma that produces an antibody that specifically binds to an epitope consisting of the continuous amino acid sequence included in positions 131 to 150 of SEQ ID NO:226; and
 producing the monoclonal antibody from the identified hybridoma.

2. The method according to claim 1, wherein the animal is a transgenic mouse induced with a gene for a human antibody, such that the monoclonal antibody is a human antibody.

3. A method of making a monoclonal antibody comprising:
 obtaining a phage antibody library;
 screening the library with an antigen comprising an epitope consisting of the continuous amino acid sequence included in positions 131 to 150 of SEQ ID NO:226;
 selecting a phage from the library that displays an antibody binding to the antigen;
 isolating or determining the sequence corresponding to the antibody from the selected phage;
 introducing the isolated or determined sequence into an expression vector;
 transfecting the expression vector into a cell line; and
 culturing the cell line to produce the monoclonal antibody.

* * * * *